United States Patent
Bernstein et al.

(10) Patent No.: US 10,620,781 B2
(45) Date of Patent: Apr. 14, 2020

(54) DEVICE, METHOD, AND GRAPHICAL USER INTERFACE FOR MOVING A CURSOR ACCORDING TO A CHANGE IN AN APPEARANCE OF A CONTROL ICON WITH SIMULATED THREE-DIMENSIONAL CHARACTERISTICS

(71) Applicant: Apple Inc., Cupertino, CA (US)

(72) Inventors: Jeffrey Traer Bernstein, San Francisco, CA (US); Avi E. Cieplinski, San Francisco, CA (US); May-Li Khoe, San Francisco, CA (US); David J. Hart, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 990 days.

(21) Appl. No.: 14/608,965

(22) Filed: Jan. 29, 2015

(65) Prior Publication Data

US 2015/0149964 A1     May 28, 2015

Related U.S. Application Data

(63) Continuation of application No. PCT/US2013/069484, filed on Nov. 11, 2013.
(Continued)

(51) Int. Cl.
*G06F 3/0481*     (2013.01)
*G06F 3/041*     (2006.01)
(Continued)

(52) U.S. Cl.
CPC ........ *G06F 3/04817* (2013.01); *G06F 3/0414* (2013.01); *G06F 3/0481* (2013.01);
(Continued)

(58) Field of Classification Search
None
See application file for complete search history.

(56) References Cited

U.S. PATENT DOCUMENTS 4,674,044 A    6/1987   Kalmus et al.
4,750,135 A    6/1988   Boilen
(Continued)

FOREIGN PATENT DOCUMENTS

AU      2016100649 A4    6/2016
CN      1658150          8/2005
(Continued)

OTHER PUBLICATIONS

Oh et al., "Moving Objects with 2D Input Devices in CAD Systems and Desktop Virtual Environments", Proceedings of Graphics Interface 2005, pp. 195-202, May 2005.*
(Continued)

*Primary Examiner* — Jennifer N To
*Assistant Examiner* — Joseph R. Burwell
(74) *Attorney, Agent, or Firm* — Morgan, Lewis & Bockius LLP

(57) ABSTRACT

An electronic device with a display, a touch-sensitive surface and one or more sensors to detect intensity of contacts with the touch-sensitive surface displays a respective control icon with simulated three-dimensional characteristics and a cursor over the respective control icon. The device detects, on the touch-sensitive surface, a stationary press input that includes an increase in intensity of a contact that corresponds to the cursor. In response to detecting the stationary press input, the device changes an appearance of the respective control icon in accordance with the simulated three-dimensional characteristics of the control icon and moves the cursor laterally on the display in accordance with the change in appearance of the respective control icon.

27 Claims, 59 Drawing Sheets

Related U.S. Application Data

(60) Provisional application No. 61/778,373, filed on Mar. 12, 2013, provisional application No. 61/747,278, filed on Dec. 29, 2012.

(51) Int. Cl.
*G06F 3/0484* (2013.01)
*G06F 3/0488* (2013.01)

(52) U.S. Cl.
CPC .......... *G06F 3/0484* (2013.01); *G06F 3/0488* (2013.01); *G06F 3/04812* (2013.01); *G06F 3/04815* (2013.01)

(56) References Cited

U.S. PATENT DOCUMENTS

| | | |
|---|---|---|
| 4,864,520 A | 9/1989 | Setoguchi et al. |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,184,120 A | 2/1993 | Schultz |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,428,730 A | 6/1995 | Baker et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagano |
| 5,689,651 A | 11/1997 | Lozman |
| 5,695,400 A | 12/1997 | Fenell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,121,960 A | 9/2000 | Carroll et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,232,891 B1 | 5/2001 | Rosenberg |
| 6,243,080 B1 | 6/2001 | Moine |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,313,836 B1 * | 11/2001 | Russell, Jr. ......... G06F 3/04812 345/419 |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,806,893 B1 * | 10/2004 | Kolawa ............... G06F 3/04817 715/836 |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,943,778 B1 | 9/2005 | Astala et al. |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |

(56) References Cited

U.S. PATENT DOCUMENTS

| | | |
|---|---|---|
| 7,411,575 B2 | 8/2008 | Hill et al. |
| 7,434,177 B1 | 10/2008 | Ording et al. |
| 7,441,204 B2 | 10/2008 | Thomson et al. |
| 7,461,026 B2 | 12/2008 | Schluetter |
| 7,471,284 B2 | 12/2008 | Bathiche et al. |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,552,397 B2 | 6/2009 | Holecek et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas-Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Luttter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,499,243 B2 | 7/2013 | Yuki |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,954,889 B2 | 2/2015 | Fujibayashi |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,032,321 B1 | 5/2015 | Cohen et al. |
| 9,046,999 B1 | 6/2015 | Teller et al. |
| 9,052,820 B2 | 6/2015 | Jarrett et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,128,605 B2 | 9/2015 | Nan et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,383,887 B1 | 7/2016 | Khafizov et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |

(56) References Cited

U.S. PATENT DOCUMENTS

| | | |
|---|---|---|
| 9,582,178 B2 | 2/2017 | Grant et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,645,722 B1 | 5/2017 | Stasior et al. |
| 9,671,943 B2 | 6/2017 | Van der Velden |
| 9,678,571 B1 | 6/2017 | Robert et al. |
| 9,733,716 B2 | 8/2017 | Shaffer |
| 9,740,381 B1 | 8/2017 | Chaudhri et al. |
| 9,760,241 B1 | 9/2017 | Lewbel |
| 9,785,305 B2 | 10/2017 | Alonso Ruiz et al. |
| 10,055,066 B2 | 8/2018 | Lynn et al. |
| 10,057,490 B2 | 8/2018 | Shin et al. |
| 10,095,396 B2 | 10/2018 | Kudershian et al. |
| 10,222,980 B2 | 3/2019 | Alonso Ruiz et al. |
| 10,235,023 B2 | 3/2019 | Gustafsson et al. |
| 10,331,769 B1 | 6/2019 | Hill et al. |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0042925 A1 | 4/2002 | Ebisu et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109668 A1 | 8/2002 | Rosenberg et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0163498 A1 | 11/2002 | Chang et al. |
| 2002/0178102 A1 | 11/2002 | Scheinberg et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0128242 A1* | 7/2003 | Gordon ............... G06F 3/04815 715/848 |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001657 A1 | 1/2006 | Monney et al. |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0236263 A1 | 10/2006 | Bathiche et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120834 A1 | 5/2007 | Boillot |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |

(56) References Cited

U.S. PATENT DOCUMENTS

| | | |
|---|---|---|
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0200713 A1 | 8/2007 | Weber et al. |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270186 A1 | 11/2007 | Gulliksson et al. |
| 2007/0288862 A1 | 12/2007 | Ording |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2007/0299923 A1 | 12/2007 | Skelly et al. |
| 2008/0001924 A1 | 1/2008 | de los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0094398 A1* | 4/2008 | Ng ............... G06F 3/0486 345/427 |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165141 A1 | 7/2008 | Christie |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0225007 A1* | 9/2008 | Nakadaira ........... G06F 3/03545 345/173 |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Chou |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0284478 A1 | 11/2009 | De la Torre Baltierra et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307583 A1 | 12/2009 | Tonisson |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0020035 A1 | 1/2010 | Ryu et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0061637 A1 | 3/2010 | Mochizuki et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0088654 A1 | 4/2010 | Henhoeffer |
| 2010/0090988 A1 | 4/2010 | Park |
| 2010/0110082 A1 | 5/2010 | Myrick et al. |
| 2010/0111434 A1 | 5/2010 | Madden |

(56) References Cited

U.S. PATENT DOCUMENTS

| | | |
|---|---|---|
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156807 A1 | 6/2010 | Stallings et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0248787 A1 | 9/2010 | Smuga et al. |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0295805 A1 | 11/2010 | Shin et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315345 A1 | 12/2010 | Laitinen |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0026099 A1 | 2/2011 | Kwon et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0050687 A1* | 3/2011 | Alyshev ............... G06T 15/00 345/419 |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0102340 A1 | 5/2011 | Martin et al. |
| 2011/0107272 A1 | 5/2011 | Aguilar |
| 2011/0109617 A1* | 5/2011 | Snook ..................... G06T 17/00 345/419 |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1 | 7/2011 | van Os |
| 2011/0167382 A1 | 7/2011 | Van Os |
| 2011/0169765 A1 | 7/2011 | Aono |
| 2011/0175826 A1 | 7/2011 | Moore et al. |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0234639 A1 | 9/2011 | Shimotani et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0260994 A1 | 10/2011 | Saynac et al. |

(56) References Cited

U.S. PATENT DOCUMENTS

| | | |
|---|---|---|
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2011/0319136 A1 | 12/2011 | Labowicz et al. |
| 2012/0005622 A1 | 1/2012 | Park et al. |
| 2012/0007857 A1* | 1/2012 | Noda .................. G06F 3/04812 345/419 |
| 2012/0011437 A1 | 1/2012 | James et al. |
| 2012/0013541 A1 | 1/2012 | Boka et al. |
| 2012/0013542 A1 | 1/2012 | Shenfield |
| 2012/0013607 A1* | 1/2012 | Lee .................. G06T 15/20 345/419 |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081326 A1 | 4/2012 | Heubel et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0144330 A1 | 6/2012 | Flint |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0158629 A1 | 6/2012 | Hinckley et al. |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0180001 A1 | 7/2012 | Griffin et al. |
| 2012/0182226 A1 | 7/2012 | Tuli |
| 2012/0183271 A1 | 7/2012 | Forutanpour et al. |
| 2012/0200528 A1 | 8/2012 | Ciesla et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256829 A1 | 10/2012 | Dodge |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063364 A1 | 3/2013 | Moore |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0076676 A1 | 3/2013 | Gan |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097564 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120280 A1 | 5/2013 | Kukulski |
| 2013/0120295 A1 | 5/2013 | Kim et al. |
| 2013/0120306 A1 | 5/2013 | Furukawa |
| 2013/0127755 A1 | 5/2013 | Lynn et al. |
| 2013/0135243 A1 | 5/2013 | Hirsch et al. |
| 2013/0135288 A1* | 5/2013 | King .................. G06F 3/04812 345/419 |
| 2013/0135499 A1 | 5/2013 | Song |
| 2013/0141364 A1 | 6/2013 | Lynn et al. |

(56) References Cited

U.S. PATENT DOCUMENTS

| | | |
|---|---|---|
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0185642 A1 | 7/2013 | Gammons |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227413 A1 | 8/2013 | Thorsander et al. |
| 2013/0227419 A1 | 8/2013 | Lee et al. |
| 2013/0227450 A1 | 8/2013 | Na et al. |
| 2013/0228023 A1 | 9/2013 | Drasnin et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0246954 A1 | 9/2013 | Gray et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307790 A1 | 11/2013 | Konttori et al. |
| 2013/0307792 A1 | 11/2013 | Andres et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0326583 A1 | 12/2013 | Freihold et al. |
| 2013/0332836 A1 | 12/2013 | Cho |
| 2013/0332892 A1 | 12/2013 | Matsuki |
| 2013/0338847 A1 | 12/2013 | Lissean et al. |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0013271 A1 | 1/2014 | Moore et al. |
| 2014/0024414 A1 | 1/2014 | Fuji |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0071060 A1 | 3/2014 | Santos-Gomez |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0344765 A1 | 11/2014 | Hicks et al. |
| 2014/0351744 A1 | 11/2014 | Jeon et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0002664 A1 | 1/2015 | Eppinger et al. |
| 2015/0015763 A1 | 1/2015 | Lee et al. |
| 2015/0020032 A1* | 1/2015 | Chen ................. G06F 3/017 715/857 |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0026642 A1 | 1/2015 | Wilson et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0055890 A1 | 2/2015 | Lundin et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |

(56) References Cited

U.S. PATENT DOCUMENTS

| | | |
|---|---|---|
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0169059 A1 | 6/2015 | Behles et al. |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0309573 A1 | 10/2015 | Brombach et al. |
| 2015/0321607 A1 | 11/2015 | Cho et al. |
| 2015/0332107 A1 | 11/2015 | Paniaras |
| 2015/0378519 A1 | 11/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0077721 A1 | 3/2016 | Laubach et al. |
| 2016/0085385 A1 | 3/2016 | Gao et al. |
| 2016/0125234 A1 | 5/2016 | Ota et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0115867 A1 | 4/2017 | Bargmann |
| 2017/0123497 A1 | 5/2017 | Yonezawa |
| 2017/0139565 A1 | 5/2017 | Choi |
| 2017/0315694 A1 | 11/2017 | Alonso Ruiz et al. |
| 2018/0024681 A1 | 1/2018 | Bernstein et al. |
| 2018/0082522 A1 | 3/2018 | Bartosik |
| 2018/0275862 A1 | 9/2018 | Khoe et al. |
| 2018/0364883 A1 | 12/2018 | Khoe et al. |
| 2018/0364898 A1 | 12/2018 | Chen |
| 2018/0364904 A1 | 12/2018 | Bernstein et al. |
| 2019/0004605 A1 | 1/2019 | Flint et al. |
| 2019/0018562 A1 | 1/2019 | Bernstein et al. |
| 2019/0042075 A1 | 2/2019 | Bernstein et al. |
| 2019/0042078 A1 | 2/2019 | Bernstein et al. |
| 2019/0065043 A1 | 2/2019 | Zambetti et al. |
| 2019/0121493 A1 | 4/2019 | Bernstein et al. |
| 2019/0121520 A1 | 4/2019 | Cieplinski et al. |
| 2019/0138101 A1 | 5/2019 | Bernstein |
| 2019/0138102 A1 | 5/2019 | Missig |
| 2019/0138189 A1 | 5/2019 | Missig |
| 2019/0146643 A1 | 5/2019 | Foss et al. |
| 2019/0155503 A1 | 5/2019 | Alonso Ruiz et al. |
| 2019/0158727 A1 | 5/2019 | Penha et al. |
| 2019/0163358 A1 | 5/2019 | Dascola et al. |
| 2019/0171353 A1 | 6/2019 | Missig et al. |
| 2019/0171354 A1 | 6/2019 | Dascola et al. |
| 2019/0212896 A1 | 7/2019 | Karunamuni et al. |
| 2019/0332257 A1 | 10/2019 | Kudurshian et al. |
| 2019/0364194 A1 | 11/2019 | Penha et al. |
| 2019/0391658 A1 | 12/2019 | Missig et al. |

FOREIGN PATENT DOCUMENTS

| | | |
|---|---|---|
| CN | 1661556 | 8/2005 |
| CN | 1808362 A | 7/2006 |
| CN | 1955906 | 5/2007 |
| CN | 101102573 | 1/2008 |
| CN | 101118469 A | 2/2008 |
| CN | 101192097 A | 6/2008 |
| CN | 101202866 A | 6/2008 |
| CN | 101222704 A | 7/2008 |
| CN | 101241397 A | 8/2008 |
| CN | 201107762 | 8/2008 |
| CN | 101320303 A | 12/2008 |
| CN | 100524183 | 8/2009 |
| CN | 101498979 A | 8/2009 |
| CN | 101527745 A | 9/2009 |
| CN | 101593077 A | 12/2009 |
| CN | 101604208 A | 12/2009 |
| CN | 101650615 A | 2/2010 |
| CN | 101727268 | 6/2010 |
| CN | 101809526 A | 8/2010 |
| CN | 101965549 A | 2/2011 |
| CN | 101998052 A | 3/2011 |
| CN | 102004593 A | 4/2011 |
| CN | 102037435 | 4/2011 |
| CN | 102099776 | 6/2011 |

(56) References Cited

FOREIGN PATENT DOCUMENTS

| | | |
|---|---|---|
| CN | 102112946 A | 6/2011 |
| CN | 102160021 A | 8/2011 |
| CN | 102243662 A | 11/2011 |
| CN | 102301322 A | 12/2011 |
| CN | 102349038 A | 2/2012 |
| CN | 102349040 A | 2/2012 |
| CN | 102385478 A | 3/2012 |
| CN | 102438092 A | 5/2012 |
| CN | 102460355 A | 5/2012 |
| CN | 102483677 A | 5/2012 |
| CN | 102646013 A | 8/2012 |
| CN | 102662571 A | 9/2012 |
| CN | 102662573 A | 9/2012 |
| CN | 102752441 A | 10/2012 |
| CN | 102792255 A | 11/2012 |
| CN | 102819401 A | 12/2012 |
| CN | 102841677 A | 12/2012 |
| CN | 103019586 A | 4/2013 |
| CN | 103092386 A | 5/2013 |
| CN | 103097992 A | 5/2013 |
| CN | 103186345 A | 7/2013 |
| CN | 103201714 A | 7/2013 |
| CN | 103279295 A | 9/2013 |
| CN | 103518176 A | 1/2014 |
| CN | 103649885 A | 3/2014 |
| CN | 103777850 A | 5/2014 |
| CN | 103793134 A | 5/2014 |
| CN | 103838465 A | 6/2014 |
| CN | 104011637 A | 8/2014 |
| CN | 104020955 A | 9/2014 |
| CN | 104021021 A | 9/2014 |
| CN | 104024985 A | 9/2014 |
| CN | 104160362 A | 11/2014 |
| CN | 104331239 A | 2/2015 |
| CN | 104392292 A | 3/2015 |
| CN | 104412201 A | 3/2015 |
| CN | 104471521 A | 3/2015 |
| CN | 104487928 A | 4/2015 |
| CN | 101527745 A | 9/2015 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 077 490 A2 | 7/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 708985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | 58-182746 | 10/1983 |
| JP | H07-098769 A | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2000-148348 A | 5/2000 |
| JP | 2001-078137 A | 3/2001 |
| JP | 2001-202192 A | 7/2001 |
| JP | 2001-222355 A | 8/2001 |
| JP | 2002-041023 A | 2/2002 |
| JP | 2002-044536 A | 2/2002 |
| JP | 2002-149312 A | 5/2002 |
| JP | 3085481 U | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2004-152217 A | 5/2004 |
| JP | 2004-288208 A | 10/2004 |
| JP | 2005-031786 A | 2/2005 |
| JP | 2005-070777 A | 3/2005 |
| JP | 2005-092386 A | 4/2005 |
| JP | 2005-102106 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2005-352927 | 12/2005 |
| JP | 2005-352927 A | 12/2005 |
| JP | 2006-185443 A | 7/2006 |
| JP | 2007-116384 A | 5/2007 |
| JP | 2007-148104 A | 6/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-191086 A | 8/2008 |
| JP | 2008-537615 | 9/2008 |
| JP | 2008 305174 A | 12/2008 |
| JP | 2009-500761 | 1/2009 |
| JP | 2009-129171 A | 6/2009 |
| JP | 2009-129443 A | 6/2009 |
| JP | 2009-169452 A | 7/2009 |

(56) References Cited

FOREIGN PATENT DOCUMENTS

| | | |
|---|---|---|
| JP | 2009-211704 A | 9/2009 |
| JP | 2009-217543 A | 9/2009 |
| JP | 2009-217815 A | 9/2009 |
| JP | 2009-294688 A | 12/2009 |
| JP | 2009-545805 A | 12/2009 |
| JP | 2010-009321 A | 1/2010 |
| JP | 2010-503126 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-181940 A | 8/2010 |
| JP | 2010-198385 A | 9/2010 |
| JP | 2010-541071 A | 12/2010 |
| JP | 2011-501307 A | 1/2011 |
| JP | 2011-028635 A | 2/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-170538 A | 9/2011 |
| JP | 2011 192179 A | 9/2011 |
| JP | 2011-192215 A | 9/2011 |
| JP | 2011-197848 A | 10/2011 |
| JP | 2011-232947 A | 11/2011 |
| JP | 2011-242386 A | 12/2011 |
| JP | 2011-250004 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-033061 A | 2/2012 |
| JP | 2012-043266 A | 3/2012 |
| JP | 2012-043267 A | 3/2012 |
| JP | 2012-053687 A | 3/2012 |
| JP | 2012-053754 | 3/2012 |
| JP | 2012-053926 A | 3/2012 |
| JP | 2012-073785 A | 4/2012 |
| JP | 2012-073873 A | 4/2012 |
| JP | 2012-509605 A | 4/2012 |
| JP | 2012-093820 A | 5/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-527685 A | 11/2012 |
| JP | 2013-030050 A | 2/2013 |
| JP | 2013-058149 A | 3/2013 |
| JP | 2013-080521 A | 5/2013 |
| JP | 2013-105410 A | 5/2013 |
| JP | 2013-529339 A | 7/2013 |
| JP | 2013-542488 A | 11/2013 |
| JP | 2014-504419 | 2/2014 |
| JP | 2014-052852 A | 3/2014 |
| JP | 2014-130567 A | 7/2014 |
| JP | 2014-140112 A | 7/2014 |
| JP | 2014-519109 A | 8/2014 |
| JP | 2014-529137 A | 10/2014 |
| JP | 2015-099555 A | 5/2015 |
| JP | 2015-521315 A | 7/2015 |
| JP | 2015-153420 A | 8/2015 |
| JP | 2015-185161 A | 10/2015 |
| KR | 2006-0071353 A | 6/2006 |
| KR | 2008-0045143 A | 4/2008 |
| KR | 100823871 B1 | 4/2008 |
| KR | 2008-0054346 A | 6/2008 |
| KR | 2008-0078108 A | 8/2008 |
| KR | 2010-0010302 | 2/2010 |
| KR | 2010-0010860 A | 2/2010 |
| KR | 2010-0014095 A | 2/2010 |
| KR | 2010-0023637 | 3/2010 |
| KR | 2010-0034608 | 4/2010 |
| KR | 2010 0046087 | 6/2010 |
| KR | 2010 0070841 A | 6/2010 |
| KR | 2010 0133246 A | 12/2010 |
| KR | 2011 0026176 A | 3/2011 |
| KR | 2011 0086501 A | 7/2011 |
| KR | 20120103670 A | 9/2012 |
| KR | 20120135723 A | 12/2012 |
| KR | 2013 0099647 A | 9/2013 |
| KR | 2014 0016495 A | 2/2014 |
| KR | 2014 0029720 A | 3/2014 |
| KR | 2014 0043760 A | 4/2014 |
| KR | 2014 0079110 A | 6/2014 |
| KR | 2014 0122000 A | 10/2014 |
| KR | 20150013263 A | 2/2015 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2006/094308 A2 | 9/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 2/2010 |
| WO | WO 2010/032598 A1 | 3/2010 |
| WO | WO 2010/090010 A1 | 8/2010 |
| WO | WO 2010/122813 A1 | 10/2010 |
| WO | WO 2010/134729 A2 | 11/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |

(56) References Cited

FOREIGN PATENT DOCUMENTS

| | | |
|---|---|---|
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/137946 A1 | 10/2012 |
| WO | WO 2012/150540 A2 | 11/2012 |
| WO | WO 2012/153555 A1 | 11/2012 |
| WO | WO 2013/022486 A1 | 2/2013 |
| WO | WO 2013/035725 A1 | 3/2013 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 20141105276 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Stewart et al., "Characteristics of Pressure-Based Input for Mobile Devices", Proceedings of the SIGCHI Conference on Human Factors in Computing Systems, pp. 801-810, Apr. 2010.*
Jauregui et al., "Design and evaluation of 3D cursors and motion parallax for the exploration of desktop virtual environments", IEEE Symposium on 3D User Interfaces 2012, Mar. 4, 2012. (Year: 2012).*
Plaisant et al., "Touchscreen Toggle Design", Proceedings of CHI '92, pp. 667-668, May 1992. (Year: 1992).*
Office Action, dated Aug. 27, 2015, received in Australian Patent Application No. 2013259614, which corresponds with U.S. Appl. No. 14/536,141, 4 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Alzona, "Full Screen Maximization with RightZoom," http://www.brighhub.com/computing/mac-platform/articles/31024.aspx>, Mar. 31, 2009, 6 pages.
Apple Inc., "iPhone User Guide for iPhone and iPhone 3G," http://manuals.info.apple.com/en_US/iPhone_User_Guide.pdf, Jul. 11, 2008, 154 pages.
Ask.MetaFilter, "Enable Screen Resize?" ask. Metafilter.com, Jan. 29, 2006, http://ask.metafilter.com/31720/Enable-screen-resize, 4 pages.
Awduche et al., "Synchronized Broadcast in Cellular Networks," 2nd Telecommunications R&D Conference in Massachusetts, Mar. 1996, 12 pages.
Azundris, "A Fire in the Sky," http://web.archive.org/web/20140722062639/http://blog.azundrix.com/archives/168-A-fire-in-the-sky.html, Jul. 22, 2014, 8 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html>, Feb. 17, 2010, 3 pages.
Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
IBM et al., "Pressure-Sensitive Icons", IBM, US, Jun. 1, 1990, 3 pages.
ICIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 5 pages.
McRitchie, "Internet Explorer Right-Click Menus," http://web.archive.org/web-201405020/http://dmcritchie.mvps.org/ie/rightie6.htm, May 2, 2014, 10 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article17878.htm>, Mar. 11, 2010, 3 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_41_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.

(56) References Cited

OTHER PUBLICATIONS

Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Science, Oxford, GB vol. 40, No. 12, Dec. 1, 2009, 11 pages.
Pallenberg, "Wow, the new iPad had gestures." https://plus.google.com/+SaschaPallenberg/posts/aaJtJogu8ac, Mar. 7, 2012, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
Reiger, "Effective Design for Multiple Screen Sizes," mobiForge, http://mobiforge.com/designing/story/effective-design-multiple-screen-sizes, Jan. 2009, 12 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple" User Interfaces: Development Models and Research Opportunities, The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.
Sony, "Sony Xperia Z1", Wikipedia, the free encyclopedia, https://en.wikipedia.org/wiki/Sony_Xperia_Z1, Sep. 2013, 10 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
Office Action, dated May 22, 2012, received in U.S. Appl. No. 12/888,381, 18 pages.
Final Office Action, dated Nov. 19, 2012, received in U.S. Appl. No. 12/888,381, 14 pages.
Office Action, dated Dec. 10, 2013, received in U.S. Appl. No. 12/888,381, 13 pages.
Notice of Allowance, dated Oct. 21, 2014, received in U.S. Appl. No. 12/888,381, 8 pages.
Notice of Allowance, dated Feb. 17, 2015, received in U.S. Appl. No. 12/888,381, 5 pages.
Notice of Allowance (corrected), dated Apr. 9, 2015, received in U.S. Appl. No. 12/888,381, 2 pages.
Office Action, dated Aug. 8, 2013, received in Australian Patent Application No. 2010350740, 3 pages.
Office Action, dated Aug. 28, 2012, received in Chinese Patent Application No. 201010602688.2, which corresponds with U.S. Appl. No. 12/888,381, 6 pages.
Office Action, dated May 24, 2013, received in Chinese Patent Application No. 201010602688.2, which corresponds with U.S. Appl. No. 12/888,381, 7 pages.
Office Action, dated Aug. 6, 2013, received in European Patent Application No. 10760867.1, which corresponds with U.S. Appl. No. 12/888,381, 4 pages.
Office Action, dated Dec. 6, 2013, received in Japanese Patent Application No. 2013-503722, which corresponds with U.S. Appl. No. 12/888,381, 2 pages.
Office Action, dated Nov. 29, 2013, received in Korean Patent Application No. 2012-7029281, which corresponds with U.S. Appl. No. 12/888,381, 4 pages.
Office Action, dated May 10, 2012, received in U.S. Appl. No. 12/888,382, 9 pages.
Final Office Action, dated Nov. 15, 2012, received in U.S. Appl. No. 12/888,382, 11 pages.
Office Action, dated Dec. 10, 2013, received in U.S. Appl. No. 12/888,382, 12 pages.
Notice of Allowance, dated Oct. 31, 2014, received in U.S. Appl. No. 12/888,382, 5 pages.
Notice of Allowance, dated Feb. 13, 2015, received in U.S. Appl. No. 12/888,382, 6 pages.
Office Action, dated May 17, 2012, received in U.S. Appl. No. 12/888,384, 15 pages.
Final Office Action, dated Nov. 7, 2012, received in U.S. Appl. No. 12/888,384, 14 pages.
Office Action, dated May 16, 2012, received in U.S. Appl. No. 12/888,386, 12 pages.
Final Office Action, dated Nov. 8, 2012, received in U.S. Appl. No. 12/888,386, 13 pages.
Office Action, dated Jan. 23, 2013, received in U.S. Appl. No. 12/888,389, 11 pages.
Final Office Action, dated Sep. 12, 2013, received in U.S. Appl. No. 12/888,389, 10 pages.
Notice of Allowance, dated Sep. 8, 2014, received in U.S. Appl. No. 12/888,389, 13 pages.
Notice of Allowance, dated Feb. 11, 2015, received in U.S. Appl. No. 12/888,389, 13 pages.
Notice of Allowance, dated Jun. 15, 2012, received in U.S. Appl. No. 12/888,391, 23 pages.
Office Action, dated Jun. 28, 2013, received in U.S. Appl. No. 13/077,524, 17 pages.
Office Action, dated Apr. 4, 2013, received in U.S. Appl. No. 12/789,426, 8 pages.
Office Action, dated Feb. 12, 2014, received in U.S. Appl. No. 13/077,524, 13 pages.
Notice of Allowance, dated May 27, 2015, received in U.S. Appl. No. 13/077,524, 9 pages.
Notice of Allowance, dated Sep. 15, 2015, received in U.S. Appl. No. 13/077,524, 9 pages.
Office Action, dated Mar. 19, 2013, received in U.S. Appl. No. 13/333,909, 18 pages.
Final Office Action, dated Dec. 5, 2013, received in U.S. Appl. No. 13/333,909, 24 pages.
Notice of Allowance, dated Mar. 31, 2014, received in U.S. Appl. No. 13/333,909. 20 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated Nov. 12, 2015, received in European Patent Application No. 13724102.2, which corresponds with U.S. Appl. No. 14/536,646, 6 pages.
Office Action, dated Feb. 29, 2016, received in Japanese Patent Application No. 2015-511645, which corresponds with U.S. Appl. No. 14/536,646, 5 pages.

(56) References Cited

OTHER PUBLICATIONS

Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Nov. 11, 2015, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Nov. 23, 2015, received in U.S. Appl. No. 14/183,316, 17 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance (corrected), dated Apr. 19, 2016, received in U.S. Appl. No. 14/183,347, 3 pages.
Office Action, dated Mar. 31, 2016, received in U.S. Appl. No. 14/864,737, 17 pages.
Certificate of Grant, dated Apr. 7, 2016, received in Australian Patent Application No. 2016100293, which corresponds with U.S. Appl. No. 14/864,737, 1 page.
Office Action, dated Apr. 5, 2016, received in Danish Patent Application No. 201500577, which corresponds with U.S. Appl. No. 14/864,737, 7 pages.
Certificate of Grant, dated Mar. 24, 2016, received in Australian Patent Application No. 2016100254, which corresponds with U.S. Appl. No. 14/866,981, 1 page.
Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, dated Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Office Action, dated Mar. 28, 2016, received in U.S. Appl. No. 14/869,899, 17 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Certificate of Grant, dated Apr. 21, 2016, received in Australia Patent Application No. 2016100292, which corresponds with U.S. Appl. No. 14/866,361, 1 page.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.

(56) References Cited

OTHER PUBLICATIONS

Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 12/888,381, 9 pages.
International Preliminary Report on Patentability, dated Oct. 9, 2012, received in International Patent Application No. PCT/US2010/050057, which corresponds with U.S. Appl. No. 12/888,381, 6 pages.
Extended European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion, dated Apr. 25, 2016, received in International Patent Application No. PCT/US2016/018758, which corresponds with U.S. Appl. No. 14/866,159, 15 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.

Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-clicklcustomize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Phonebuff, "How to Pair Bluetooth on the iPhone", https://www.youtube.com/watch?v=LudNwEar9A8, Feb. 8, 2012, 3 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.

(56) References Cited

OTHER PUBLICATIONS

Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.
Office Action, dated May 31, 2016, received in European Patent Application No. 13724102.2, which corresponds with U.S. Appl. No. 14/536,646, 5 pages.
Notice of Allowance, dated Jan. 4, 2017, received in European Patent Application No. 13724102.2, which corresponds with U.S. Appl. No. 14,536,646, 5 pages.
Notice of Allowance, dated Dec. 22, 2016, received in Japanese Patent Application No. 2015-511645, which corresponds with U.S. Appl. No. 14/536,646, 2 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Feb. 1, 2017, received received in U.S. Patent Application No. 14/536,203 (5850), 9 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated May 31, 2016, received in European Patent Application No. 13724104.8, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Office Action, dated Oct. 20, 2016, received in U.S. Appl. No. 14/536,247, 10 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.

(56) References Cited

OTHER PUBLICATIONS

Office Action, dated Dec. 9, 2016, received in Chinese Patent Application No. 2016120601564130, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 20167029533, which corresponds with U.S. Appl. No. 14/536,267, 2 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Notice of Allowance, dated Jan. 24, 2017, received in Japanese Patent Application No. 2015-550384, which corresponds with U.S. Appl. No. 14/608,985, 5 pages.
Office Action, dated Nov. 4, 2016, received in Korean Patent Application No. 10-2015-7019984, which corresponds with U.S. Appl. No. 14/608,985, 8 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action (Search Report), dated Apr. 4, 2016, received in Danish Patent Application No. 201500582, which corresponds with U.S. Appl. No. 14/863,432, 10 pages.

(56) References Cited

OTHER PUBLICATIONS

Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated Sep. 19, 2016, received in German Patent Application No. 202016002908.9, which corresponds with U.S. Appl. No. 14/866,987, 3 pages.

(56) References Cited

OTHER PUBLICATIONS

Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Search Report, dated May 26, 2016, received in Danish Patent Application No. 201500595, which corresponds with U.S. Appl. No. 14/871,236, 14 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 page.
Office Action, dated Oct. 31, 2016, received in Australian Patent Application No. 2016101438, which corresponds with U.S. Appl. No. 14/871,236, 6 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Sep. 7, 2016, received in Danish Patent Application No. 201500594, which corresponds with U.S. Appl. No. 14/867,823, 4 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Jul. 21, 2016, received in International Patent Application No. PCT/US2016/019913, which corresponds with U.S. Appl. No. 14/868,078, 16 pages.

(56) References Cited

OTHER PUBLICATIONS

International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Office Action, dated Jul. 17, 2017, received in U.S. Appl. No. 14/536,166, 19 pages.
Office Action, dated Jul. 21, 2017, received in Australian Patent Application No. 2016216658, which corresponds with U.S. Appl. No. 14/536,291, 3 pages.
Office Action, dated Jul. 21, 2017, received in Australian Patent Application No. 2016247194, which corresponds with U.S. Appl. No. 14/536,648, 3 pages.
Grant, dated Jul. 21, 2016, received in Dutch Patent Application No. 2016801, which corresponds with U.S. Appl. No. 14/871,227, 8 pages.
Notice of Allowance, dated Jul. 14, 2017, received in Japanese Patent Application No. 2016558214, which corresponds with U.S. Appl. No. 14/866,511, 5 pages.
Office Action, dated Jul. 31, 2017, received in Japanese Patent Application No. 2017126445, which corresponds with U.S. Appl. No. 14/866,987, 6 pages.
Office Action, dated Aug. 4, 2017, received in Japanese Patent Application No. 2016-533201, which corresponds with U.S. Appl. No. 14/871,227, 6 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Jun. 22, 2017, received in Dutch Patent Application No. 2016375, which corresponds with U.S. Appl. No. 14/866,981, 17 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Bautisa, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", IP.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
Kaaresoja, et al., "Snap-Crackle-Pop: Tactile Feedback for Mobile Touch Screens", Proceedings of Eurohaptics vol. 2006, Jul. 3, 2006, 2 pages.
Minsky, "Computational Haptics The Sandpaper System for Synthesizing Texture for a Force-Feedback Display," Massachusetts Institute of Technology, Jun. 1978, 217 pages.
O'Hara, et al., "Pressure-Sensitive Icons", IP.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSenseII: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011,10 pages.

(56) References Cited

OTHER PUBLICATIONS

International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, 14 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, 7 pages.
International Search Report and Written Opinion dated Apr. 7, 2014, received in International Application No. PCT/US2013/069483, 18 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
Invitation to Pay Additional Fees dated Apr. 17, 2014, received in International Application No. PCT/US2013/069484, 7 pages.
International Search Report and Written Opinion dated Jul. 9, 2014, received in International Application No. PCT/US2013/069484, 17 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, 7 pages.
International Search Report and Written Opinion dated Jun. 2, 2014, received in International Application No. PCT/US2013/069486, 7 pages.
International Search Report and Written Opinion dated Mar. 6, 2014, received in International Application No. PCT/US2013/069489, 12 pages.
International Search Report and Written Opinion dated Sep. 30, 2014, received in International Application No. PCT/US2014/047303, 10 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Brownlee, "Android 5.0 Lollipop Feature Review!", https//www.youtube.com/watch?v=pEDQ1z1-PvU, Oct. 27, 2014, 5 pages.
Elliot, "Mac System 7", YouTube. Web. Mar. 8, 2017, http://www.youtube.com/watch?v=XLv22hfuuik, Aug. 3, 2011, 1 page.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.

(56) References Cited

OTHER PUBLICATIONS

IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.

Kost, "LR3—Deselect All Images But One", Julieanne Kost's Blog, blogs.adobe.com/jkost/2011/12/lr3-deselect-all-images-but-one.html, Dec. 22, 2011, 1 page.

YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.

Office Action, dated Mar. 15, 2017, received in U.S. Appl. No. 14/535,671, 13 pages.

Office Action, dated Jun. 29, 2017, received in U.S. Appl. No. 14/608,895, 30 pages.

Patent, dated May 12, 2017, received in Japanese Patent Application No. 2015-547948, which corresponds with U.S. Appl. No. 14/536,426, 3 pages.

Office Action, dated Feb. 24, 2017, received in Korean Patent Application No. 10-2015-7018851, which corresponds with U.S. Appl. No. 14/536,426, 3 pages.

Patent, dated May 26, 2017, received in Korean Patent Application No. 2015-7018851, which corresponds with U.S. Appl. No. 14/536,426, 3 pages.

Office Action, dated Apr. 5, 2017, received in U.S. Appl. No. 14/536,367, 16 pages.

Office Action, dated May 15, 2017, received in Australian Patent Application No. 2016216580, which corresponds with U.S. Appl. No. 14/536,426, 3 pages.

Office Action, dated May 4, 2017, received in Chinese Patent Application No. 201380068414.1, which corresponds with U.S. Appl. No. 14/608,926, 5 pages.

Patent, dated Feb. 17, 2017, received in Japanese Patent Application No. 2015-549392, which corresponds with U.S. Appl. No. 14/608,926, 3 pages.

Notice of Allowance, dated Mar. 31, 2017, received in Korean Patent Application No. 2015-7018853, which corresponds with U.S. Appl. No. 14/608,926, 4 pages.

Patent, dated May 26, 2017, received in European Patent Application No. 13724102.2, which corresponds with U.S. Appl. No. 14,536,646, 1 page.

Office Action, dated Apr. 3, 2017, received in U.S. Appl. No. 14/536,141, 11 pages.

Office Action, dated Mar. 3, 2017, received in Chinese Patent Application No. 201380035893.7, which corresponds with U.S. Appl. No. 14/536,646, 8 pages.

Notice of Allowance, dated Jun. 30, 2017, received in Japanese Patent Application No. 2015-511646, which corresponds with U.S. Appl. No. 14/536,141, 5 pages.

Notice of Allowance, dated May 12, 2017, received in U.S. Appl. No. 14/608,942, 10 pages.

Office Action, dated Mar. 29, 2017, received in Australian patent Application No. 2016201303, which corresponds with U.S. Appl. No. 14/608,942, 3 pages.

Office Action, dated Jun. 16, 2017, received in Chinese Patent Application No. 201380068295.X, which corresponds with U.S. Appl. No. 14/608,942, 6 pages.

Notice of Allowance, dated May 12, 2017, received in Japanese Patent Application No. 2015-549393, which corresponds with U.S. Appl. No. 14/608,942, 5 pages.

Patent, dated Jun. 16, 2017, received in Japanese Patent Application No. 2015-549393, which corresponds with U.S. Appl. No. 14/608,942, 3 pages.

Office Action, dated Feb. 24, 2017, received in Korean Patent Application No. 2015-7018448, which corresponds with U.S. Appl. No. 14/608,942, 4 pages.

Office Action, dated Jul. 4, 2017, received in Australian Patent Application No. 2016238917, which corresponds with U.S. Appl. No. 14/536,203, 5 pages.

Office Action, dated Jun. 23, 2017, received in Japanese Patent Application No. 2016173113, which corresponds with U.S. Appl. No. 14/536,203, 5 pages.

Final Office Action, dated Mar. 24, 2017, received in U.S. Appl. No. 14/536,247, 14 pages.

Office Action, dated Mar. 24, 2017, received in U.S. Appl. No. 14/536,267, 12 pages.

Office Action, dated Mar. 24, 2017, received in Australian Patent Application No. 2016204411, which corresponds with U.S. Appl. No. 14/536,267, 3 pages.

Office Action, dated Mar. 3, 2017, received in Japanese Patent Application No. 2016-125839, which corresponds with U.S. Appl. No. 14/536,267, 6 pages.

Office Action, dated Apr. 7, 2017, received in U.S. Appl. No. 14/536,291, 11 pages.

Office Action, dated Mar. 23, 2017, received in European Patent Application No. 13724107.1, which corresponds with U.S. Appl. No. 14/536,291, 8 pages.

Patent, dated May 18, 2017, received in Australian Patent Application No. 2013368445, which corresponds with U.S. Appl. No. 14/608,985, 1 page.

Office Action, dated May 19, 2017, received in Chinese Patent Application No. 201380068399.0, which corresponds with U.S. Appl. No. 14/608,985, 5 pages.

Office Action, dated Feb. 27, 2017, received in European Patent Application No. 13811032.5, which corresponds with U.S. Appl. No. 14/608,985, 6 pages.

Patent, dated Feb. 24, 2017, received in Japanese Patent Application No. 2015-550384, which corresponds with U.S. Appl. No. 14/608,985, 2 pages.

Office Action, dated Mar. 24, 2017, received in U.S. Appl. No. 14/609,006, 13 pages.

Office Action, dated Apr. 19, 2017, received in U.S. Appl. No. 14/536,296, 12 pages.

Notice of Allowance, dated Jul. 10, 2017, received in U.S. Appl. No. 14/609,042, 8 pages.

Notice of Allowance, dated Jun. 19, 2017, received in U.S. Appl. No. 14/864,737, 8 pages.

Office Action, dated May 15, 2017, received in Japanese Patent Application No. 2016-558331, which corresponds with U.S. Appl. No. 14/864,737, 5 pages.

Notice of Allowance, dated Jun. 23, 2017, received in Japanese Patent Application No. 2016-558331, which corresponds with U.S. Appl. No. 14/864,737, 5 pages.

Office Action, dated May 18, 2017, received in Dutch Patent Application No. 2016452, which corresponds with U.S. Appl. No. 14/864,737, 22 pages.

Office Action, dated Jul. 7, 2017, received in Danish Patent Application No. 201500575, 4 pages.

Office Action, dated Mar. 14, 2017, received in Danish Patent Application No. 201500574, which corresponds with U.S. Appl. No. 14/866,159, 5 pages.

Office Action, dated Jul. 6, 2017, received in Danish Patent Application No. 201500574, which corresponds with U.S. Appl. No. 14/866,159, 3 pages.

Notice of Allowance, dated May 2, 2017, received in received in Danish Patent Application No. 201500588, which corresponds with U.S. Appl. No. 14/868,078, 2 pages.

Office Action, dated May 18, 2017, received in Dutch Patent Application No. 2016376, which corresponds with U.S. Appl. No. 14/868,078, 15 pages.

Notice of Allowance, dated Apr. 27, 2017, received in U.S. Appl. No. 14/863,432, 7 pages.

Office Action, dated Jun. 12, 2017, received in Danish Patent Application No. 201500582, which corresponds with U.S. Appl. No. 14/863,432, 5 pages.

Office Action, dated May 18, 2017, received in Dutch Patent Application No. 2016801, which corresponds with U.S. Appl. No. 14/863,432, 34 pages.

Office Action, dated Jun. 9, 2017, received in Japanese Patent Application No. 2016558214, which corresponds with U.S. Appl. No. 14/866,511, 6 pages.

(56) References Cited

OTHER PUBLICATIONS

Notice of Allowance, dated Apr. 27, 2017, received in U.S. Appl. No. 14/866,489, 27 pages.
Notice of Allownce, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Apr. 13, 2017, received in U.S. Appl. No. 14/866,992 (7310), 34 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Mar. 31, 2017, received in U.S. Appl. No. 14/857,700, 14 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Office Action, dated May 4, 2017, received in Danish Patent Application No. 201500585, which corresponds with U.S. Appl. No. 14/864,627, 4 pages.
Office Action, dated Jun. 15, 2017, received in Danish Patent Application No, 201500579, which corresponds with U.S. Appl. No. 14/866,361, 2 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Apr. 20, 2017, received in Chinese Patent Application No. 201621044346.2, which corresponds with U.S. Appl. No. 14/871,462, 3 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated May 4, 2017, received in Danish Patent Application No. 201500598, which corresponds with U.S. Appl. No. 14/867,892, 4 pages.
Office Action, dated May 3, 2017, received in Danish Patent Application No. 201500581, which corresponds with U.S. Appl. No. 14/867,990, 5 pages.
Final Office Action, dated Jun. 2, 2017, received in U.S. Appl. No. 15/081,771, 17 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Anonymous, "Google Android 5.0 Release Date, Specs and Editors Hands On Review—CNET", http://www.cnet.com/products/google-an-android-5-0-lollipop/, Mar. 12, 2015, 10 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0l, Jan. 27, 2014, 3 pages.
YouTube, "Recentz—Recent Apps in a Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Office Action, dated Aug. 22, 2017, received in Korean Patent Application No. 2017-7018250, which corresponds with U.S. Appl. No. 14/608,926, 2 pages.
Notice of Allowance, dated Sep. 20, 2017, received in U.S. Appl. No. 14/536,141, 10 pages.
Patent, dated Jul. 28, 2017, received in Japanese Patent Application No. 2015-511646, which corresponds with U.S. Appl. No. 14/536,141, 3 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.
Notice of Allowance, dated Sep. 19, 2017, received in Chinese Patent Application No. 201380068399.0, which corresponds with U.S. Appl. No. 14/608,985, 3 pages.

(56) References Cited

OTHER PUBLICATIONS

Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 28, 2017, received in Japanese Patent Application No. 2016-558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Patent, dated Aug. 18, 2017, received in Japanese Patent Application No. 2016558214, which corresponds with U.S. Appl. No. 14/866,511, 3 pages.
Office Action, dated Sep. 5, 2017, received in Danish Patent Application No. 201500593, which corresponds with U.S. Appl. No. 14/866,992, 6 pages.
Office Action, dated Sep. 22, 2017, received in Japanese Patent Application No. 2017-029201, which corresponds with U.S. Appl. No. 14/857,636 8 pages.
Notice of Allowance, dated Sep. 22, 2017, received in Japanese Patent Application No. 2016-233449, which corresponds with U.S. Appl. No. 14/866,987, 5 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Final Office Action, dated Aug. 18, 2017, received in U.S. Appl. No. 14/869,873, 20 pages.
Office Action, dated Aug. 29, 2017, received in Korean Patent Application No. 2017-7014536, which corresponds with U.S. Appl. No. 15/081,771, 5 pages.
Notice of Allowance, dated Jul. 6, 2017, received in U.S. Appl. No. 15/231,745, 18 pages.
Office Action, dated Aug. 30, 2017, received in U.S. Appl. No. 15/655,749, 22 pages.
Extended European Search Report, dated Sep. 11, 2017, received in European Patent Application No. 17163309.2, which corresponds with U.S. Appl. No. 14/866,987, 8 pages.
Easton-Ellett, "Three Free Cydia Utilies to Remove iOS Notification Badges", http://www.ijailbreak.com/cydia/three-free-cydia-utilies-to-remove-ios-notification-badges, Apr. 14, 2012, 2 pages.
IPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
YouTube, "Android Lollipop Lock-Screen Notification Tips", https://www.youtube.com/watch?v=LZTxHBOwzIU, Nov. 13, 2014, 3 pages.

Office Action, dated Mar. 9, 2018, received in European Patent Application No. 13795391.5, which corresponds with U.S. Appl. No. 14/536,426, 4 pages.
Final Office Action, dated Feb. 26, 2018, received in U.S. Appl. No. 14/536,235, 13 pages.
Intention to Grant, dated Mar. 9, 2018, received in European Patent Application No. 15183980.0 (5842EP01), which corresponds with U.S. Appl. No. 14/536,426, 5 pages.
Final Office Action, dated May 3, 2018, received in U.S. Appl. No. 14/536,644, 28 pages.
Notice of Allowance, dated Feb. 8, 2018, received in Chinese Patent Application No. 201380068414.1, which corresponds with U.S. Appl. No. 14/608,926, 2 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Feb. 28, 2018, received in U.S. Appl. No. 14/536,166, 5 pages.
Notice of Allowance, dated Apr. 4, 2018, received in Chinese Patent Application No. 201380035977.0, which corresdponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Notice of Acceptance, dated Feb. 27, 2018, received in Australian Patent Application No. 2016204411, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Notice of Allowance, dated Mar. 21, 2018, received in Danish Patent Application No. 201500574, which corresponds with U.S. Appl. No. 14/866,159, 2 pages.
Office Action, dated Apr. 25, 2018, received in European Patent Application No. 16708916.8, which corresponds with U.S. Appl. No. 14/868,078, 6 pages.
Notice of Allowance, dated Apr. 24, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Office Action, dated Mar. 13, 2018, received in U.S. Appl. No. 15/009,688, 10 pages.
Notice of Allowance, dated May 2, 2018, received in U.S. Appl. No. 14/856,519, 10 pages.
Final Office Action, dated Nov. 16, 2017, received in U.S. Appl. No. 14/856,520, 41 pages.

(56) References Cited

OTHER PUBLICATIONS

Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Notice of Allowance, dated Mar. 16, 2018, received in Danish Patent Application No. 201500579, which corresponds with U.S. Appl. No. 14/866,361, 2 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Feb. 26, 2018, received in Australian Patent Application No. 2017201079, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Final Office Action, dated Mar. 15, 2018, received in U.S. Appl. No. 14/871,336, 23 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Office Action, dated Feb. 28, 2018, received in U.S. Appl. No. 14/869,261, 26 pages.
Notice of Allowance, dated Mar. 30, 3018, received in U.S. Appl. No. 14/867,990, 5 pages.
Office Action, dated Apr. 19, 2018, received in U.S. Appl. No. 14/869,703, 19 pages.
Notice of Allowance, dated Mar. 19, 2018, received in Danish Patent Application No. 201770190, which corresponds with U.S. Appl. No. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691, 29 pages.
Extended European Search Report, dated Mar. 2, 2018, received in European Patent Application No. 17206374.5, which corresponds with U.S. Appl. No. 15/272,343, 11 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Office Action, dated Feb. 22, 2018, received in U.S. Appl. No. 14/608,895, 20 pages.
Office Action, dated Nov. 6, 2017, received in Chinese Patent Application No. 201380068493.6, which corresponds with U.S. Appl. No. 14/608,895, 5 pages.
Notice of Allowance, dated Nov. 30, 2017, received in U.S. Appl. No. 14/536,367, 9 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Office Action, dated Oct. 19, 2017, received in U.S. Appl. No. 14/608,926, 14 pages.
Notice of Acceptance, dated Dec. 20, 2017, received in Australian Patent Application No. 2016201451, which corresponds with U.S. Appl. No. 14/608,926, 3 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Office Action, dated Feb. 2, 2018, received in Chinese Patent Application No. 201380035893.7, which corresponds with U.S. Appl. No. 14/536,141, 5 pages.
Office Action, dated Oct. 25, 2017, received in Chinese Patent Application No. 201380035977.0, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.

(56) References Cited

OTHER PUBLICATIONS

Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Notice of Allowance, dated Nov. 17, 2017, received in Japanese Patent Application No. 2016-125839, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Notice of Allowance, dated Dec. 1, 2017, received in U.S. Appl. No. 14/536,291, 19 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Patent, dated Dec. 8, 2017, received in Chinese Patent Application No. 201380068399.0, which corresponds with U.S. Appl. No. 14/608,985, 4 pages.
Summons, dated Oct. 6, 2017, received in European Patent Application No. 13811032.5, which corresponds with U.S. Appl. No. 14/608,985, 6 pages.
Patent, dated Dec. 19, 2017, received in Korean Patent Application No. 2015-7019984, which corresponds with U.S. Appl. No. 14/608,985, 3 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Office Action, dated Oct. 6, 2017, received in U.S. Appl. No. 14/868,078, 40 pages.
Certificate of Grant, dated Jan. 3, 2018, received in Australian Patent Application No. 2016229421, which corresponds with U.S. Appl. No. 14/868,078, 1 page.
Notice of Allowance, dated Oct. 4, 2017, received in U.S. Appl. No. 14/866,511, 37 pages.
Office Action, dated Nov. 24, 2017, received in European Patent Application No. 16727900.9, which corresponds with U.S. Appl. No. 14/866,511, 5 pages.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Final Office Action, dated Oct. 3, 2017, received in U.S. Appl. No. 14/866,992, 37 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Office Action, dated Jan. 17, 2018, received in Australian Patent Application No. 2017202816, which corresponds with U.S. Appl. No. 14/857,636, 3 pages.
Office Action, dated Dec. 1, 2017, received in U.S. Appl. No. 14/857,663, 15 pages.
Final Office Action, dated Oct. 11, 2017, received in U.S. Appl. No. 14/857,700, 13 pages.
Notice of Allowance, dated Feb. 12, 2018, received in U.S. Appl. No. 14/857,700, 13 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Office Action, dated Jan. 22, 2018, received in U.S. Appl. No. 14/866,987, 22 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Patent, dated Oct. 27, 2017, received in Japanese Patent Application No. 2016-233449, which corresponds with U.S. Appl. No. 14/866,987, 3 pages.
Office Action, dated Nov. 29, 2017, received in U.S. Appl. No. 14/866,989, 31 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.

(56) References Cited

OTHER PUBLICATIONS

Notice of Allowance, dated Jan. 4, 2018, received in Japanese Patent Application No. 2016-533201, which corresponds with U.S. Appl. No. 14/871,227, 4 pages.
Office Action, dated Oct. 26, 2017, received in U.S. Appl. No. 14/871,336, 22 pages.
Patent, dated Oct. 30, 2017, Danish Patent Application No. 201500601, which corresponds with U.S. Appl. No. 14/871,336, 5 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Final Office Action, dated Nov. 29, 2017, received in U.S. Appl. No. 14/867,823, 47 pages.
Office Action, dated Jan. 23, 2018, received in Danish Patent Application No. 201500594, which corresponds with U.S. Appl. No. 14/867,823, 8 pages.
Final Office Action, dated Dec. 14, 2017, received in U.S. Appl. No. 14/867,892, 53 pages.
Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Feb. 19, 2018, received in Danish Patent Application No. 201500581, which corresponds with U.S. Appl. No. 14/867,990, 4 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Oct. 20, 2017, received in U.S. Appl. No. 15/136,782, 9 pages.
Office Action, dated Jan. 8, 2018, received in Danish Patent Application No. 201770190, which corresponds with U.S. Appl. No. 15/136,782, 2 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Patent, dated Oct. 30, 2017, received in Danish Patent Application No. 201670593, which corresponds with U.S. Appl. No. 15/231,745, 3 pages.

Office Action, dated Feb. 7, 2018, received in Danish Patent Application No. 201770709, 2 pages.
Office Action, dated Oct. 16, 2017, received in Danish Patent Application No. 201770710, 10 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Extended European Search Report, dated Oct. 17, 2017, received in European Patent Application No. 17184437.6, Which corresponds with U.S. Appl. No. 14/868,078, 8 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Oct. 10, 2017, received in European Patent Application No. 17188507.2, which corresponds with U.S. Appl. No. 14/866,361, 9 pages.
Anonymous, "Acer Liquid Z5 Duo User's Manual", https://global-download.acer.com, Feb. 21, 2014, 65 pages.
Neuburg, "Detailed Explanation iOS SDK", Oreilly Japan, Dec. 22, 2014, vol. 4, p. 175-186, 15 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
UpDown-G, "Using Multiple Selection Mode in Android 4.0 / Getting Started", https://techbooster.org/android/13946, Mar. 7, 2012, 7 pages.
Decision to Grant, dated Jan. 10, 2019, received in European Patent Application No. 15183980.0, which corresponds with U.S. Appl. No. 14/536,426, 4 pages.
Patent, dated Feb. 6, 2019, received in European Patent Application No. 15183980.0, which corresponds with U.S. Appl. No. 14/536,426, 4 pages.
Office Action, dated Feb. 22, 2019, received in Japanese Patent Application No. 2018-079290, which corresponds with U.S. Appl. No. 14/608,926, 7 pages.
Office Action, dated Mar. 7, 2019, received in European Patent Application No. 13726053.5, which corresponds with U.S. Appl. No. 14/436,141, 5 pages.
Notice of Allowance, dated Jan. 15, 2019, received in Korean Patent Application No. 2015-7018448, which corresponds with U.S. Appl. No. 14/608,942, 5 pages.
Patent, dated Mar. 8, 2019, received in Korean Patent Application No. 2015-7018448, which corresponds with U.S. Appl. No. 14/608,942, 4 pages.
Intention to Grant, dated Mar. 18, 2019, received in European Patent Application No. 13724104.8, which corresponds with U.S. Appl. No. 14/536,203, 9 pages.
Office Action, dated Mar. 15, 2019, received in Australian Patent Application No. 2018204236, which corresponds with U.S. Appl. No. 14/5326,267, 5 pages.
Office Action, dated Feb. 4, 2019, received in Japanese Patent Application No. 2017-237035, which corresponds with U.S. Appl. No. 14/536,267, 7 pages.
Patent, dated Mar. 4, 2019 received in Korean Patent Application No. 2017-7034838, which corresponds with U.S. Appl. No. 14/536,267, 4 pages.
Patent, dated Feb. 22, 2019, received in Japanese Patent Application No. 2017-083027, which corresponds with U.S. Appl. No. 14/536,291, 3 pages.
Notice of Allowance, dated Jan. 15, 2019, received in Japanese Patent Application No. 2017-083027, which corresponds with U.S. Appl. No. 14/536,291, 5 pages.
Intention to Grant, dated Jan. 16, 2019, received in European Patent Application No. 13811032.5, which corresponds with U.S. Appl. No. 14/608,985, 9 pages.

(56) References Cited

OTHER PUBLICATIONS

Notice of Allowance, dated Feb. 4, 2019, received in Japanese Patent Application No. 2017-008764, which corresponds with U.S. Appl. No. 14/536,648, 5 pages.
Patent, dated Mar. 1, 2019, received in Japanese Patent Application No. 2017-008764, which corresponds with U.S. Appl. No. 14/536,648, 3 pages.
Patent, dated Mar. 8, 2019, received in Korean Patent Application No. 2017-7008614, which corresponds with U.S. Appl. No. 14/609,042, 4 pages.
Notice of Acceptance, dated Mar. 12, 2019, received in Australian Patent Application No. 2016233792, which corresponds with U.S. Appl. No. 14/864,737, 5 pages.
Patent, dated Feb. 19, 2019, received in Chinese Patent Application No. 201610137839.9, which corresponds with U.S. Appl. No. 14/866,159, 6 pages.
Office Action, dated Feb. 7, 2019, received in Australian Patent Application No. 2017258967, which corresponds with 14/868,078, 3 page.
Office Action, dated Feb. 26, 2019, received in Chinese Patent Application No. 01610130348.1, which corresponds with U.S. Appl. No. 14/868,078, 4 pages.
Patent, dated Feb. 26, 2019, received in Danish Patent Application No. 201670594, which corresponds with U.S. Appl. No. 14/869,899, 3 pages.
Notice of Allowance, dated Mar. 1, 2019, received in Japanese Patent Application No. 2018-100827, which corresponds with U.S. Appl. No. 14/869,899, 5 pages.
Notice of Acceptance, dated Mar. 12, 2019, received in Australian Patent Application No. 2016304890, which corresponds with U.S. Appl. No. 14/866,992, 5 pages.
Office Action, dated Jan. 11, 2019, received in Japanese Patent Application No. 2018-506425, which corresponds with U.S. Appl. No. 14/866,992, 6 pages.
Notice of Allowance, dated Jan. 15, 2019, received in Australian Patent Application No. 2017202816, which corresponds with U.S. Appl. No. 14/857,636, 3 pages.
Certificate of Grant, dated Feb. 21, 2019, received in Australian Patent Application No. 2016276030, which corresponds with U.S. Appl. No. 14/864,601, 4 pages.
Office Action, dated Feb. 4, 2019, received in European Patent Application No. 16730554.9, which corresponds with U.S. Appl. No. 14/864,601, 10 pages.
Patent, dated Jan. 11, 2019, received in Japanese Patent Application No. 2017-561375, which corresponds with U.S. Appl. No. 14/864,601, 3 pages.
Office Action, dated Jan. 25, 2019, received in Korean Patent Application No. 2017-7033756, which corresponds with U.S. Appl. No. 14/864,601, 8 pages.
Office Action, dated Jan. 30, 2019, received in European Patent Application No. 17188507.2, which corresponds with U.S. Appl. No. 14/866,361, 13 pages.
Notice of Allowance, dated Jan. 30, 2019, received in Korean Patent Application No. 2018-7013039, which corresponds with U.S. Appl. No. 14/866,361, 5 pages.
Notice of Allowance, dated Jan. 17, 2019, received in U.S. Appl. No. 14/866,989, 8 pages.
Notice of Acceptance, dated Feb. 14, 2019, received in Australian Patent Application No. 2017201079, which corresponds with U.S. Appl. No. 14/866,989, 3 pages.
Office Action, dated Feb. 25, 2019, received in Chinese Patent Application No. 201610342314.9, which corresponds with U.S. Appl. No. 14/866,989, 3 pages.
Patent, dated Feb. 15, 2019, received in Russian Patent Application No. 2017131408, which corresponds with U.S. Appl. No. 14/871,236, 2 pages.
Office Action, dated Feb. 11,2019, received in European Patent Application No. 17171972.7, which corresponds with U.S. Appl. No. 14/870,882, 7 pages.
Certificate of Grant, dated Feb. 28, 2019, received in Australian Patent Application No. 2016203040, which corresponds with U.S. Appl. No. 14/871,227, 1 page.
Notice of Allowance, dated Feb. 5, 2019, received in U.S. Appl. No. 14/871,336, 10 pages.
Office Action, dated Feb. 12, 2019, received in European Patent Application No. 17172266.3, which corresponds with U.S. Appl. No. 14/871,336, 6 pages.
Notice of Acceptance, dated Jan. 24, 2019, received in Australian Patent Application No. 2017202058, which corresponds with U.S. Appl. No. 15/081,771, 3 pages.
Certificate of Grant, dated Jan. 17. 2019, received in Australian Patent Application No. 2018202855, which corresponds with U.S. Appl. No. 15/136,782, 4 pages.
Notice of Allowance, dated Feb. 18, 2019, received in Japanese Patent Application No. 2018-062161, which corresponds with U.S. Appl. No. 15/136,782, 5 pages.
Notice of Allowance, dated Feb. 25, 2019, received in Korean Patent Application No. 2018-7020659, which corresponds with U.S. Appl. No. 15/136,782, 5 pages.
Office Action, dated Mar. 22, 2019, received in Australian Patent Application No. 2018204234, which corresponds with U.S. Appl. No. 15/272,327, 7 pages.
Intention to Grant, dated Mar. 19, 2019, received in European Patent Application No. 15155939.4, which corresponds with U.S. Appl. No. 15/272,327, 6 pages.
Decision to Grant, dated Jan. 31, 2019, received in European Patent Application No. 16756862.5, which corresponds with U.S. Appl. No. 15/272,345, 5 pages.
Patent, dated Feb. 27, 2019, received in European Patent Application No. 16756862.5, which corresponds with U.S. Appl. No. 15/272,345, 3 pages.
Extended European Search Report, dated Mar. 8, 2019, received in European Patent Application No. 18205283.7, which corresponds with U.S. Appl. No. 15/081,771, 15 pages.
Anonymous, "Event Handling Guide for iOS", https://github.com/lonfee88/iOSDevelopeLibrary/raw/master/EventHandlingiPhoneOS.pdf, Mar. 9, 2015, 74 pages.
Anonymous, "Event Handling Guide for iOS—GitHub", https://github.com/lonfee88/iOSDevelopeLibrary/blob/master/EventHandlingiPhoneOS.pdf, Apr. 15, 2015, 3 pages.
Bilibili, "Android 5.0 Lollipop", https://www.bilibili.com/video/av1636064?from=search&seid=3128140235778895126, Oct. 19, 2014 3 pages.
Dachis, "All the Awesome Things You Can Do With a Long Press on Your iPhone, iPad, or iPad Touch", www.lifehacker.com, Jan. 25, 2012, 4 pages.
McGarry, "Everything You Can Do With Force Touch on Apple Watch", Macworld, www.macworld.com, May 6, 2015, 4 pages.
Nickinson, "How to use Do Not Disturb on the HTC One M8", Android Central (Year: 2014), Apr. 7, 2014, 9 pages.
Ogino, iOS 7 Design Standard, Japan, Impress Japan Corporation, Nov. 21, 2013, 1st edition, pp. 58-059.
Tweak, UltimateiDeviceVids, Cydia Tweak: Quick Center—Add 3-Touch Shortcuts to ControlCenter, https://www.youtube.com/watch?v=8rHOFpGvZFM, Mar. 22, 2016, 2 pages.
Tweak, "iCrackUriDevice, iOS 9.0.2 Jailbreak & 9.2.1-9.3 Support: QuickCenter 3D Touch Cydia Tweak!", https://www.youtube.com/watch?v=op-OBr3O_Fkl, Mar. 6, 2016 3 pages.
YouTube, "How to Use 3D Touch Multitasking on iPhone", https://www.youtube.com/watch?v=kDq05uRdrCg, Sep. 29, 2015, 1 page.
Notice of Allowance, dated Sep. 5, 2018, received in U.S. Appl. No. 14/535,671, 5 pages.
Office Action, dated Oct. 9, 2018, received in Chinese Patent Application No. 201380068493.6, which corresponds with U.S. Appl. No. 14/608,895, 3 pages.
Office Action, dated Oct. 5, 2018, received in Korean Patent Application No. 2018-7028236, which corresponds with U.S. Appl. No. 14/608,895, 6 pages.
Certificate of Grant, dated Sep. 13, 2018, received in Australian Patent Application No. 2016216580, which corresponds with U.S. Appl. No. 14/536,426. 1 page.

(56) References Cited

OTHER PUBLICATIONS

Patent, dated Aug. 17, 2018, received in Chinese Patent Application No. 201380035982.1, which corresponds with U.S. Appl. No. 14/536,426, 4 pages.
Patent, dated Oct. 23, 2018, received in Chinese Patent Application No. 201510566550.4, which corresponds with U.S. Appl. No. 14/536,426, 4 pages.
Office Action, dated Nov. 6, 2018, received in Japanese Patent Application No. 2018-000753, which corresponds with U.S. Appl. No. 14/536,426, 8 pages.
Office Action, dated Nov. 2, 2018, received in U.S. Appl. No. 14/536,644, 24 pages.
Notice of Allowance, dated Aug. 31, 2018, received in Chinese Patent Application No. 201380035893.7, which corresponds with U.S. Appl. No. 14/536,141, 6 pages.
Patent, dated Oct. 23, 2018, received in Chinese Patent Application No. 201380035893.7, which corresponds with U.S. Appl. No. 14/536,141, 4 pages.
Office Action, dated Oct. 8, 2018, received in Chinese Patent Application No. 201380068295.X, which corresponds with U.S. Appl. No. 14/608,942, 3 pages.
Decision to Grant, dated Sep. 13, 2018, received in European Patent Application No. 13798464.7, which corresponds with U.S. Appl. No. 14/608,942, 2 pages.
Certificate of Grant, dated Nov. 1, 2018, received in Australian Patent Application No. 2016238917, which corresponds with U.S. Appl. No. 14/536,203, 1 page.
Decision to Grant, dated Oct. 24, 2018, received in European Patent Application No. 13724104.8, which corresponds with U.S. Appl. No. 14/536,203, 5 pages.
Office Action, dated Oct. 19, 2018, received in Japanese Patent Application No. 2018-022394, which corresponds with U.S. Appl. No. 14/536,203, 4 pages.
Office action, dated Nov. 1, 2018, received in Chinese Patent Application No. 201380074060.1, which corresponds with U.S. Appl. No. 14/608,965, 3 pages.
Decision to Grant, dated Sep. 6, 2018, received in European Office Action No. 13798465.4, which corresponds with U.S. Appl. No. 14/608,965, 2 pages.
Office Action, dated Nov. 28, 2018, received in Chinese Patent Application No. 201610537334.1, which corresponds with U.S. Appl. No. 14/536,267, 5 pages.
Decision to Grant, dated Oct. 18, 2018, revevied in European Patent Application No. 13724106.3, which corresponds with U.S. Appl. No. 14/536,267, 3 pages.
Grant Certificate, dated Nov. 14, 2018, received in European Patent Application No. 13724106.3, which corresponds with U.S. Appl. No. 14/536,267, 3 pages. 4 pages.
Office Action, dated Oct. 11, 2018, received in U.S. Appl. No. 14/609,006, 12 pages.
Office Action, dated Jan. 2, 2019, received in U.S. Appl. No. 14/536,648 12 pages.
Office Action, dated Aug. 24, 2018, received in Japanese Patent Application No. 2017-113598, which corresponds with U.S. Appl. No. 14/609,042, 6 pages.
Notice of Allowance, dated Dec. 17, 2018, received in Korean Patent Application No. 2017-7008614 , which corresponds with U.S. Appl. No. 14/609,042, 5 pages.
Office Action, dated Sep. 11, 2018, received in Chinese Patent Application No. 201610159295.6, which corresponds with U.S. Appl. No. 14/864,737, 6 pages.
Office Action, dated Nov. 5, 2018, received in Chinese Patent Application No. 201610131415.1, which corresponds with U.S. Appl. No. 14/866,981, 6 pages.
Notice of Allowance, dated Dec. 6, 2018, received in Chinese Patent Application No. 201610137839.9, which corresponds with U.S. Appl. No. 14/866,159, 3 pages.
Office Action, dated Aug. 20, 2018, received in Chinese Patent Application No. 01610130348.1, which corresponds with U.S. Appl. No. 14/868,078, 6 pages.
Office Action, dated Oct. 25, 2018, received in European Patent Application No. 17184437.6, which corresponds with U.S. Appl. No. 14/868,078, 6 pages.
Office Action, dated Dec. 4, 2018, received in Chinese Patent Application No. 201610342313.4, which corresponds with U.S. Appl. No. 14/863,432, 5 pages.
Office Action, dated Dec. 5, 2018, received in Chinese Patent Application No. 201610342264.4, which corresponds with U.S. Appl. No. 14/866,511, 4 pages.
Office Action, dated Jan. 2, 2019, received in European Patent Application No. 16727900.9, which corresponds with U.S. Appl. No. 14/866,511, 5 pages.
Notice of Acceptance, dated Aug. 23, 2018, received in Australian Patent Application No. 2018204611, which corresponds with U.S. Appl. No. 14/869,899, 3 pages.
Office Action, dated Oct. 9, 2018, received in Danish Patent Application No. 201670594, which corresponds with U.S. Appl. No. 14/869,899, 2 pages.
Office Action, dated Sep. 21, 2018, received in Japanese Patent Application No. 2018-100827, which corresponds with U.S. Appl. No. 14/869,899, 4 pages.
Office Action, dated Oct. 5, 2018, received in Korean Patent Application No. 2018-7017213, which corresponds with U.S. Appl. No. 14/869,899, 3 pages.
Final Office Action, dated Aug. 28, 2018, received in U.S. Appl. No. 14/866,992, 52 pages.
Office Action, dated Oct. 12, 2018, received in European Patent Application No. 16758008.3, which corresponds with U.S. Appl. No. 14/866,992, 11 pages.
Final Office Action, dated Sep. 19, 2018, received in U.S. Appl. No. 15/009,661, 28 pages.
Notice of Allowance, dated Nov. 15, 2018, received in U.S. Appl. No. 15/009,676, 6 pages.
Notice of Allowance, dated Nov. 6, 2018, received in U.S. Appl. No. 15/009,688, 10 pages.
Office Action, dated Nov. 20, 2018, received in U.S. Appl. No. 14/856,520, 36 pages.
Notice of Allowance, dated Aug. 16, 2018, received in U.S. Appl. No. 14/857,636, 5 pages.
Office Action, dated Nov. 28, 2018, received in Korean Patent Application No. 20177036645, which corresponds with U.S. Appl. No. 14/857,636, 6 pages.
Notice of Allowance, dated Aug. 16, 2018, received in U.S. Appl. No. 14/857,663, 5 pages.
Notice of Allowance, dated Oct. 9, 2018, received in U.S. Appl. No. 14/864,529, 11 pages.
Office Action, dated Nov. 7, 2018, received in Chinese Patent Application No. 201610342151.4, which corresponds with U.S. Appl. No. 14/864,580, 3 pages.
Office Action, dated Aug. 31, 2018, received in Australian Patent Application No. 2016276030, which corresponds with U.S. Appl. No. 14/864,601, 3 pages.
Office Action, dated Oct. 19, 2018, received in Chinese Patent Application No. 201610189298.4, which corresponds with U.S. Appl. No. 14/866,361, 6 pages.
Office Action, dated Oct. 12, 2018, received in Japanese Patent Application No. 2017-141962, which corresponds with U.S. Appl. No. 14/866,361, 6 pages.
Office Action, dated Sep. 14, 2018, received in Korean Patent Application No. 2018-7013039, which corresponds with U.S. Appl. No. 14/866,361, 2 pages.
Final Office Action, dated Oct. 11, 2018, received in U.S. Appl. No. 14/866,987, 20 pages.
Office Action, dated Dec. 11, 2018, received in European Patent Application No. 16189421.7, which corresponds with U.S. Appl. No. 14/866,987, 6 pages.
Office Action, dated Sep. 19, 2018, received in Chinese Patent Application No. 201610342314.9, which corresponds with U.S. Appl. No. 14/866,989, 6 pages.
Notice of Allowance, dated Dec. 3, 2018, received in U.S. Appl. No. 14/870,754, 8 pages.
Notice of Allowance, dated Dec. 5, 2018, received in U.S. Appl. No. 14/870,882, 8 pages.

(56) References Cited

OTHER PUBLICATIONS

Notice of Allowance, dated Aug. 27, 2018, received in U.S. Appl. No. 14/870,988, 11 pages.
Notice of Acceptance, dated Oct. 30, 2018, received in Australian Patent Application No. 2016203040, which corresponds with U.S. Appl. No. 14/871,227, 4 pages.
Office Action, dated Oct. 11, 2018, received in Australian Patent Application No. 2017245442, which corresponds with U.S. Appl. No. 14/871,227, 4 pages.
Office Action, dated Nov. 16, 2018, received in Chinese Patent Application No. 201680000466.9, which corresponds with U.S. Appl. No. 14/871,227, 5 pages.
Intent to Grant, dated Sep. 17, 2018, received in European Patent No. 16711743.1, which corresponds with U.S. Appl. No. 14/871,227, 5 pages.
Patent, dated Nov. 28, 2018, received in European Patent No. 16711743.1, which corresponds with U.S. Appl. No. 14/871,227, 1 page.
Notice of Allowance, dated Oct. 1, 2018, received in Korean Patent Application No. 2016-7019816, which corresponds with U.S. Appl. No. 14/871,227, 6 pages.
Office Action, dated Nov. 5, 2018, received in U.S. Appl. No. 14/871,336, 24 pages.
Notice of Allowance, dated Oct. 12, 2018, received in Japanese Patent Application No. 2018-020324, which corresponds with U.S. Appl. No. 14/871,336, 5 pages.
Final Office Action, dated Oct. 17, 2018, received in U.S. Appl. No. 14/867,892, 48 pages.
Final Office Action, dated Oct. 4, 2018, received in U.S. Appl. No. 14/869,361, 28 pages.
Office Action, dated Sep. 7, 2018, received in U.S. Appl. No. 14/869,997, 23 pages.
Final Office Action, dated Oct. 26, 2018, received in U.S. Appl. No. 14/869,703, 19 pages.
Notice of Allowance, dated Oct. 12, 2018, received in Japanese Patent Application No. 2017-086460, which corresponds with U.S. Appl. No. 15/081,771, 5 pages.
Patent, dated Sep. 28, 2018, received in Korean Patent Application No. 2017-7014536, which corresponds with U.S. Appl. No. 15/081,771, 3 pages.
Notice of Acceptance, dated Sep. 10, 2018, received in Australian Patent Application No. 2018202855, which corresponds with U.S. Appl. No. 15/136,782, 3 pages.
Office Action, dated Nov. 12, 2018, received in Japanese Patent Application No. 2018-062161, which corresponds with U.S. Appl. No. 15/136,782, 5 pages.
Office Action, dated Oct. 31, 2018, received in Korean Patent Application No. 2018-7020659, which corresponds with U.S. Appl. No. 15/136,782, 5 pages.
Office Action, dated Dec. 18, 2018, received in Danish Patent Application No. 201670587, which corresponds with U.S. Appl. No. 15/231,745, 4 pages.
Office Action, dated Nov. 23, 2018, received in Danish Patent Application No. 201670591, which corresponds with U.S. Appl. No. 15/231,745, 7 pages.
Notice of Allowance, dated Oct. 4, 2018, received in U.S. Appl. No. 15/272,327, 46 pages.
Office Action, dated Sep. 14, 2018, received in European Patent Application No. 15155939.4, which corresponds with U.S. Appl. No. 15/272,327, 5 pages.
Patent, dated Aug. 31, 2018, received in Japanese Patent Application No. 2018-506989, which corresponds with U.S. Appl. No. 15/272,327, 3 pages.
Office Action, dated Oct. 26, 2018, received in U.S. Appl. No. 15/272,341, 22 pages.
Notice of Allowance, dated Sep. 20, 2018, received in U.S. Appl. No. 15/272,343, 44 pages.
Office Action, dated Oct. 15, 2018, received in U.S. Appl. No. 15/272,345, 31 pages.
Office Action, dated Nov. 13, 2018, received in European Patent Application No. 16756862.5, which corresponds with U.S. Appl. No. 15/272,345, 5 pages.
Notice of Allowance, dated Oct. 12, 2018, received in U.S. Appl. No. 15/499,693, 8 pages.
Extended European Search Report, dated Dec. 5, 2018, received in European Patent Application No. 18194127.9, which corresponds with U.S. Appl. No. 14/608,942, 8 pages.
Extended European Search Report, dated Oct. 30, 2018, received in European Patent Application No. 18183789.9, which corresponds with U.S. Appl. No. 14/536,267, 11 pages.
Extended European Search Report, dated Aug. 24, 2018, received in European Patent Application No. 18171453.6, which corresponds with U.S. Appl. No. 15/136,782, 9 pages.
Patent, dated Dec. 25, 2018, received in Chinese Patent Application No. 201380068493.6, which corresponds with U.S. Appl. No. 14/608,895, 4 pages.
Certificate of Grant, dated Dec. 26, 2018, received in European Patent Application No. 13795391.5, which corresponds with U.S. Appl. No. 14/536,426, 4 pages.
Decision to Grant, dated Nov. 29, 2018, received in European Patent Application No. 16177863.4, which corresponds with U.S. Appl. No. 14/536,267, 4 pages.
Patent, dated Dec. 26, 2018, received in European Patent Application No. 16177863.4, which corresponds with U.S. Appl. No. 14/536,267, 4 pages.
Notice of Allowance, dated Dec. 3, 2018, received in Korean Patent Application No. 2017-7034838, which corresponds with U.S. Appl. No. 14/536,267, 5 pages.
Patent, dated Nov. 30, 2018, received in Australian Patent Application No. 2016216658, which corresponds with U.S. Appl. No. 14/536,291, 4 pages.
Patent, dated Dec. 26, 2018, received in Korean Patent Application No. 2017-7030129, which corresponds with U.S. Appl. No. 14/864,737, 4 pages.
Notice of Allowance, dated Dec. 10, 2018, received in Japanese Patent Application No. 2017-561375, which corresponds with U.S. Appl. No. 14/864,601, 5 pages.
Office Action, dated Dec. 4, 2018, received in Chinese Patent Application No. 201610342336.5, which corresponds with U.S. Appl. No. 14/866,987, 5 pages.
Office Action, dated Jan. 8, 2019, received in European Patent Application No. 17206374.5, which corresponds with U.S. Appl. No. 15/272,343, 5 pages.
Patent, dated Dec. 28, 2018, received in Korean Patent Application No. 2016-7019816, which corresponds with U.S. Appl. No. 14/871,227, 8 pages.
Notice of Allowance, dated Jan. 17, 2019, reveived in U.S. Appl. No. 14/866,989, 8 pages.
Office Action, dated Feb. 27, 2019, received in U.S. Appl. No. 14/869,361, 28 pages.
Notice of Allowance, dated Mar. 12, 2019, received in U.S. Appl. No. 14/869,703, 6 pages.
Office Action, dated Jan. 10, 2019, received in U.S. Appl. No. 15/009,668, 17 pages.
Final Office Action, dated Mar. 25, 2019, received in U.S. Appl. No. 15/272,341, 25 pages.
Final Office Action, dated Apr. 2, 2019, received in U.S. Appl. No. 15/272,345, 28 pages.
Office Action, dated Jan. 24, 2019, received in U.S. Appl. No. 15/655,749, 25 pages.
Apple, "Apple—September Event 2014", https://www.youtube.com/watch?v=38lqQpqwPe7s, Sep. 10, 2014, 5 pages.
Billibi, "Android 5.0 Lollipop", https://www.bilibili.comvideo/av1636046?from=search&seid=3128140235778895126, Oct. 19, 2014, 6 pages.
Borowska, "6 Types of Digital Affordance that Impact Your Ux", https://www.webdesignerdepot.com/2015/04/6-types-of-digital-affordance-that-implact-your-ux, Apr. 7, 2015, 6 pages.
Nickinson, How to Use Do Not Disturb on the HTC One M8, https://www.androidcentral.com/how-to-use-do-not-disturb-htc-one-m8, Apr. 7, 2014, 9 pages.

(56) References Cited

OTHER PUBLICATIONS

Nickinson, "Inside Android 4.2: Notifications and Quick Settings", https://www.andrloidcentral.com/inside-android-42-notifications-and-quick-settings, Nov. 3, 2012, 3 pages.
Ogino, "iOS 7 Design Standard", Japan, Impress Japan Corporation, 1st edition, Nov. 21, 2013, 2 pages.
Tweak, "QuickCenter—Add 3D-Touch Shortcuts to Control Center", https://www.youtube.com/watch?v=8rHOFpGvZFM, Mar. 22, 2016, 2 pages.
Tweak, "iOS 10 Tweak on iOS 9.0.2 Jailbread & 9.2.1-9.3 Support: QuickCenter 3D, Touch Cydia Tweak!" https://wwwyoutube.com/watch2v=opOBr30_Fkl, Mar. 6, 2016, 3 pages.
Viticci, "Apple Watch: Our Complete Overview—MacStories", https://www.macstories.net, Sep. 10, 2014, 21 pages.
Yang, et al., "Affordance Application on Visual Interface Design of Desk-Top Virtual Experiments", 2014 International Conference on Information Science, Electronics and Electrical Engineerig, IEEE, vol. 1, Apr. 26, 2014, 5 pages.
Yatani, et al., SemFeel: A User Interface with Semantic Tactile Feedback for Mobile Touch-Screen Devices, Proceedings of the 22nd annual ACM symposium on user interface software and technology (UIST '09) Oct. 2009, 10 pages.
Notice of Allowance, dated May 24, 2019, received in Korean Patent Application No. 2018-7028236, which corresponds with U.S. Appl. No. 14/608,895, 4 pages.
Patent, dated Jul. 9, 2019, received in Korean Patent Application No. 2018-7028236, which corresponds with U.S. Appl. No. 14/608,895, 4 pages.
Office Action, dated Apr. 12, 2019, received in Australian Patent Application No. 2018223021, which corresponds with U.S. Appl. No. 14/536,426, 3 pages.
Office Action, dated Nov. 18, 2019, received in Australian Patent Application No. 2018223021, which corresponds with U.S. Appl. No. 14/536,426, 3 pages.
Office Action, dated Sep. 6, 2019, received in European Patent Application No. 18180503.7, which corresponds with U.S. Appl. No. 14/536,426, 5 pages.
Certificate of Grant, dated Jul. 5, 2019, received in Hong Kong Patent Application No. 15108892.5, which corresponds with U.S. Appl. No. 14/536,426, 5 pages.
Office Action, dated Oct. 7, 2019, received in Japanese Patent Application No. 2018-000753, which corresponds with U.S. Appl. No. 14/536,426, 5 pages.
Notice of Allowance, dated Jul. 2, 2019, received in U.S. Appl. No. 14/536,644, 5 pages.
Notice of Allowance, dated Apr. 10, 2019, received in the U.S. Appl. No. 14/608,926, 16 pages.
Notice of Allowance, dated May 21, 2019, received in U.S. Appl. No. 14/608,926, 5 pages.
Office Action, dated Sep. 30, 2019, received in Japanese Patent Application No. 2018-079290, which corresponds with U.S. Appl. No. 14/608,926, 5 pages.
Office Action, dated Jun. 6, 2019, received in Australian Patent Application No. 2018256626, which corresponds with U.S. Appl. No. 14/536,646, 3 pages.
Notice of Acceptance, dated Aug. 1, 2019, received in Australian Patent Application No. 2018256626, which corresponds with U.S. Appl. No. 14/536,646, 3 pages.
Certificate of Grant, dated Jan. 25, 2019, received in Hong Kong Patent Application No. 2015-511645, which corresponds with U.S. Appl. No. 14/536,646, 4 pages.
Office Action, dated Jun. 5, 2019, received in Australian Patent Application No. 2018256616, which corresponds with U.S. Appl. No. 14/536,141, 3 pages.
Intention to Grant, dated Sep. 6, 2019, received in European Patent Application No. 13726053.5, which corresponds with U.S. Appl. No. 14/536,141, 7 pages.
Office Action, dated Jul. 5, 2019, received in Japanese Patent Application No. 2017-141953, which corresponds with U.S. Appl. No. 14/536,141, 6 pages.
Notice of Allowance, dated May 7, 2019, received in Chinese Patent Application No. 201380068295.X, which corresponds with U.S. Appl. No. 14/608942, 3 pages.
Patent, dated Jul. 5, 26:19, received in Chinese Patent Application No. 201380068295.X, which corresponds with U.S. Appl. No. 14/608,942, 8 pages.
Intention to Grant, dated Nov. 8, 2019, received in European Patent Application No. 18194127.9, which corresponds with U.S. Appl. No. 14/608,942, 7 pages.
Certificate of Grant, dated Jul. 26, 2019, received in Hong Kong, which corresponds with U.S. Appl. No. 14/608,942, 4 pages.
Office Action, dated Aug. 20, 2018, received in Australian Patent Application No. 2018250481, which corresponds with U.S. Appl. No. 14/536,203, 2 pages.
Decision to Grant, dated Aug. 8, 2019, received in European Patent Application No. 13724104.8, which corresponds with U.S. Appl. No. 14/536,203, 1 page.
Certificate of Grant, dated Sep. 4, 2019, received in European Patent Application No. 13724104.8, which corresponds with U.S. Appl. No. 14/536,203, 4 pages.
Patent, dated Sep. 27, 2019, received in Hong Kong Patent Application No. 15108904.1, which corresponds with U.S. Appl. No. 14/536,203, 6 pages.
Office Action, dated Sep. 30, 2019, received in Japanese Patent Appiication No. 2018-022394, which corresponds with U.S. Appl. No. 14/536,203, 5 pages.
Office action, dated Apr. 3, 2019, received in Chinese Patent Application No. 201380074060.1, which corresponds with U.S. Appl. No. 14/608,965, 3 pages.
Patent, dated May 17, 2019, received in Chinese Patent Application No. 201380074060.1, which corresponds with U.S. Appl. No. 14/608,965, 6 pages.
Notice of Acceptance, dated Apr. 29, 2019, received in Australian Patent Appiication No. 2018204236, which corresponds with U.S. Appl. No. 14/5326,267, 3 pages.
Certificat of Grant, dated Aug. 28, 2019, received in Australian Patent Application No. 2018204236, which corresponds with U.S. Appl. No. 14/5326,267, 4 pages.
Office Action, dated Jul. 11, 2019, received in Chinese Patent Application No. 201610537334.1, which corresponds with U.S. Appl. No. 14/536,267, 3 pages.
Office Action, dated Sep. 30, 2019, received in Chinese Patent Application No. 201610537334.1, which corresponds with U.S. Appl. No. 14/536,267, 3 pages.
Office Action, dated Aug. 29, 2019, received in European Patent Application No. 18183789.9, which corresponds with U.S. Appl. No. 16/262,800, 9 pages.
Patent, dated Aug. 30, 2019, received in Hong Kong Patent Application No. 15107537.8, which corresponds with U.S. Appl. No. 14/536,267, 9 pages.
Notice of Allowance, dated Sep. 9, 2019, received in Japanese Patent Application No. 2017-237035, which corresponds with U.S. Appl. No. 14/536,267, 5 pages.
Patent, dated Sep. 27, 2019, received in Japanese Patent Application No. 2017-237035, which corresponds with U.S. Appl. No. 14/536,267, 3 pages.
Decision to Grant, dated Oct. 31, 2019, received in European Patent Application No. 17186744.3, which corresponds with U.S. Appl. No. 14/536,291, 3 pages.
Decision to Grant, dated Aug. 1, 2019, received in European Patent Application No. 13811032.5, which corresponds with U.S. Appl. No. 14/608,985, 2 pages.
Certificate of Grant, dated Aug. 28, 2019, received in European Patent Application No. 13811032.5, which corresponds with U.S. Appl. No. 14/536,648, 4 pages.
Fianl Office Action, dated May 23, 2019, received in U.S. Appl. No. 14/609,006, 14 pages.
Notice of Allowance, dated Jul. 2, 2019, received in U.S. Appl. No. 14/536,648, 5 pages.
Intention to Grant, dated Apr. 1, 2019, received in European Patent Application No. 17153418.3, which corresponds with U.S. Appl. No. 14/536,648, 7 pages.

(56) References Cited

OTHER PUBLICATIONS

Decision to Grant, dated Aug. 16, 2019, received in European Patent Application No. 17153418.3, which corresponds with U.S. Appl. No. 14/536,648, 3 pages.
Grant Certificate, dated Sep. 11, 2019, received in European Patent Application No. 17153418.3, which corresponds with U.S. Appl. No. 14/536,648, 3 pages.
Notice of Allowance, dated Apr. 9, 2019, received in Japanese Patent Application No. 2017-113598, which corresponds with U.S. Appl. No. 14/609,042, 5 pages.
Patent, dated Apr. 19, 2019, received in Japanese Patent Application No. 2017-113598, which corresponds with U.S. Appl. No. 14/609,042, 2 pages.
Certificate of Grant, dated Jul. 4, 2019, received in Australian Patent Application No. 2016233792, which corresponds with U.S. Appl. No. 14/864,737, 1 page.
Notice of Allowance, dated Apr. 17, 2019, received in Chinese Patent Application No. 201610159295.6, which corresponds with U.S. Appl. No. 14/864,737, 3 pages.
Patent, dated May 31, 2019, received in Chinese Patent Application No. 201610159295.6, which corresponds with U.S. Appl. No. 14/864,737, 7 pages.
Office Action, dated Jul. 16, 2019, received in Chinese Patent Application No. 201610131415.1, which corresponds with U.S. Appl. No. 14/866,981, 4 pages.
Intention to Grant, dated Oct. 28, 2019. received in European Patent Application No. 16707356.8, which corresponds with U.S. Appl. No. 14/866,159, 7 pages.
Notice of Acceptance, dated Jun. 21, 2019, received in Australian Patent Application No. 2017258967, which corresponds with U.S. Appl. No. 14/868,078, 3 page.
Certificate of Grant, dated Oct. 17, 2019, received in Australian Patent Application No. 2017258967, which corresponds with U.S. Appl. No. 14/868,078, 4 page.
Notice of Allowance, dated May 6, 2019, received in Chinese Patent Application No. 01610130348.1, which corresponds with U.S. Appl. No. 14/868,078, 3 pages.
Patent, dated Jul. 5, 2019, received in Chinese Patent Application No. 201610130348.1, which corresponds with U.S. Appl. No. 14/868,078, 6 pages.
Intention to Grant, dated May 10, 2019, received in European Patent Application No. 16708916.8, which corresponds with U.S. Appl. No. 14/868,078, 5 pages.
Decision to Grant, dated Sep. 12, 2019, reveived in European Patent Application No. 16708916.8, which corresponds with U.S. Appl. No. 14/868,078, 2 pages.
Patent, dated Oct. 9, 2019, received in European Patent Application No. 16708916.8, which corresponds with U.S. Appl. No. 14/868,078, 3 pages.
Intention to Grant, dated May 22, 2019, received in European Patent Application No. 17184437.6, which corresponds with U.S. Appl. No. 14/868,078, 7 pages.
Decision to Grant, dated Sep. 19, 2019, received in European Patent Application No. 17184437.6, which corresponds with U.S. Appl. No. 14/868,078, 2 pages.
Patent, dated Oct. 16, 2019, received in European Patent Application No. 17184437.6, which corresponds with U.S. Appl. No. 14/868,078, 3 pages.
Office Action, dated Jun. 17, 2019, received in Chinese Patent Application No. 201610342313.4, which corresponds with U.S. Appl. No. 14/863,432, 4 pages.
Office Action, dated Nov. 5, 2019, received in Chinese Patent Application No. 201610342313.4, which corresponds with U.S. Appl. No. 14/863,432, 4 pages.
Office Action, dated Jul. 11, 2019, received in Chinese Patent Application No. 201610342264.4, which corresponds with U.S. Appl. No. 14/866,511, 4 pages.
Office Action, dated Sep. 17, 2019, received in Chinese Patent Application No. 201610342264.4, which corresponds with U.S. Appl. No. 14/866,511, 3 pages.
Intention to Grant, dated Jul. 5, 2019, received in European Patent Application No. 16727900.9, which corresponds with U.S. Appl. No. 14/866,511, 5 pages.
Office Action, dated May 8, 2019, received in European Patent Application No. 18168939.9, which corresponds with U.S. Appl. No. 14/869,899, 10 pages.
Intention to Grant, dated Oct. 25, 2019, received in European Patent Application No. 18168939.9, which corresponds with U.S. Appl. No. 14/869,899, 8 pages.
Office Action, dated May 23, 2019, received in European Patent Application No. 18175195.9, which corresponds with U.S. Appl. No. 14/869,899, 10 pages.
Patent, dated Apr. 5, 2019, received in Japanese Patent Application No. 2018-100827, which corresponds with U.S. Appl. No. 14/869,899, 5 pages.
Office Action, dated Mar. 22, 2019, received in Korean Patent Application No. 2018-7017213, which corresponds with U.S. Appl. No. 14/869,899, 6 pages.
Patent, dated May 10, 2019, received in Korean Patent Application No. 2018-7017213, which corresponds with U.S. Appl. No. 14/869,899, 8 pages.
Examiner's Answer, dated May 9, 2019, received in U.S. Appl. No. 14/866,992, 26 pages
Certificate of Grant, dated Jul. 4, 2019, received in Australian Patent Application No. 2016304890, which corresponds with U.S. Appl. No. 14/866,992, 1 page.
Certificate of Grant, dated May 9, 2019, received in Australian Patent Application No. 201761478, which corresponds with U.S. Appl. No. 14/866,992, 3 pages.
Office Action, dated Sep. 12, 2019, received in Chinese Patent Application No. 201610658351.8, which corresponds with U.S. Appl. No. 14/866,992, 5 pages.
Summons, dated May 8, 2019, received in European Patent Application No. 16758008.3, which corresponds with U.S. Appl. No. 14/866,992, 14 pages.
Notice of Allowance, dated Jun. 18, 2019, received in Japanese Patent Application No. 2018-5306425, which corresponds with U.S. Appl. No. 14/866,992, 5 pages.
Patent, dated Jul. 26, 2019, received in Japanese Patent Application No. 2018-506425, which corresponds with U.S. Appl. No. 14/866,992, 3 pages.
Notice of Allowance, dated Sep. 10, 2019, received in Korean Patent Application No. 2018-7003890, which corresponds with U.S. Appl. No. 14/866,992, 5 pages.
Patent, dated Oct. 11, 2019, received in Korean Patent Application No. 2018-7003890, which corresponds with U.S. Appl. No. 14/866,992, 5 pages.
Office Action, dated Jun. 28, 2019, received in U.S. Appl. No. 15/009,661, 33 pages.
Final Office Action, dated Apr. 17, 2019, received in U.S. Appl. No. 14/856,520, 38 pages.
Certificate of Grant, dated May 16, 2019, received in Australian Patent Application No. 2017202816, which corresponds with U.S. Appl. No. 14/857,636, 4 pages.
Notice of Allowance, dated May 10, 2019, received in Korean Patent Application No. 20177036645, which corresponds with U.S. Appl. No. 14/857,636, 4 pages.
Patent, dated Jul. 11, 2019, received in Korean Patent Application No. 20177036645, which corresponds with U.S. Appl. No. 14/857,636, 8 pages.
Office Action, dated Nov. 11, 2019, received in Japanese Patent Application No. 2018-201076, which corresponds with U.S. Appl. No. 14/857,663, 7 pages.
Office Action, dated Jul. 1, 2019, received in Australian Patent Application No. 2019200872, which corresponds with U.S. Appl. No. 14/864,580, 6 pages.
Notice of Acceptance, dated Sep. 19, 2019, received in Australian Patent Application No. 2019200872, which corresponds with U.S. Appl. No. 14/864,580, 3 pages.
Notice of Allowance, dated Jun. 14, 2019, received in Chinese Patent Application No. 201610342151.4, which corresponds with U.S. Appl. No. 14/864,580, 3 pages.

(56) References Cited

OTHER PUBLICATIONS

Patent, dated Jul. 30, 2019, received in Chinese Patent Application No. 201610342151.4, which corresponds with U.S. Appl. No. 14/864,580, 6 pages.
Notice of Allowance, dated Aug. 14, 2019, received in Korean Patent Application No. 2019-7018317, which corresponds with U.S. Appl. No. 14/864,580, 6 pages.
Intention to Grant, dated Jul. 18, 2019, received in European Patent Application No. 16730554.9, which corresponds with U.S. Appl. No. 14/864,601, 5 pages.
Decision to Grant, dated Sep. 12, 2019, received in European Patent Application No. 16730554.9, which corresponds with U.S. Appl. No. 14/864,601, 2 pages.
Patent, dated Oct. 9, 2019, received in European Patent Application No. 16730554.9, which corresponds with U.S. Appl. No. 14/864,601, 3 pages.
Notice of Allowance, dated May 29, 2019, received in Korean Patent Application No. 2017-7033756, which corresponds with U.S. Appl. No. 14/864,601, 6 pages.
Patent, dated Jun. 25, 2019, received in Korean Patent Application No. 2017-7033756, which corresponds with U.S. Appl. No. 14/864,601, 6 pages.
Notice of Allowance, dated May 23, 2019, received in Chinese Patent Application No. 201610189298.4, which corresponds with U.S. Appl. No. 14/866,361, 3 pages.
Patent, dated Jul. 23, 2019, received in Chinese Patent Application No. 201610189298.4, which corresponds with U.S. Appl. No. 14/866,361, 7 pages.
Office Action, dated Oct. 8, 2019, received in European Patent Application No. 17188507.2, which corresponds with U.S. Appl. No. 14/866,361, 6 pages.
Office Action, dated Jun. 10, 2019, received in Japanese Patent Application No. 2017-441962, which corresponds with U.S. Appl. No. 14/866,361, 6 pages.
Notice of Allowance, dated Oct. 7, 2019, received in Japanese Patent Application No. 2017-141962, which corresponds with U.S. Appl. No. 14/866,361, 5 pages.
Patent, dated Apr. 3, 2019, received in Korean Patent Application No. 2018-7013039, which corresponds U.S. Appl. No. 14/866,361, 4 pages.
Notice of Allowance, dated Apr. 4, 2019, received in U.S. Appl. No. 14/866,987, 5 pages.
Rejection Decision, dated Apr. 28, 2019, received in Chinese Patent Application No. 201610342336.5, which corresponds with U.S. Appl. No. 14/866,987, 4 pages.
Office Action, dated Aug. 15, 2019, received in Chinese Patent Application No. 201610342336.5, which corresponds with U.S. Appl. No. 14/866,987, 3 pages.
Intention to Grant, dated Jun. 14, 2019, received in European Patent Application No. 16189421.7, which corresponds with U.S. Appl. No. 14/866,987, 7 pages.
Intention to Grant, dated Oct. 25, 2019, received in European Patent Application No. 16189421.7, which corresponds with U.S. Appl. No. 14/866,987, 7 pages.
Decision to Grant, dated Nov. 14, 2019, received in European Patent Application No. 16189421.7, which corresponds with U.S. Appl. No. 14/866,987, 2 pages.
Certificate of Grant, dated Jun. 13, 2019, received in Australian Patent Application No. 2017201079, which corresponds with U.S. Appl. No. 14/866,989, 1 page.
Rejection Decision, dated Apr. 24, 2019, received in Chinese Patent Application No. 201610342314.9, which corresponds with U.S. Appl. No. 14/866,989, 3 pages.
Office Action, dated Sep. 30, 2019, received in Chinese Patent Application No. 201610871466.8, which corresponds with U.S. Appl. No. 14/871,236, 4 pages.
Notice of Allowance, dated Jun. 5, 2019, received in Chinese Patent Application No. 201680000466.9, which corresponds with U.S. Appl. No. 14/871,227, 5 pages.
Patent, dated Aug. 9, 2019, received in Chinese Patent Application No. 201680000466.9, which corresponds with U.S. Appl. No. 14/871,227, 8 pages.
Office Action, dated Nov. 4, 2019, received in Chinese Patent Application No. 201610871323.7, which corresponds with U.S. Appl. No. 14/871,336, 12 pages.
Examiner's Answer, dated Jul. 18, 2019, received in U.S. Appl. No. 14/867,892, 17 pages.
Notice of Allowance, dated Apr. 4, 2019, received in U.S. Appl. No. 14/869,997, 9 pages.
Notice of Allowance, dated May 21, 2019, received in Chinese Patent Application No. 201610131507.X, which corresponds with U.S. Appl. No. 14/867,990, 3 pages.
Patent, dated Jul. 19, 2019, received in Chinese Patent Application No. 201610131507.X, which corresponds with U.S. Appl. No. 14/867,990, 6 pages.
Notice of Allowance, dated May 1, 2019, received in U.S. Appl. No. 15/009,668, 12 pages.
Certificate of Grant, dated May 23, 2019, received in Australian Patent Application No. 2017202058, which corresponds with U.S. Appl. No. 15/081,771, 1 page.
Office Action, dated Sep. 27, 2019, received in Chinese Patent Application No. 201810119007.3, which corresponds with U.S. Appl. No. 15/136,782, 6 pages.
Office Action, dated Apr. 17, 2019, received in European Patent Application No. 18171453.6, which corresponds with U.S. Appl. No. 15/136,782, 4 pages.
Office Action, dated Oct. 2, 2019, received in European Patent Application No. 18171453.6, which corresponds with U.S. Appl. No. 15/136,782, 5 pages.
Patent, dated Mar. 22, 2019, received in Japanese Patent Application No. 2018-062161, which corresponds with U.S. Appl. No. 15/136,782, 5 pages.
Patent, dated Apr. 3, 2019, received in Korean Patent Application No. 2018-7020659, which corresponds with U.S. Appl. No. 15/136,782, 5 pages.
Notice of Allowance, dated Nov. 1, 2019, received in Japanese Patent Application No. 2018-158502, which corresponds with U.S. Appl. No. 15/231,745, 5 pages.
Decision to Grant, dated Apr. 26, 2019, received in European Patent Application No. 15155939.4, which corresponds with U.S. Appl. No. 15/272,327, 2 pages.
Patent, dated May 22, 2019, received in European Patent Application No. 15155939.4, which corresponds with U.S. Appl. No. 15/272,327, 1 pages.
Office Action, dated Jun. 5, 2019, received in Chinese Patent Application No. 201810071627.4, which corresponds with U.S. Appl. No. 15/272,343, 6 pages.
Intention to Grant, dated May 13, 2019, received in European Patent Application No. 17206374.5, which corresponds with U.S. Appl. No. 15/272,343, 7 pages.
Decision to Grant, dated Sep. 12, 2019, received in European Patent Application No. 17206374.5, which corresponds with U.S. Appl. No. 15/272,343, 3 pages.
Patent, Oct. 9, 2019, received in European Patent Application No. 17206374.5, which corresponds with U.S. Appl. No. 15/272,343, 3 pages.
Office Action, dated Oct. 22, 2019, received in Chinese Patent Application No. 201680022696.5, which corresponds with U.S. Appl. No. 15/272,345, 7 pages.
Office Action, dated Aug. 2, 2019, received in Korean Patent Application No. 2019-7009439, which corresponds with U.S. Appl. No. 15/499,693, 3 pages.
Final Office Action, dated Jul. 1, 2019, received in U.S. Appl. No. 15/655,749, 24 pages.
Notice of Allowance, dated Apr. 18, 2019, received in Korean Patent Application No. 2017-7034248, which corresponds with U.S. Appl. No. 15/655,749, 5 pages.
Patent, dated Jul. 3, 2019, received in Korean Patent Application No. 2017-7034248, which corresponds with U.S. Appl. No. 15/655,749, 5 pages.
Office Action, dated Aug. 1, 2019, received in U.S. Appl. No. 15/785,372, 22 pages.

(56) References Cited

OTHER PUBLICATIONS

Office Action, dated Apr. 11, 2019, received in U.S. Appl. No. 15/889,115, 9 pages.
Final Office Action, dated Oct. 28, 2019, received in U.S. Appl. No. 15/889,115, 12 pages.
Office Action, dated Jul. 25, 2019, received in U.S. Appl. No. 15/979,347, 14 pages.
Office Action, dated May 31, 2019, received in Australian Patent Application No. 2018253539, which corresponds with U.S. Appl. No. 16/049,725, 3 pages.
Notice of Allowance, dated Oct. 10, 2019, received in U.S. Appl. No. 16/102,409, 9 pages.
Office Action, dated Aug. 20, 2019, received in Korean Patent Application No. 2019-7019946, which corresponds with U.S. Appl. No. 16/154,591, 6 pages.
Office Action, dated May 22, 2019, received in U.S. Appl. No. 16/230,743, 7 pages.
Notice of Allowance, dated Sep. 11, 2019, received in U.S. Appl. No. 16/230,743, 5 pages.
Office Action, dated Jul. 5, 2019, received in Korean Patent Application No. 2018-7037896, which corresponds with U.S. Appl. No. 16/243,834, 2 pages.
Notice of Allowance, dated Apr. 19, 2019, received in U.S. Appl. No. 16/252,478, 11 pages.
Office Action, dated Jul. 15, 2019, received in U.S. Appl. 16/258,394, 8 pages.
Notice of Allowance, dated Nov. 6, 2019, received in U.S. Appl. No. 16/258,394, 8 pages.
Office Action, dated Oct. 11, 2019, received in Australian Patent Application No. 2019202417, 4 pages.
Office Action, dated Aug. 30, 2019, received in Korean Patent Application No. 2019-7019100, 2 pages.
Notice of Allowance, dated Nov. 1, 2019, received in Korean Patent Application No. 2019-7019100, 5 pages.
Extended European Search Report, dated Nov. 14, 2019, received in European Patent Application No. 19194418.0, which corresponds with U.S. Appl. No. 14/864,580, 8 pages.
Extended European Search Report, dated Oct. 28, 2019, received in European Patent Application No. 19195414.8, which corresponds with U.S. Appl. No. 16/240,672, 6 pages.
Extended European Search Report, dated Nov. 13, 2019, received in European Patent Application No. 19194439.6, which corresponds with U.S. Appl. No. 16/262,800, 12 pages.
Extended European Search Report, dated Oct. 9, 2019, received in European Patent Application No. 19181042.3, which corresponds with U.S. Appl. No. 15/272,343, 10 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Notice of Allowance, dated May 16, 2018, U.S. Appl. No. 14/536,367, 5 pages.
Office Action, dated May 8, 2018, Australian Patent Application No. 2016216580, which corresponds with U.S. Appl. No. 14/536,426, 5 pages.
Notice of Allowance, dated May 17, 2018, Australian Patent Application No. 2016216580, which corresponds with U.S. Appl. No. 14/536,426, 3 pages.
Notice of Allowance, dated May 10, 2018, Chinese Patent Application No. 201380035982.1, which corresponds with U.S. Appl. No. 14/536,426, 2 pages.
Final Office Action, dated Jun. 22, 2018, U.S. Appl. No. 14/536,464, 32 pages.
Final Office Action, dated Jun. 6, 2018, U.S. Appl. No. 14/608,926, 19 pages.
Certificate of Grant, dated May 3, 2018, Australian Patent Application No. 2016201451, which corresponds with U.S. Appl. No. 14/608,926, 1 page.
Patent, dated May 4, 2018, Chinese Patent Application No. 201380068414.1, which corresponds with U.S. Appl. No. 14/608,926, 4 pages.
Patent, dated Apr. 27, 2018, Japanese Patent Application No. 2017-024234, which corresponds with U.S. Appl. No. 14/608,926, 3 pages.
Notice of Allowance, dated Jun. 1, 2018, U.S. Appl. No. 14/536,267, 5 pages.
Notice of Allowance, dated Mar. 20, 2018, U.S. Appl. No. 14/536,291, 5 pages.
Grant Certificate, dated Apr. 25, 2018, European Patent Application No. 16710871.1, which corresponds with U.S. Appl. No. 14/864,737, 2 pages.
Notice of Allowance, dated May 18, 2018, U.S. Appl. No. 14/866,159, 8 pages.
Office Action, dated Jun. 5, 2018, Chinese Patent Application No. 201610137839.9, which corresponds with U.S. Appl. No. 14/866,159, 11 pages.
Patent, dated May 22, 2018, Danish Patent Application No. 201500574, which corresponds with U.S. Appl. No. 14/866,159, 2 pages.
Notice of Allowance, dated May 24, 2018, U.S. Appl. No. 14/868,078, 6 pages.
Office Action, dated May 24, 2018, European Patent Application No. 16727900.9, which corresponds with U.S. Appl. No. 14/866,511, 7 pages.
Patent, dated May 28, 2018, Danish Patent Application No. 201500592, which corresponds with U.S. Appl. No. 14/869,899, 2 pages.
Patent, dated May 22, 2018, Danish Patent Application No. 201500579, which corresponds with U.S. Appl. No. 14/866,361, 2 pages.
Office Action, dated Jun. 11, 2018, European Patent Application No. 17188507.2, which corresponds with U.S. Appl. No. 14/866,361, 10 pages.
Patent, dated Jun. 18, 2018, Danish Patent Application No. 201500595, which corresponds with U.S. Appl. No. 14/871,236, 3 pages.
Final Office Action, dated Apr. 20, 2018, U.S. Appl. No. 14/870,882, 7 pages.
Notice of Allowance, dated Jun. 11, 2018, U.S. Appl. No. 14/871,227, 11 pages.
Notice of Allowance, dated May 31, 2018, U.S. Appl. No. 14/869,855, 10 pages.
Final Office Action, dated May 23, 2018, U.S. Appl. No. 14/869,873, 18 pages.
Office Action, dated May 4, 2018, Australian Patent Application No. 2018202855, which corresponds with U.S. Appl. No. 15/136,782, 3 pages.
Patent, dated May 22, 2018, Danish Patent Application No. 201770190, which corresponds with U.S. Appl. No. 15/136,782, 2 pages.
Office Action, dated Jun. 1, 2018, Japanese Patent Application No. 2018-062161, which corresponds with U.S. Appl. No. 15/136,782, 5 pages.
Patent, dated May 28, 2018, Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Final Office Action, dated May 10, 2018, received in U.S. Appl. No. 15/655,749, 19 pages.
International Preliminary Report on Patentability, dated Sep. 12, 2017, received in International Patent Application No. PCT/US2016/021400, which corresponds with U.S. Appl. No. 14/869,899, 39 pages.
Extended European Search Report, dated May 30, 2018, received in International Patent Application No. 18155939.4, which corresponds with U.S. Appl. No. 15/272,327, 8 pages.
Office Action, dated Jan. 7, 2020, U.S. Appl. No. 14/609,006, 17 pages.
Final Office Action, dated Dec. 30, 2019, U.S. Appl. No. 15/009,661, 33 pages.

(56) References Cited

OTHER PUBLICATIONS

Notice of Allowance, dated Jan. 6, 2020, U.S. Appl. No. 14/856,520, 5 pages.
Office Action, dated Nov. 25, 2019, U.S. Appl. No. 16/049,725, 9 pages.
Office Action, dated Nov. 29, 2019, U.S. Appl. No. 16/136,163, 9 pages.
Office Action, dated Nov. 25, 2019, U.S. Appl. No. 16/174,170, 31 pages.
Patent, dated Nov. 22, 2019, Hong Kong Patent Application No. 16107033.6, which corresponds with U.S. Appl. No. 14/536,426, 6 pages.
Certificate of Grant, dated Dec. 5, 2019, Australian Patent Application No. 2018256626, which corresponds with U.S. Appl. No. 14/536,646, 3 pages.
Office Action, dated Dec. 20, 2019, Chinese Patent Application No. 201610537334.1, which corresponds with U.S. Appl. No. 14/536,267, 3 pages.
Patent, dated Nov. 8, 2019, Hong Kong Patent Application No. 15108890.7, which corresponds with U.S. Appl. No. 14/536,267, 4 pages.
Patent, dated Nov. 27, 2019, European Patent Application No. 17186744.3, which corresponds with U.S. Appl. No. 14/536,291, 4 pages.
Office Action, dated Nov. 21, 2019, Chinese Patent Application No. 201680011338.4, which corresponds with U.S. Appl. No. 14/868,078, 8 pages.
Office Action, dated Jan. 10, 2020, Japanese Patent Application No. 2018-243773, which corresponds with U.S. Appl. No. 14/863,432, 6 pages.
Notice of Allowance, dated Nov. 28, 2019, Chinese Patent Application No. 201610342264.4, which corresponds with U.S. Appl. No. 14/866,511, 3 pages.
Decision to Grant, dated Dec. 5, 2019, European Patent Application No. 16727900.9, which corresponds with U.S. Appl. No. 14/866,511, 2 pages.
Patent, dated Jan. 1, 2020, European Patent Application No. 16727900.9, which corresponds with U.S. Appl. No. 14/866,511, 3 pages.
Oral Summons, dated Dec. 6, 2019, European Patent Application No. 18175195.9, which corresponds with U.S. Appl. No. 14/869,899, 9 pages.
Office Action, dated Jan. 13, 2020, Chinese Patent Application No. 201610658351.8, which corresponds with U.S. Appl. No. 14/866,992, 3 pages.
Office Action, dated Jan. 20, 2020, Japanese Patent Application No. 2017-029201, which corresponds with U.S. Appl. No. 14/857,636, 21 pages.
Patent, dated Nov. 12, 2019, Korean Patent Application No. 2019-7018317, which corresponds with U.S. Appl. No. 14/864,580, 6 pages.
Patent, dated Nov. 8, 2019, Japanese Patent Application No. 2017-141962, which corresponds with U.S. Appl. No. 14/866,361, 4 pages.
Notice of Allowance, dated Dec. 3, 2019, Chinese Patent Application No. 201610342336.5, which corresponds with U.S. Appl. No. 14/866,987, 3 pages.
Patent, dated Dec. 11, 2019, European Patent Application No. 16189421.7, which corresponds with U.S. Appl. No. 14/866,987, 3 pages.
Intention to Grant, dated Dec. 4, 2019, European Patent Application No. 18168941.5, which corresponds with U.S. Appl. No. 14/871,236, 8 pages.
Office Action, dated Nov. 28, 2019, Chinese Patent Application No. 201610870912.3, which corresponds with U.S. Appl. No. 14/870,882, 10 pages.
Patent, dated Nov. 29, 2019, Japanese Patent Application No. 2018-158502, which corresponds with U.S. Appl. No. 15/231,745, 3 pages.
Notice of Acceptance, dated Dec. 10, 2019, Australian Patent Application No. 2018204234, which corresponds with U.S. Appl. No. 15/272,327, 3 pages.
Notice of Allowance, dated Dec. 11, 2019, Chinese Patent Application No. 201810071627.4, which corresponds with U.S. Appl. No. 15/272,343, 4 pages.
Notice of Allowance, dated Dec. 27, 2019, Korean Patent Application No. 2019-7009439, which corresponds with U.S. Appl. No. 15/499,693, 5 pages.
Office Action, dated Dec. 2, 2019, Japanese Patent Application No. 2018-202048, which corresponds with U.S. Appl. No. 16/154,591, 6 pages.
Office Action, dated Dec. 18, 2019, Australian Patent Application No. 2018282409, which corresponds with U.S. Appl. No. 16/243,834, 3 pages.
Office Action, dated Dec. 23, 2019, Korean Patent Application No. 2018-7037896, which corresponds with U.S. Appl. No. 16/243,834, 6 pages.
Notice of Allowance, dated Dec. 13, 2019, Korean Patent Application No. 2019-7033444, which corresponds with U.S. Appl. No. 16/252,478, 6 pages.

\* cited by examiner

Touch-Sensitive Display 112

14504 — While a focus selector is at a location on the display that corresponds to the respective control:

14516 — Change the appearance of the respective control to indicate progress toward meeting the respective contact intensity criteria 14518 — The respective contact intensity criteria include a respective contact intensity threshold and a respective delay time period Changing the appearance of the control includes displaying an indication of an amount of time remaining before the respective delay time period has elapsed 14520 — The respective contact intensity criteria include a respective contact intensity threshold Changing the appearance of the control includes displaying an indication of a difference between a current intensity of a contact on the touch-sensitive surface and the respective contact intensity threshold 14522 — Changing the appearance of the control includes displaying a progress bar in the control 14524 — Changing the appearance of the control includes changing color of at least a portion of the control in accordance with the intensity of the contact 14526 — Changing the appearance of the control includes changing color of at least a portion of the control in accordance with a length of time that the contact has continuously met a respective contact intensity threshold 14528 — Changing the appearance of the control includes changing color of at least a portion of the control in accordance with a length of time since the contact met a respective contact intensity threshold

```
┌─────────────────────────────────────────────────────────────┐
│ Display a brush manipulation object on a display, wherein the output of a │
│ virtual brush on a virtual canvas is controlled in accordance with: one or │ ─ 16902
│ more output properties of the virtual brush, and movement of the brush │
│ manipulation object on the display │
└─────────────────────────────────────────────────────────────┘
                              ↓
┌─────────────────────────────────────────────────────────────┐
│ While a focus selector is over or adjacent to the brush manipulation object, │ ─ 16904
│ detect an increase in intensity of a first contact on a touch-sensitive surface │
└─────────────────────────────────────────────────────────────┘
                              ↓
┌─────────────────────────────────────────────────────────────┐
│ In response to detecting the increase in intensity of the first contact:    ─ 16906 │
│  ┌───────────────────────────────────────────────────────┐  │
│  │ Adjust a first output property of the virtual brush in accordance with │ ─ 16908 │
│  │ the increase in intensity of the first contact │  │
│  │  ┌─────────────────────────────────────────────────┐  │  │
│  │  │ The first output property is a property selected from the set │ ─ 16910 │
│  │  │ consisting of: line width, line color, and line opacity │  │  │
│  │  └─────────────────────────────────────────────────┘  │  │
│  └───────────────────────────────────────────────────────┘  │
│  ┌───────────────────────────────────────────────────────┐  │
│  │ Adjust an appearance of the brush manipulation object in accordance │ ─ 16916 │
│  │ with the change in the first output property of the virtual brush │  │
│  │  ┌─────────────────────────────────────────────────┐  │  │
│  │  │ Adjusting the appearance of the brush manipulation object │ ─ 16918 │
│  │  │ includes displaying a bar that fills up as the intensity of the first │  │  │
│  │  │ contact increases │  │  │
│  │  └─────────────────────────────────────────────────┘  │  │
│  └───────────────────────────────────────────────────────┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ┐  │
│    Adjusting the appearance of the brush manipulation object includes  ─ 16920 │
│  │ displaying a brush output status indicator that moves towards a brush │  │
│    status boundary in accordance with an intensity of the first contact; │
│  │ and adjusting the first output property of the virtual brush includes a │  │
│    binary change in the output of the virtual brush when the status │
│  │ indicator reaches the brush status boundary │  │
│    ┌ ─ ─ ─ ─ ─ ─ ─ ─ ─ ─ ─ ─ ─ ─ ─ ─ ─ ─ ─ ─ ─ ─ ─ ─ ┐ │
│  │   Adjusting the first output property of the virtual brush includes a │ ─ 16921 │
│    │ continuous change in the output of the virtual brush that │ │ │
│  │   corresponds to an increase in intensity of the first contact after │   │
│    │ the status indicator reaches the brush status boundary │ │ │
│  │ └ ─ ─ ─ ─ ─ ─ ─ ─ ─ ─ ─ ─ ─ ─ ─ ─ ─ ─ ─ ─ ─ ─ ─ ─ ┘ │  │
│    ┌ ─ ─ ─ ─ ─ ─ ─ ─ ─ ─ ─ ─ ─ ─ ─ ─ ─ ─ ─ ─ ─ ─ ─ ─ ┐ │
│  │ │ The brush status boundary corresponds to a maximum size of │ │ ─ 16922 │
│    │ the virtual brush │ │ │
│  │ └ ─ ─ ─ ─ ─ ─ ─ ─ ─ ─ ─ ─ ─ ─ ─ ─ ─ ─ ─ ─ ─ ─ ─ ─ ┘ │  │
│  └ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────┘
                              ↓
                             (A)
```

Figure 12A

DEVICE, METHOD, AND GRAPHICAL USER INTERFACE FOR MOVING A CURSOR ACCORDING TO A CHANGE IN AN APPEARANCE OF A CONTROL ICON WITH SIMULATED THREE-DIMENSIONAL CHARACTERISTICS

RELATED APPLICATIONS

This application is a continuation of PCT Patent Application Serial No. PCT/US2013/069484, filed on Nov. 11, 2013, entitled "Device, Method, and Graphical User Interface for Moving a Cursor According to a Change in an Appearance of a Control Icon with Simulated Three-Dimensional Characteristics," which claims the benefit of and priority to U.S. Provisional Patent Application Ser. No. 61/778,373, filed on Mar. 12, 2013, entitled "Device, Method, and Graphical User Interface for Managing Activation of a Control Based on Contact Intensity;" and U.S. Provisional Patent Application No. 61/747,278, filed Dec. 29, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for managing activation of controls that provide users with an indication of progress toward activating a respective control. Such methods and interfaces may complement or replace conventional methods for managing activation of controls. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying, on the display, a respective control associated with respective contact intensity criteria. The method further includes while a focus selector is at a location on the display that corresponds to the respective control: detecting a gesture, on the touch-sensitive surface, that corresponds to an interaction with the respective control; and while detecting the gesture, in accordance with a determination that the gesture does not include a contact that meets the respective contact intensity criteria, changing the appearance of the respective control to indicate progress toward meeting the respective contact intensity criteria.

In accordance with some embodiments, an electronic device includes a display unit configured to display on the display unit, a respective control associated with respective contact intensity criteria; a touch-sensitive surface unit configured to receive a contact on the touch-sensitive surface unit; one or more sensor units configured to detect intensity of contacts with the touch-sensitive surface unit; and a processing unit coupled to the display unit, the sensor units and the touch-sensitive surface unit. The processing unit is configured to: while a focus selector is at a location on the display unit that corresponds to the respective control: detect a gesture, on the touch-sensitive surface unit, that corresponds to an interaction with the respective control; and while detecting the gesture, in accordance with a determination that the gesture does not include a contact that meets the respective contact intensity criteria, change the appearance of the respective control to indicate progress toward meeting the respective contact intensity criteria.

Thus, electronic devices with displays, touch-sensitive surfaces and one or more sensors to detect intensity of contacts with the touch-sensitive surface are provided with faster, more efficient methods and interfaces for managing activation of controls based on the intensity (e.g., pressure) and/or duration of a contact, thereby increasing the effectiveness, efficiency, and user satisfaction with such devices. Such methods and interfaces may complement or replace conventional methods for managing activation of controls.

There is a need for electronic devices with faster, more efficient methods and interfaces for moving a cursor according to a change in an appearance of a control icon with simulated three-dimensional characteristics. Such methods and interfaces may complement or replace conventional methods for moving a cursor according to a change in an appearance of a control icon with simulated three-dimensional characteristics. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a respective control icon with simulated three-dimensional characteristics and a cursor over the respective control icon; and detecting, on the touch-sensitive surface, a stationary press input that includes an increase in intensity of a contact that corresponds to the cursor. In response to detecting the stationary press input, the method further includes: changing an appearance of the respective control icon in accordance with the simulated three-dimensional characteristics of the respective control icon; and moving the cursor laterally on the display in accordance with the change in appearance of the respective control icon.

In accordance with some embodiments, an electronic device includes: a display unit configured to display a respective control icon with simulated three-dimensional characteristics and a cursor over the respective control icon; a touch-sensitive surface unit configured to receive contacts; one or more sensor units configured to detect intensity of contacts with the touch-sensitive surface unit; and a processing unit coupled to the display unit, the touch-sensitive surface unit and the one or more sensor units. The processing unit is configured to: detect, on the touch-sensitive surface unit, a stationary press input that includes an increase in intensity of a contact that corresponds to the cursor. In response to detecting the stationary press input, the processing unit is further configured to: change an appearance of the respective control icon in accordance with the simulated three-dimensional characteristics of the respective control icon; and move the cursor laterally on the display unit in accordance with the change in appearance of the respective control icon.

Thus, electronic devices with displays, touch-sensitive surfaces and one or more sensors to detect intensity of contacts with the touch-sensitive surface are provided with faster, more efficient methods and interfaces for moving a cursor according to a change in an appearance of a control icon with simulated three-dimensional characteristics, thereby increasing the effectiveness, efficiency, and user satisfaction with such devices. Such methods and interfaces may complement or replace conventional methods for moving a cursor according to a change in an appearance of a control icon with simulated three-dimensional characteristics.

There is a need for electronic devices with faster, more efficient methods and interfaces for adjusting properties of a virtual brush. Such methods and interfaces may complement or replace conventional methods for adjusting properties of a virtual brush. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface, and one or more sensors to detect intensity of contacts with the touch-sensitive surface. The method includes: displaying a brush manipulation object on the display, where the output of a virtual brush on a virtual canvas is controlled in accordance with: one or more output properties of the virtual brush and movement of the brush manipulation object on the display. The method further includes, while a focus selector is over or adjacent to the brush manipulation object, detecting an increase in intensity of a first contact on the touch-sensitive surface; and in response to detecting the increase in intensity of the first contact: adjusting a first output property of the virtual brush in accordance with the increase in intensity of the first contact, and adjusting an appearance of the brush manipulation object in accordance with the change in the first output property of the virtual brush.

In accordance with some embodiments, an electronic device includes a display unit configured to display a brush manipulation object on the display unit, where the output of a virtual brush on a virtual canvas is controlled in accordance with one or more output properties of the virtual brush and movement of the brush manipulation object on the display unit; a touch-sensitive surface unit configured to receive contacts; one or more sensors configured to detect intensity of contacts with the touch-sensitive surface unit; and a processing unit coupled to the display unit, the touch-sensitive surface unit and the one or more sensors. The processing unit is configured to: while a focus selector is over or adjacent to the brush manipulation object, detect an increase in intensity of a first contact on the touch-sensitive surface unit; and in response to detecting the increase in intensity of the first contact: adjust a first output property of the virtual brush in accordance with the increase in intensity of the first contact, and adjust an appearance of the brush manipulation object in accordance with the change in the first output property of the virtual brush.

Thus, electronic devices with displays, touch-sensitive surfaces, and one or more sensors to detect intensity of contacts with the touch-sensitive surface are provided with faster, more efficient methods and interfaces for adjusting properties of a virtual brush, thereby increasing the effectiveness, efficiency, and user satisfaction with such devices. Such methods and interfaces may complement or replace conventional methods for adjusting properties of a virtual brush.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are flow diagrams illustrating a method of managing activation of controls based on the intensity and/or duration of a contact in accordance with some embodiments.

FIGS. 12A-12C are flow diagrams illustrating a method of adjusting properties of a virtual brush in accordance with some embodiments.

DESCRIPTION OF EMBODIMENTS

Figure 1A:
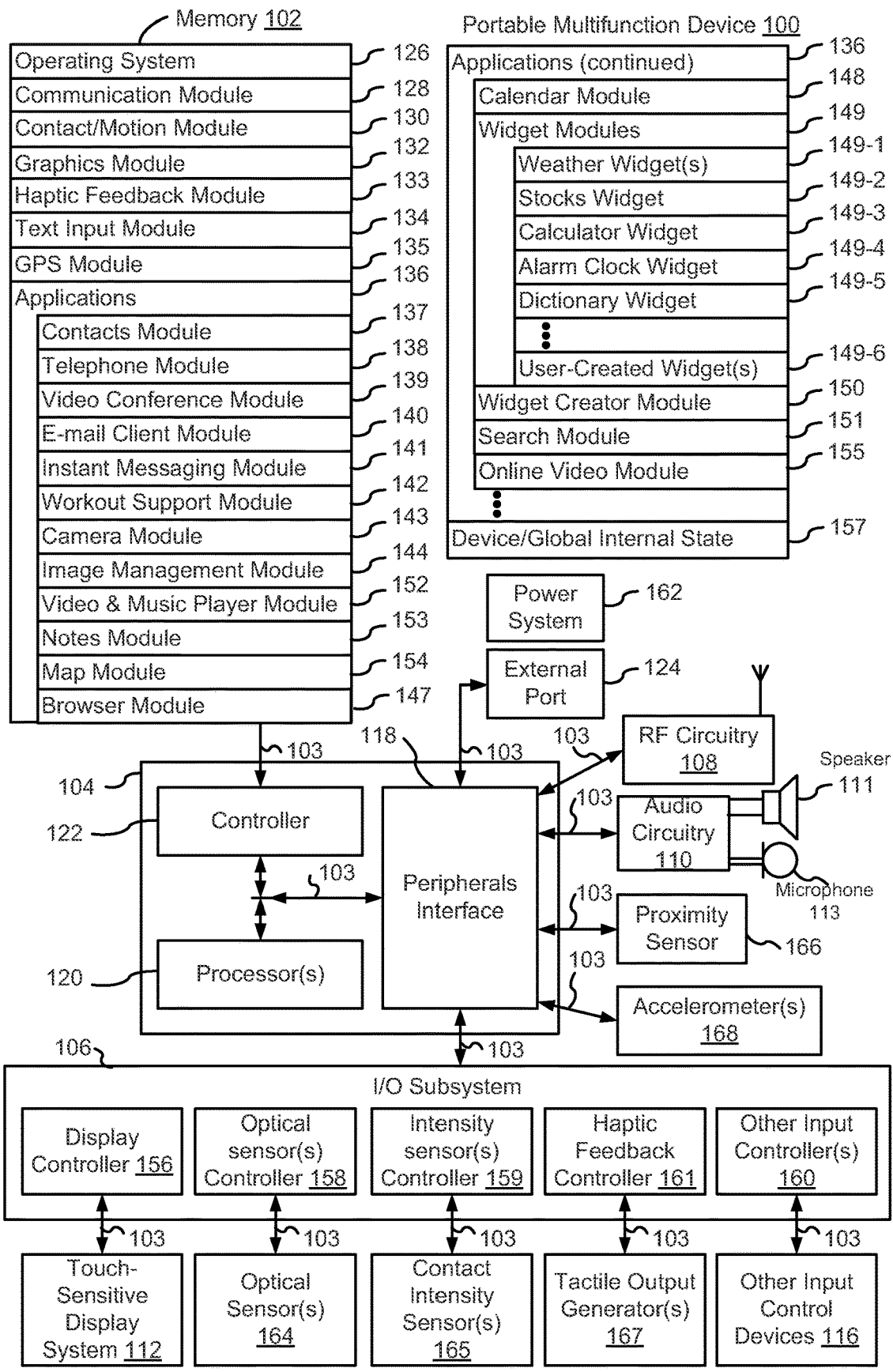
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations.

As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces with controls which, upon activation, perform various operations at the device. Some controls are linked to more important functions than other controls (e.g., a button in a user interface that allows users to permanently delete user accounts, modify security settings on files or folders, change account passwords, and the like). It would be helpful to provide a user with feedback indicating whether or not a particular control is linked to an important function, for example, by making some controls harder to activate than others. However, when different controls have different activation requirements, the user may be confused as to the requirements to activate a particular control. The embodiments described below provide a convenient and intuitive interface that provides an indication of progress toward activating a control by providing feedback to the user based on intensity of a contact. In particular, FIGS. 5A-5M illustrate exemplary user interfaces for managing activation of controls based on the intensity (e.g., pressure) and/or duration of a contact. FIGS. 6A-6D are flow diagrams illustrating a method of managing activation of controls based on the intensity (e.g., pressure) and/or duration of a contact. The user interfaces in FIGS. 5A-5M are used to illustrate the processes in FIGS. 6A-6D.

Many electronic devices display control icons (e.g., buttons) in a user interface that are responsive to a user input. A cursor is sometimes used to manipulate these controls in response to user input. However, when the input does not include a directional component, the cursor remains stationary while manipulating the controls. The embodiments provide a convenient and intuitive interface for activating controls by, in response to detecting a stationary press input on a touch-sensitive surface changing an appearance of simulated three-dimensional characteristics of a control icon (e.g., the control icon appears to move downward, or be depressed, along a simulated z-axis extending out of the plane of the display) and moving the cursor laterally on the display in accordance with the change in appearance of the control icon. In particular, FIGS. 8A-8K illustrate exemplary user interfaces for moving a cursor according to a change in an appearance of a control icon with simulated three-dimensional characteristics. FIGS. 9A-9C are flow diagrams illustrating a method of moving a cursor according to a change in an appearance of a control icon with simulated three-dimensional characteristics. The user interfaces in FIGS. 8A-8K are used to illustrate the processes in FIGS. 9A-9C.

Figure 11A:
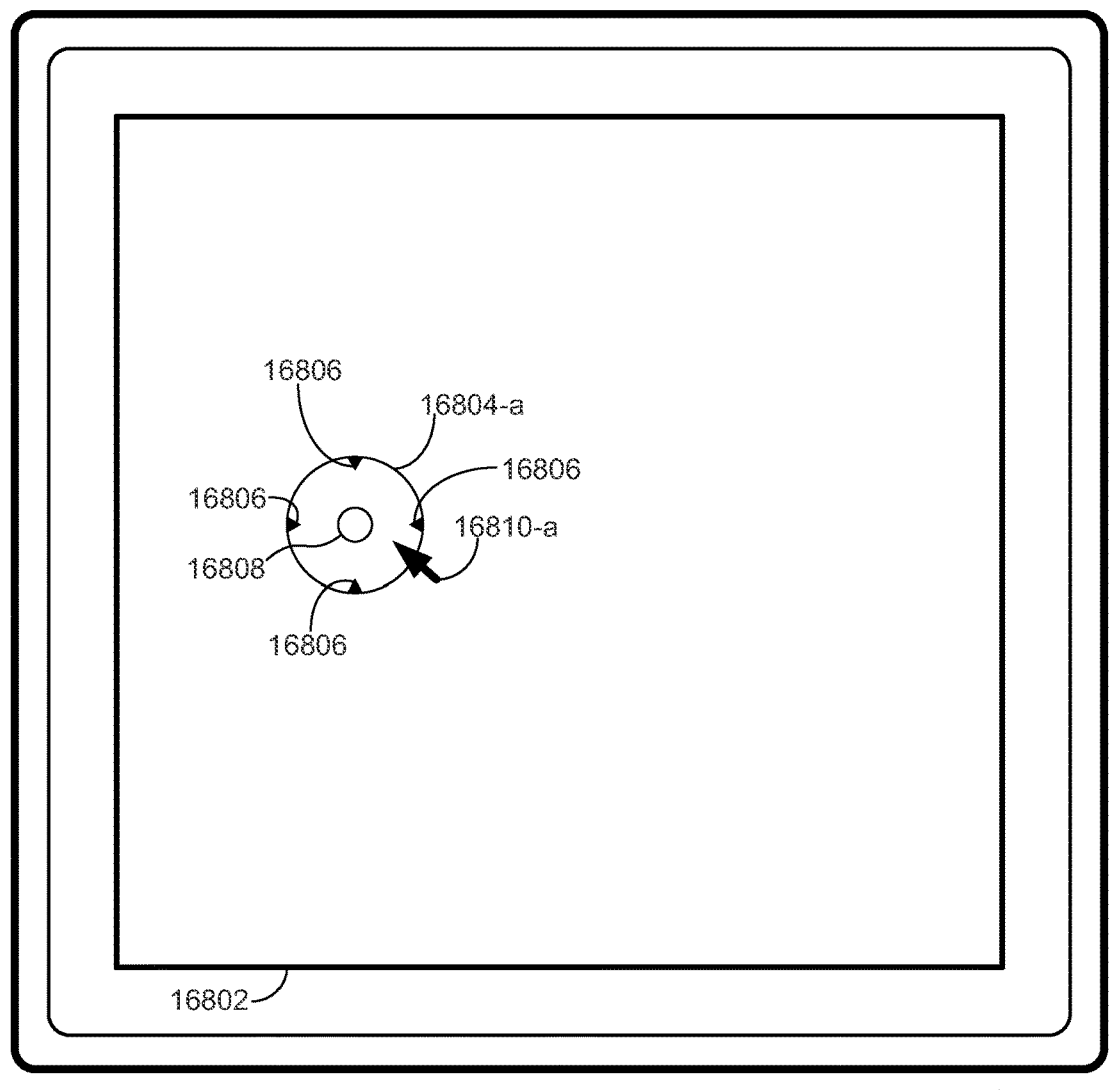
FIGS. 11A-11P illustrate exemplary user interfaces for adjusting properties of a virtual brush in accordance with some embodiments.
Figure 11A:
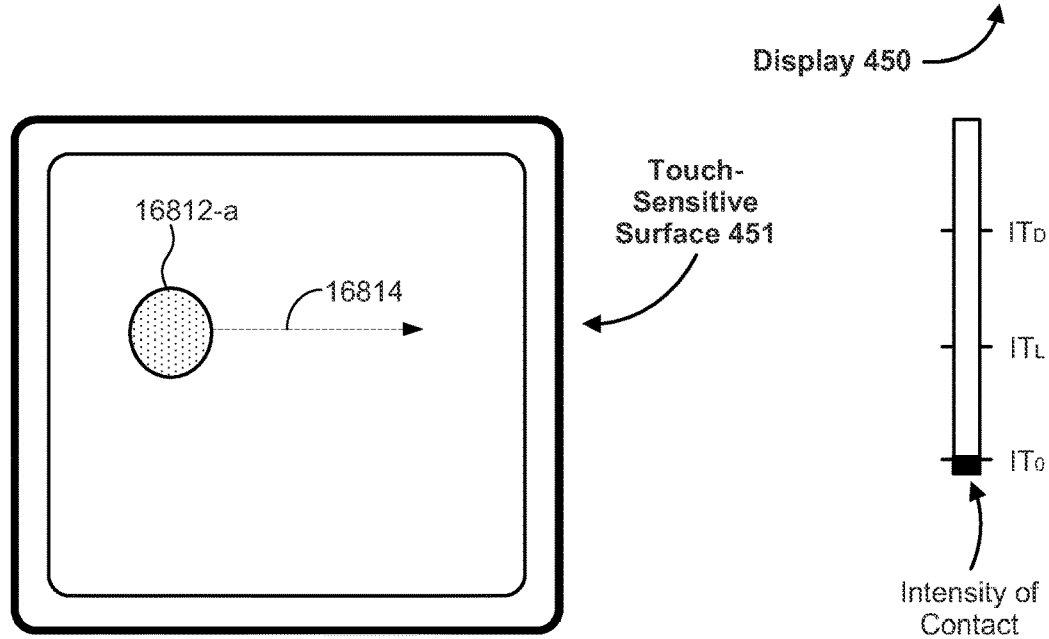
Figure 11P:
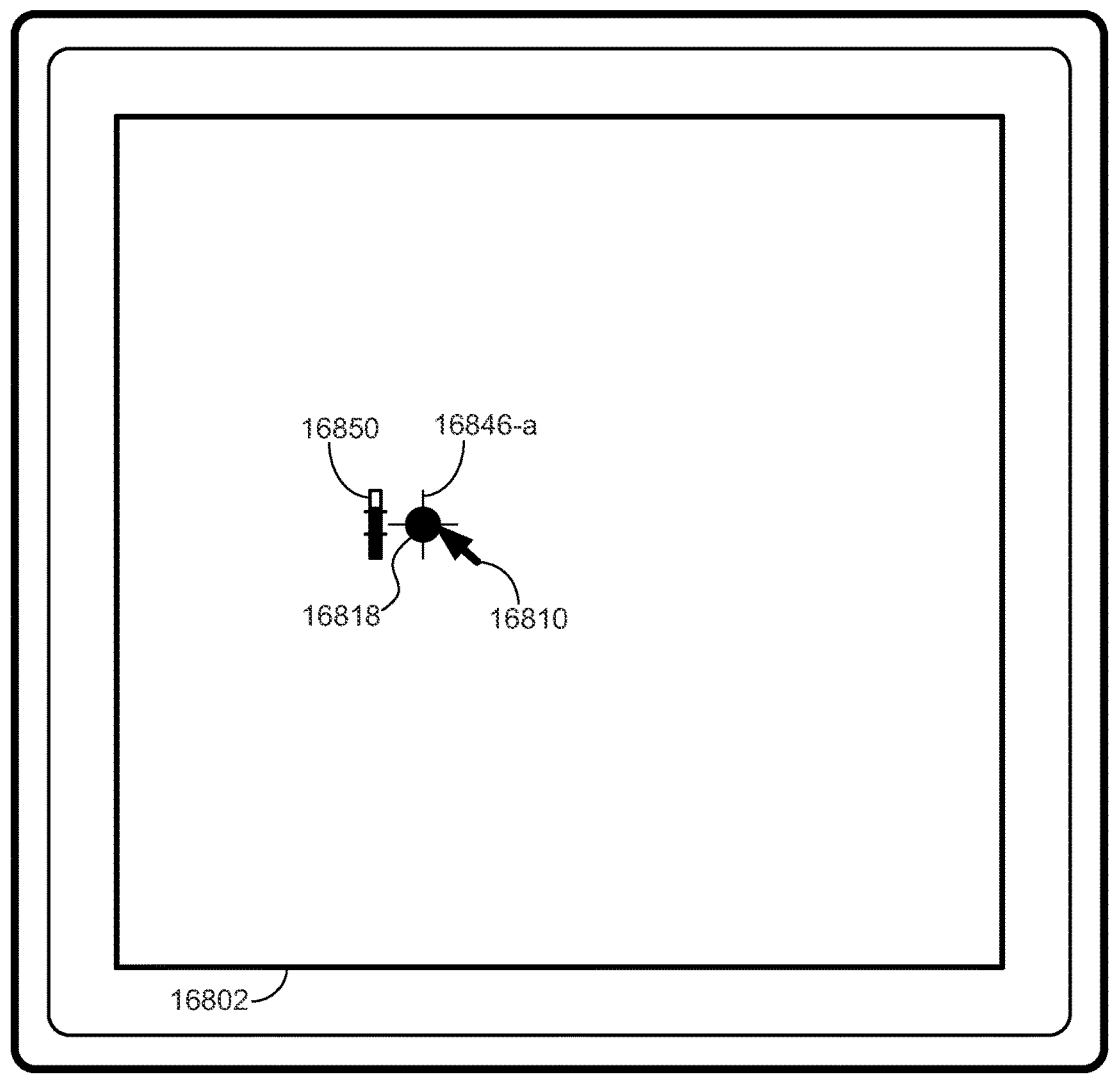
Figure 11P:
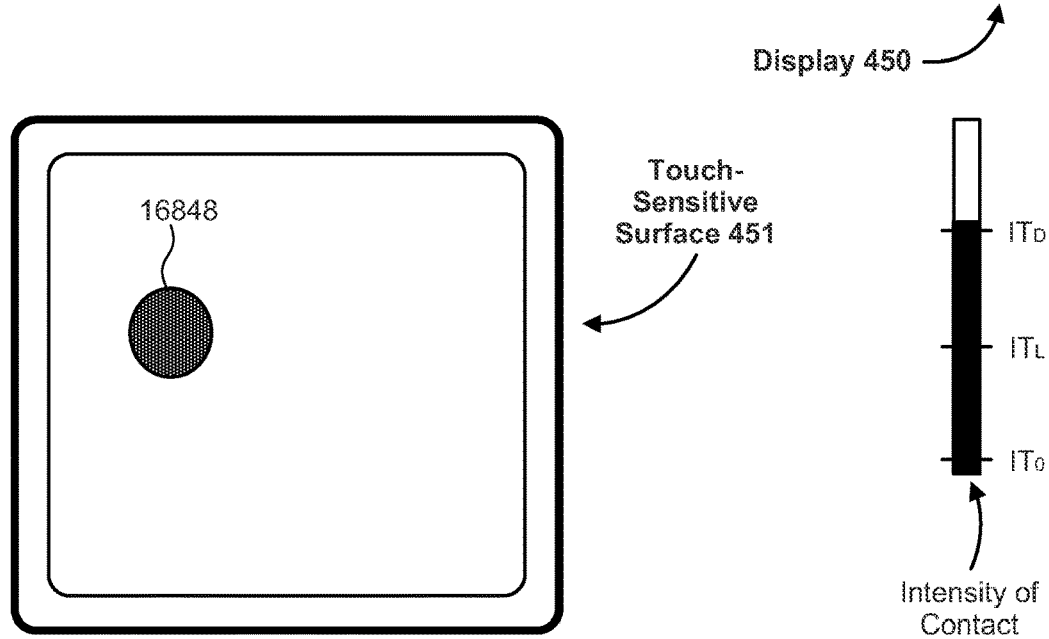
Figure 12B:
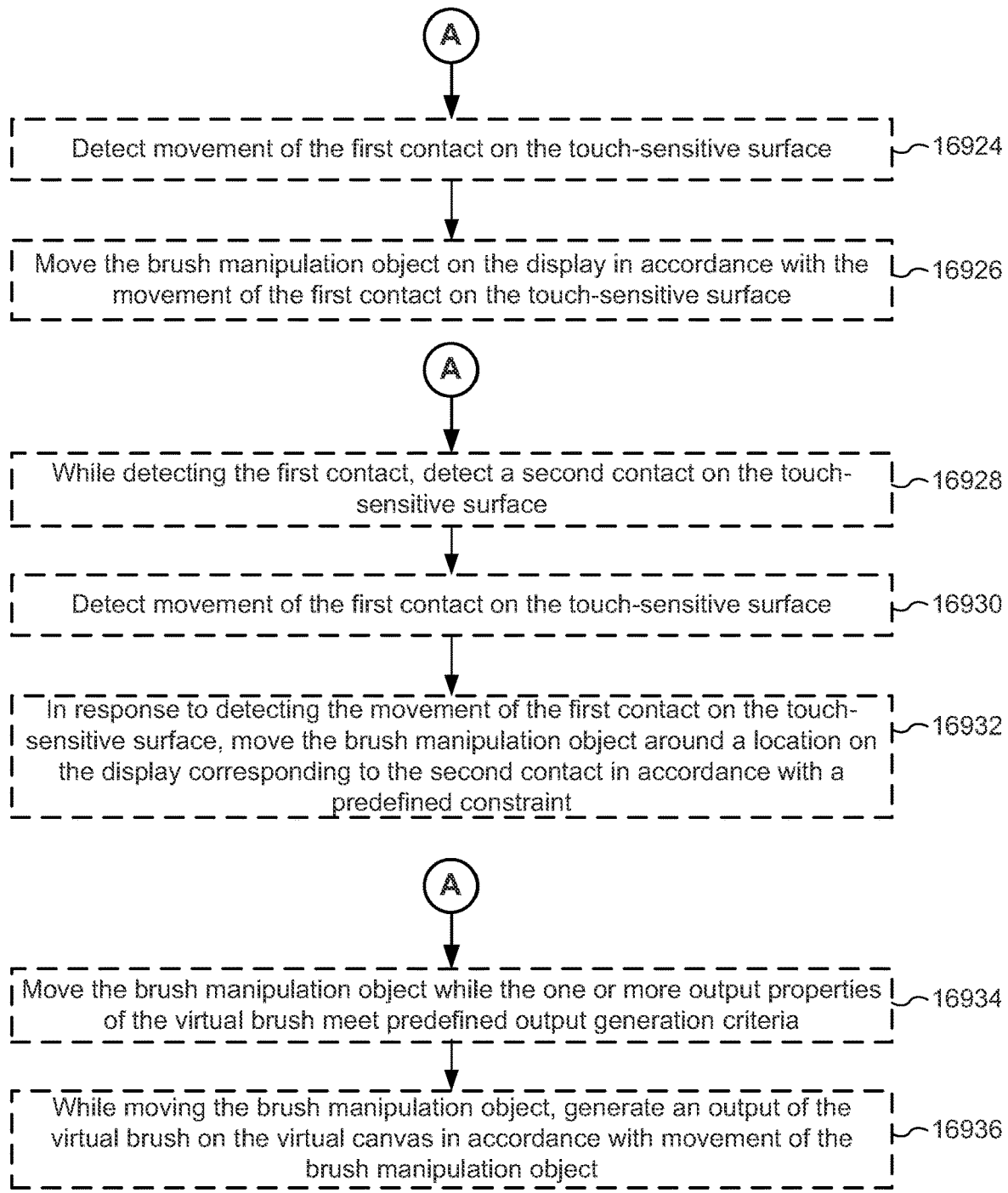
Figure 12C:
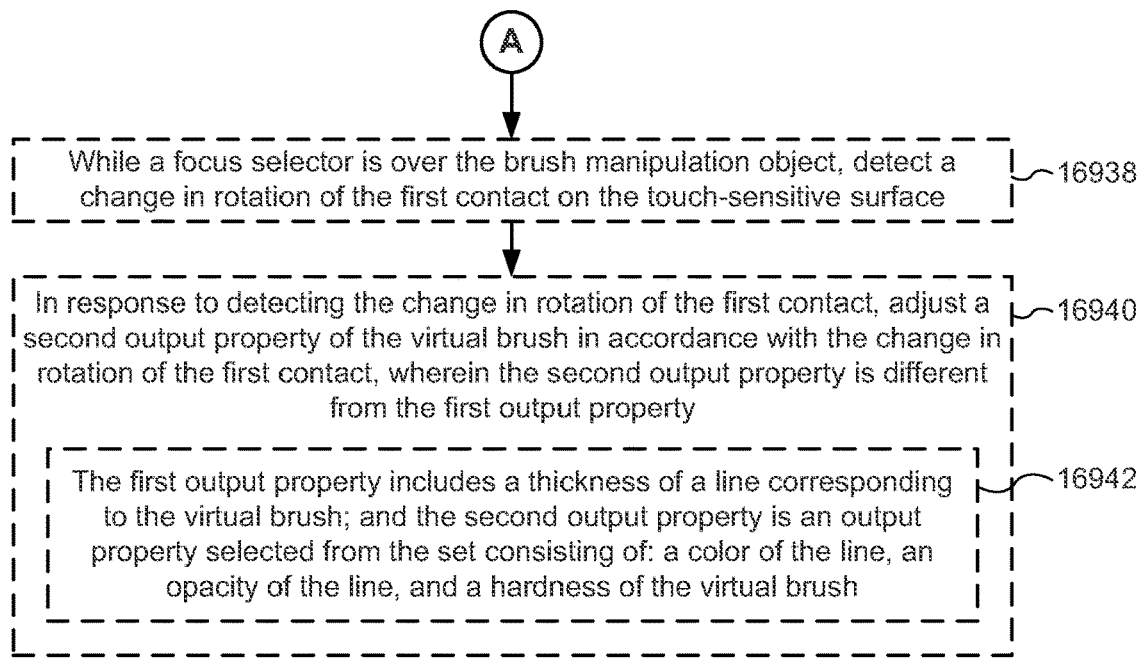

Many electronic devices include applications in which a user can draw drawings on a virtual canvas. In some situations, the user makes drawings by manipulating a user interface object that corresponds to a virtual drawing instrument (e.g., a virtual brush). The virtual drawing instrument includes one or more properties, associated with output generated from the virtual drawing instrument that are adjustable. However, adjusting these properties frequently involves navigating through a set of menus or controls that can be confusing and time consuming. The embodiments described below provide a more convenient and intuitive interface by enabling the user to adjust an output property of the virtual drawing instrument with the same contact used for manipulating the user interface object that corresponds to the virtual drawing instrument (e.g., by changing an intensity or rotating the contact while manipulating the user interface object that corresponds to the virtual drawing instrument). In particular, FIGS. 11A-11P illustrate exemplary user interfaces for adjusting properties of a virtual brush. FIGS. 12A-12C are flow diagrams illustrating a method of adjusting properties of a virtual brush. The user interfaces in FIGS. 11A-11P are used to illustrate the processes in FIGS. 12A-12C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
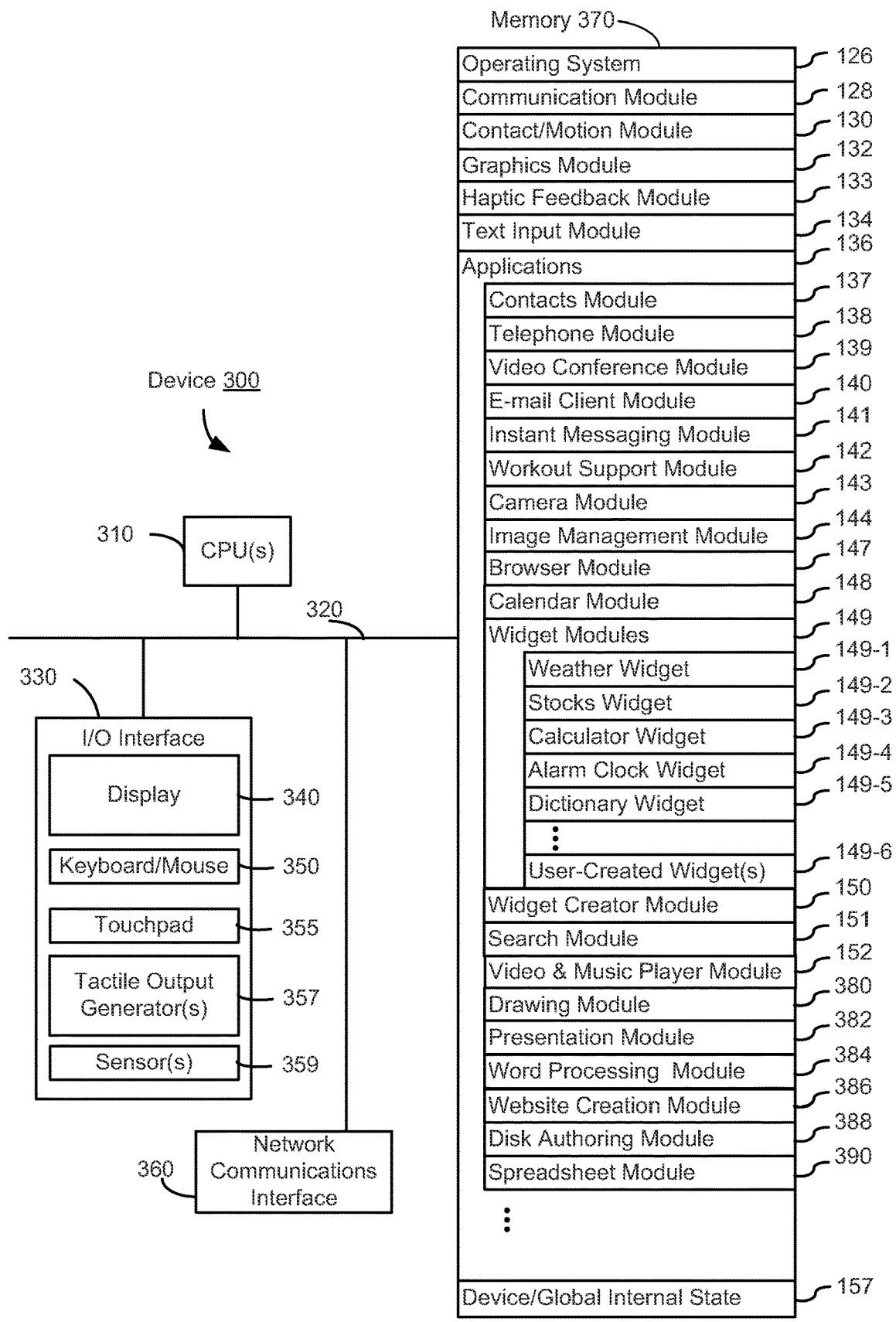
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
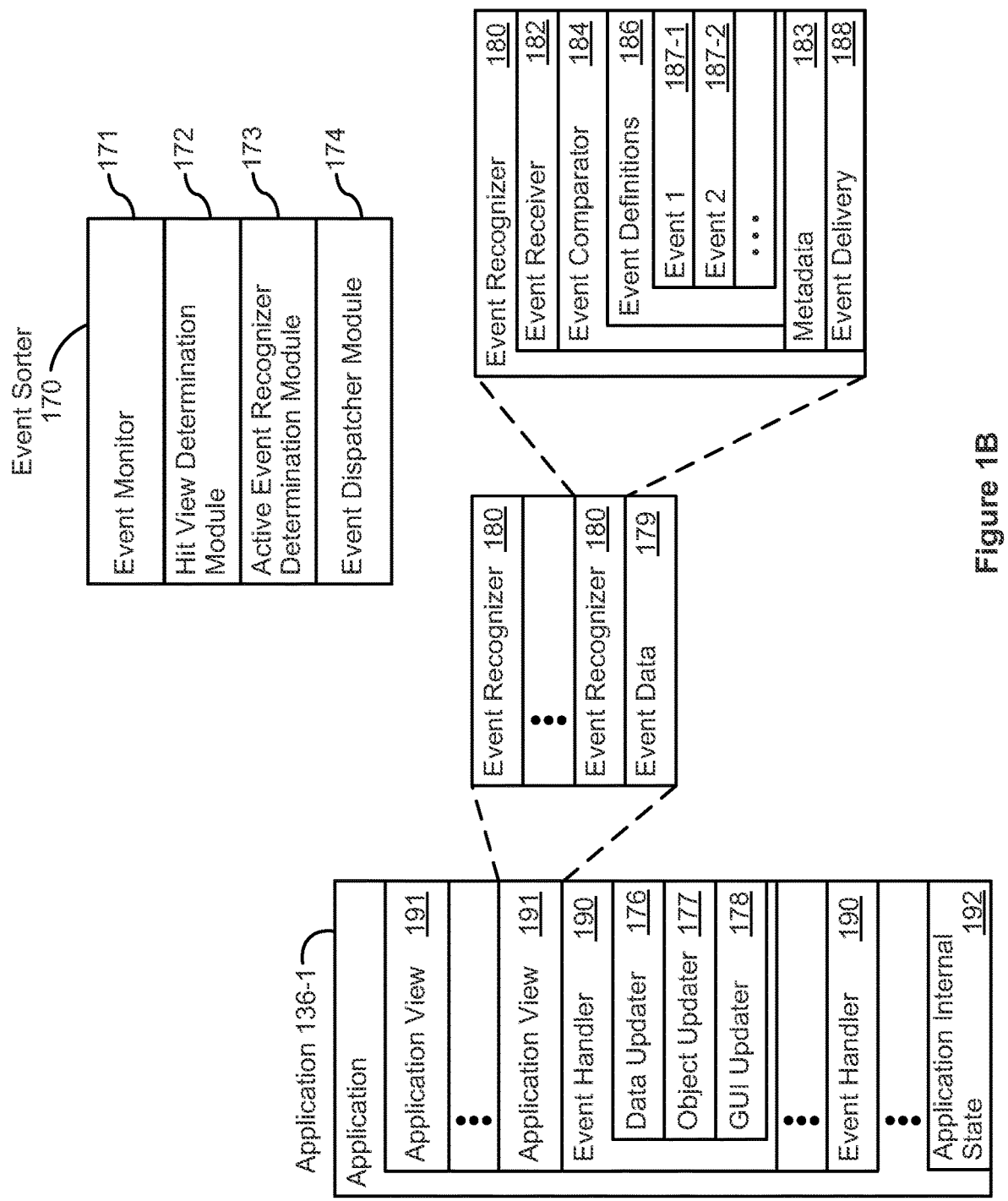
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
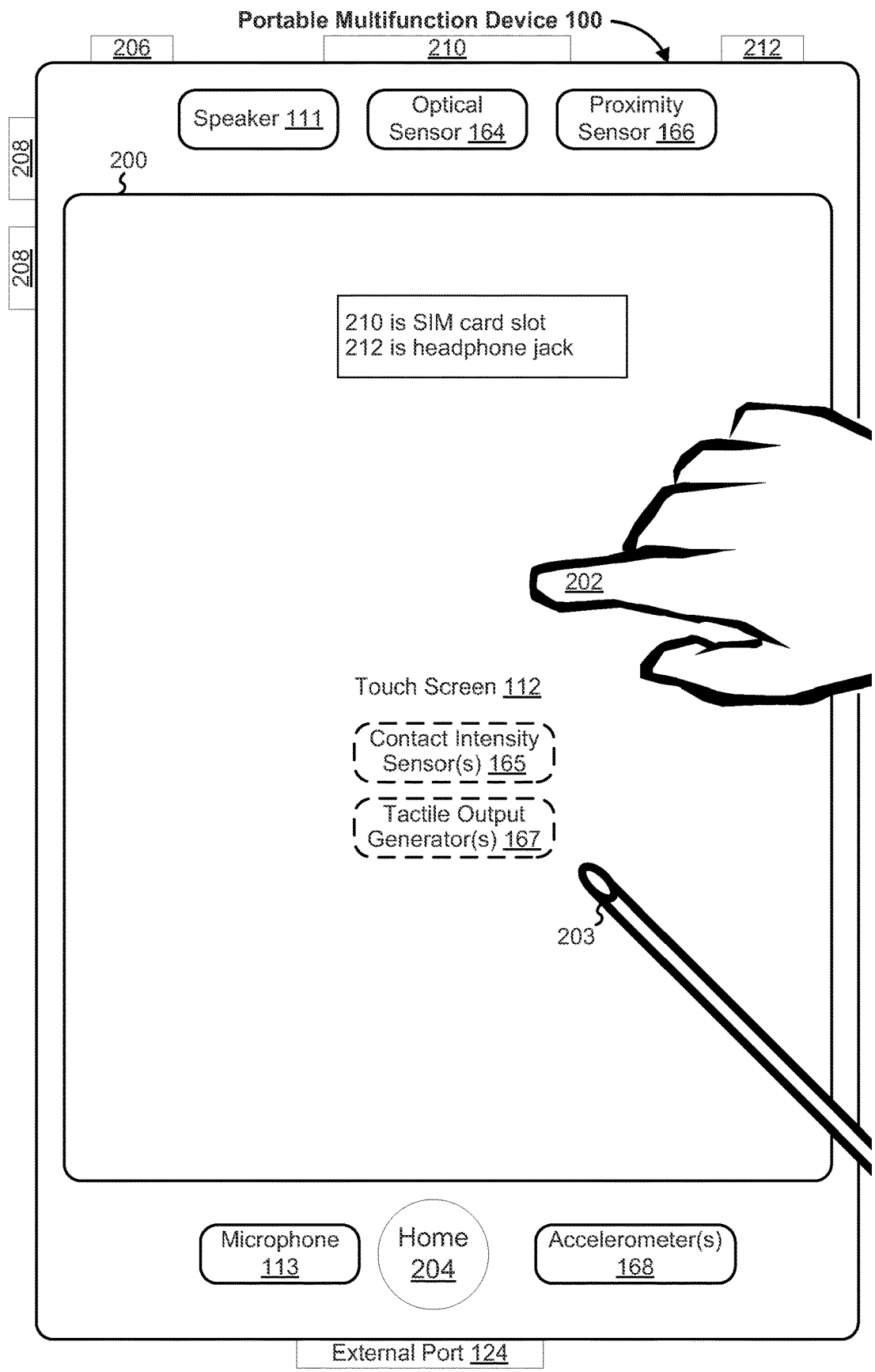
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
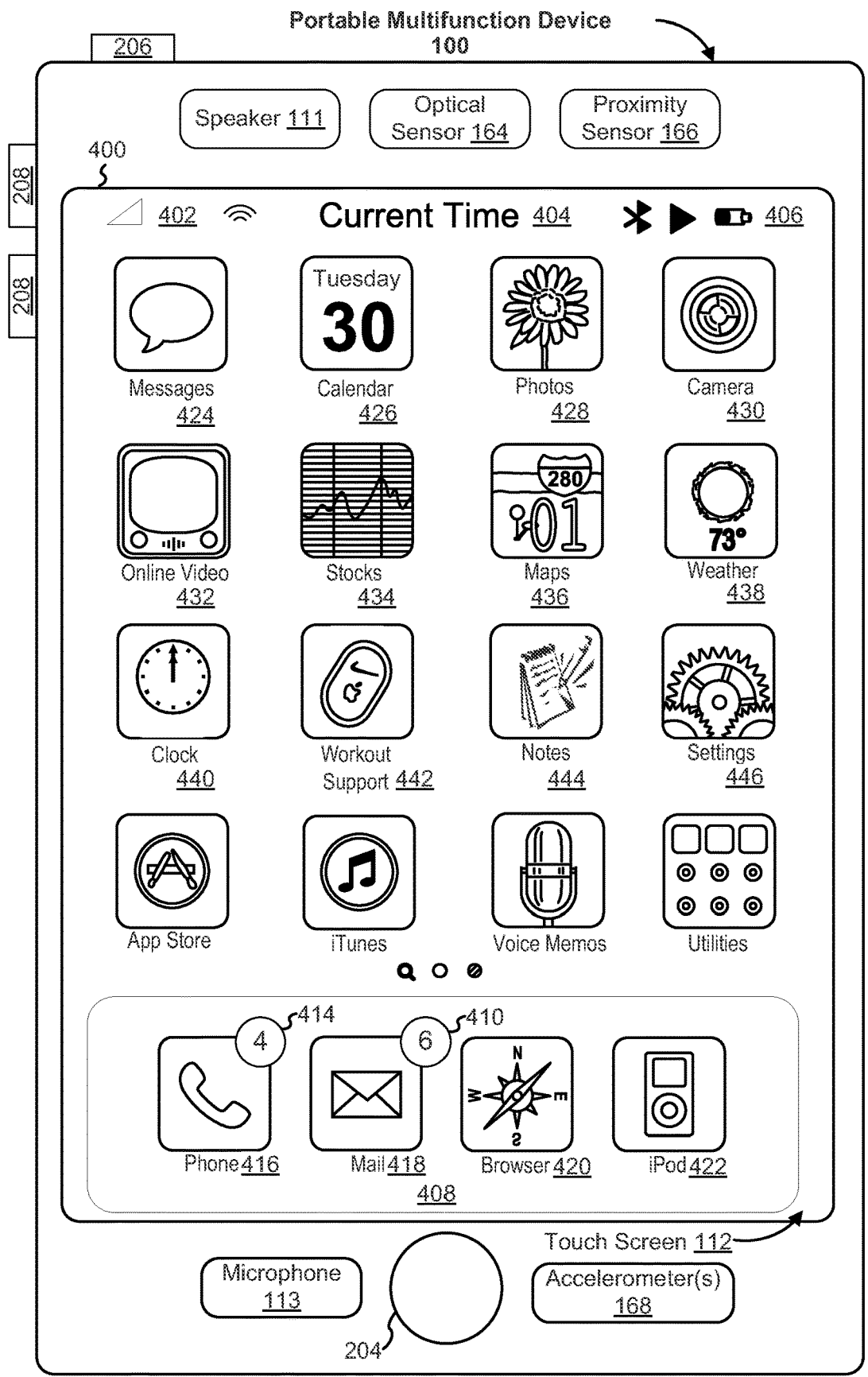
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
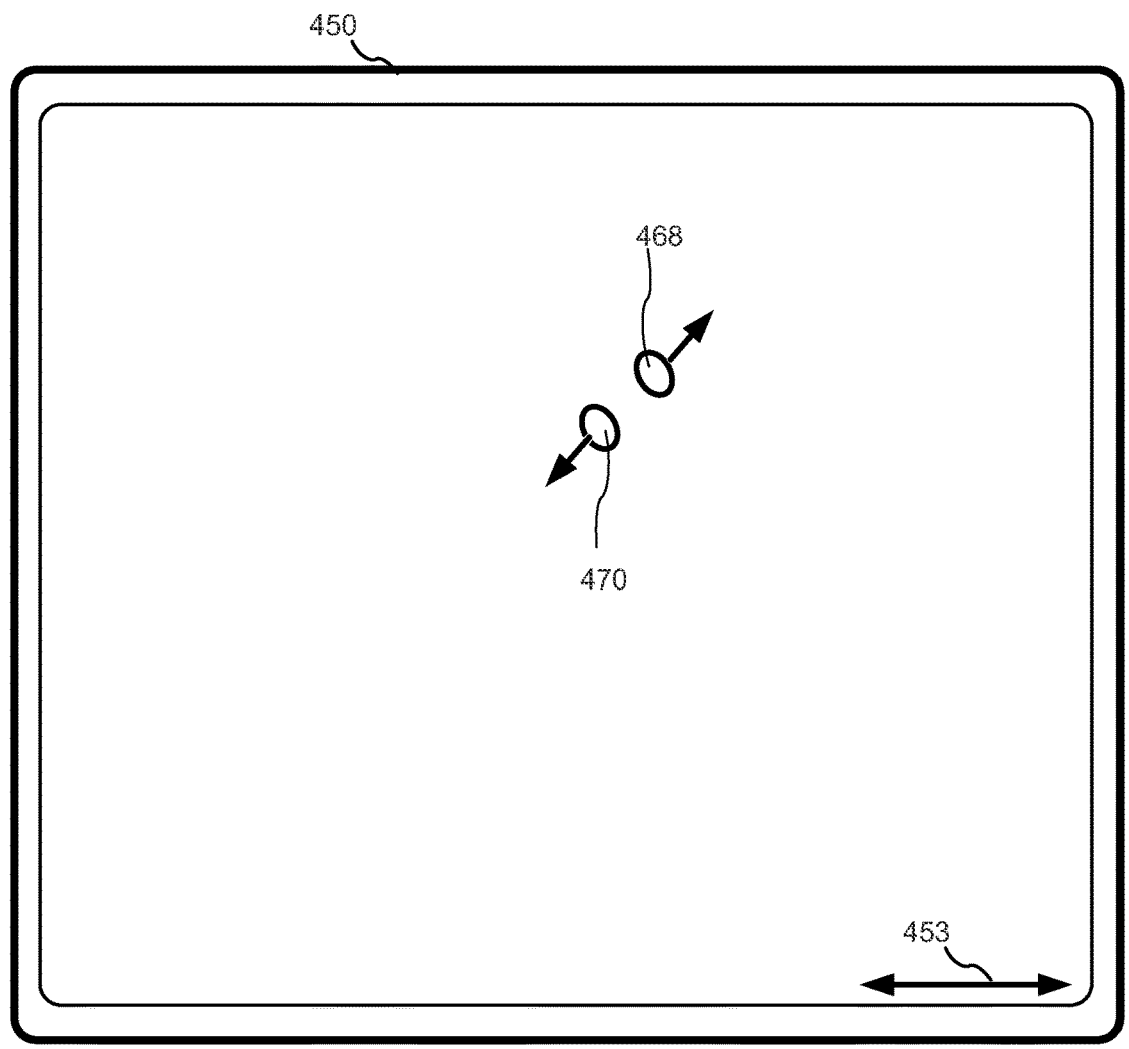
FIG. 4B illustrates an exemplary user interface for a multifunction device with a touch-sensitive surface that is separate from the display in accordance with some embodiments.
Figure 4B:
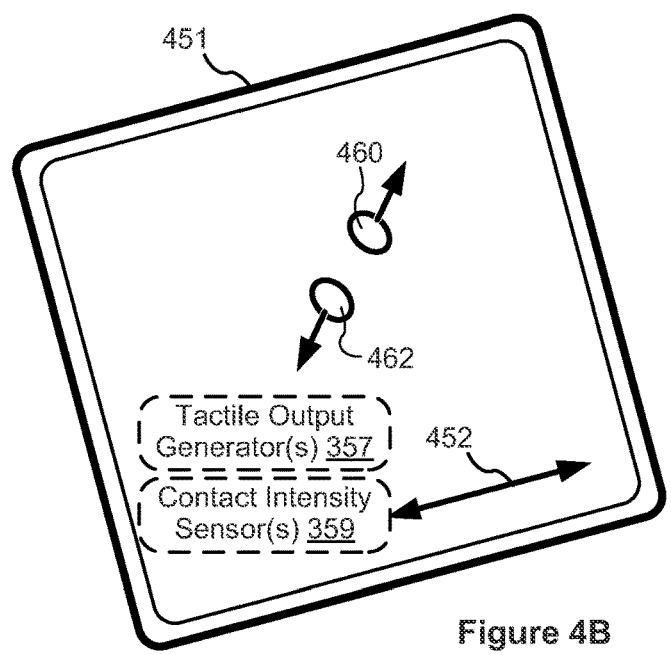

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Managing Activation of a Control Based on Contact Intensity

Many electronic devices have graphical user interfaces with controls which, upon activation, perform various operations at the device. However, some controls control more important functions than other controls and thus it would be helpful to provide users with feedback indicating whether or not the control controls an important function (e.g., buttons in a user interface that allow users to permanently delete user accounts, modify security settings on files or folders, change account passwords, and the like). For example, an electronic device can make a button or other control harder to activate by enforcing a time and/or intensity thresholds for buttons performing important options that are different from time and/or intensity thresholds for buttons for performing less important operations. In some situations, a device optionally requires a user to actively and deliberately confirm intent to delete a user account by enabling activation of an account deletion button only after the user has pressed on a touch-sensitive surface with an intensity above a predefined intensity threshold. However, these different thresholds for buttons associated with important operations may be confusing for a user, as the thresholds are different from thresholds used for other controls in the user interface. As such, in it would be advantageous to provide visual feedback to the user so as to indicate progress toward meeting the time and/or intensity thresholds for activating controls associated with important operation. However, there is a need for an additional layer of safeguard against accidental or inadvertent activation of such controls by users in a user interface, by providing adaptive, continuous, real-time, visual feedback to the user attempting to activate such controls—based on the user's input (e.g., based on an intensity or duration of the user's contact, for instance, on a touch-sensitive surface; the contact having time-varying intensity or pressure).

The disclosed embodiments provide a method, system, and user interface for managing activation of controls in a user interface (e.g., for managing activation of a button to permanently delete a user account, or to change security settings on an important file or folder, or to reset a password in a user account), by providing visual feedback to the user based on an intensity (e.g., pressure) and/or a duration of the user's contact. Such visual feedback is provided, for example, by changing the appearance of the control based on the intensity (e.g., pressure) and/or the duration of the user-contact or by displaying a visual confirmation (e.g., based on the intensity and/or the duration of the user contact) that the control will be activated upon termination of the user-contact. As a result, the disclosed embodiments help to ensure that the user does not accidentally activate such controls while providing visual feedback so that the user is informed of the additional intensity and/or time thresholds associated with activation of such controls. Such methods provide an added layer of security and safeguard to a user in order to prevent accidental or inadvertent activation of such controls by the user while providing additional feedback to the user so that the user is aware of the different intensity and/or time thresholds that are applied to the controls.

FIGS. 5A-5M illustrate exemplary user interfaces for governing or managing activation of controls on a user interface based on the intensity (e.g., pressure) and/or duration of a contact, in accordance with some embodiments. The user interfaces in these figures are used to illustrate the processes described below, including the processes in FIGS. 6A-6D. FIGS. 5A-5K include intensity diagrams that show the current intensity of the contact on the touch-sensitive surface relative to a first intensity threshold ("$IT_L$") and a second threshold ("$IT_D$"), higher than the first intensity threshold. In some embodiments, operations similar to those described below with reference to $IT_D$ are performed with reference to a different intensity threshold (e.g., "$IT_L$").

Figure 5A:
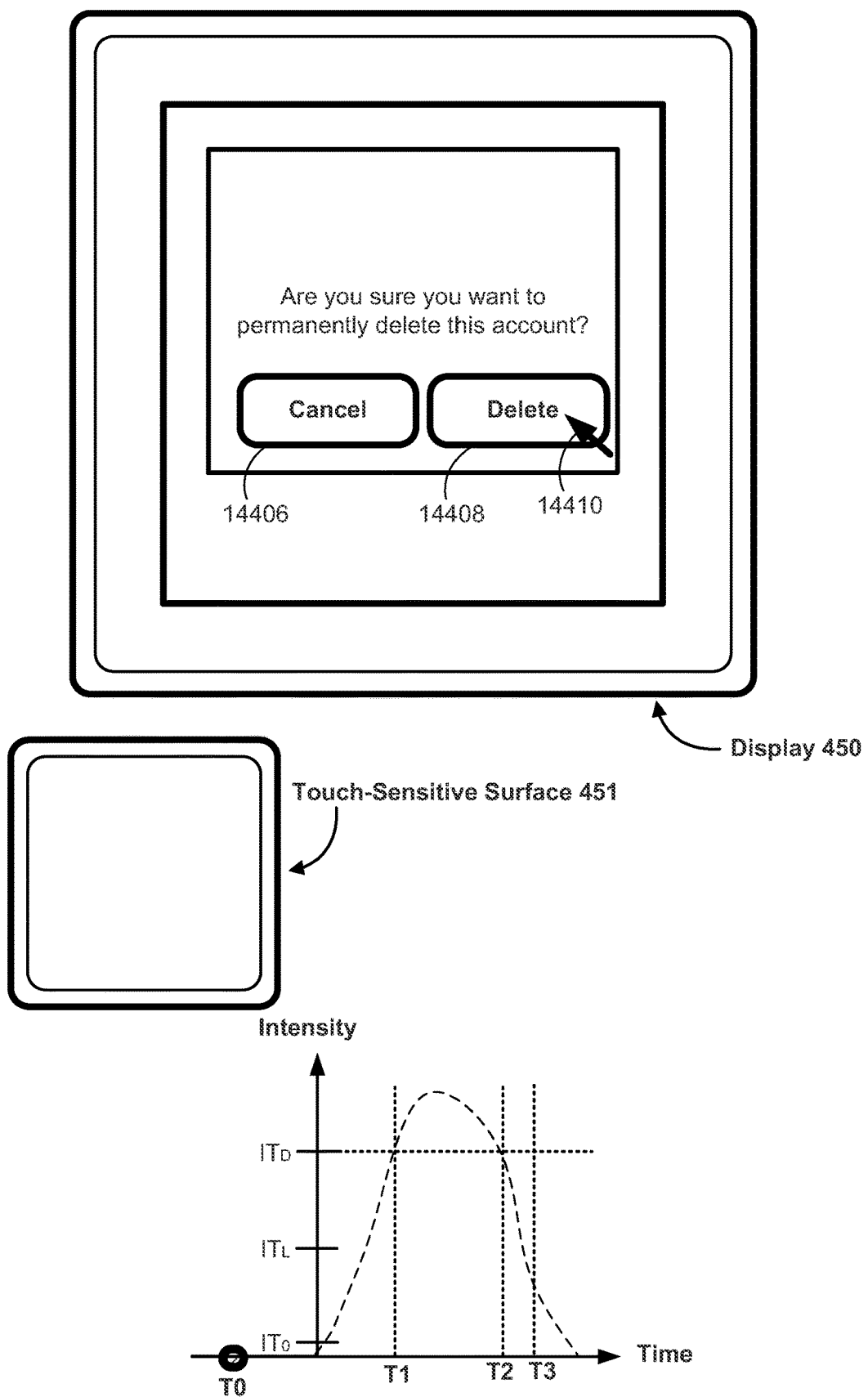
FIGS. 5A-5M illustrate exemplary user interfaces for managing activation of controls based on the intensity and/or duration of a contact in accordance with some embodiments.

FIG. 5A illustrates a user interface (e.g., a dialog box requesting a user for affirmation of user intent prior to performing a user-initiated action, such as a user-initiated request for an irreversible deletion of a file, a user account, or the like), with one or more controls (e.g., control buttons, such as control 14406 and control 14408), that is displayed on display 450.

Figure 5B:
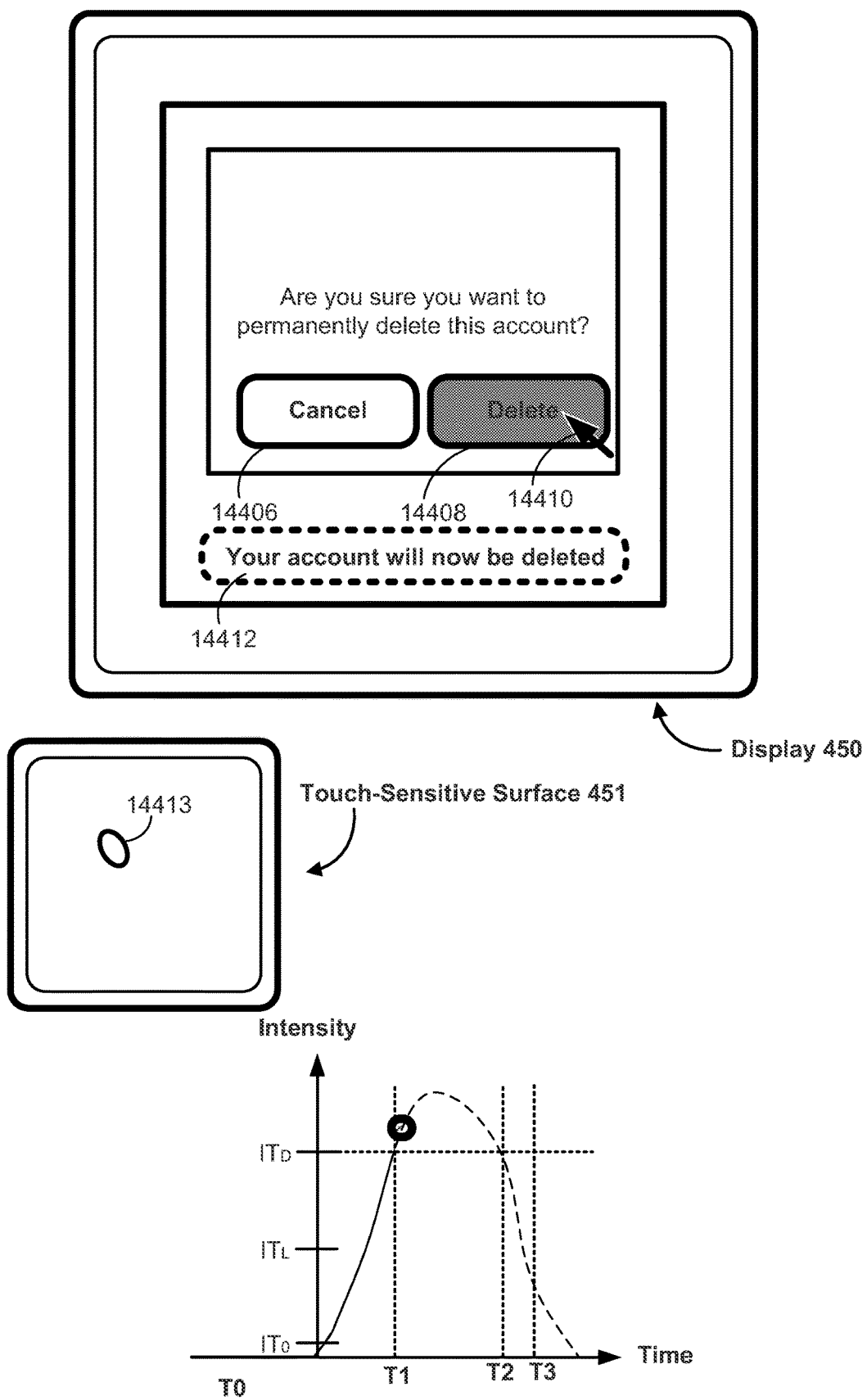
Figure 5C:
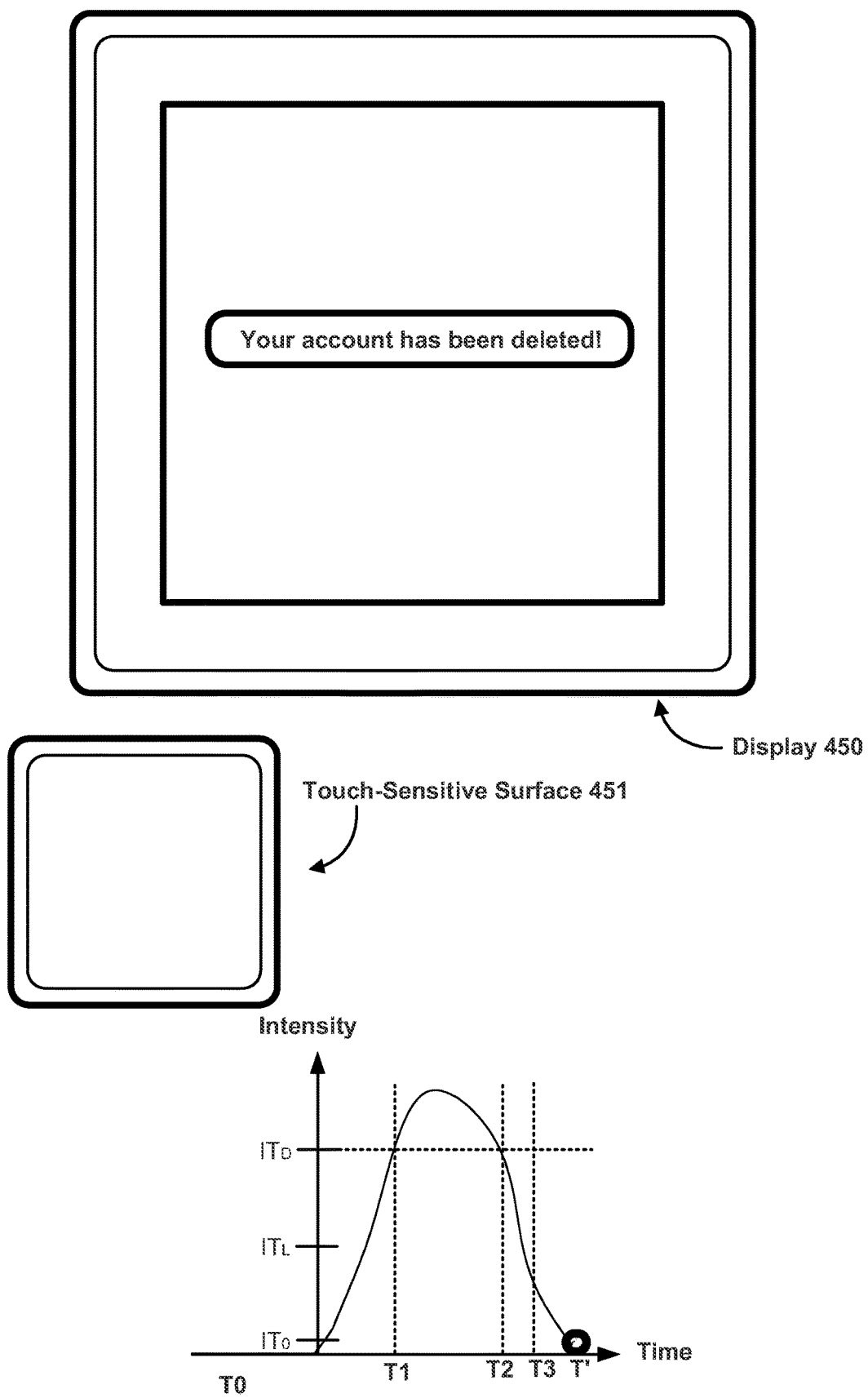

FIGS. 5A-5C illustrate providing the user a confirmation that a respective control (e.g., control 14408, FIG. 5A) will be activated—e.g., a user account will be irreversibly deleted—in response to a gesture (e.g., upon termination of the gesture), if the gesture includes a contact that meets predefined contact intensity criteria (e.g., if the contact has an intensity above a contact intensity threshold). FIGS. 5A-5C also illustrate optionally activating the respective control (e.g., control 14408, FIG. 5A)—for example, deleting the user account—upon termination of the gesture if the gesture includes a contact that meets predefined contact intensity criteria (e.g., if the contact has an intensity above a contact intensity threshold, such as $IT_D$).

In FIG. 5A, at time T0, no contact is present or detected on touch-sensitive surface 451. A focus selector 14410 is at a location on display 450 corresponding to a respective control (e.g., control 14408, FIG. 5A). In FIG. 5B, at time T1, a contact or a gesture that includes a contact (e.g., contact 14413 in FIG. 5B) is detected on the touch-sensitive surface 451. As shown in FIG. 5B, while focus selector 14410 is at the location on display 450 corresponding to the respective control (e.g., control 14408, FIG. 5B), the contact (e.g., contact 14413 on the touch-sensitive surface 451) meets predefined contact intensity criteria. In the example shown in FIG. 5B, the predefined contact intensity criteria include a contact intensity threshold, such that if an intensity of contact 14413 exceeds the contact intensity threshold, then contact 14413 meets the predefined contact intensity criteria. In some embodiments, the predefined contact intensity criteria include a contact intensity threshold and a respective delay time period. In the example shown in FIG. 5B, in such embodiments, if an intensity of contact 14413 exceeds the contact intensity threshold (e.g., "$IT_D$") for at least a delay time $T_{delay}$=T2−T1, then contact 14413 meets the predefined contact intensity criteria. As another example, referring to FIG. 5B, when the predefined contact intensity criteria include a contact intensity threshold and a respective delay time period, the respective delay time period is a predefined time period (e.g., $T_{delay}$=T3−T1) since (e.g., after) the respective contact intensity threshold is met (e.g., time period starting at time T1, FIG. 5B) in which contact 14413 must continue to be detected, even if the contact intensity is not maintained at or above the respective contact intensity threshold (e.g., "$IT_D$").

Continuing along the example illustrated in FIG. 5B, since contact 14413 meets the predefined contact intensity criteria (e.g., an intensity of contact 14413 exceeds the contact intensity threshold), a confirmation is provided to the user indicating that control 14408 will be activated upon detecting the end of the gesture (e.g., upon detecting finger lift-off). In the example shown in FIG. 5B, the confirmation is optionally shown as control 14408 completely filling up with a different color compared to a color of control 14408 prior to time T1 (e.g., prior to contact 14413 meeting the predefined contact intensity criteria, as shown in FIG. 5A). Alternatively, or in addition, as shown in FIG. 5B, the confirmation is provided to the user as verbal or textual confirmation 14412 indicating that control 14408 will be activated (e.g., the user account will be deleted) upon termination of the gesture.

In FIG. 5C, at time T' subsequent to time T1, upon detecting termination of the gesture or termination of contact 14413 (e.g., upon detecting finger lift-off), control 14408 (FIG. 5B) is activated (e.g., the user account is deleted).

If, on the other hand, the gesture does not include a contact that meets the predefined contact intensity criteria (for example, if contact 14413 does not have an intensity above the contact intensity threshold), then the control (e.g., control 14408) is not activated in response to the gesture (e.g., in response to detecting termination of the gesture). Consequently, the user is not provided with a confirmation that the control will be activated in response to the gesture (e.g., upon termination of the gesture). Instead, in some embodiments, if the gesture does not include a contact 14413 that meets the predefined contact intensity criteria, the user would continue to view the user interface shown in FIGS. 5A-5B unless the user chooses to cancel the deletion of the user account by activating control 14406. In some embodiments, the user chooses to cancel the deletion of the user account by activating control by placing focus selector 14410 over "Cancel" button 14406 and increasing the intensity of contact 14413 above a lower contact intensity threshold (e.g., "$IT_L$") than the contact intensity threshold (e.g., "$IT_D$") at which "Delete" button 14408 is activated and then lifting the contact off of the touch-sensitive surface.

Thus, in some embodiments, the device determines if the gesture includes a contact that meets contact intensity criteria (e.g., if the intensity of the contact is above or greater than an intensity threshold) while the focus selector is at a location corresponding to a control on the display. If the contact meets the contact intensity criteria, the device provides the user with a confirmation that the contact will be activated upon detecting the end of the gesture. As a result, the user has the improved convenience of receiving real-time confirmation of user-intent (e.g., to activate the control) based on the user input (e.g., based on intensity and/or duration of user-contact). This additional confirmation provides the user a safeguard against accidental and inadvertent activation of the control by the user.

FIGS. 5D-5H illustrate detecting a user gesture, corresponding to a control (e.g., control 14408), on a touch-sensitive surface 451; the gesture including a contact (e.g., having time-varying intensity or pressure detected by the touch-sensitive surface or sensors associated with the touch-sensitive surface). FIGS. 5D-5H further illustrate providing the user a visual indication or feedback of progress toward the contact meeting predefined contact intensity criteria (e.g., providing a visual indication that the time-varying intensity of the contact is approaching or increasing toward meeting a predefined contact intensity threshold, for instance as the user pushes down harder on the touch-sensitive surface). FIGS. 5D-5H additionally illustrate providing a confirmation to the user that the control (e.g., control 14408, FIG. 5D) will be activated—e.g., a user account will be irreversibly deleted—in response to the gesture (e.g., upon termination of the gesture) if the contact meets the predefined contact intensity criteria. FIGS. 5D-5H illustrate subsequently activating the control (e.g., control 14408)—for example, deleting the user account—upon termination of the gesture if the contact meets predefined contact intensity criteria.

Figure 5D:
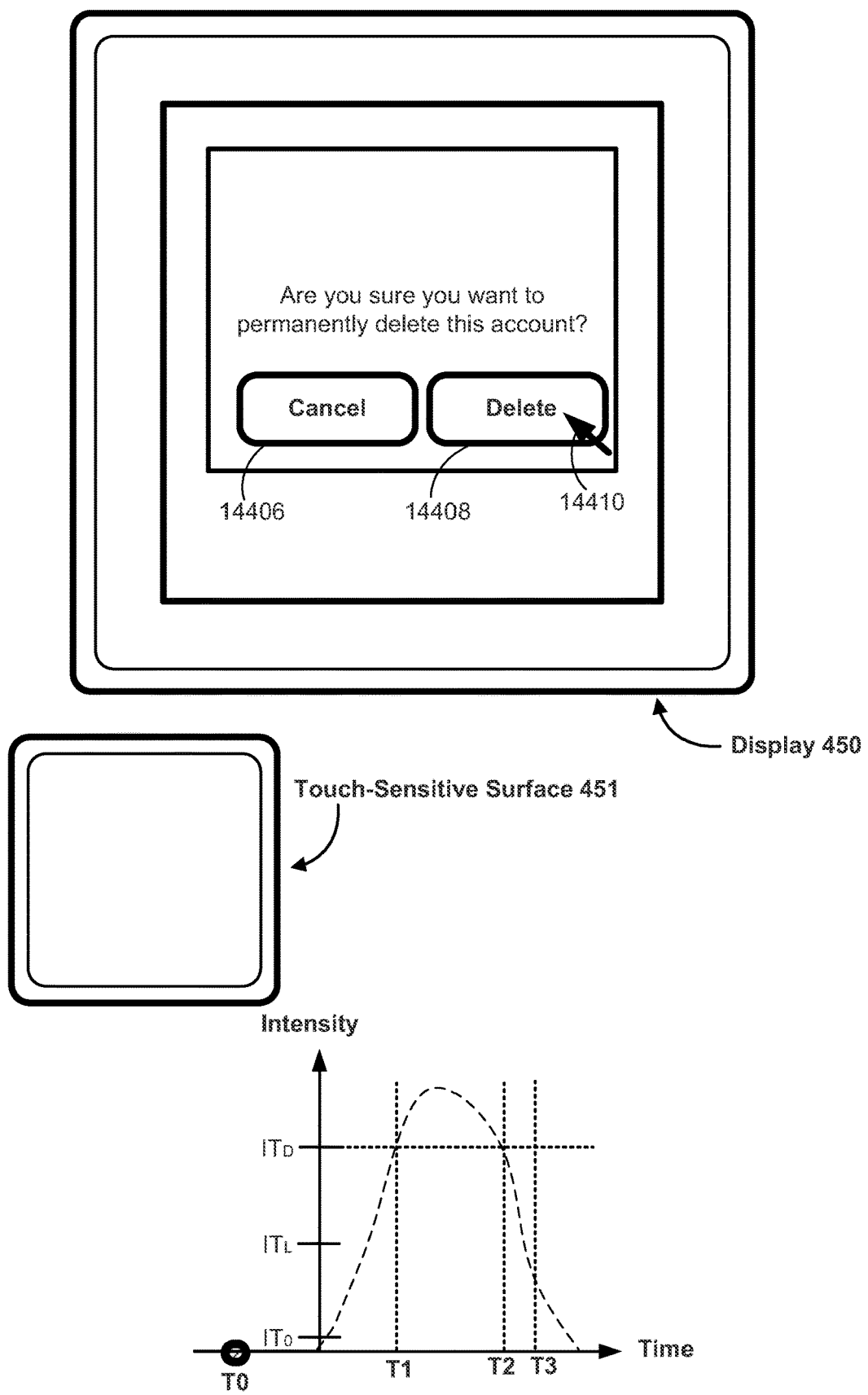
Figure 5E:
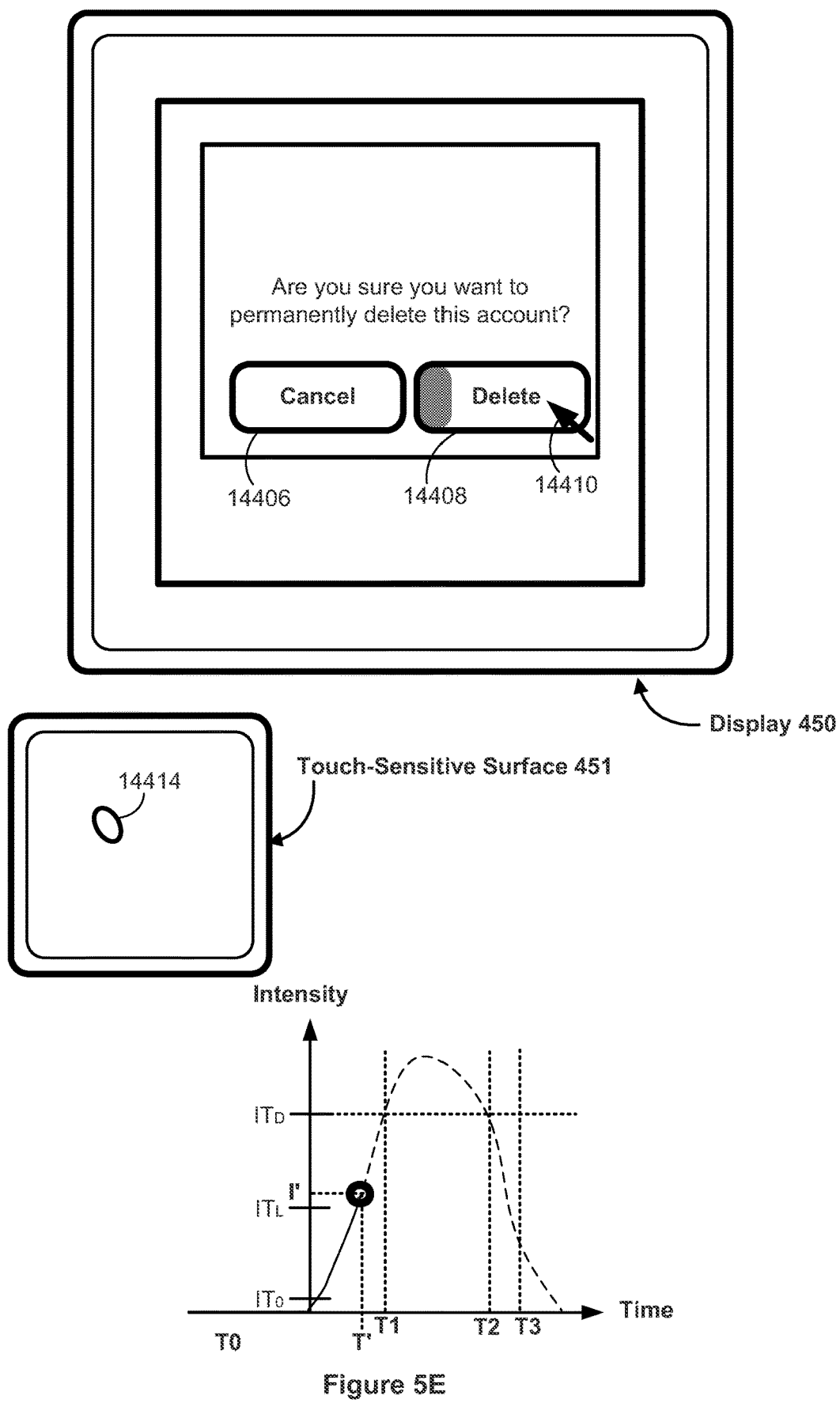

In FIG. 5D, at time T0, no contact is present or detected on touch-sensitive surface 451. A focus selector 14410 is at a location on display 450 corresponding to a respective control (e.g., control 14408, FIG. 5D). In FIG. 5E, at time T', a contact or a gesture that includes a contact (e.g., contact 14414 in FIG. 5E) is detected on touch-sensitive surface 451. As shown in FIG. 5E, at time T', while focus selector 14410 is still at the location on display 450 corresponding to the respective control (e.g., control 14408, FIG. 5E), contact 14414 has an intensity I', lower than the contact intensity threshold (e.g., "$IT_D$") and, optionally above a different button activation intensity threshold (e.g., "$IT_L$"). In response to detecting a user contact of intensity I' (lower than the contact intensity threshold), the user is provided a visual indication of progress toward contact 14414 meeting the predefined contact intensity criteria. For example, as shown in FIG. 5E, control 14408 changes appearance (compared to its appearance in FIG. 5D), for instance as a progress bar is displayed in control 14408. As another example, control 14408 changes appearance by displaying an indication of a difference (e.g., corresponding to a portion of control 14408 that is not filled in with gray) between a current intensity of contact 14414 (e.g., corresponding to the grayed or filled out portion of control 14408) on touch-sensitive surface 451 and the contact intensity threshold.

Figure 5F:
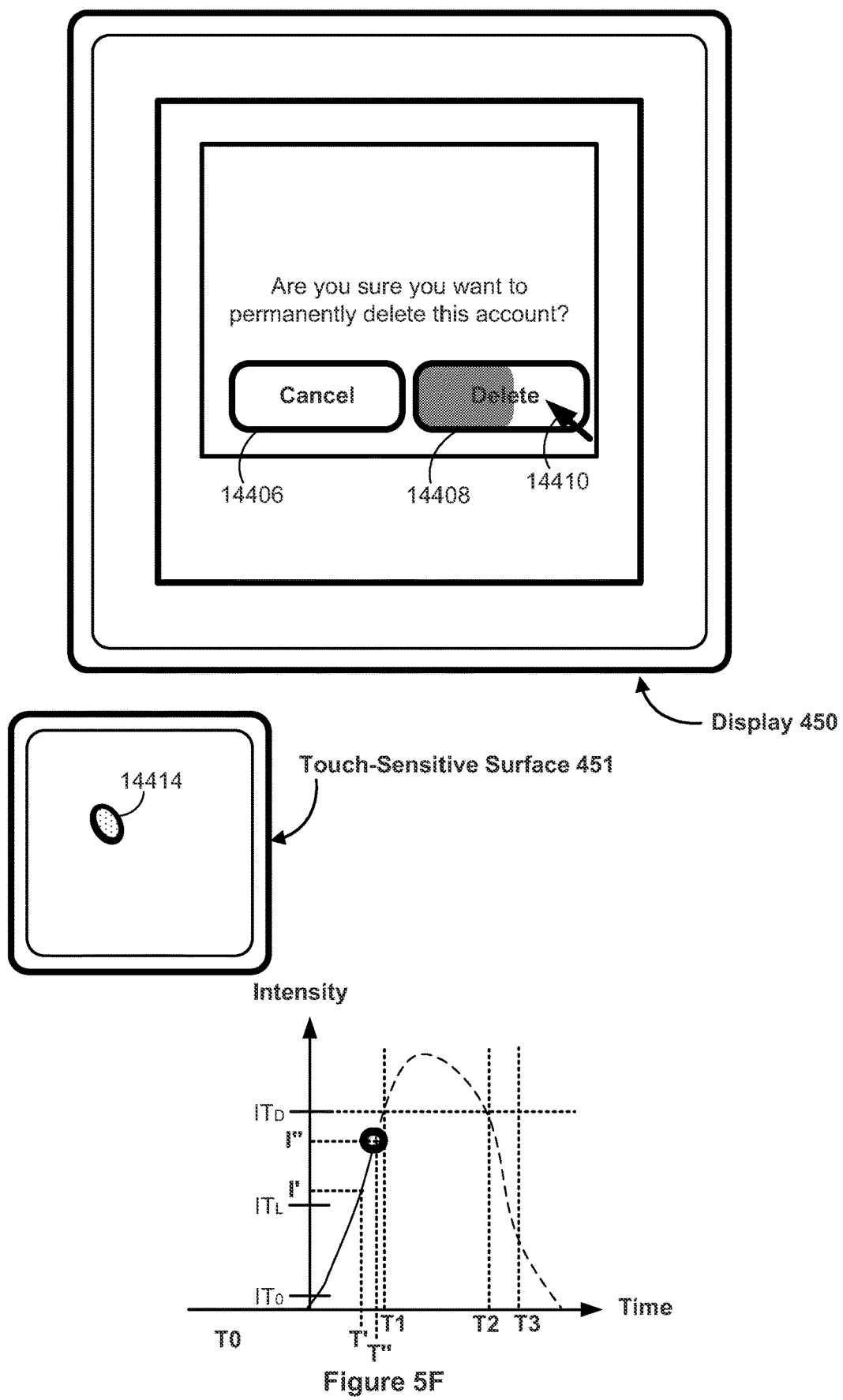

Similarly, as shown in FIG. 5F, at time T", while focus selector 14410 is still at the location on display 450 corresponding to the respective control (e.g., control 14408, FIG. 5F), contact 14414 has an intensity I", lower than the contact intensity threshold (e.g., "$IT_D$"). In response to detecting an intensity I" of contact 14414 (lower than the contact intensity threshold, but greater than the intensity I' of contact 14414 at time T' shown in FIG. 5E), the user is provided a visual indication of progress toward contact 14414 meeting or approaching the predefined contact intensity criteria. As shown in FIG. 5F, control 14408 further changes appearance (compared to its appearance in FIG. 5D and subsequently in FIG. 5E), for example as the progress bar displayed in control 14408 increases in size (relative to FIG. 5E) in response to the increased intensity of contact 14414 (again, relative to FIG. 5E) toward the contact intensity threshold. As another example, control 14408 further changes appearance by displaying an indication of the difference (e.g., corresponding to a portion of control 14408 that is not filled in with gray) between the current intensity (I″) of contact 14414 (e.g., corresponding to the grayed or filled out portion of control 14408) on touch-sensitive surface 451 and the contact intensity threshold. In some embodiments intensity I″ is above a different button activation intensity threshold (e.g., "$IT_L$") for activating "Cancel" button 14406 (e.g., if the focus selector were over "Cancel" button 14406 in FIG. 5F, "Cancel" button would have been activated).

Figure 5G:
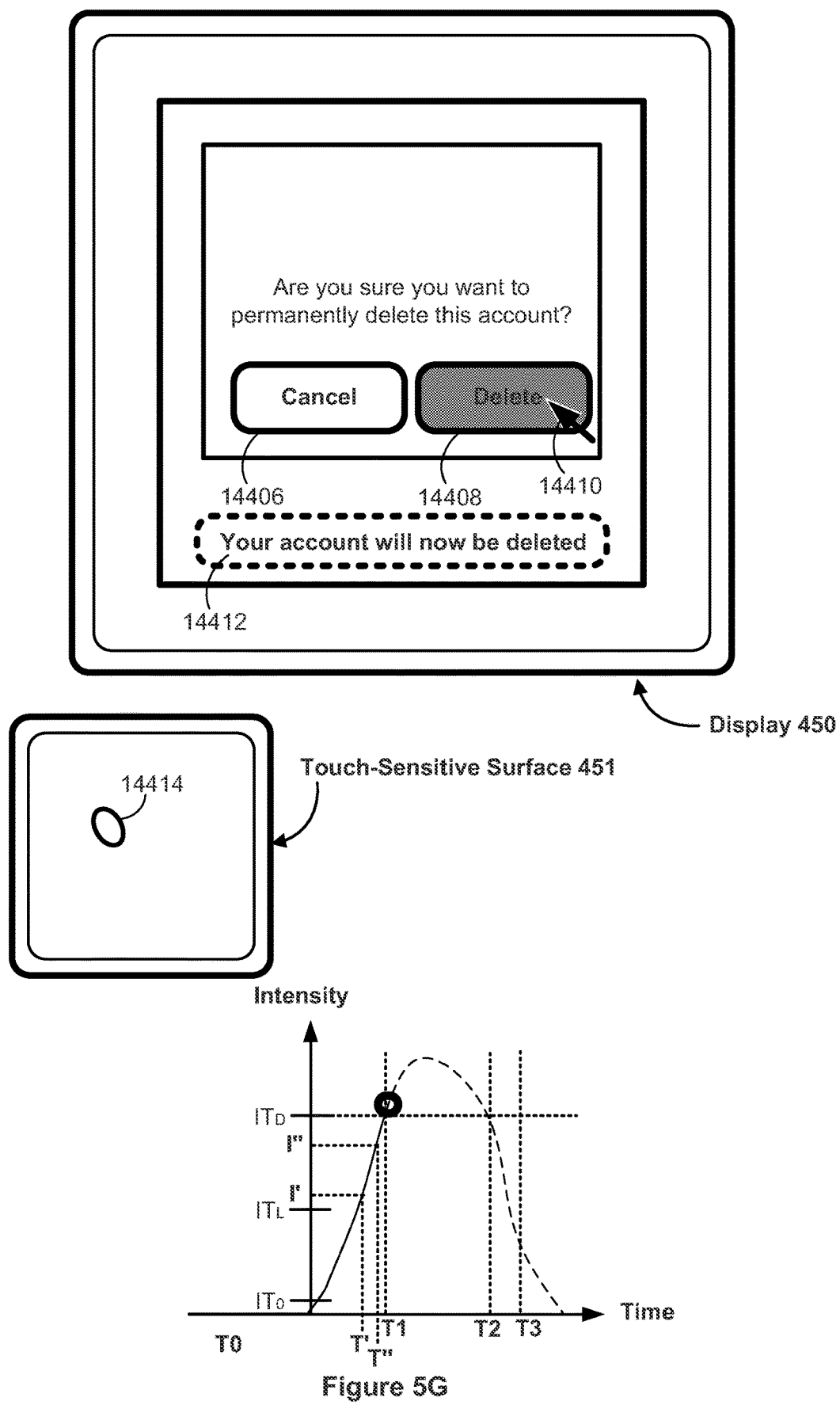

As shown in FIG. 5G, at time T1, while focus selector 14410 is still at the location on display 450 corresponding to the respective control (e.g., control 14408, FIG. 5G), contact 14414 on the touch-sensitive surface 451 meets predefined contact intensity criteria. In the example shown in FIG. 5G, the predefined contact intensity criteria include a contact intensity threshold (e.g., "$IT_D$"). As a result, if and when the intensity of contact 14414 reaches or exceeds the contact intensity threshold, contact 14414 meets the predefined contact intensity criteria. Since contact 14414 meets the predefined contact intensity criteria at time T1, a confirmation is optionally provided to the user to indicate that control 14408 will be activated (e.g., the user account will be permanently deleted) upon detecting the end of the gesture (e.g., upon detecting lift-off of contact 14413). In the example shown in FIG. 5G, the confirmation is optionally shown as control 14408 completely filling up with a different color compared to a color of control 14408 prior to time T1 (e.g., prior to contact 14414 meeting the predefined contact intensity criteria), as shown in FIGS. 5D-5F. Alternatively, or in addition, as shown in FIG. 5G, the confirmation is provided to the user as verbal or textual confirmation 14412 indicating that control 14408 will be activated (e.g., the user account will be deleted) upon termination of the gesture.

As noted previously with reference to FIGS. 5A-5C, in some embodiments, the predefined contact intensity criteria include a contact intensity threshold (e.g., "$IT_D$") and a respective delay time period. In the example shown in FIG. 5G, in such embodiments, contact 14414 meets the predefined contact intensity criteria if the intensity of contact 14414 exceeds the contact intensity threshold for at least a delay time $T_{delay}=T2-T1$. In such embodiments, the progress bar displayed in control 14408 increases in size (e.g., starts to fill up) after the intensity of contact 14414 exceeds the contact intensity threshold, throughout the duration of the delay time. Conversely, in such embodiments, contact 14414 does not meet the predefined contact intensity criteria if the intensity of contact 14414 does not exceed the contact intensity threshold for at least a delay time $T_{delay}=T2-T1$. As another example, referring to FIG. 5G, contact 14414 meets the predefined contact intensity criteria if contact 14414 continues to be detected for a predefined time period (e.g., $T_{delay}=T3-T1$) since (e.g., after) the intensity of contact 14414 exceeds the contact intensity threshold (e.g., time period starting at time T1, FIG. 5G), even if the contact intensity is not maintained at or above the respective contact intensity threshold for the entire predefined time period.

Figure 5H:
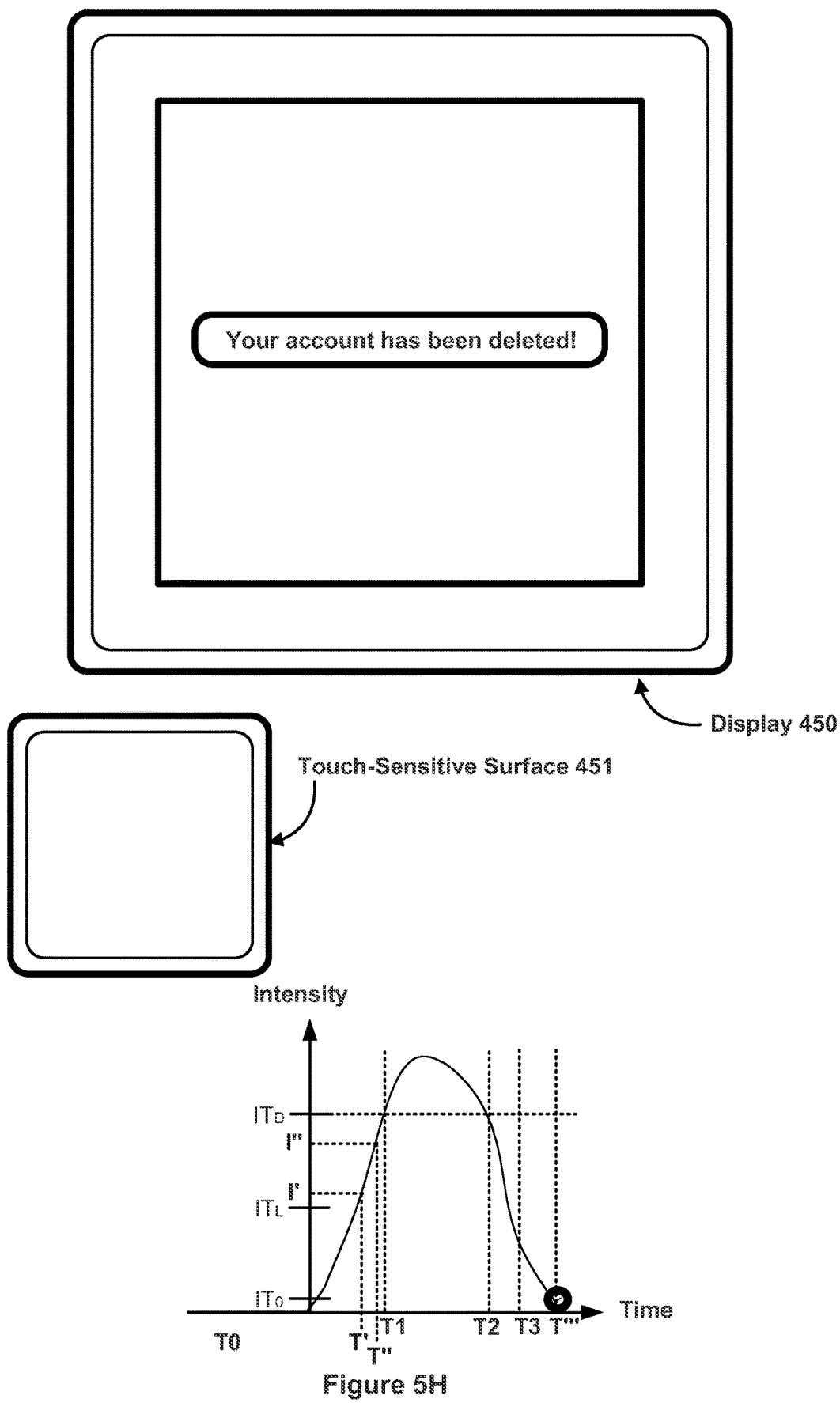

In FIG. 5H, at time T‴ subsequent to time T1, upon detecting termination of the gesture or termination of contact 14414 (e.g., upon detecting lift-off of contact 14413), control 14408 (FIGS. 5D-5G) is activated (e.g., the user account is deleted) since the contact is determined to meet the predefined contact intensity criteria (e.g., in FIG. 5G).

On the other hand, as noted with reference to FIGS. 5A-5C, in some embodiments, if the gesture does not include a contact that meets the predefined contact intensity criteria (for example, if contact 14414 does not, at an end of the gesture, have an intensity above the contact intensity threshold), then the control (e.g., control 14408) is not activated in response to the gesture (e.g., upon termination of the gesture). Consequently, the user is not provided with a confirmation that the control will be activated in response to the gesture (e.g., upon termination of the gesture). In some embodiments, the user is provided with a confirmation that the control will not be activated (e.g., by displaying "Delete" button 14408 that is not completely filled up with gray, as illustrated in FIG. 5F). Instead, in some embodiments, if the gesture does not include a contact that meets the predefined contact intensity criteria, the user would continue to view a user interface similar to the user interface shown in FIGS. 5D-5F (e.g., with the extent of visual indication provided in control corresponding to an instantaneous intensity level of the contact 14414). In some embodiments, the user may optionally choose to cancel the deletion of the user account by activating control 14406.

Thus, in some embodiments, the device determines if the gesture includes a contact that meets predefined contact intensity criteria (e.g., if the intensity of the contact is above or greater than an intensity threshold) while the focus selector is at a location corresponding to a control on the display. If the contact meets the contact intensity criteria, the device optionally provides the user with a confirmation that the contact will be activated upon detecting the end of the gesture. If the contact does not yet meet the contact intensity criteria, the device provides the user a visual indication of progress toward meeting the contact intensity based on a current state of user input (e.g., based on the time-varying intensity and/or duration of contact). As a result, the user has the improved convenience of receiving real-time indication of progress toward activation of the control based on the user's input (e.g., based on the time-varying intensity and/or duration of the user's contact), and, in response, the option to adjust the user's input (e.g., adjusting the pressure of the contact by pushing harder or more lightly) to affirm or reverse intent to activate the control. This additional visual indication and requirement for active user-affirmation provides the user with additional information that enables the user to understand how to activate a control that is protected by these extra safeguards against accidental activation of the control by the user.

FIGS. 5I-5M illustrate detecting a user gesture corresponding to a control (e.g., control 14408) on a touch-sensitive display 112, the gesture including a contact (e.g., contact 14420, having time-varying intensity or pressure detected by the touch-sensitive display 112 or sensors associated with the touch-sensitive display 112). FIGS. 5I-5M further illustrate providing the user a visual indication or feedback indicating progress toward the contact meeting predefined contact intensity criteria (e.g., providing a visual indication that the time-varying intensity of the contact is approaching or increasing toward a predefined contact intensity threshold (e.g., "$IT_D$"), for instance as the user pushes down harder on the touch-sensitive surface). FIGS. 5I-5M additionally illustrate providing a confirmation to the user that a respective control (e.g., control 14408, FIG. 5I) will be activated—e.g., a user account will be irreversibly deleted—in response to the gesture (e.g., upon termination of the gesture) if the contact meets the predefined contact intensity criteria. FIGS. 5I-5M also illustrate subsequently activating the control (e.g., control 14408)—for example, deleting the user account—upon termination of the gesture if the contact meets predefined contact intensity criteria.

Figure 5I:
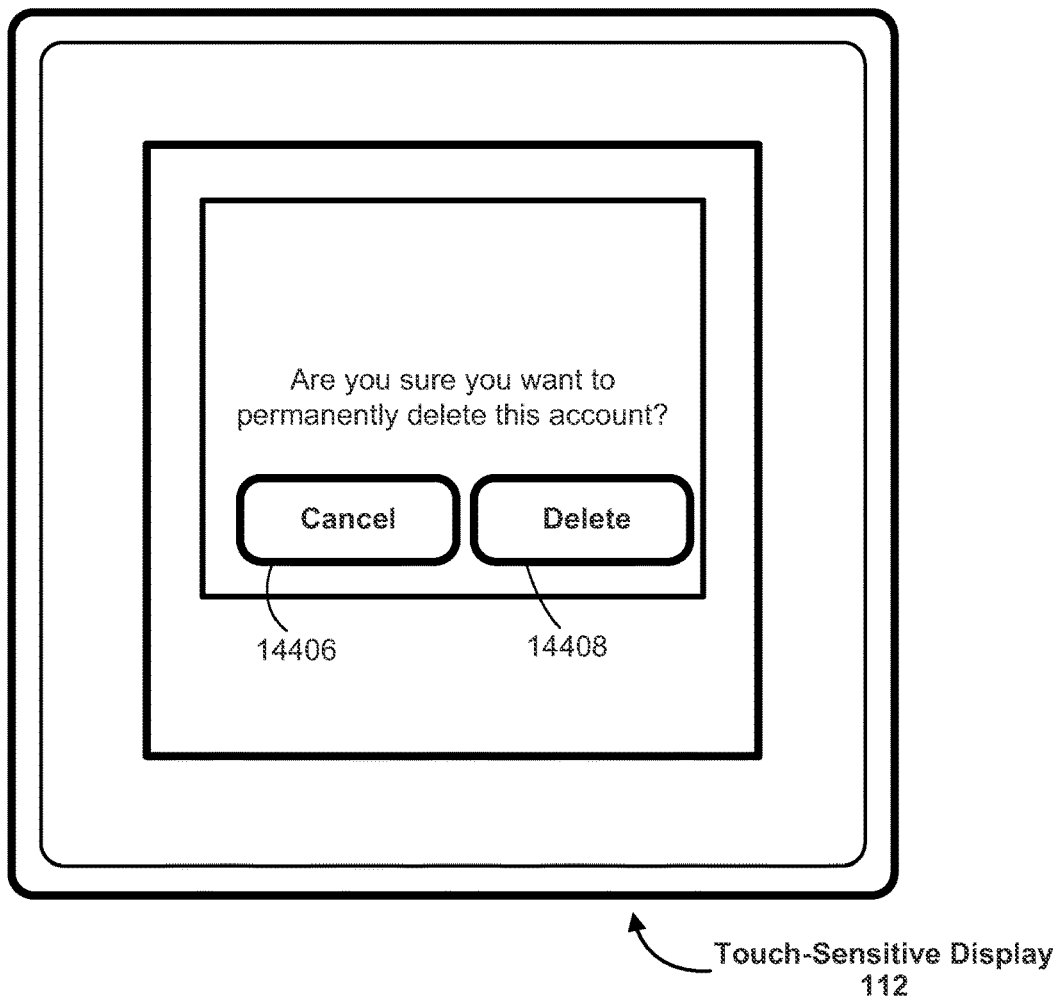
Figure 5I:
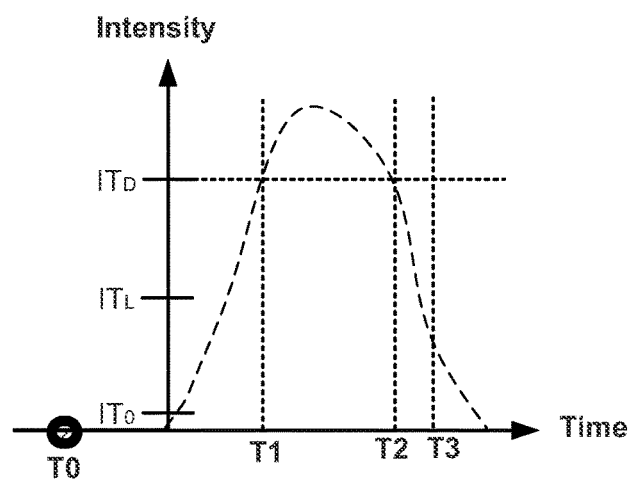
Figure 5J:
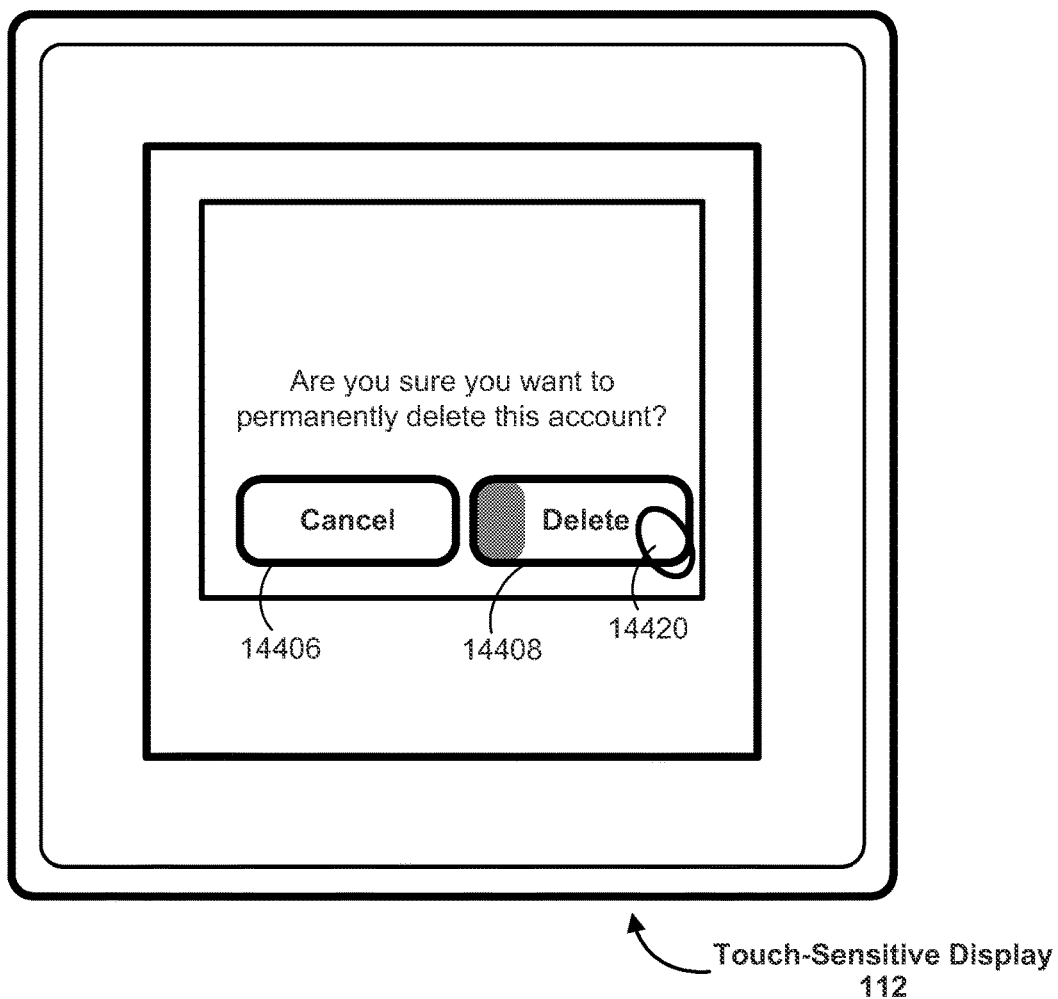
Figure 5J:
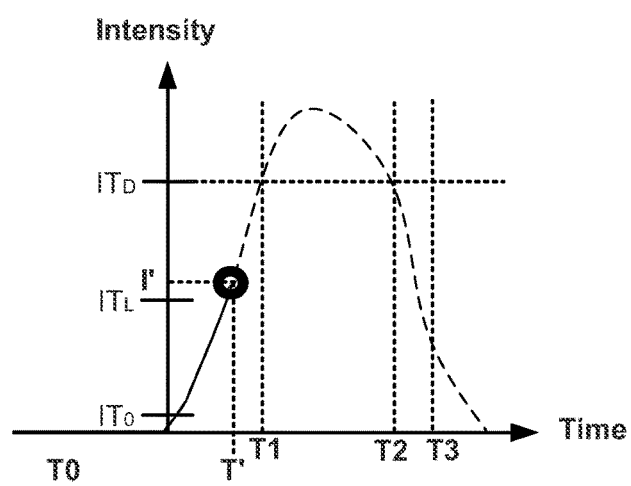

In FIG. 5I, at time T0, no contact is present or detected on touch-sensitive display 112. In FIG. 5J, at time T', a contact or a gesture that includes a contact (e.g., contact 14420 in FIG. 5J) is detected on touch-sensitive display 112. A focus selector (corresponding to contact 14420) is at a location on display 112 corresponding to a respective control (e.g., control 14408, FIG. 5J). As shown in FIG. 5J, at time T', while focus selector 14410 is still at the location on touch-sensitive display 112 corresponding to the respective control (e.g., control 14408, FIG. 5J), contact 14420 has an intensity I', lower than the contact intensity threshold (e.g., "$IT_D$"). In response to detecting a user contact of intensity I' (lower than the contact intensity threshold), the user is provided a visual indication of progress toward contact 14420 meeting predefined contact intensity criteria. For example, as shown in FIG. 5J, control 14408 changes appearance (compared to its appearance in FIG. 5I), for instance as a progress bar is displayed in control 14408. As another example, control 14408 changes appearance by displaying an indication of a difference (e.g., corresponding to a portion of control 14408 that is not filled in with gray) between a current intensity of contact 14420 (e.g., corresponding to the grayed or filled out portion of control 14408) on touch-sensitive display 112 and the contact intensity threshold.

Figure 5K:
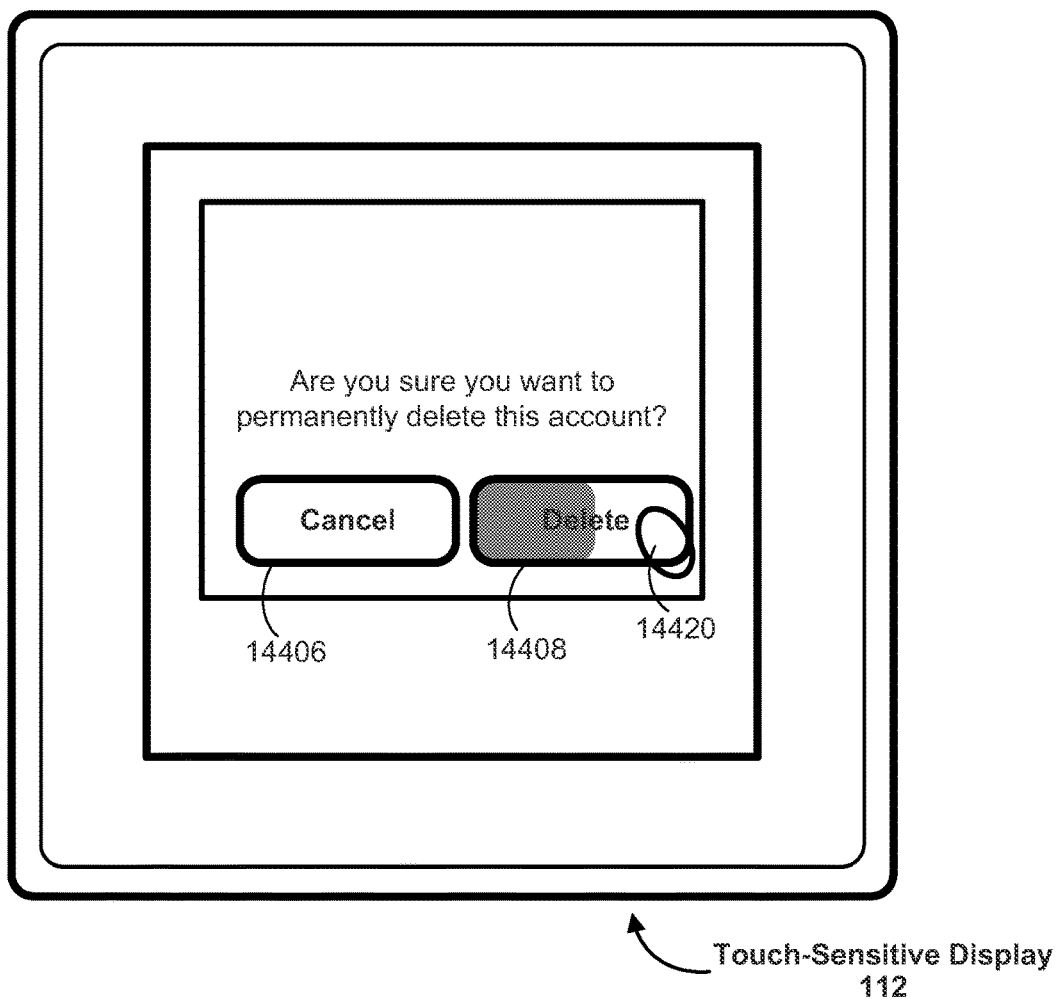
Figure 5K:
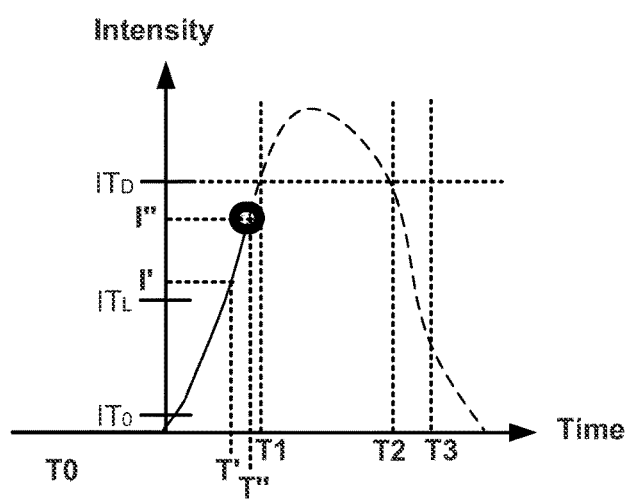

Similarly, as shown in FIG. 5K, at time T", while focus selector 14410 is still at the location on touch-sensitive display 112 corresponding to the respective control (e.g., control 14408, FIG. 5K), contact 14420 has an intensity I", lower than the contact intensity threshold. In response to detecting an intensity I" of contact 14420 (lower than the contact intensity threshold (e.g., "$IT_D$"), but greater than the intensity I' of contact 14420 at time T' shown in FIG. 5J), the user is provided a visual indication of progress toward contact 14420 meeting or approaching the predefined contact intensity criteria. As shown in FIG. 5K, control 14408 further changes appearance (compared to its appearance in FIG. 5I and subsequently in FIG. 5J), for example as the progress bar displayed in control 14408 increases in size (relative to FIG. 5J) in response to the increased intensity of contact 14420 (again, relative to FIG. 5J) toward the contact intensity threshold.

Figure 5L:
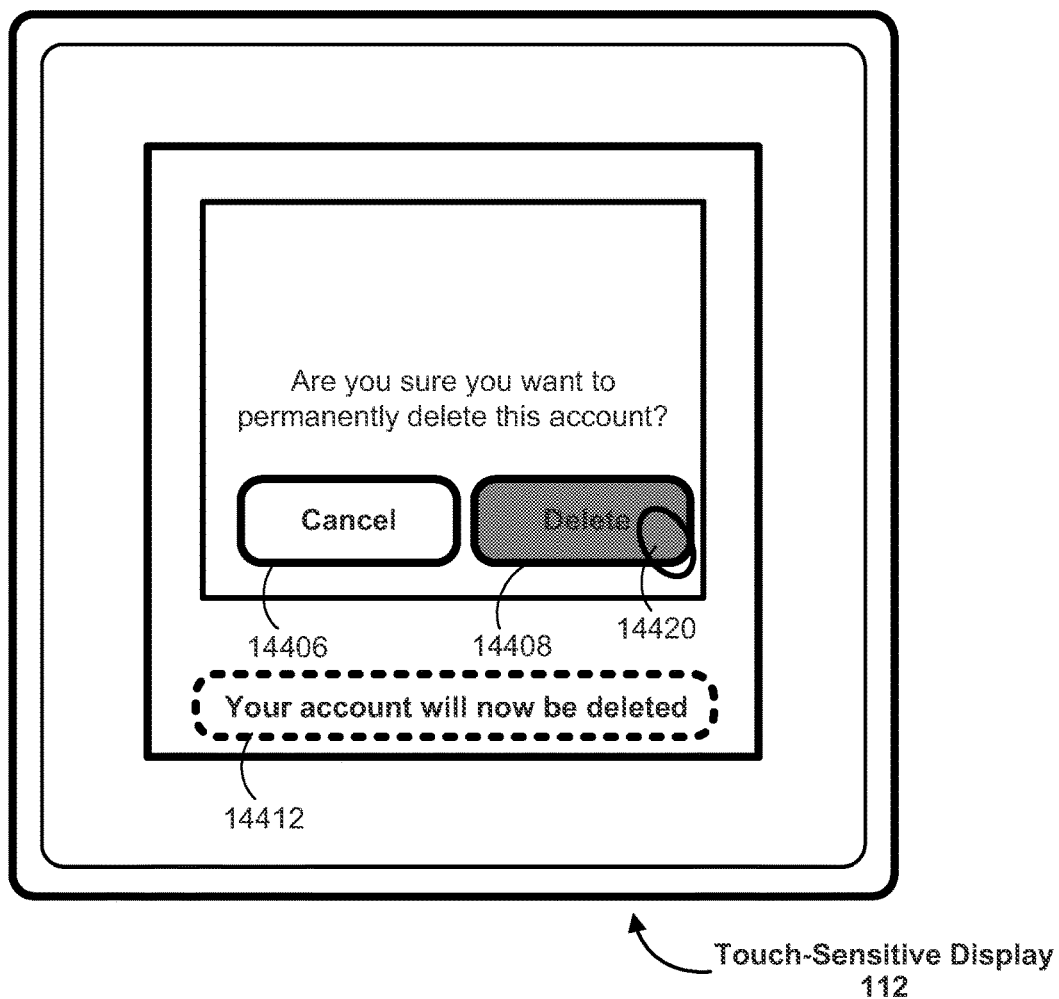
Figure 5L:
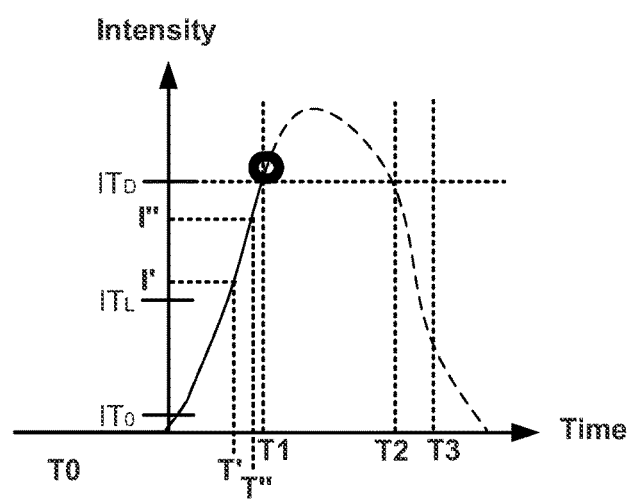

As shown in FIG. 5L, at time T1, while focus selector 14410 is still at the location on touch-sensitive display 112 corresponding to the respective control (e.g., control 14408, FIG. 5L), contact 14420 on the touch-sensitive display 112 meets predefined contact intensity criteria. In the example shown in FIG. 5L, the predefined contact intensity criteria include a contact intensity threshold (e.g., "$IT_D$"). As a result, when the intensity of contact 14420 reaches or exceeds the contact intensity threshold, then contact 14420 meets the predefined contact intensity criteria. Since contact 14420 meets the predefined contact intensity criteria, a confirmation is optionally provided to the user to indicate that control 14408 will be activated (e.g., the user account will be permanently deleted) upon detecting the end of the gesture (e.g., upon detecting lift-off of contact 14420). In the example shown in FIG. 5L, the confirmation is optionally shown as control 14408 completely filling up with a different color compared to a color of control 14408 prior to time T1 (e.g., prior to contact 14420 meeting the predefined contact intensity criteria), as shown in FIGS. 5I-5K. Alternatively, or in addition, as shown in FIG. 5L, the confirmation is provided to the user as verbal or textual confirmation 14412 indicating that control 14408 will be activated (e.g., the user account will be deleted) upon termination of the gesture.

As noted previously with reference to FIGS. 5A-5C, and with reference to FIGS. 5D-5H, in some embodiments, the predefined contact intensity criteria include a contact intensity threshold (e.g., "$IT_D$") and a respective delay time period. In the example shown in FIG. 5L, in such embodiments, contact 14420 meets the predefined contact intensity criteria if the intensity of contact 14420 exceeds the contact intensity threshold for at least a delay time $T_{delay}=T2-T1$. Conversely, in such embodiments, contact 14420 does not meet the predefined contact intensity criteria if the intensity of contact 14420 does not exceed the contact intensity threshold for at least a delay time $T_{delay}=T2-T1$. As another example, referring to FIG. 5L, contact 14420 meets the predefined contact intensity criteria if the contact continues to be detected for a predefined time period (e.g., $T_{delay}=T3-T1$) since (e.g., after) the intensity of contact 14420 exceeds the contact intensity threshold (e.g., time period starting at time T1, FIG. 5L), even if the contact intensity is not maintained at or above the respective contact intensity threshold for the entire predefined time period.

Figure 5M:
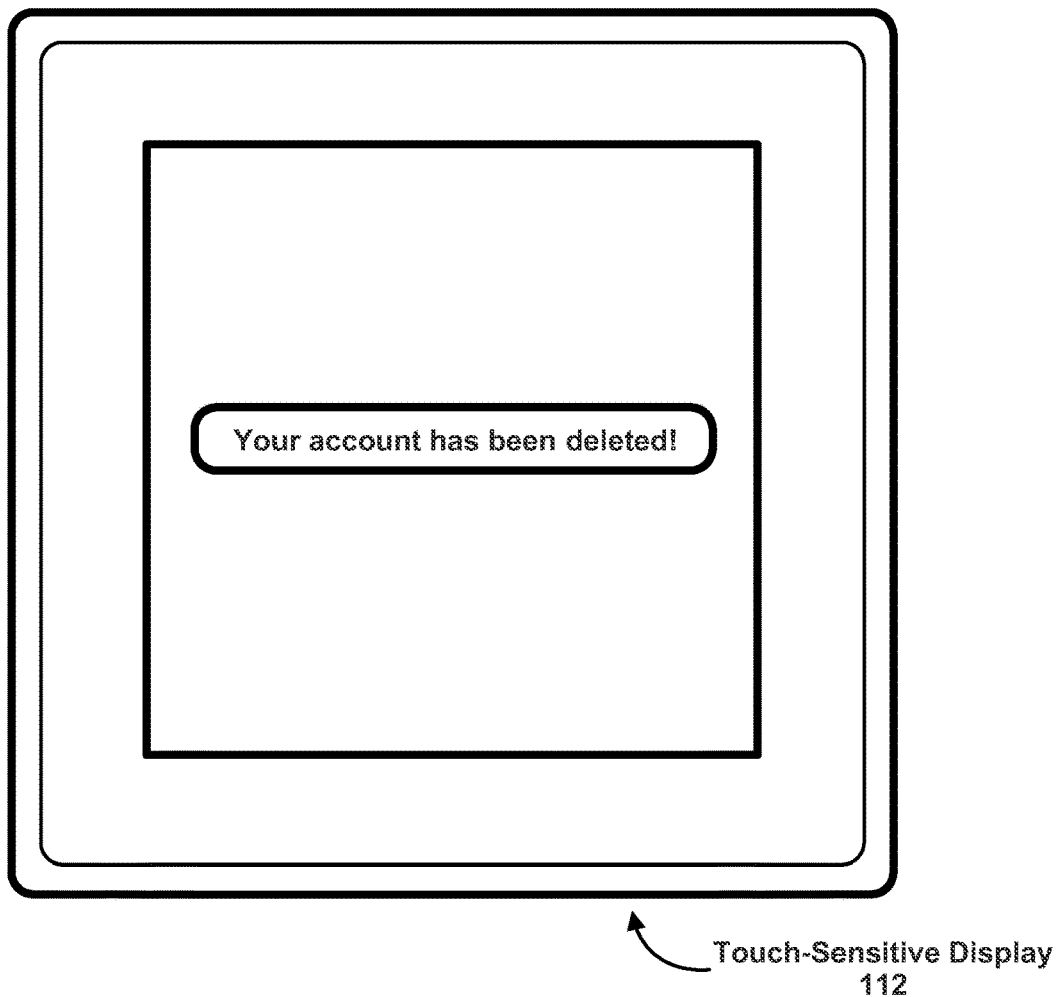
Figure 5M:
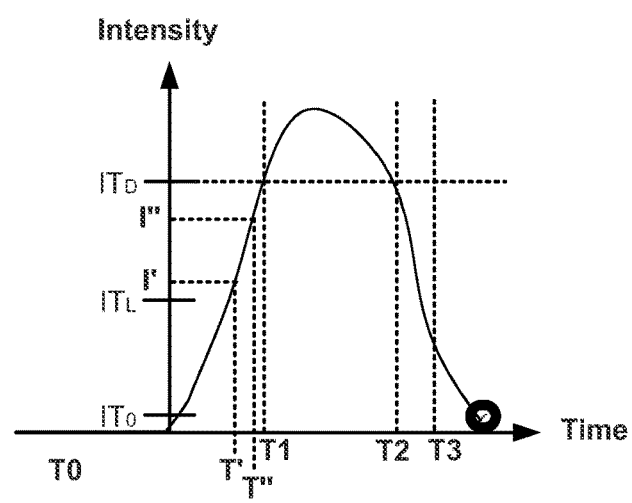
Figure 6A:
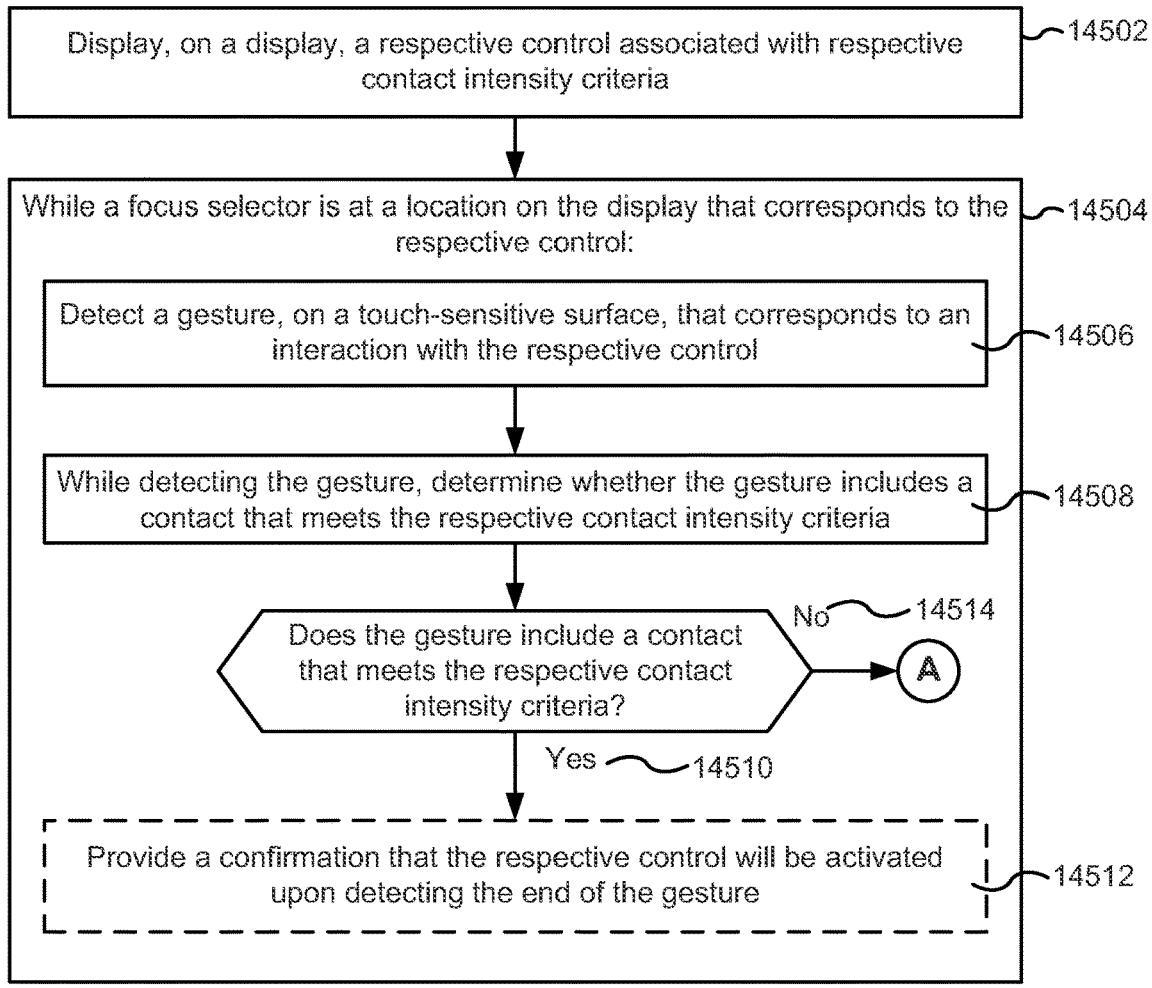
Figure 6C:
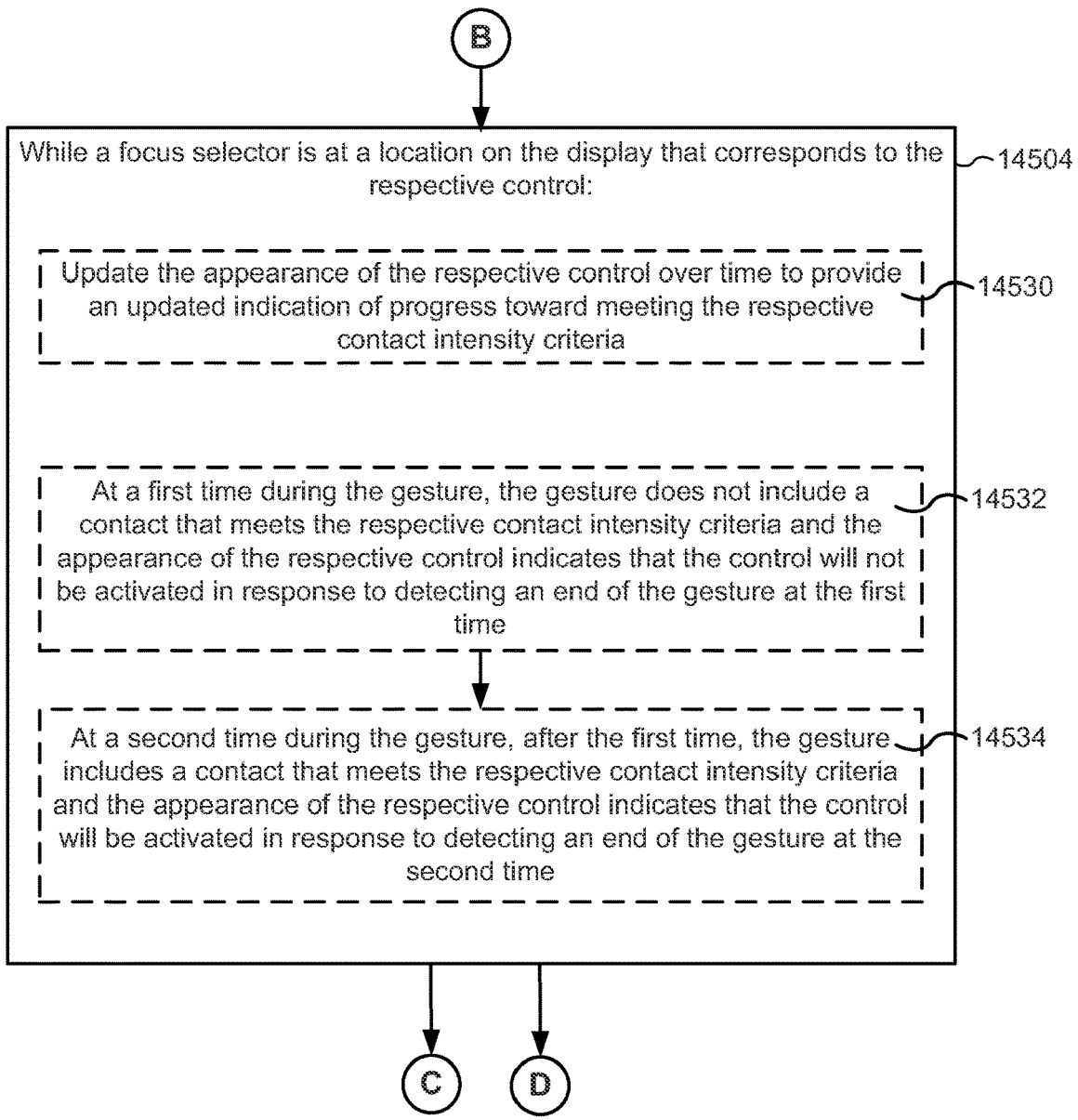
Figure 6D:
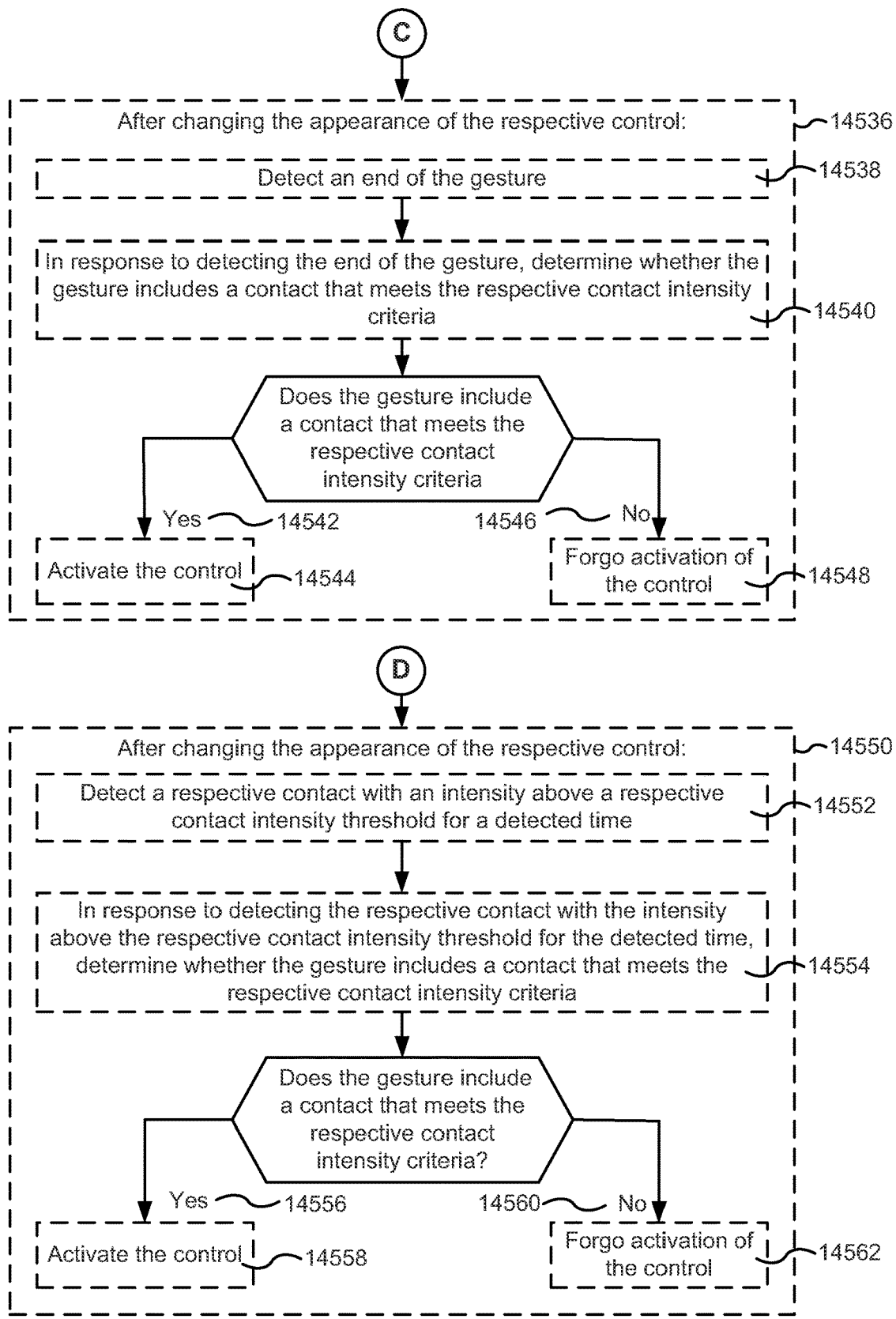

In FIG. 5M, at time T'" subsequent to time T1, upon detecting termination of the gesture or termination of contact 14420 (e.g., upon detecting lift-off of contact 14420), control 14408 (FIGS. 5I-5L) is activated (e.g., the user account is deleted).

On the other hand, as noted with reference to FIGS. 5A-5C, in some embodiments, if the gesture does not include a contact that meets the predefined contact intensity criteria (for example, if contact 14420 does not, at an end of the gesture, have an intensity above the contact intensity threshold), then the control (e.g., control 14408) is not activated in response to the gesture (e.g., upon termination of the gesture). Consequently, the user is not provided with a confirmation that the control will be activated in response to the gesture (e.g., upon termination of the gesture). In some embodiments, the user is provided with a confirmation that the control will not be activated (e.g., by displaying "Delete" button 14408 that is not completely filled up with gray, as illustrated in FIG. 5K). Instead, in some embodiments, if the gesture does not include a contact that meets the predefined contact intensity criteria, the user would continue to view a user interface similar to those shown in FIGS. 5I-5K (e.g., with the extent of visual indication provided in control corresponding to an instantaneous intensity level of the contact 14420). In some embodiments, the user may optionally choose to cancel the deletion of the user account by activating control 14406.

FIGS. 6A-6D are flow diagrams illustrating a method 14500 of governing or managing activation of controls based on the intensity of a contact in accordance with some embodiments. The method 14500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 14500 are, optionally, combined and/or the order of some operations is, optionally, changed.

As described below, the method 14500 provides an intuitive way to manage activation of controls based on the intensity of a contact. The method reduces the cognitive burden on a user when managing activation of controls based on the intensity of a contact, thereby creating a more efficient human-machine interface. For battery-operated electronic devices, enabling a user to manage activation of controls based on the intensity of a contact faster and more efficiently conserves power and increases the time between battery charges.

The device displays (14502), on a display, a respective control (e.g., a button or slider) associated with respective contact intensity criteria. For example, the respective control has a corresponding predefined contact intensity threshold (e.g., "$IT_D$") that needs to be met by a detected contact in order to activate the control. For example, as described with reference to FIGS. 5A-5C, control 14408 (e.g., a control to delete a user account) displayed on display 450 is associated with a contact intensity threshold (e.g., "$IT_D$") that needs to be met by a contact detected on touch-sensitive surface 451 in order to activate control 14408.

While a focus selector is (14504) at a location on the display that corresponds to the respective control: the device performs one or more of operations 14506-14534.

The device detects (14506) a gesture, on a touch-sensitive surface, that corresponds to an interaction with the respective control. For example, as explained with reference to FIGS. 5A-5C, while focus selector 14410 is at a location on display 450 corresponding to control 14408, a gesture (e.g., including contact 14413, FIG. 5B) is detected on touch-sensitive surface 451.

While detecting the gesture, the device determines (14508) whether the gesture includes a contact that meets the respective contact intensity criteria. In some embodiments, in accordance with a determination that the gesture includes (14510) a contact that meets the respective contact intensity criteria, the device provides (14512) a confirmation that the respective control will be activated upon detecting the end of the gesture. For example, as shown in FIG. 5B, upon determining that intensity of contact 14413 is above the contact intensity threshold (e.g., "$IT_D$"), the device displays an updated appearance of the progress indicator, such as displaying the control (e.g., control 14408, FIG. 5B) filling completely up with a different color (e.g., control 14408, with a white background, fills up with gray). As another example, as shown in FIG. 5B, upon determining that intensity of contact 14413 is above the contact intensity threshold, the device displays a verbal or textual confirmation 14412 indicating that control 14408 will be activated (e.g., the user account will be deleted) upon termination of the gesture.

In accordance with a determination that the gesture does not (e.g., yet) (14514) include a contact that meets the respective contact intensity criteria, the device performs one or more of operations 14516-14562.

In accordance with a determination that the gesture does not (e.g., yet) (14514) include a contact that meets the respective contact intensity criteria, the device changes (14516) the appearance of the respective control to indicate progress toward meeting the respective contact intensity criteria, as described with reference to operations 14518-14528. For example, as explained with reference to FIGS. 5D-5F above, upon determining that an intensity of contact 14414 (e.g., intensity I' at time T', and intensity I" at time T" corresponding to increasing contact pressure applied by the user) is lower than the contact intensity threshold, the device changes (14516) the appearance of control 14408 to indicate progress toward meeting the contact intensity threshold (e.g., as a progress bar is displayed in control 14408 or as control 14408 gradually fills up with a gray color).

In some embodiments, the respective contact intensity criteria include (14518) a respective contact intensity threshold (e.g., "$IT_D$") and a respective delay time period. For example, as explained with reference to FIG. 5G, the respective delay time period is a predefined time period in which the contact intensity meets or exceeds the respective contact intensity threshold (e.g., $T_{delay}=T2-T1$, FIG. 5G). Alternatively, as explained with reference to FIG. 5G, the respective delay time period is a predefined time period since (after) the respective contact intensity threshold is met (e.g., since time T1) in which the contact continues to be detected, even if the contact intensity is not maintained at or above the respective contact intensity threshold (e.g., $T_{delay}=T3-T1$, FIG. 5G). In some embodiments, changing the appearance of the control includes displaying an indication of an amount of time remaining before the respective delay time period has elapsed. In some embodiments, in response to detecting an end of the gesture, such as liftoff of the contact, if the gesture meets the respective contact intensity criteria, including the respective delay time period, the device performs an operation associated with the control (e.g., the device deletes the user account upon detecting lift-off of contact 14414, as explained with reference to FIG. 5H). In some embodiments, as soon as the gesture meets the respective contact intensity criteria, including the respective delay time period, the device performs an operation associated with the control, without waiting to detect an end of the gesture, such as liftoff of the contact (e.g., in response to detecting that the gesture includes a contact with an intensity above the respective contact intensity threshold).

In some embodiments, the respective contact intensity criteria include (14520) a respective contact intensity threshold (e.g., "$IT_D$"), optionally, without a corresponding delay time period. For example, as explained with reference to FIG. 5G, when the intensity (e.g., pressure) of contact 14414 on touch-sensitive surface 451 reaches or exceeds the contact intensity threshold, then contact 14414 meets the predefined contact intensity criteria. In some embodiments, changing the appearance of the control includes displaying an indication of a difference between a current intensity of a contact on the touch-sensitive surface and the respective contact intensity threshold. For example, as explained with reference to FIGS. 5D-5F, control 14408 further changes appearance by displaying an indication of the difference (e.g., corresponding to a portion of control 14408 that is not filled in with gray) between the current intensity (I") of contact 14414 (e.g., corresponding to the grayed or filled out portion of control 14408) on touch-sensitive surface 451 and the contact intensity threshold. In some embodiments, the device displays an indication of an additional amount of intensity (e.g., pressure) that a user needs to apply in order to activate the control. For example, if the respective contact intensity threshold is 2X, and the detected intensity of the contact is X, then the "Delete" button would be filled up fifty percent of the way. In some embodiments, in response to detecting an end of the gesture, such as liftoff of the contact, if the gesture meets the respective contact intensity criteria, the device performs an operation associated with the control (e.g., the device deletes the user account upon detecting lift-off of contact 14414, as explained with reference to FIG. 5H). In some embodiments, as soon as the gesture meets the respective contact intensity criteria, the device performs an operation associated with the control, without waiting to detect an end of the gesture, such as liftoff of the contact.

In some embodiments, changing the appearance of the control includes (14522) displaying a progress bar in the control. For example, as explained with reference to FIGS.

5D-5H, control 14408 changes appearance (e.g., in FIG. 5E as compared to its appearance in FIG. 5D), for instance as a progress bar is displayed in control 14408 when the intensity of the contact changes.

In some embodiments, changing the appearance of the control includes (14524) changing color of at least a portion of the control in accordance with the intensity of the contact. For example, as explained with reference to FIGS. 5D-5H, control 14408 changes appearance (e.g., in FIG. 5E as compared to its appearance in FIG. 5D), as at least a portion of the control 14408 changes color (from white to gray) when the intensity of the contact changes.

In some embodiments, changing the appearance of the control includes (14526) changing color of at least a portion of the control in accordance with a length of time that the contact has continuously met a respective contact intensity threshold (e.g., "$IT_D$"). For example, the appearance of the control changes color with the time elapsed while the contact has continuously maintained an intensity at or above a predefined contact intensity. For example, if the respective time threshold is 2X (e.g., 1 second), and the detected time that the contact has maintained the respective contact intensity threshold is X (e.g., 0.5 seconds), then the "Delete" button would be filled up fifty percent of the way.

In some embodiments, changing the appearance of the control includes (14528) changing color of at least a portion of the control in accordance with a length of time since the contact met a respective contact intensity threshold (e.g., "$IT_D$"). For example, the appearance of the control changes with the time elapsed since the contact met a predefined contact intensity without regard to whether or not the contact has maintained the predefined contact intensity. For example, if the respective time threshold is 2X (e.g., 1 second), and the detected time that the contact has been detected since the contact reached the respective contact intensity threshold is X (e.g., 0.5 seconds), then the "Delete" button would be filled up fifty percent of the way.

In some embodiments, the device updates (14530) the appearance of the respective control over time to provide an updated indication of progress toward meeting the respective contact intensity criteria. For example, as explained with reference to FIGS. 5D-5G, control 14408 (e.g., a button) gradually fills up with (e.g., gray) color in accordance with a gradually increasing intensity of contact 14414 on touch-sensitive surface 451 (e.g., as the user pushes harder on touch-sensitive surface 451). As another example, as explained with reference to FIGS. 5D-5G, control 14408 (e.g., a button) gradually fills with (e.g., gray) color as contact 14414 is maintained at an intensity above a respective contact intensity threshold (e.g., "$IT_D$") for a predefined period of time (e.g., $T_{delay}$=T2−T1, FIG. 5G) needed to activate the button (e.g., control 14408).

In some embodiments, at a first time during the gesture, the gesture does not include (14532) a contact that meets the respective contact intensity criteria and the appearance of the respective control indicates that the control will not be activated in response to detecting an end of the gesture at the first time. In such embodiments, at a second time during the gesture, after the first time, the gesture includes (14534) a contact that meets the respective contact intensity criteria and the appearance of the respective control indicates that the control will be activated in response to detecting an end of the gesture at the second time. For example, the contact increases in intensity and/or duration during the gesture and thus at the end of the gesture, the control is activated. For example, as explained with reference to FIGS. 5D-5H, the intensity of contact 14414 increases from zero intensity (no contact, FIG. 5D) to intensity I' (FIG. 5E) to intensity I" (FIG. 5F)—as the user pushes harder on touch-sensitive surface 451—during which times contact 14414 does not meet contact intensity criteria. At these times, the appearance of control 14408 (e.g., control 14408 is not completely filled in gray color) indicates that control 14408 will not be activated (e.g., user account will not be deleted) in response to detecting an end of the gesture at these times. However, when the intensity of contact 14414 exceeds contact intensity threshold at time T1 (FIG. 5G), contact 14414 meets contact intensity criteria. At this time, the appearance of control 14408 (e.g., control 14408 is completely filled in with gray color) indicates that control 14408 will be activated (e.g., user account will be deleted) in response to detecting an end of the gesture at this time.

In some embodiments, after changing (14536) the appearance of the respective control: the device detects (14538) an end of the gesture. For example, as explained with reference to FIGS. 5D-5E, after changing the appearance of the respective control 14408, the device detects liftoff of contact 14414 (FIG. 5E). In response to detecting the end of the gesture, the device determines (14540) whether the gesture includes a contact that meets the respective contact intensity criteria. In accordance with a determination that the gesture includes (14542) a contact that meets the respective contact intensity criteria, the device activates (14544) the control. For example, the device performs an operation associated with activation of the control (e.g., the device deletes the user account, as shown in FIG. 5H). In accordance with a determination that the gesture does not include (14546) a contact that meets the respective contact intensity criteria, the device forgoes (14548) activation of the control. For example, as explained with reference to FIGS. 5D-5H, upon determining that the gesture does not include a contact that meets the respective contact intensity criteria the device does not delete the user account, but rather returns the user to the user interface shown in FIG. 5D.

In some embodiments, after changing (14550) the appearance of the respective control: the device detects (14552) a respective contact with an intensity above a respective contact intensity threshold (e.g., "$IT_D$") for a detected time. In some embodiments, the respective contact is a contact of the gesture, such as a contact corresponds to a press input on the touch-sensitive surface while the focus selector is at the location on the display that corresponds to the respective control. In response to detecting the respective contact with the intensity above the respective contact intensity threshold for the detected time, the device determines (14554) whether the gesture includes a contact that meets the respective contact intensity criteria. In accordance with a determination that the gesture includes (14556) a contact that meets the respective contact intensity criteria, the device activates (14558) the control. For example, the device performs an operation associated with activation of the control without waiting to detect an end of the gesture (e.g., prior to lift off of the finger contact). In accordance with a determination that the gesture does not (14560) include a contact that meets the respective contact intensity criteria, the device forgoes (14562) activation of the control.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 14500 described above with respect to FIGS. 6A-6D. For example, the contacts, gestures, controls, user interface objects, intensity thresholds, focus selectors described above with reference to method 14500 optionally have one or more of the characteristics of the contacts, gestures, controls, user interface objects, intensity thresholds, focus selectors described herein with reference to other methods described herein (e.g., those listed in the fifth paragraph of the Description of Embodiments). For brevity, these details are not repeated here.

Figure 7:
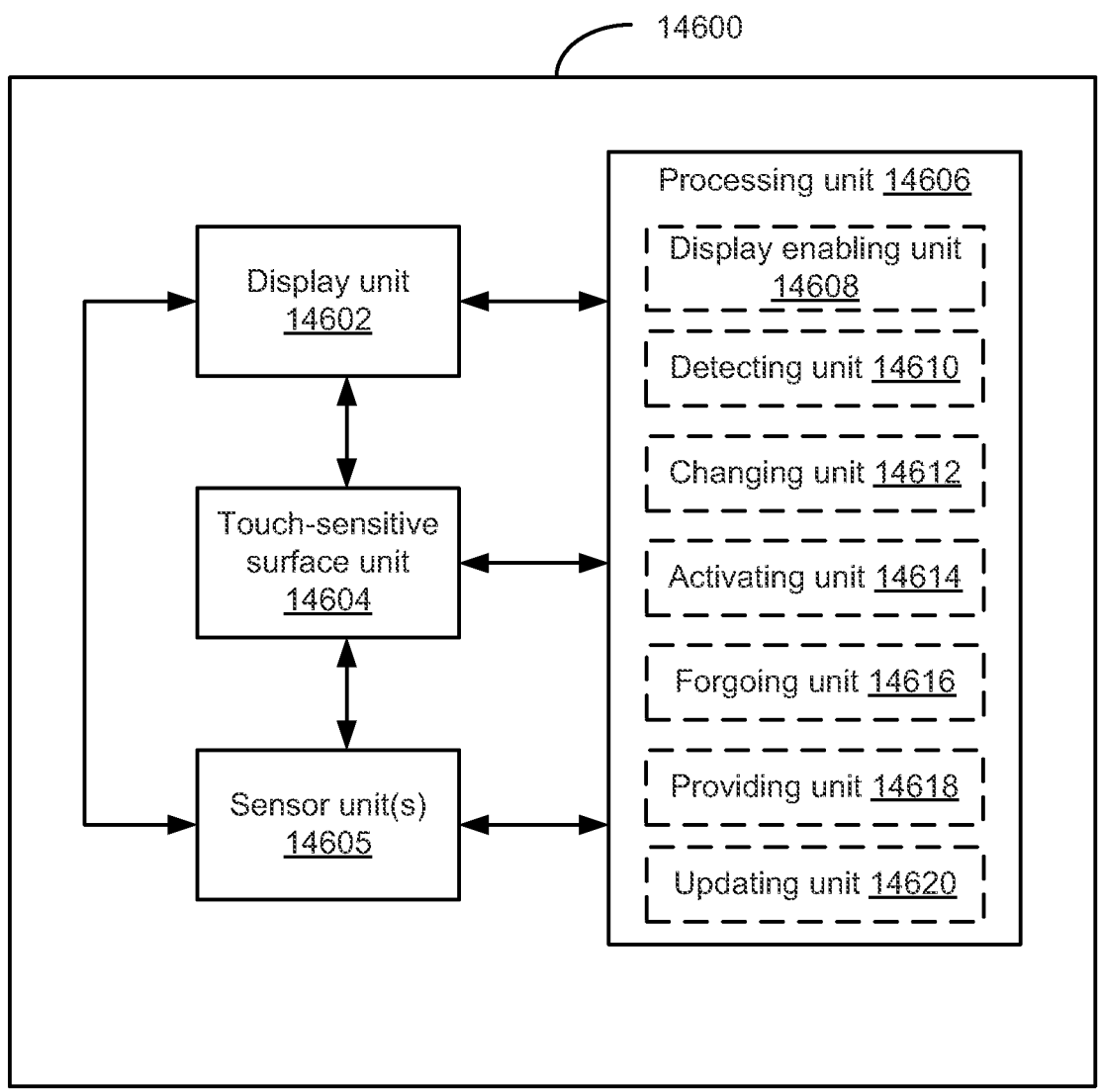
FIG. 7 is a functional block diagram of an electronic device in accordance with some embodiments.

In accordance with some embodiments, FIG. 7 shows a functional block diagram of an electronic device 14600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 14600 includes a display unit 14602 configured to display on the display unit 14602, a respective control associated with respective contact intensity criteria; a touch-sensitive surface unit 14604 configured to receive a contact on the touch-sensitive surface unit; one or more sensor units 14605 configured to detect intensity of contacts with the touch-sensitive surface unit 14604; and a processing unit 14606 coupled to the display unit 14602. In some embodiments, the processing unit 14606 includes a display enabling unit 14608, a detecting unit 14610, a changing unit 14612, an activating unit 14614, a providing unit 14618, and an updating unit 14620.

The processing unit 14606 is configured to: display, on the display unit 14602, a respective control associated with respective contact intensity criteria; and while a focus selector is at a location on the display unit 14602 that corresponds to the respective control: detect a gesture, on the touch-sensitive surface unit 14604, that corresponds to an interaction with the respective control (e.g., with the detecting unit 14610); and while detecting the gesture, in accordance with a determination that the gesture does not include a contact that meets the respective contact intensity criteria, change the appearance of the respective control to indicate progress toward meeting the respective contact intensity criteria (e.g., with the changing unit 14612).

In some embodiments, the processing unit 14606 is further configured to, after changing the appearance of the respective control: detect an end of the gesture (e.g., with the detecting unit 14610); and in response to detecting the end of the gesture: in accordance with a determination that the gesture includes a contact that meets the respective contact intensity criteria, activate the control (e.g., with the activating unit 14614); and in accordance with a determination that the gesture does not include a contact that meets the respective contact intensity criteria, forgo activation of the control (e.g., with the activating unit 14614).

In some embodiments, the processing unit 14606 is further configured to, while detecting the gesture, in accordance with a determination that the gesture includes a contact that meets the respective contact intensity criteria, provide a confirmation that the respective control will be activated upon detecting the end of the gesture (e.g., with the providing unit 14618).

In some embodiments, the processing unit 14606 is further configured to, after changing the appearance of the respective control: detect a respective contact with an intensity above a respective contact intensity threshold for a detected time (e.g., with the detecting unit 14610); and in response to detecting the respective contact with the intensity above the respective contact intensity threshold for the detected time: in accordance with a determination that the gesture includes a contact that meets the respective contact intensity criteria, activate the control (e.g., with the activating unit 14614); and in accordance with a determination that the gesture does not include a contact that meets the respective contact intensity criteria, forgo activation of the control (e.g., with the activating unit 14614).

In some embodiments, at a first time during the gesture, the gesture does not include a contact that meets the respective contact intensity criteria and the appearance of the respective control indicates that the control will not be activated in response to detecting an end of the gesture at the first time; and at a second time during the gesture, after the first time, the gesture includes a contact that meets the respective contact intensity criteria and the appearance of the respective control indicates that the control will be activated in response to detecting an end of the gesture at the second time.

In some embodiments, the processing unit 14606 is further configured to update the appearance of the respective control over time to provide an updated indication of progress toward meeting the respective contact intensity criteria (e.g., with the updating unit 14620).

In some embodiments, the respective contact intensity criteria include a respective contact intensity threshold and a respective delay time period; and changing the appearance of the control includes displaying an indication of an amount of time remaining before the respective delay time period has elapsed.

In some embodiments, the respective contact intensity criteria include a respective contact intensity threshold; and changing the appearance of the control includes displaying an indication of a difference between a current intensity of a contact on the touch-sensitive surface unit 14604 and the respective contact intensity threshold.

In some embodiments, changing the appearance of the control includes displaying a progress bar in the control (e.g., with the changing unit 14612).

In some embodiments, changing the appearance of the control includes changing color of at least a portion of the control in accordance with the intensity of the contact (e.g., with the changing unit 14612).

In some embodiments, changing the appearance of the control includes changing color of at least a portion of the control in accordance with a length of time that the contact has continuously met a respective contact intensity threshold (e.g., with the changing unit 14612).

In some embodiments, changing the appearance of the control includes changing color of at least a portion of the control in accordance with a length of time since the contact met a respective contact intensity threshold (e.g., with the changing unit 14612).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, displaying operation 14502, detecting operation 14506, and determining operation 14508 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Moving a Cursor According to a Change in an Appearance of a Control Icon with Simulated Three-Dimensional Characteristics Many electronic devices display control icons (e.g., buttons) corresponding to content on a user interface that are responsive to a user input. A cursor is sometimes used to manipulate these controls in response to user input. However, when the input does not include a directional component, the cursor remains stationary while manipulating the controls. The embodiments provide a convenient and intuitive interface for activating controls by displaying a control icon with simulated three-dimensional characteristics on a user interface and detecting a stationary press input on a touch-sensitive surface that includes an increase in intensity of a contact that corresponds to a cursor displayed on the user interface over the control icon. Then, in response to detecting the stationary press input, the device changes an appearance of the simulated three-dimensional characteristics of the control icon (e.g., the control icon appears to move downward, or be depressed, along a simulated z-axis extending out of the plane of the display) and moves the cursor laterally on the display in accordance with the change in appearance of the control icon. In some embodiments, the cursor remains stationary relative to the control icon but moves relative to the background of the user interface as the control icon changes in appearance so as to provide the user with additional feedback indicating that the control icon is responding to changes in intensity of an input performed by the user (e.g., an intensity of a contact on a touch-sensitive surface that controls the cursor).

FIGS. 8A-8K illustrate exemplary user interfaces for moving a cursor according to a change in an appearance of a control icon with simulated three-dimensional characteristics in accordance with some embodiments. The user interfaces in these figures are used to illustrate the processes described below, including the processes in FIGS. 9A-9C. FIGS. 8A-8K include intensity diagrams that show the current intensity of the contact on the touch-sensitive surface relative to a plurality of intensity thresholds including "$IT_0$," "$IT_L$," and "$IT_D$." In some implementations, an appearance of the respective control icon changes in accordance with the simulated three-dimensional characteristics of the respective control icon and in response to detecting a stationary press input that includes an increase in intensity of a contact (that corresponds to a displayed cursor) on the touch-sensitive surface in excess of one or more of a contact detection intensity threshold, "$IT_0$," a light press intensity threshold, "$IT_L$," and a deep press intensity threshold, "$IT_D$."

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8K and FIGS. 9A-9C will be discussed with reference to display 450 and a separate touch-sensitive surface 451; however, analogous operations are, optionally, performed on a device with a touch-sensitive display system 112 in response to detecting the contacts described in FIGS. 8A-8K on the touch-sensitive display system 112 while displaying the user interfaces shown in FIGS. 8A-8K on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 15604.

Figure 8A:
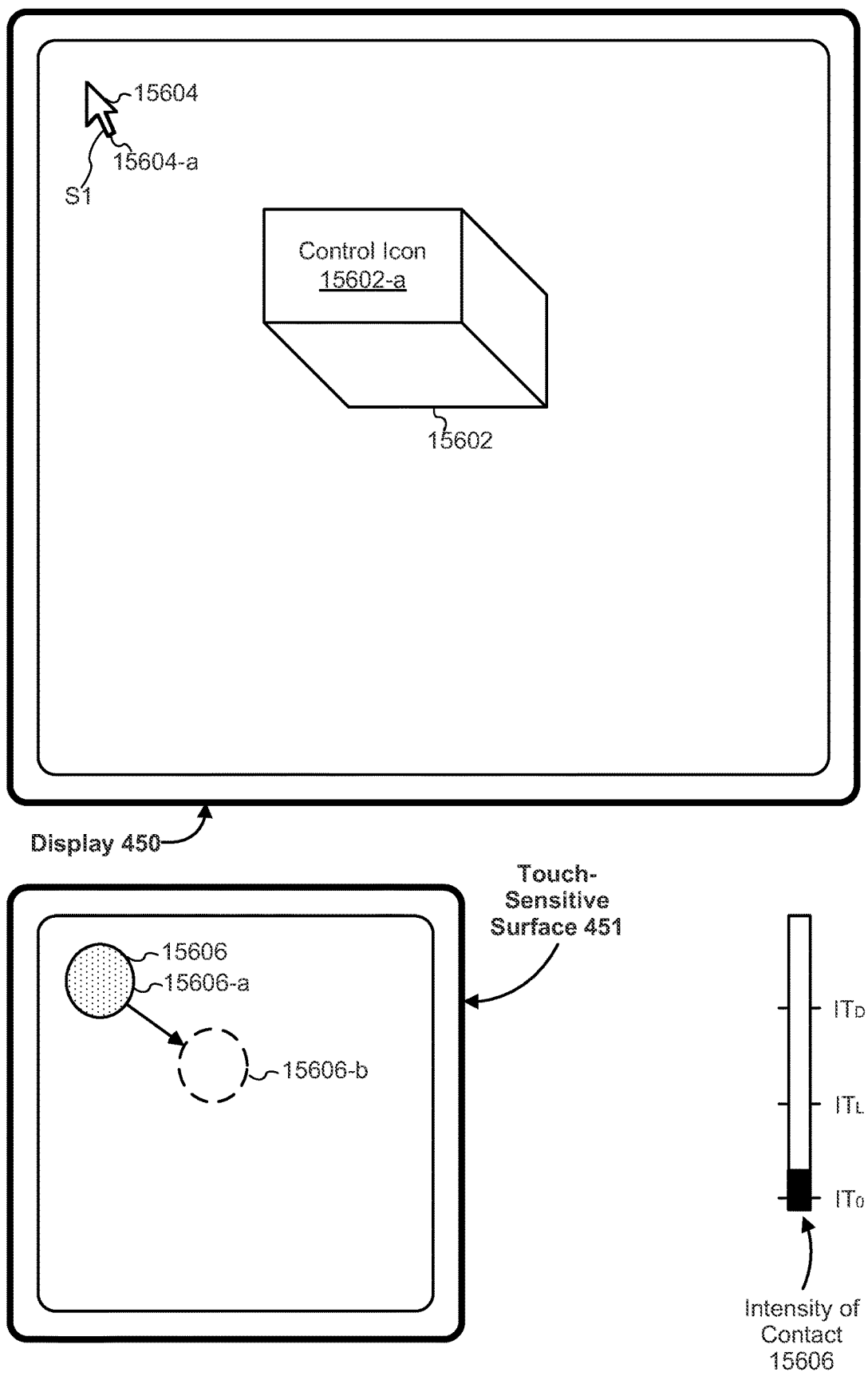
FIGS. 8A-8K illustrate exemplary user interfaces for moving a cursor according to a change in an appearance of a control icon with simulated three-dimensional characteristics in accordance with some embodiments.
Figure 9A:
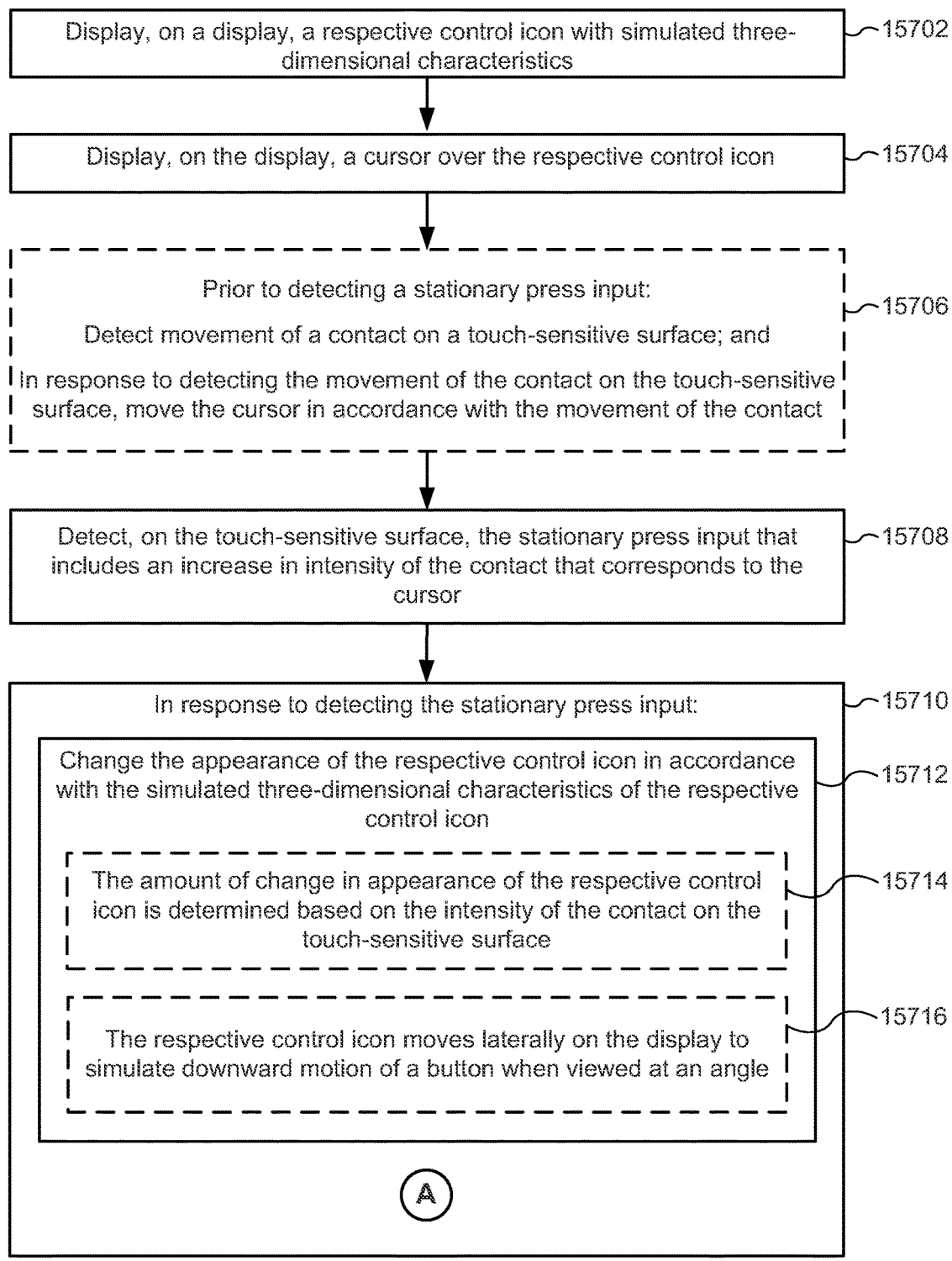
FIGS. 9A-9C are flow diagrams illustrating a method of moving a cursor according to a change in an appearance of a control icon with simulated three-dimensional characteristics in accordance with some embodiments.
Figure 9B:
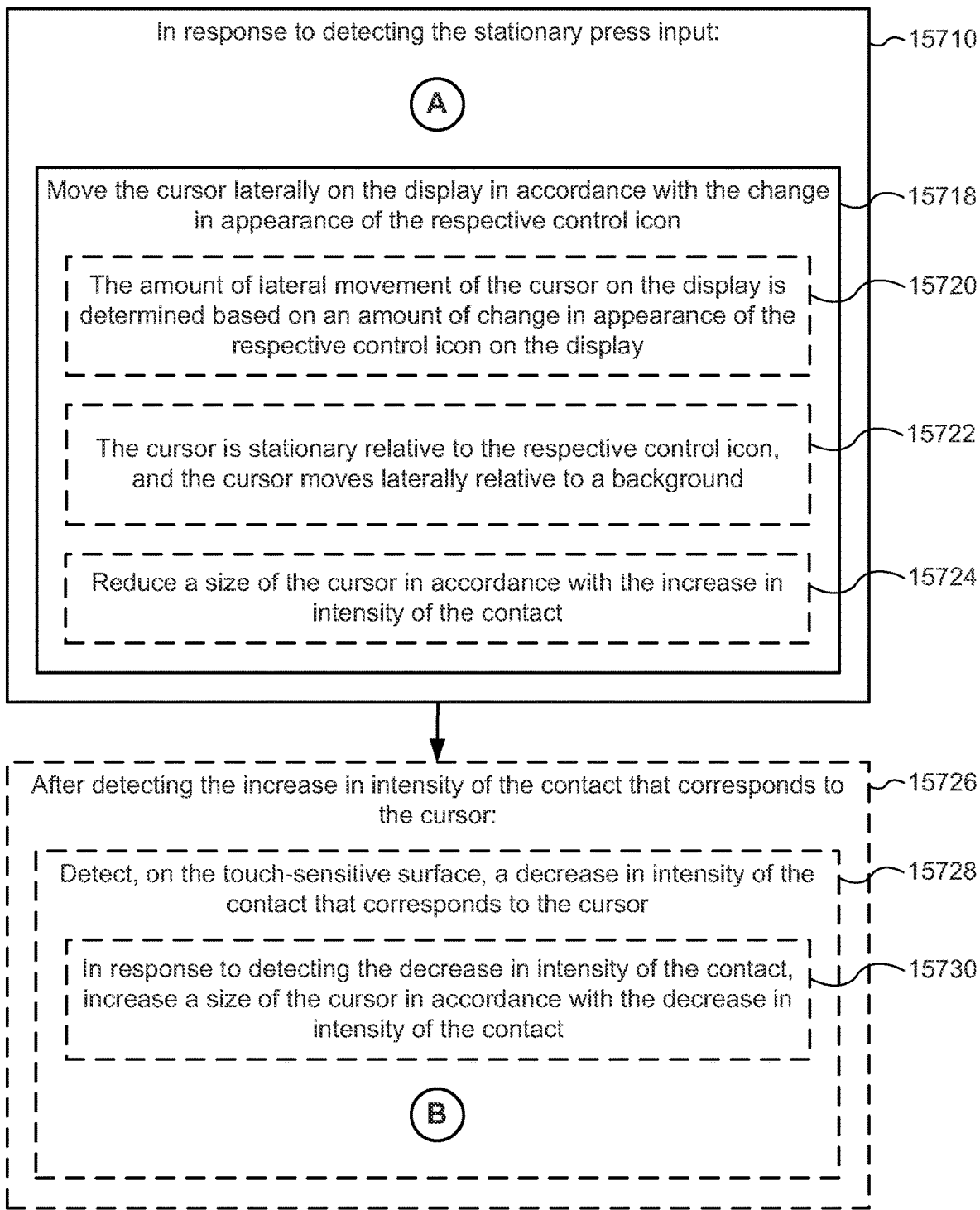
Figure 9C:
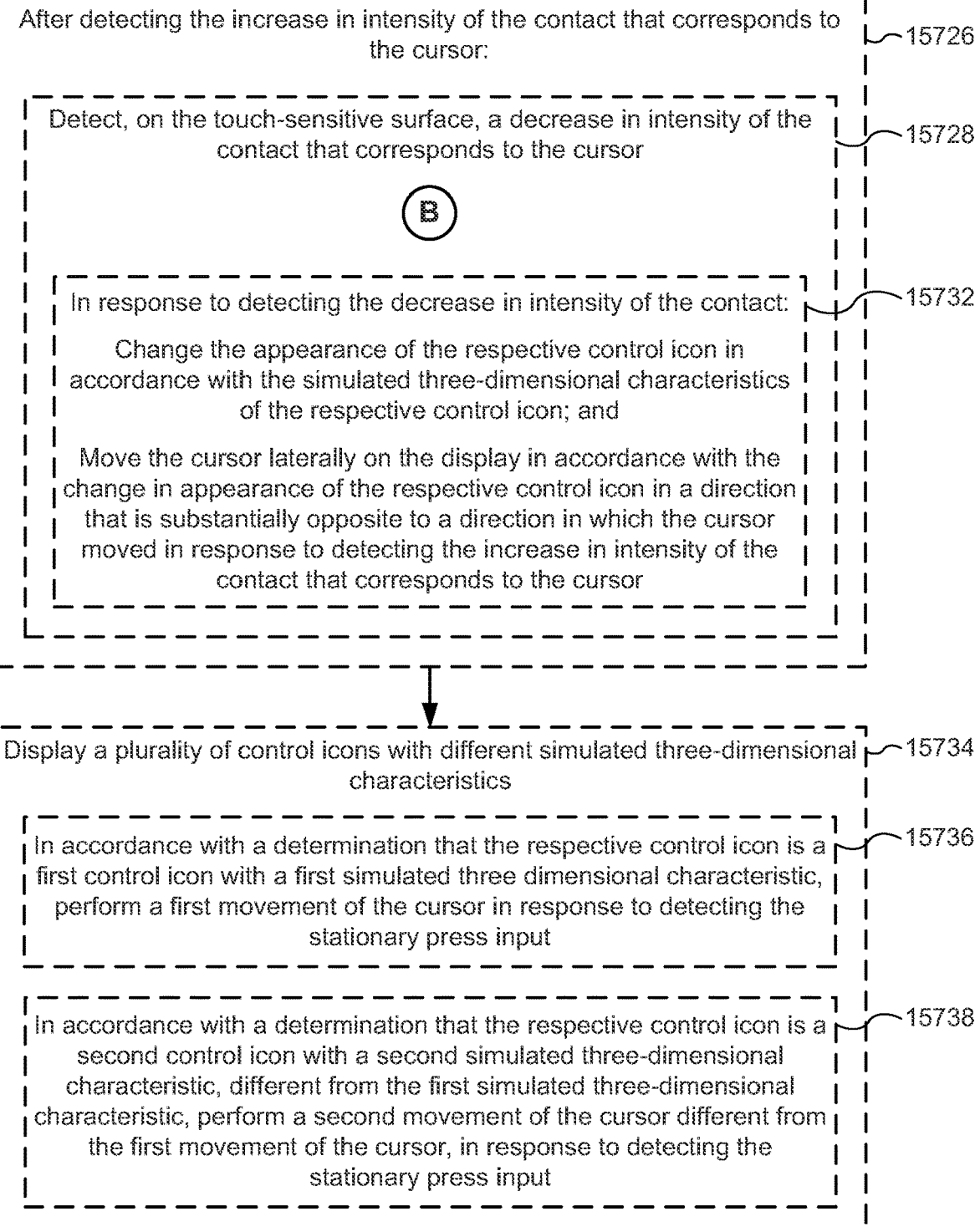

FIG. 8A illustrates respective control icon 15602 displayed at position 15602-a on display 450. FIG. 8A further illustrates contact 15606 detected on touch-sensitive surface 451 at position 15606-a and a displayed representation of a focus selector (e.g., cursor 15604) at position 15604-a on display 450 corresponding to contact 15604. In this example, cursor 15604 is displayed at size S1, and subsequent position 15606-b of contact 15606 is represented as a dotted circle on touch-sensitive surface 451.

Figure 8B:
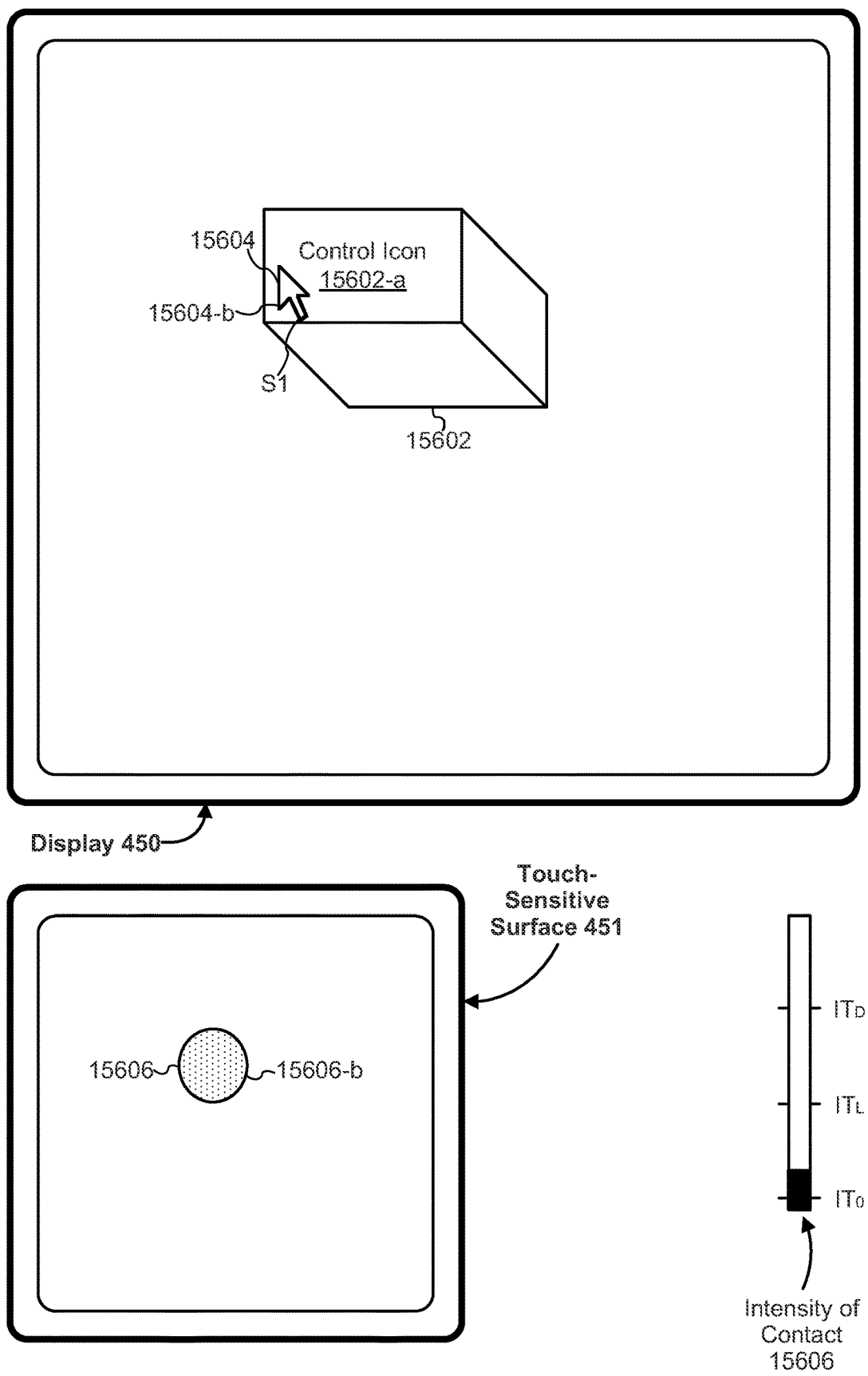

FIGS. 8A-8B illustrate detecting movement of contact 15606 on touch-sensitive surface 451 (e.g., contact 15606 moves from position 15606-a in FIG. 8A to position 15606-b in FIG. 8B). In this example, cursor 15604 moves from position 15604-a in FIG. 8A to position 15604-b in FIG. 8B in response to detecting movement of contact 15606 on touch-sensitive surface 451. FIG. 8B illustrates cursor 15604 displayed at position 15604-b over control icon 15602 on display 450.

Figure 8C:
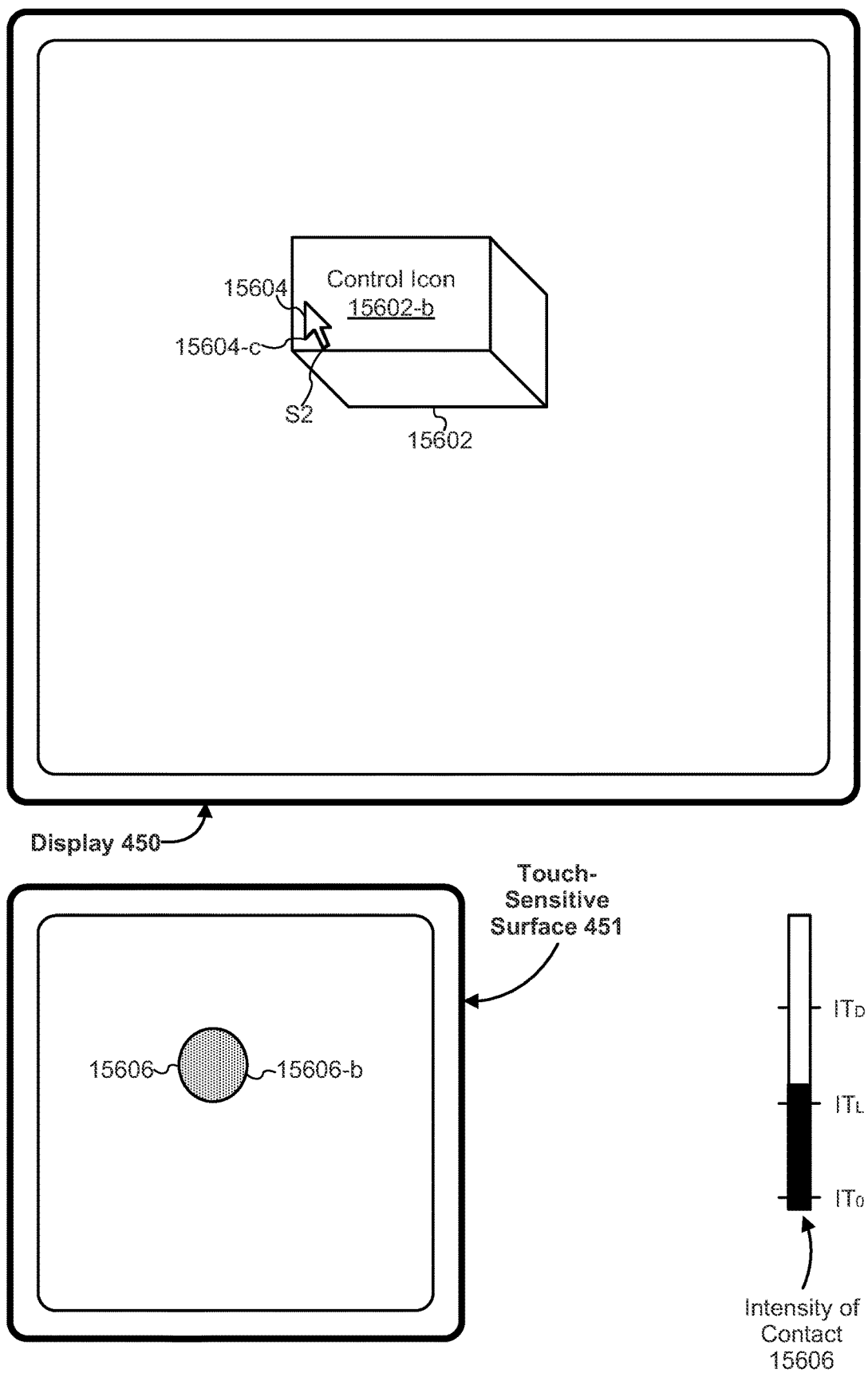

FIGS. 8B-8C illustrate detecting, on touch-sensitive surface 451, a stationary press input that includes an increase in intensity of contact 15606 that corresponds to cursor 15604. In this example, contact 15606 remains stationary at position 15606-b and the intensity of contact 15606 increases (e.g., from below $IT_L$ in FIG. 8B to above $IT_L$ in FIG. 8C).

FIGS. 8B-8C further illustrate changing an appearance of respective control icon 15602 in accordance with the simulated three-dimensional characteristics of respective control icon 15602 (e.g., control icon 15602 appears to move downward along a simulated z-axis extending out of the plane of display 450 by moving from position 15602-a in FIG. 8B to position 15602-b in FIG. 8C). In this example, the amount of change in appearance of respective control icon 15602 is determined based on the intensity of contact 15606 on touch-sensitive surface 451 (e.g., control icon 15602 appears to be depressed further as the intensity of contact 15606 increases between FIGS. 8B-8C). FIGS.

8B-8C further illustrate moving cursor 15604 laterally on display 450 (e.g., cursor 15604 moves from position 15604-*b* in FIG. 8B to position 15604-*c* in FIG. 8C) in accordance with the change in appearance of respective control icon 15602 (e.g., cursor 15604 moves as control icon 15602 appears to move downward along the simulated z-axis extending out of the plane of display 450 between FIGS. 8B-8C).

Figure 8D:
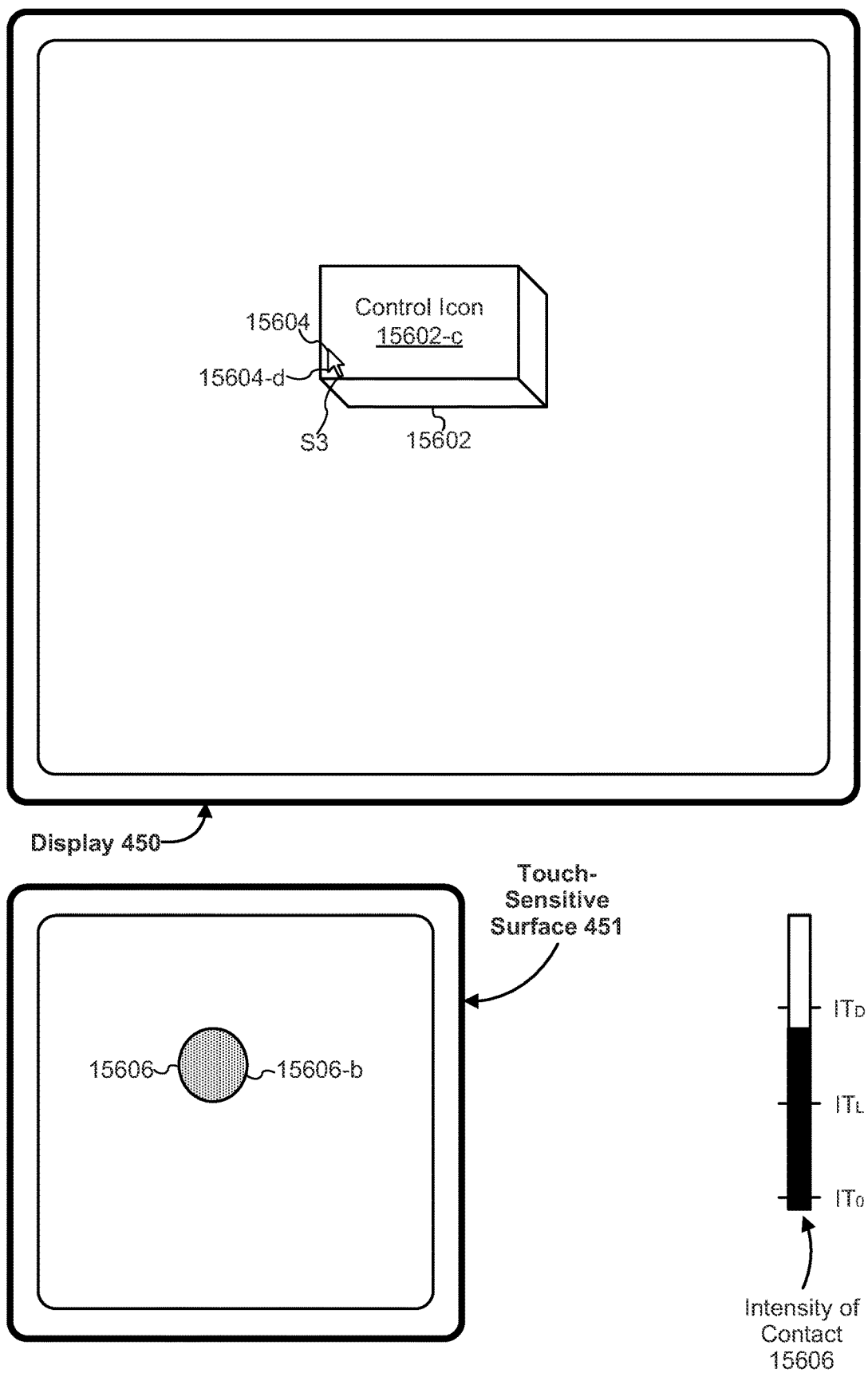

FIGS. 8B-8D illustrate cursor 15604 remaining stationary relative to respective control icon 15602 but moving laterally relative to the background (e.g., cursor 15604 moves from position 15604-*b* in FIG. 8B to position 15604-*c* in FIG. 8C, then to position 15604-*d* in FIG. 8D). FIGS. 8B-8D further illustrate reducing a size of cursor 15604 (e.g., the size of cursor 15604 reduces from S1 in FIG. 8B to S2 in FIG. 8C, then to S3 in FIG. 8D) in response to detecting the stationary press input (e.g., contact 15606 remains at position 15606-*b* between FIGS. 8B-8D) and in accordance with the increase in intensity of contact 15606 (e.g., the size of cursor 15604 reduces as the intensity of contact 15606 increases from below $IT_L$ in FIG. 8B to above $IT_L$ in FIG. 8D).

Figure 8E:
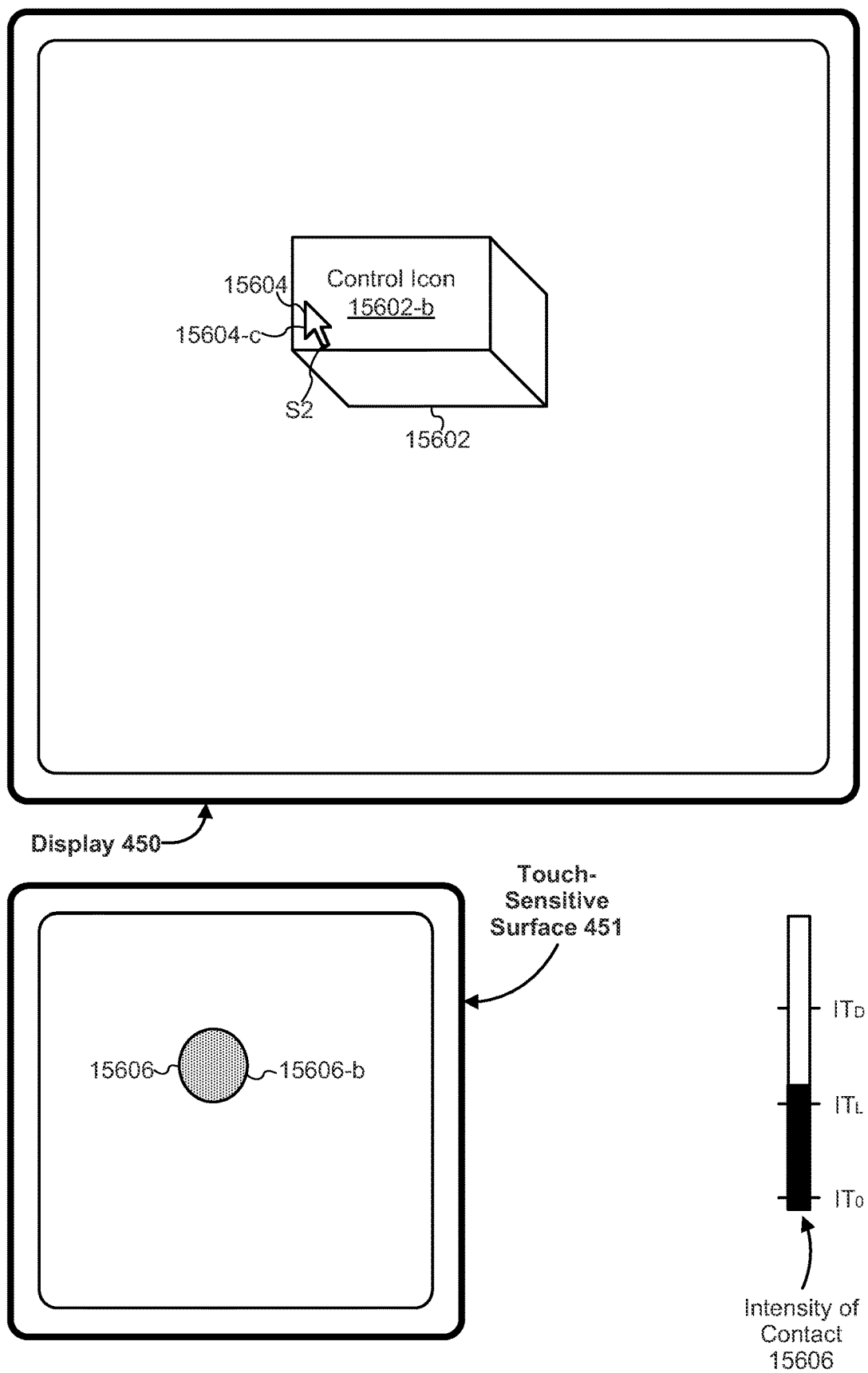
Figure 8F:
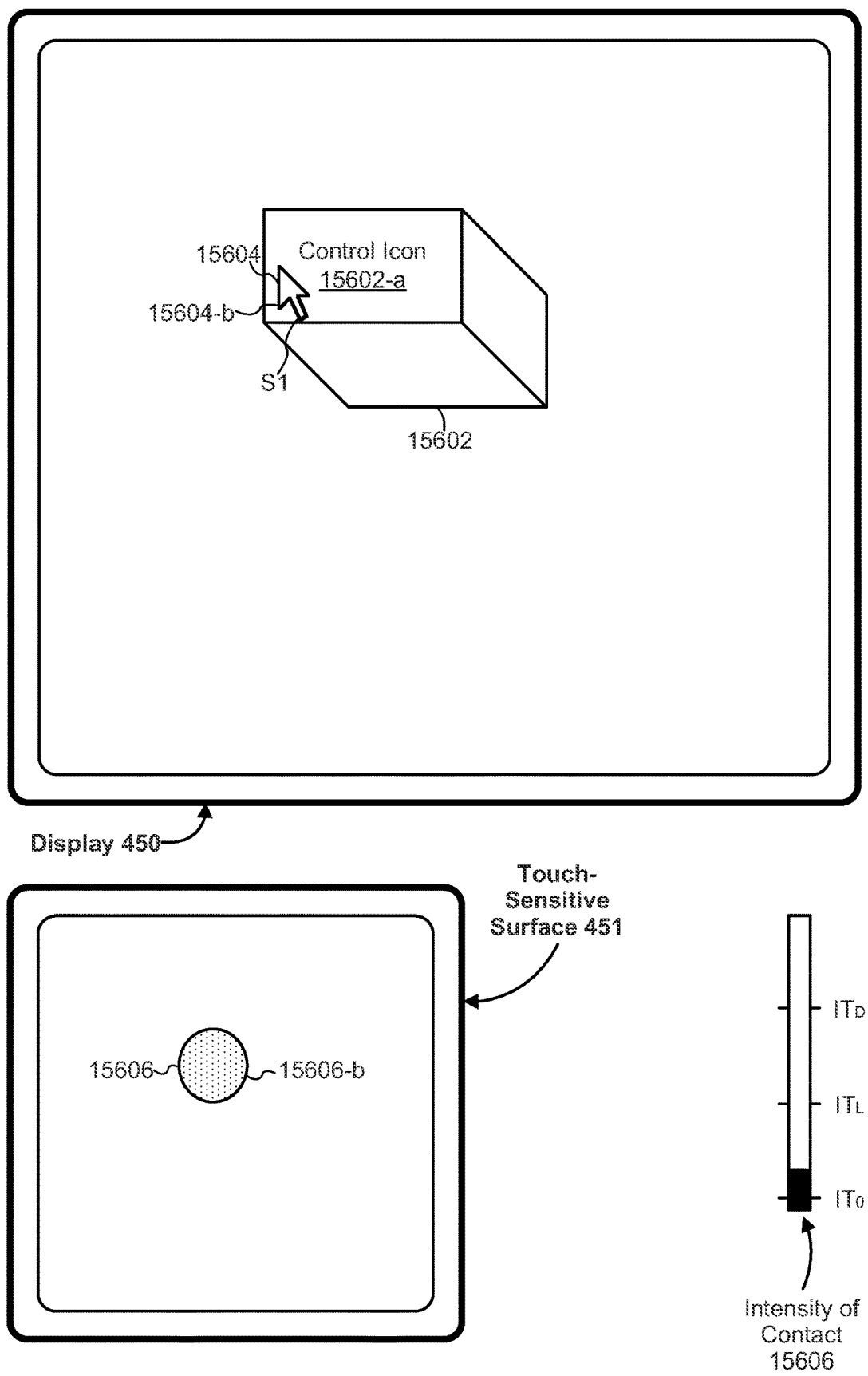
Figure 8G:
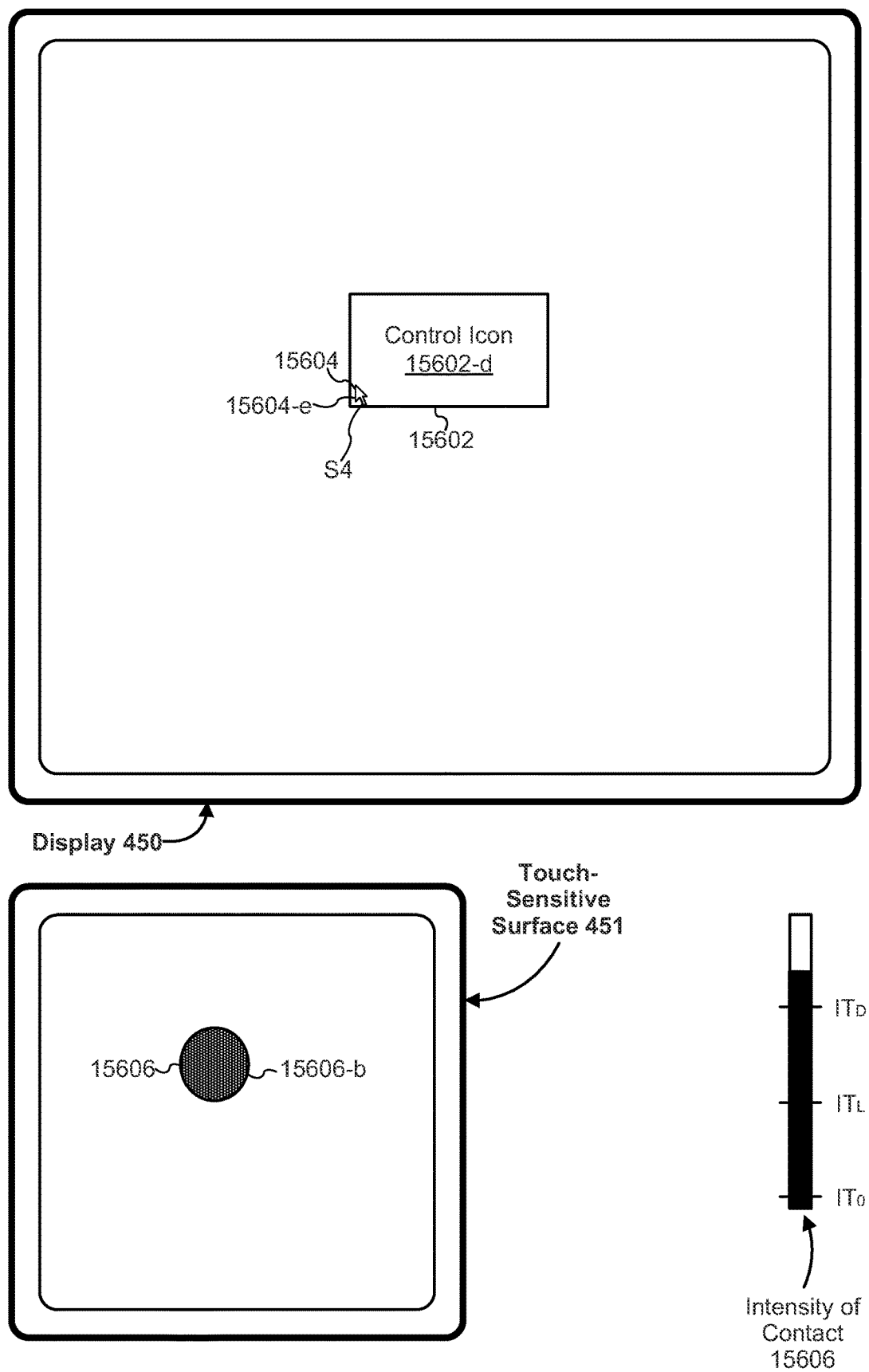

FIGS. 8B-8D and 8G illustrate moving respective control icon 15602 laterally on the display 450 to simulate downward motion of control icon 15602 when viewed at an angle (e.g., control icon 15602 is depressed from a maximum height at position 15602-*a* in FIG. 8B through intermediate heights at positions 15602-*b* and 15602-*c* in FIGS. 8C and 8D, respectively, to a minimum height at position 15602-*d* in FIG. 8G).

FIGS. 8C-8E illustrate detecting, on touch-sensitive surface 451, a decrease in intensity of contact 15606 that corresponds to cursor 15604 (e.g., the intensity of contact 15606 decreases between FIGS. 8D-8E) after detecting the increase in intensity of contact 15606 that corresponds to cursor 15604 (e.g., after detecting the increase in intensity of contact 15606 between FIGS. 8C-8D).

FIGS. 8D-8F illustrate increasing a size of cursor 15604 (e.g., the size of cursor 15604 increases from S3 in FIG. 8D to S2 in FIG. 8E, then to S1 in FIG. 8F) in response to detecting the decrease in intensity of contact 15606 (e.g., between FIGS. 8D-8E) and in accordance with the decrease in intensity of contact 15606 (e.g., the size of cursor 15604 increases as the intensity of contact 15606 decreases between FIGS. 8D-8F).

FIGS. 8E-8F illustrate changing the appearance of respective control icon 15602 in accordance with the simulated three-dimensional characteristics of respective control 15602 icon (e.g., control icon 15602 appears to move upward along the simulated z-axis extending out of the plane of display 450 by moving from position 15602-*c* in FIG. 8D to position 15602-*b* in FIG. 8E, then to position 15602-*a* in FIG. 8F) in response to detecting the decrease in intensity of contact 15606 (e.g., between FIGS. 8D-8E). FIGS. 8E-8F further illustrate moving cursor 15604 laterally on display 450 (e.g., cursor 15604 moves from position 15604-*d* in FIG. 8D to position 15604-*c* in FIG. 8E, then to position 15604-*b* in FIG. 8F) in a direction that is substantially opposite to a direction in which cursor 15604 was moved in response to detecting the increase in intensity of the contact that corresponds to the cursor (e.g., cursor 15604 previously moved from position 15604-*c* in FIG. 8C to position 15604-*d* in FIG. 8D), in response to detecting the decrease in intensity of contact 15606 (e.g., between FIGS. 8D-8E) and in accordance with the change in appearance of respective control icon 15602 (e.g., cursor 15604 moves as control icon 15602 moves upward along the simulated z-axis extending out of the plane of display 450).

FIGS. 8H-8K illustrate displaying a plurality of control icons (e.g., control icons 15608 and 15610) with different simulated three-dimensional characteristics (e.g., different heights, or levels of protrusion, relative to a z-axis extending out of the plane of display 450).

Figure 8H:
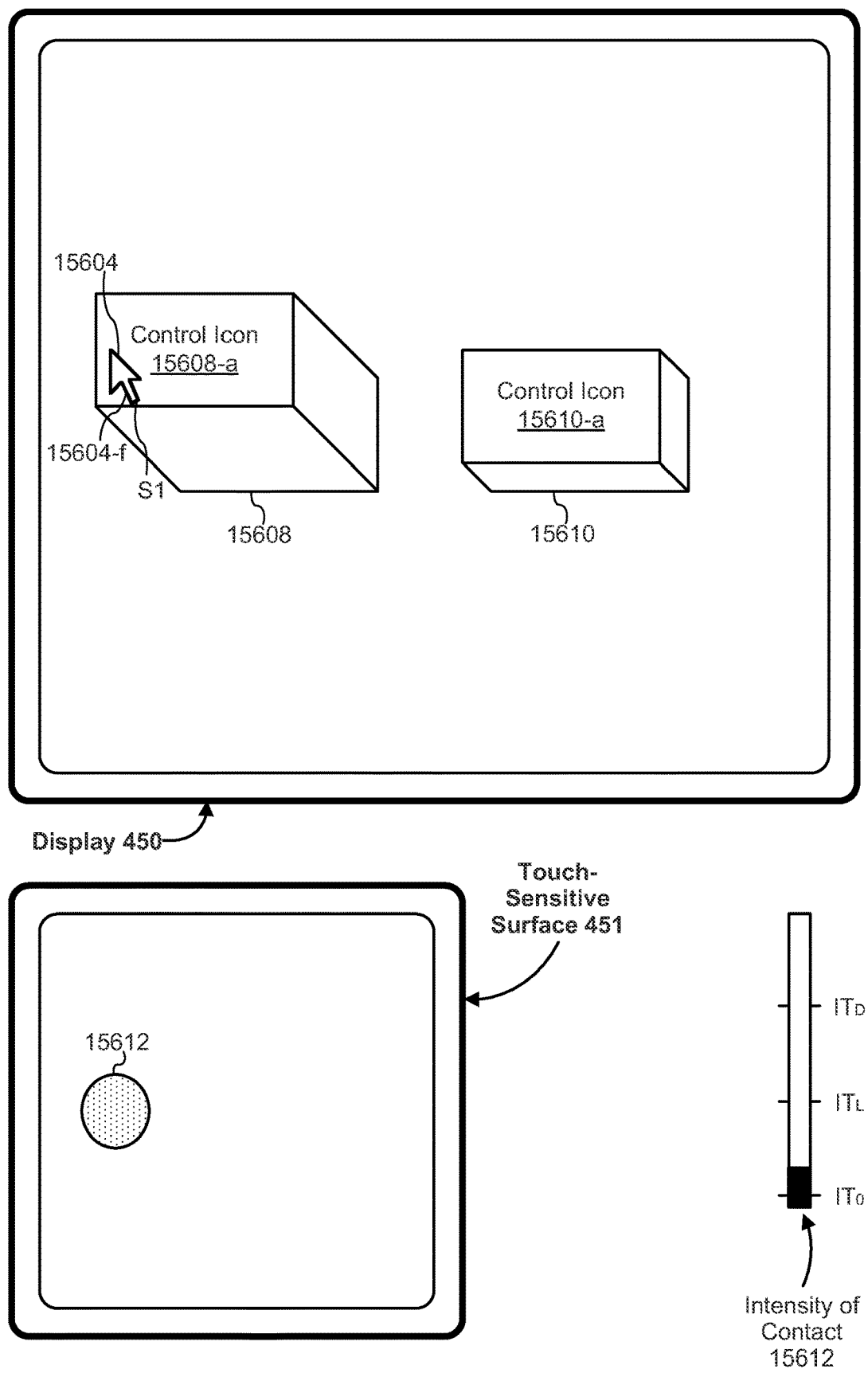
Figure 8I:
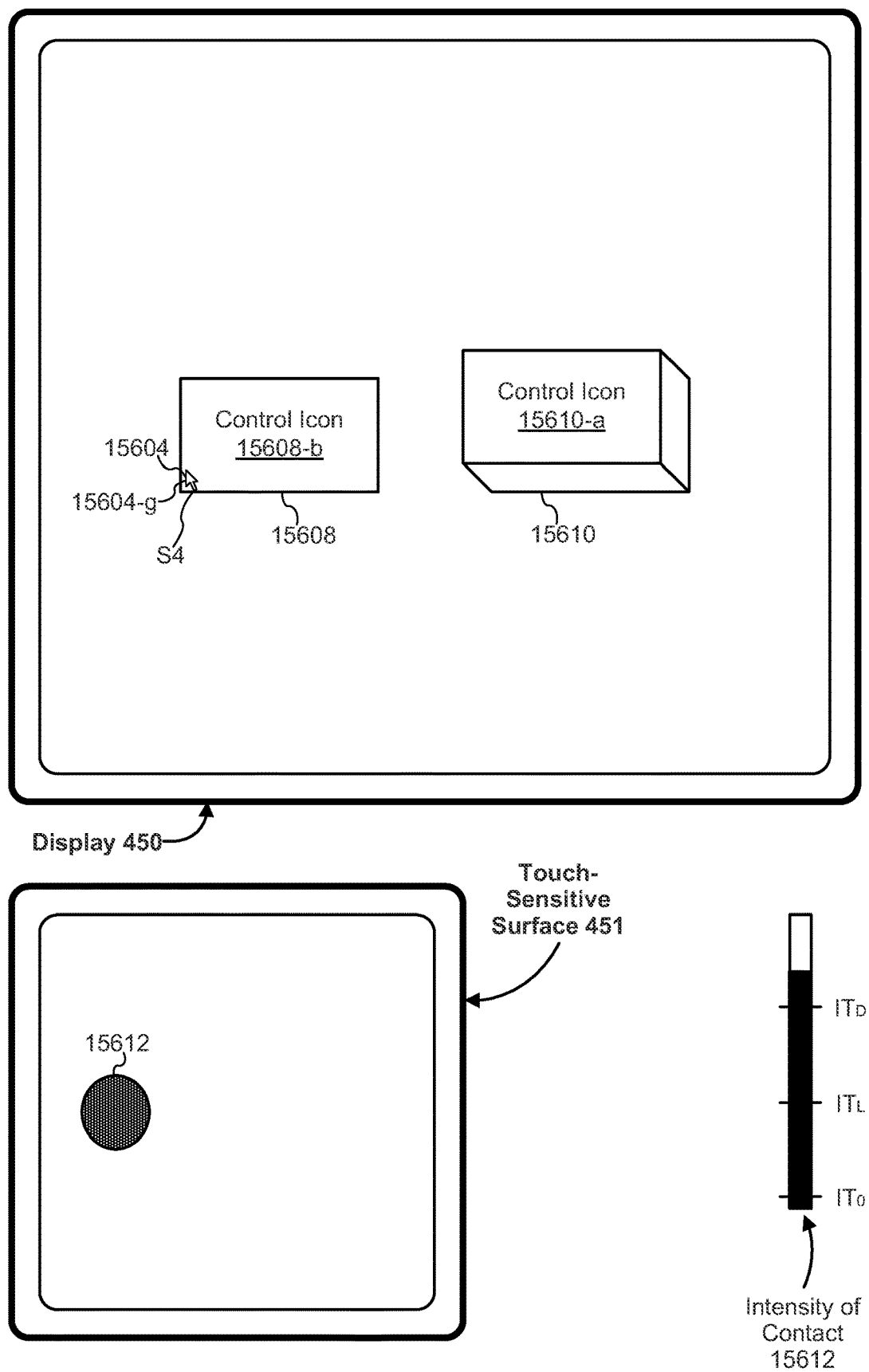

FIGS. 8H-8I illustrate performing a first movement of cursor 15604 (e.g., cursor 15604 moves from position 15604-*f* in FIG. 8H to position 15604-*g* in FIG. 8I) in response to detecting the stationary press input (e.g., contact 15612 is stationary as the intensity of contact 15612 increases between FIGS. 8H-8I) over respective control icon 15608 and in accordance with a determination that the respective control icon is first control icon 15608 with a first simulated three-dimensional characteristic (e.g., a height in excess of control icon 15610). FIGS. 8H-8I further illustrate reducing the size of cursor 15604 (e.g., the size of cursor 15604 reduces from S1 in FIG. 8H to S4 in FIG. 8I) in accordance with the increase in intensity of contact 15612 (e.g., the size of cursor 15604 reduces as the intensity of contact 15612 increases between FIGS. 8H-8I).

Figure 8J:
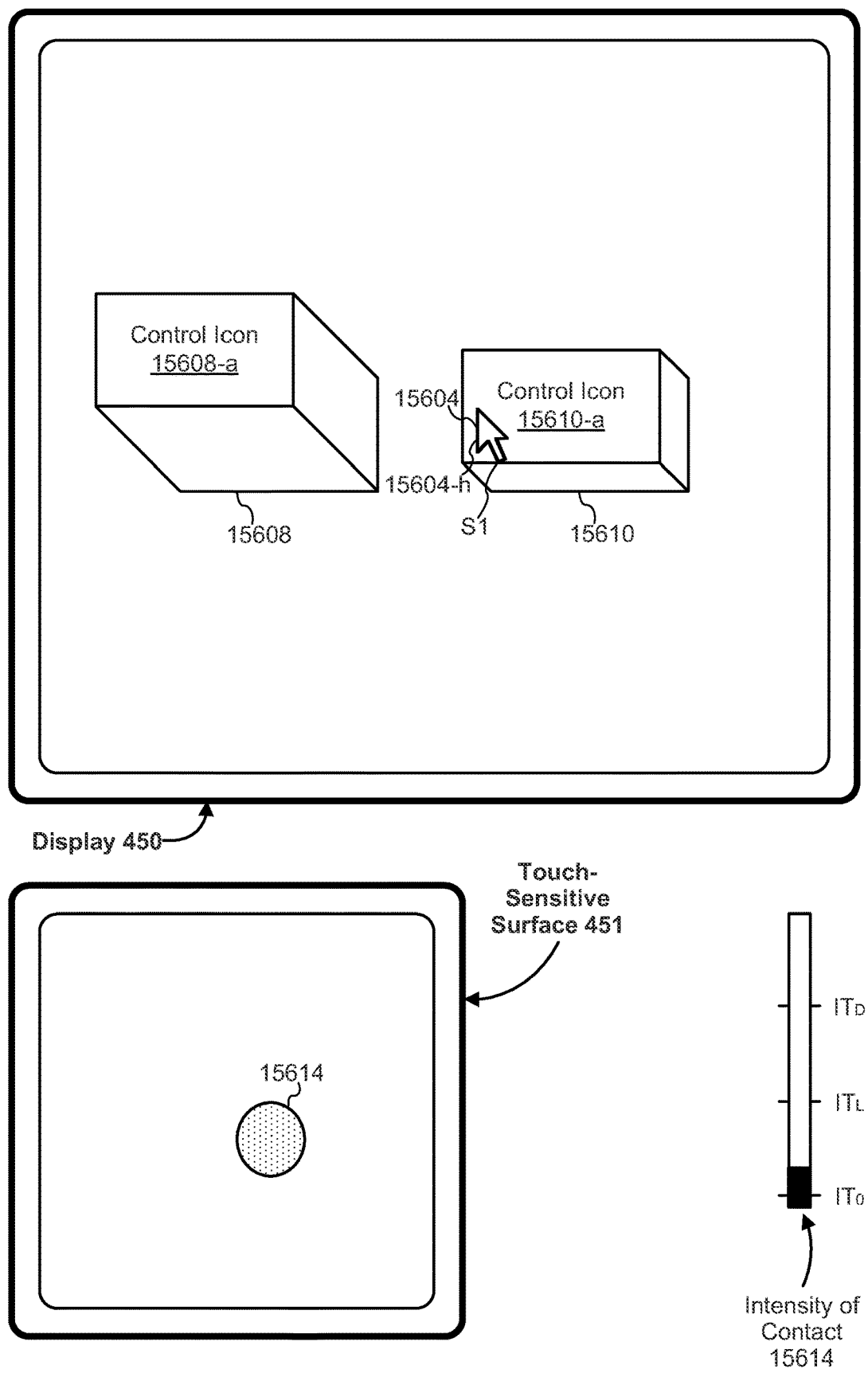
Figure 8K:
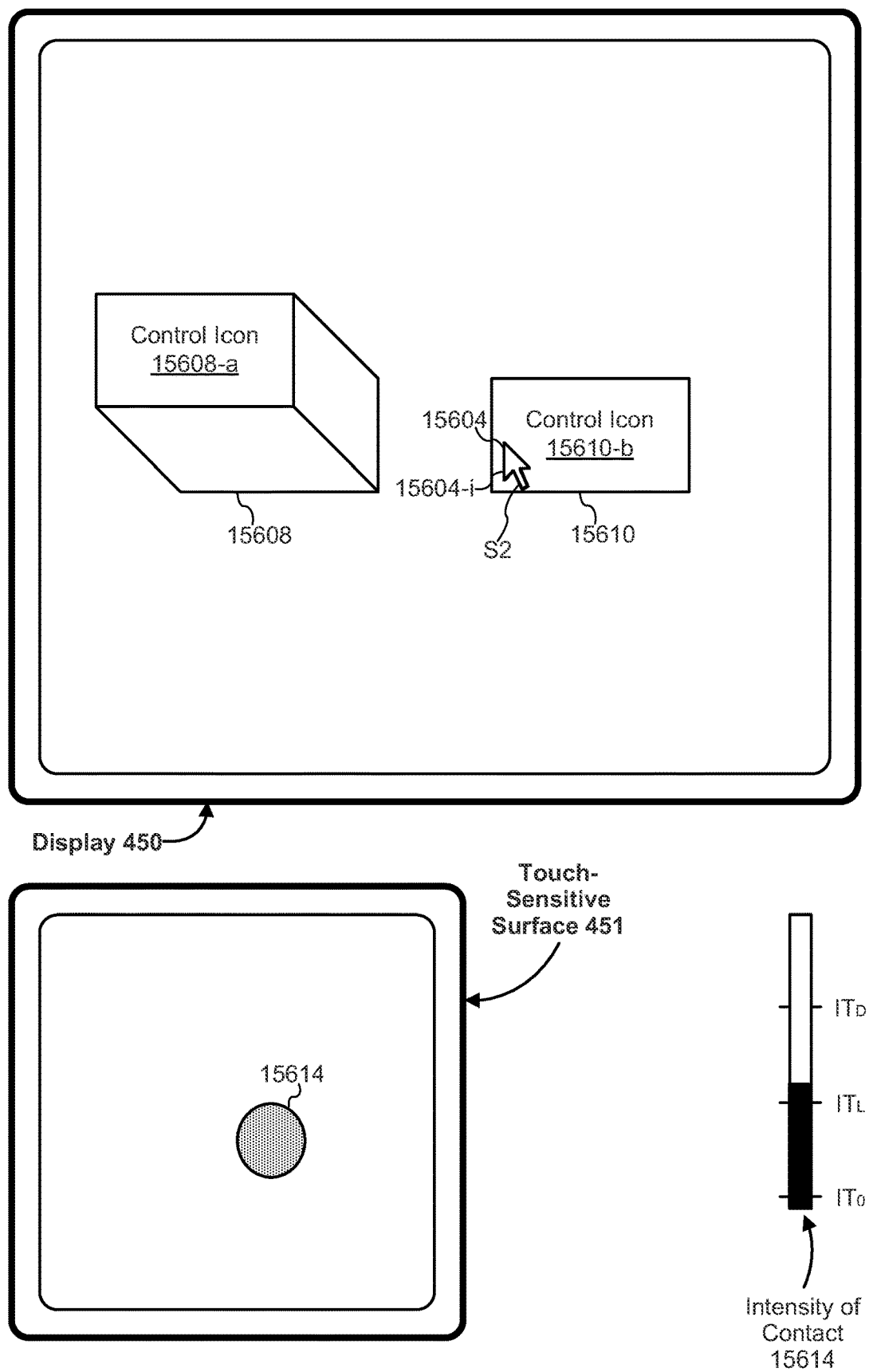

FIGS. 8J-8K illustrate performing a second movement of cursor 15604 (e.g., cursor 15604 moves from position 15604-*h* in FIG. 8J to position 15604-*i* in FIG. 8K), different from the first movement of the cursor (e.g., the movement of cursor 15604 between FIGS. 8H-8I), in response to detecting the stationary press input (e.g., contact 15614 is stationary as the intensity of contact 15614 increases between FIGS. 8J-8K) over respective control icon 15610 and in accordance with a determination that the respective control icon is second control icon 15610 with a second simulated three-dimensional characteristic (e.g., a height, which is less than control icon 15608), different from the first simulated three-dimensional characteristic. FIGS. 8J-8K further illustrate reducing the size of cursor 15604 (e.g., the size of cursor 15604 reduces from S1 in FIG. 8J to S2 in FIG. 8K) in accordance with the increase in intensity of contact 15614 (e.g., the size of cursor 15604 reduces as the intensity of contact 15614 increases between FIGS. 8J-8K).

As shown in FIGS. 8H-8K, the distance between position 15604-*f* and 15604-*g* is greater than the distance between positions 15604-*h* and 15604-*i* (e.g., because control 15608 has a greater simulated height than the simulated height of control 15610 in the z-direction of the user interface). In some circumstances, the press inputs in FIGS. 8H-8I and 8J-8K both include increasing contact 15604 from an intensity below $IT_L$ to an intensity above $IT_D$. In some embodiments, in response to detecting either of the press inputs in FIGS. 8H-8I or 8J-8K, the device changes a size of cursor 15604 between a first size and a second size (e.g., the size of cursor 15604 depends on an intensity of a contact associated with the cursor, while the lateral movement of cursor 15604 depends on a simulated height of a control that is being "pressed" in response to the increase in intensity of the contact).

FIGS. 9A-9C are flow diagrams illustrating a method 15700 of moving a cursor according to a change in an appearance of a control icon with simulated three-dimensional characteristics in accordance with some embodiments. The method 15700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 15700 are, optionally, combined and/or the order of some operations is, optionally, changed.

As described below, the method 15700 provides an intuitive way to move a cursor according to a change in an appearance of a control icon with simulated three-dimensional characteristics. The method reduces the cognitive burden on a user when moving a cursor according to a change in an appearance of a control icon with simulated three-dimensional characteristics, thereby creating a more efficient human-machine interface. For battery-operated electronic devices, enabling a user to move a cursor according to a change in an appearance of a control icon with simulated three-dimensional characteristics faster and more efficiently conserves power and increases the time between battery charges.

The device displays (15702), on a display, a respective control icon (e.g., a virtual button) with simulated three-dimensional characteristics (e.g., a three dimensional shape, drop shadow, etc.). FIG. 8B, for example, shows a respective control icon (e.g., control icon 15602) with simulated three-dimensional characteristics displayed on display 450 (e.g., a height relative to a z-axis extending out of a plane of display 450). The device also displays (15704), on the display, a cursor over (or proximate to) the respective control icon. FIG. 8B, for example, further shows cursor 15604 displayed on display 450 at position 15604-b over control icon 15602.

In some embodiments, prior to detecting a stationary press input, the device detects (15706) a movement of a contact on a touch-sensitive surface, and in response to detecting movement of the contact on the touch-sensitive surface, the device moves the cursor in accordance with the movement of the contact. FIGS. 8A-8B, for example, show the device detecting a movement of contact 15606 from position 15606-a in FIG. 8A to position 15606-b in FIG. 8B on touch-sensitive surface 451 prior to detecting a stationary press input of contact 15606 (e.g., between FIGS. 8B-8C). FIGS. 8A-8B, for example, further show the device moving cursor 15604 from position 15604-a in FIG. 8A to position 15604-b in FIG. 8B on display 450 in accordance with the movement of contact 15606 on touch-sensitive surface 451 (e.g., cursor 15604's movement corresponds to movement of contact 15606 from position 15606-a in FIG. 8A to position 15606-b in FIG. 8B) and in response to detecting the movement of contact 15606.

The device detects (15708), on the touch-sensitive surface, the stationary press input that includes an increase in intensity of a contact that corresponds to the cursor. FIGS. 8B-8C, for example, show detecting the stationary press input (e.g., contact 15606 remains at position 15606-b between FIGS. 8B-8C) that includes an increase in intensity of contact 15606 on touch-sensitive surface 451 (e.g., the intensity of contact 15606 increases from below $IT_L$ in FIG. 8B to above $IT_L$ in FIG. 8C). In this example, contact 15606 on touch-sensitive surface 451 corresponds to displayed cursor 15604 on display 450.

In response to detecting (15710) the stationary press input, the device changes (15712) an appearance of the respective control icon in accordance with the simulated three-dimensional characteristics of the respective control icon (e.g., so that the control icon appears to move downward along the simulated z-axis extending out of the plane of the display). In some embodiments, the simulated z-axis of the display is at an angle with respect to the plane of the display, so that an x-y plane has a vanishing point on the display. FIGS. 8B-8C, for example, show the device changing an appearance of control icon 15602 in accordance with its simulated three-dimensional characteristics (e.g., control icon 15602 appears to depress relative to the simulated z-axis extending out of the plane of the display 450) in response to detecting the stationary press input (e.g., contact 15606 remains at position 15606-b as the intensity of contact 15606 increases between FIGS. 8B-8C).

In some embodiments, the amount of change in appearance of the respective control icon is determined (15714) based on the intensity of the contact on the touch-sensitive surface (e.g., as the contact increases in intensity, the cursor moves laterally in accordance with the intensity or change in intensity of the contact). FIGS. 8B-8D, for example, show the amount of change in appearance of control icon 15602 determined based on the intensity of contact 15606 on touch-sensitive surface 451 (e.g., control icon 15602 depresses from position 15602-a in FIG. 8B to position 15602-b in FIG. 8C as the intensity of contact 15606 increases between FIGS. 8B-8C and control icon 15602 depresses from position 15602-a in FIG. 8B to position 15602-c in FIG. 8D as the intensity of contact 15606 increases between FIGS. 8B-8D).

In some embodiments, the respective control icon moves (15716) laterally on the display to simulate downward motion of a button when viewed at an angle (e.g., the virtual button moves "into" a hole in the display along a z-axis, where the z-axis is at an angle other than 90 degrees with respect to the plane of the display). FIGS. 8B-8C, for example, show control icon 15602 moving laterally on display 450 to simulate downward motion of control icon 15602 when viewed at an angle (e.g., control icon 15602 appears to move downward along the simulated z-axis extending out of the plane of the display 450 from position 15602-a in FIG. 8B to position 15602-b in FIG. 8C).

In response to detecting (15710) the stationary press input, the device moves (15718) the cursor laterally on the display in accordance with the change in appearance of the respective control icon. FIGS. 8B-8C, for example, show cursor 15604 moving laterally on display 450 (e.g., cursor 15604 moves from position 15604-b in FIG. 8B to position 15604-c in FIG. 8C) in accordance with the change in appearance of control icon 15602 (e.g., cursor 15604 moves as control icon 15602 depresses from position 15602-a in FIG. 8B to position 15602-b in FIG. 8C) and in response to detecting the stationary press input (e.g., contact 15606 remains at position 15606-b as the intensity of contact 15606 increases between FIGS. 8B-8C).

In some embodiments, the amount of lateral movement of the cursor on the display is determined (15720) based on an amount of change in appearance of the respective control icon on the display (e.g., as a virtual button is pushed "down" on the display, the cursor moves laterally in accordance with how far down the virtual button has been pushed). FIGS. 8B-8C, for example, show an amount of lateral movement of cursor 15604 on display 450 (e.g., cursor 15604 moves from position 15604-b in FIG. 8B to position 15604-c in FIG. 8C) determined based on the amount of change in appearance of control icon 15602 on display 450 (e.g., cursor 15604 moves as control icon 15602 appears to depress, or be pushed "down," relative to the simulated z-axis extending out of the plane of the display 450 between FIG. 8B-8C).

In some embodiments, the cursor is (15722) stationary relative to the respective control icon, and the cursor moves laterally relative to a background. FIGS. 8B-8C, for example, show cursor 15604 displayed stationary relative to control icon 15602, but cursor 15604 moves laterally from position 15604-*b* in FIG. 8B to position 15604-*c* in FIG. 8C relative to the background of display 450.

In some embodiments, the device reduces (15724) a size of the cursor in accordance with the increase in intensity of the contact. FIGS. 8B-8C, for example, show the device reducing the size of cursor 15604 (e.g., from S1 in FIG. 8B to S2 in FIG. 8C) in accordance with the increase in intensity of contact 15606 on touch sensitive surface 451 (e.g., the size of cursor 15604 reduces as the intensity of contact 15604 increases from below $IT_L$ in FIG. 8B to above $IT_L$ in FIG. 8C).

In some embodiments, after detecting (15726) the increase in intensity of the contact that corresponds to the cursor, the device detects (15728), on the touch-sensitive surface, a decrease in intensity of the contact that corresponds to the cursor (e.g., while continuing to detect the contact on the touch-sensitive surface). FIGS. 8C-8E, for example, show the device detecting a decrease in intensity of contact 15606 on touch-sensitive surface 451 (e.g., the intensity of contact 15606 decreases between FIGS. 8D-8E) that corresponds to the cursor 15604 after the device detected the increase in intensity of contact 15606 (e.g., the intensity of contact 15606 increased between FIGS. 8C-8D) that corresponds to cursor 15604.

In some embodiments, in response to detecting the decrease in intensity of the contact, the device increases (15730) a size of the cursor in accordance with the decrease in intensity of the contact. FIGS. 8D-8E, for example, show the device increasing the size of cursor 15604 (e.g., from S3 in FIG. 8D to S2 in FIG. 8E) in accordance with the decrease in intensity of contact 15606 (e.g., the size of cursor 15604 increases as the intensity of contact 15606 decreases between FIGS. 8D-8F) and in response to detecting the decrease in intensity of the contact between FIGS. 8D-8E.

In some embodiments, in response to detecting the decrease in intensity of the contact, the device changes (15732) the appearance of the respective control icon in accordance with the simulated three-dimensional characteristics of the respective control icon (e.g., so that the control icon appears to move upward along a simulated z-axis out of the display), and the device moves the cursor laterally on the display in accordance with the change in appearance of the respective control icon in a direction that is substantially opposite to a direction in which the cursor was moved in response to detecting the increase in intensity of the contact that corresponds to the cursor. For example, if the cursor moves down and to the left in response to the increase in intensity of the contact during stationary press input, the cursor will move up and to the right in response to detecting a decrease in intensity of the contact.

FIGS. 8D-8E, for example, show the device changing the appearance of control icon 15602 in accordance with its simulated three-dimensional characteristics (e.g., control icon 15602 appears to move upward along the simulated z-axis extending out of the plane of the display 450 as control icon 15602 moves from position 15602-*c* in FIG. 8D to position 15602-*b* in FIG. 8E) and in response to detecting the decrease in intensity of contact 15606. FIGS. 8D-8E, for example, further show the device moving cursor 15604 laterally on display 450 (e.g., cursor 15604 moves from position 15604-*d* in FIG. 8D to position 15604-*c* in FIG. 8E) in a direction that is substantially opposite to a direction in which cursor 15604 was moved in response to detecting the increase in intensity of contact 15606 that corresponds to cursor 15604 (e.g., cursor 15604 previously moved from position 15604-*c* in FIG. 8C to position 15604-*d* in FIG. 8D), in accordance with the change in appearance of the respective control icon (e.g., cursor 15604 moves as control icon 15602 appears to move upward along the simulated z-axis extending out of the plane of the display 450) and in response to detecting the decrease in intensity of contact 15606.

In some embodiments, the device displays (15734) a plurality of control icons with different simulated three-dimensional characteristics (e.g., different "heights" or angles with respect to the z-axis). FIG. 8H, for example, shows the plurality of controls icons (e.g., control icons 15608 and 15610) displayed on display 450 with different simulated three-dimensional characteristics (e.g., the height of control icon 15608 is in excess of the height of control icon 15610).

In some embodiments, in accordance with a determination that the respective control icon is a first control icon with a first simulated three-dimensional characteristic, the device performs (15736) a first movement of the cursor in response to detecting the stationary press input. FIGS. 8H-8I, for example, show the device performing a first movement of cursor 15604 (e.g., cursor 15604 moves from position 15604-*f* in FIG. 8H to position 15604-*g* in FIG. 8I) in accordance with a determination that the respective control icon is first control icon 15608 with the first simulated three-dimensional characteristic (e.g., the height of control icon 15608 is in excess of the height of control icon 15610) and in response to detecting the stationary press input (e.g., contact 15612 is stationary as the intensity of contact 15612 increases between FIGS. 8H-8I) over respective control icon 15608.

In some embodiments, in accordance with a determination that the respective control icon is a second control icon with a second simulated three-dimensional characteristic, different from the first simulated three-dimensional characteristic, the device performs (15738) a second movement of the cursor, different from the first movement of the cursor, in response to detecting the stationary press input (e.g., the first movement and the second movement have a different direction and/or magnitude). For example, if the first button is simulated as being taller than the second button, then the cursor will move farther laterally in response to pressing down the first button down than in response to pressing down the second button. FIGS. 8J-8K, for example, show the device performing a second movement of cursor 15604 (e.g., cursor 15604 moves from position 15604-*h* in FIG. 8J to position 15604-*i* in FIG. 8K) in accordance with a determination that the respective control icon is second control icon 15610 with the second simulated three-dimensional characteristic (e.g., the height of control icon 15610 is less than the height of control icon 15608), different from the first simulated three-dimensional characteristic, and in response to detecting the stationary press input (e.g., contact 15614 is stationary as the intensity of contact 15614 increases between FIGS. 8J-8K) over respective control icon 15610.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the thirty-first paragraph of the Description of Embodiments) are also applicable in an analogous manner to method 15700 described above with respect to FIGS. 9A-9C. For example, the contacts, intensity thresholds, and focus selectors described above with reference to method 15700 optionally have one or more of the characteristics of the contacts, intensity thresholds, and focus selectors described herein with reference to other methods described herein (e.g., those listed in the thirty-first paragraph of the Description of Embodiments). For brevity, these details are not repeated here.

Figure 10:
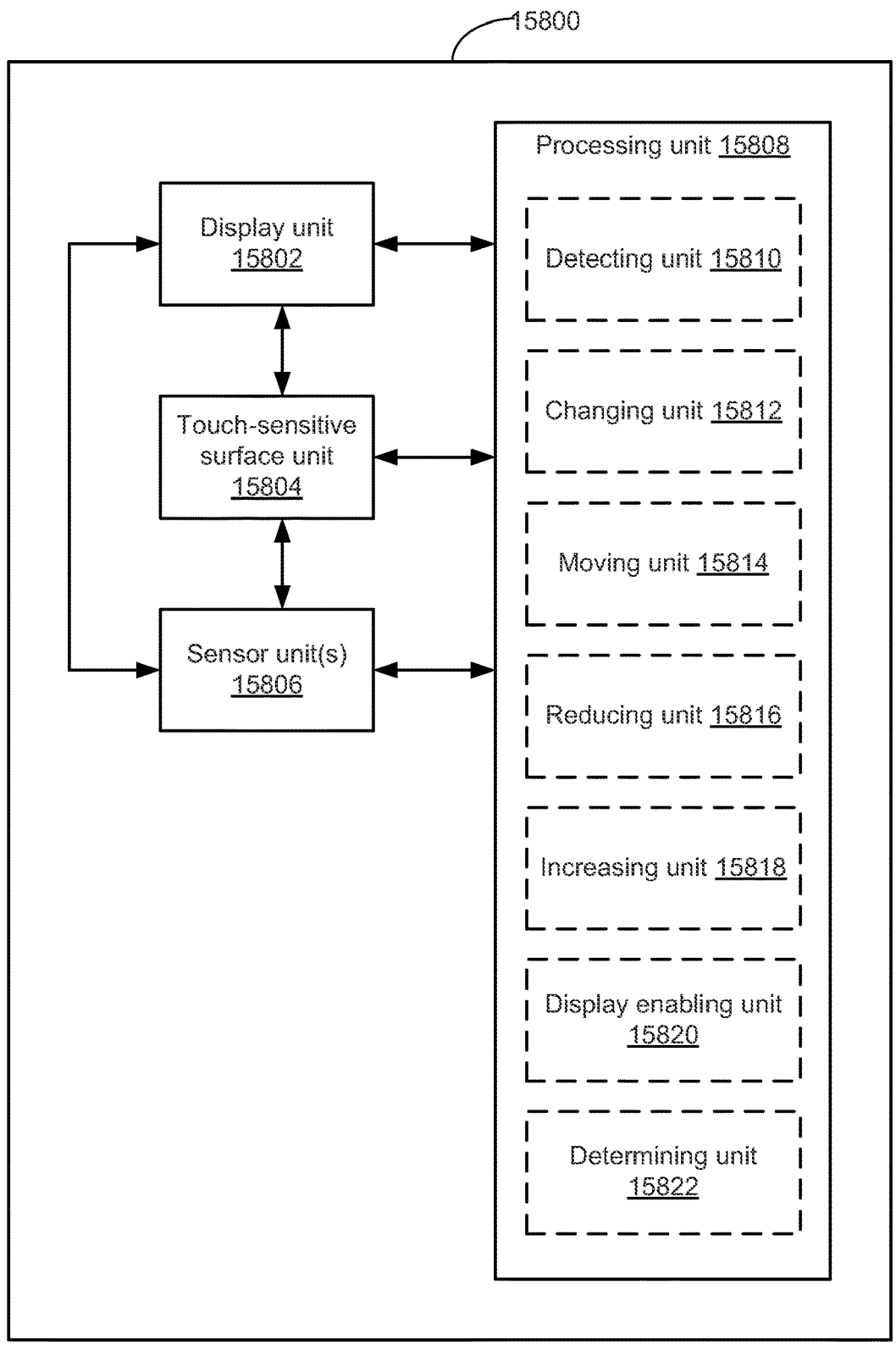
FIG. 10 is a functional block diagram of an electronic device in accordance with some embodiments.

In accordance with some embodiments, FIG. 10 shows a functional block diagram of an electronic device 15800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein supports any possible combination or separation or further definition of the functional blocks described herein.

As shown in FIG. 10, an electronic device 15800 includes: a display unit 15802 configured to display a respective control icon with simulated three-dimensional characteristics and a cursor over the respective control icon; a touch-sensitive surface unit 15804 configured to receive contacts; one or more sensor units 15806 configured to detect intensity of contacts with the touch-sensitive surface unit 15804; and a processing unit 15808 coupled to the display unit 15802, the touch-sensitive surface unit 15804 and the one or more sensor units 15806. In some embodiments, the processing unit 15808 includes a detecting unit 15810, a changing unit 15812, a moving unit 15814, a reducing unit 15816, an increasing unit 15818, a display enabling unit 15820, and a determining unit 15822. In some embodiments, a display control unit replaces and is configured to perform the operations of the changing unit 15812, the moving unit 15814, the reducing unit 15816, the increasing unit 15818 and the display enabling unit 15820.

The processing unit 15808 is configured to detect (e.g., with the detecting unit 15810), on the touch-sensitive surface unit 15804, a stationary press input that includes an increase in intensity of a contact that corresponds to the cursor. In response to detecting the stationary press input, the processing unit 15808 is further configured to: change (e.g., with the changing unit 15812) an appearance of the respective control icon in accordance with the simulated three-dimensional characteristics of the respective control icon; and move (e.g., with moving unit 15814) the cursor laterally on the display unit 15802 in accordance with the change in appearance of the respective control icon.

In some embodiments, the respective control icon moves (e.g., with moving unit 15814) laterally on the display unit 15802 to simulate downward motion of a button when viewed at an angle.

In some embodiments, the cursor is stationary relative to the respective control icon, and the cursor moves (e.g., with moving unit 15814) laterally relative to a background.

In some embodiments, the processing unit 15808 is configured to reduce (e.g., with the reducing unit 15816) a size of the cursor in accordance with the increase in intensity of the contact, in response to detecting the stationary press input.

In some embodiments, the processing unit 15808 is further configured to: detect (e.g., with the detecting unit 15810), on the touch-sensitive surface unit 15804, a decrease in intensity of the contact that corresponds to the cursor after detecting the increase in intensity of the contact that corresponds to the cursor; and in response to detecting the decrease in intensity of the contact, increase (e.g., with the increasing unit 15818) a size of the cursor in accordance with the decrease in intensity of the contact.

In some embodiments, the processing unit 15808 is further configured to detect (e.g., with the detecting unit 15810), on the touch-sensitive surface unit 15804, a decrease in intensity of the contact that corresponds to the cursor after detecting the increase in intensity of the contact that corresponds to the cursor. In response to detecting the decrease in intensity of the contact the processing unit 15808 is configured to: change (e.g., with the changing unit 15812) the appearance of the respective control icon in accordance with the simulated three-dimensional characteristics of the respective control icon; and move (e.g., with the moving unit 15814) the cursor laterally on the display unit 15802 in accordance with the change in appearance of the respective control icon in a direction that is substantially opposite to a direction in which the cursor was moved in response to detecting the increase in intensity of the contact that corresponds to the cursor.

In some embodiments, the processing unit 15808 is further configured to: detect (e.g., with the detecting unit 15810) movement of the contact on the touch-sensitive surface unit 15804 prior to detecting the stationary press input; and move (e.g., with the moving unit 15814) the cursor in accordance with the movement of the contact, in response to detecting the movement of the contact on the touch-sensitive surface unit 15804, prior to detecting the stationary press input.

In some embodiments, the processing unit 15808 is configured to: enable display of (e.g., with the display enabling unit 15820) a plurality of control icons with different simulated three-dimensional characteristics; in accordance with a determination (e.g., with the determining unit 15822) that the respective control icon is a first control icon with a first simulated three-dimensional characteristic, perform a first movement (e.g., with the moving unit 15814) of the cursor in response to detecting the stationary press input; and in accordance with a determination (e.g., with the determining unit 15822) that the respective control icon is a second control icon with a second simulated three-dimensional characteristic, different from the first simulated three-dimensional characteristic, perform a second movement (e.g., with the moving unit 15814) of the cursor, different from the first movement of the cursor, in response to detecting the stationary press input.

In some embodiments, the amount of lateral movement of the cursor on the display unit 15802 is determined based on an amount of change in appearance of the respective control icon on the display unit 15802.

In some embodiments, the amount of change in appearance of the respective control icon is determined based on the intensity of the contact on the touch-sensitive surface unit 15804.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B or FIG. 10. For example, displaying operations 15702-15704, detecting operation 15708, changing operation 15712, moving operation 15718, reducing operation 15722, and increasing operation 15728 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Adjusting Properties of a Virtual Brush

Many electronic devices include applications in which a user can draw drawings on a virtual canvas. In some situations, the user makes drawings by manipulating a user interface object that corresponds to a virtual drawing instrument (e.g., a virtual brush). The virtual drawing instrument includes one or more properties, associated with output generated from the virtual drawing instrument, that are adjustable. However, adjusting these properties frequently involves navigating through a set of menus or controls that can be confusing and time consuming (e.g., to adjust those output properties, the user has to, for example, go through an options menu or select buttons corresponding to the options in a toolbar). The embodiments described below provide a more convenient and intuitive interface by enabling the user to adjust an output property of the virtual drawing instrument with the same contact used for manipulating the user interface object that corresponds to the virtual drawing instrument. By changing the intensity of the contact, the user can adjust an output property (e.g., width, color, opacity,) of the virtual drawing instrument. Additionally, the user interface object optionally includes helpful indications of various output properties of the virtual drawing instrument, thereby providing the user with information that enables the user to use the virtual drawing instrument more quickly and efficiently.

FIGS. 11A-11P illustrate exemplary user interfaces for adjusting properties of a virtual brush in accordance with some embodiments. The user interfaces in these figures are used to illustrate the processes described below, including the processes in FIGS. 12A-12C. FIGS. 11A-11P include intensity diagrams that show the current intensity of the contact on the touch-sensitive surface relative to a plurality of intensity thresholds including: a contact-detection intensity threshold (e.g., $IT_0$) a light press intensity threshold (e.g., "$IT_L$") that, optionally, corresponds to a minimum threshold for activating or enabling virtual brush input; and a deep press intensity threshold (e.g., "$IT_D$") that, optionally, corresponds to a threshold corresponding to a maximum virtual brush output width or thickness.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 11A-11P and FIGS. 12A-12C will be discussed with reference to display 450 and a separate touch-sensitive surface 451, however analogous operations are, optionally, performed on a device with a touch-sensitive display system 112 in response to detecting the contacts described in FIGS. 11A-11P on the touch-sensitive display system 112 while displaying the user interfaces shown in FIGS. 11A-11P on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 16810.

FIG. 11A illustrates virtual canvas 16802 displayed on display 450. Virtual canvas 16802 is associated with an application, such as a drawing application or a presentation application. A user will, in some circumstances, draw lines, curves, etc. on virtual canvas 16802 with a virtual brush associated with virtual canvas 16802. The virtual brush is represented on display 450 by brush manipulation object 16804. Output from the virtual brush (e.g., virtual brush strokes, such as a line, drawn on virtual canvas 16802) is controlled in accordance with one or more output properties of the virtual brush and movement of brush manipulation object 16804 on display 450. In some embodiments, the properties include one or more of width, thickness, color, opacity, and brush hardness (e.g., whether the virtual brush output more resembles strokes from an instrument with a softer tip, such as a physical paint brush, or from an instrument with a harder tip, such as a pen or marker).

A brush manipulation object includes one or more status indicators. For example, brush manipulation object 16804 includes output status indicator(s) 16806 and brush status boundary 16808. Brush manipulation object 16804 include four output status indicators 16806. The output status indicators 16806 move (e.g., converge) toward brush status boundary 16808 as an intensity of a contact controlling brush manipulation object 16804, detected on touch-sensitive surface 451, increases, and move away from brush status boundary 16808 as the intensity of the contact decreases. In some embodiments, brush status boundary 16808 is represented as a circle (e.g., as shown in FIGS. 11A-11M).

A focus selector (e.g., cursor 16810) is also displayed on display 450. In some embodiments, cursor 16810 is a pointer.

FIG. 11A illustrates contact 16812 being detected on touch-sensitive surface 451 (e.g., with an intensity slightly above $IT_0$) at location 16812-*a* while cursor 16810 is located over brush manipulation object 16804. Movement 16814 of contact 16812 from location 16812-*a* (FIG. 11A) to location 16812-*b* (FIG. 11B) is detected. In response to detection of the movement of contact 16812, cursor 16810 is moved to location 16810-*b* and brush manipulation object 16804 is moved to location 16804-*b*, as shown in FIG. 11B.

Figure 11B:
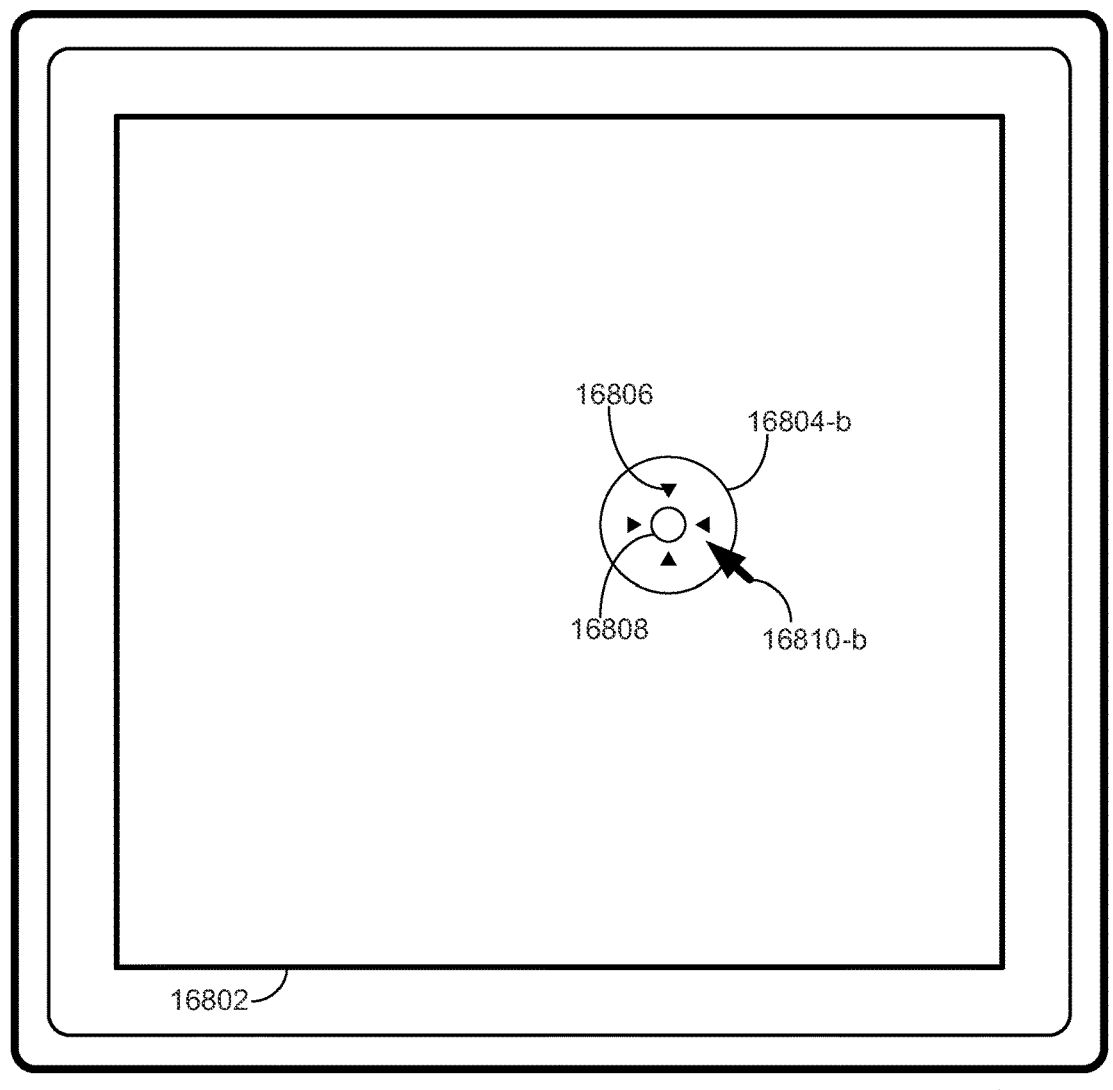
Figure 11B:
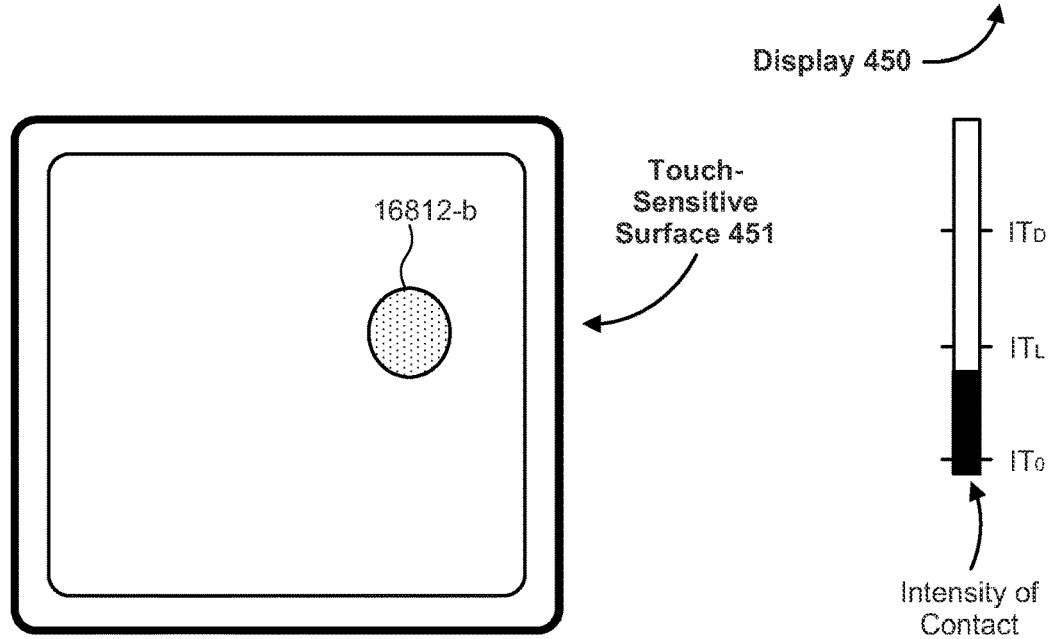

In FIGS. 11A-11B, while cursor 16810 is located over brush manipulation object 16804, the intensity of contact 16812 is increased (e.g., from an intensity slightly above $IT_0$ in FIG. 11A to an intensity slightly below $IT_L$ in FIG. 11B). As the intensity of contact 16812 increases, output status indicators 16806 converge toward brush status boundary 16808. The intensity of contact 16812 in FIG. 11B does not increase above a minimum intensity threshold (e.g., $IT_L$ in FIGS. 11A-11P) for enabling output from brush manipulation object 16804. In accordance with the increase in the intensity of contact 16812, where the intensity does not increase above threshold $IT_L$, no virtual brush output is generated along the movement path of brush manipulation object 16804. This no-output status is indicated by output status indicators 16806 converging toward but not reaching brush status boundary 16808. However, the movement of the status indicators 16806 provides visual feedback to the user indicating progress of the user towards starting to draw with the virtual brush and indicating an additional amount of intensity that would cause the virtual brush to start drawing on the virtual canvas.

Thus, whether a virtual brush output is generated, as a brush manipulation object (e.g., brush manipulation object 16804) moves across a virtual canvas, and the type of output that is generated, is based on the intensity of the contact controlling the brush manipulation object (e.g., contact 16812 or 16816). As the intensity changes, the appearance of the brush manipulation object changes. In some embodiments, a status boundary (e.g., status boundary 16808, corresponding to the minimum intensity threshold for enabling output, such as $IT_L$) indicates a point at which the contact has a sufficiently high intensity to activate generation of virtual brush output. In some embodiments, a change in the appearance of the brush manipulation object in accordance with the change in intensity includes one or more output status indicators (e.g., output status indicators 16806) moving toward or away from a brush status boundary (e.g., brush status boundary 16808).

Figure 11C:
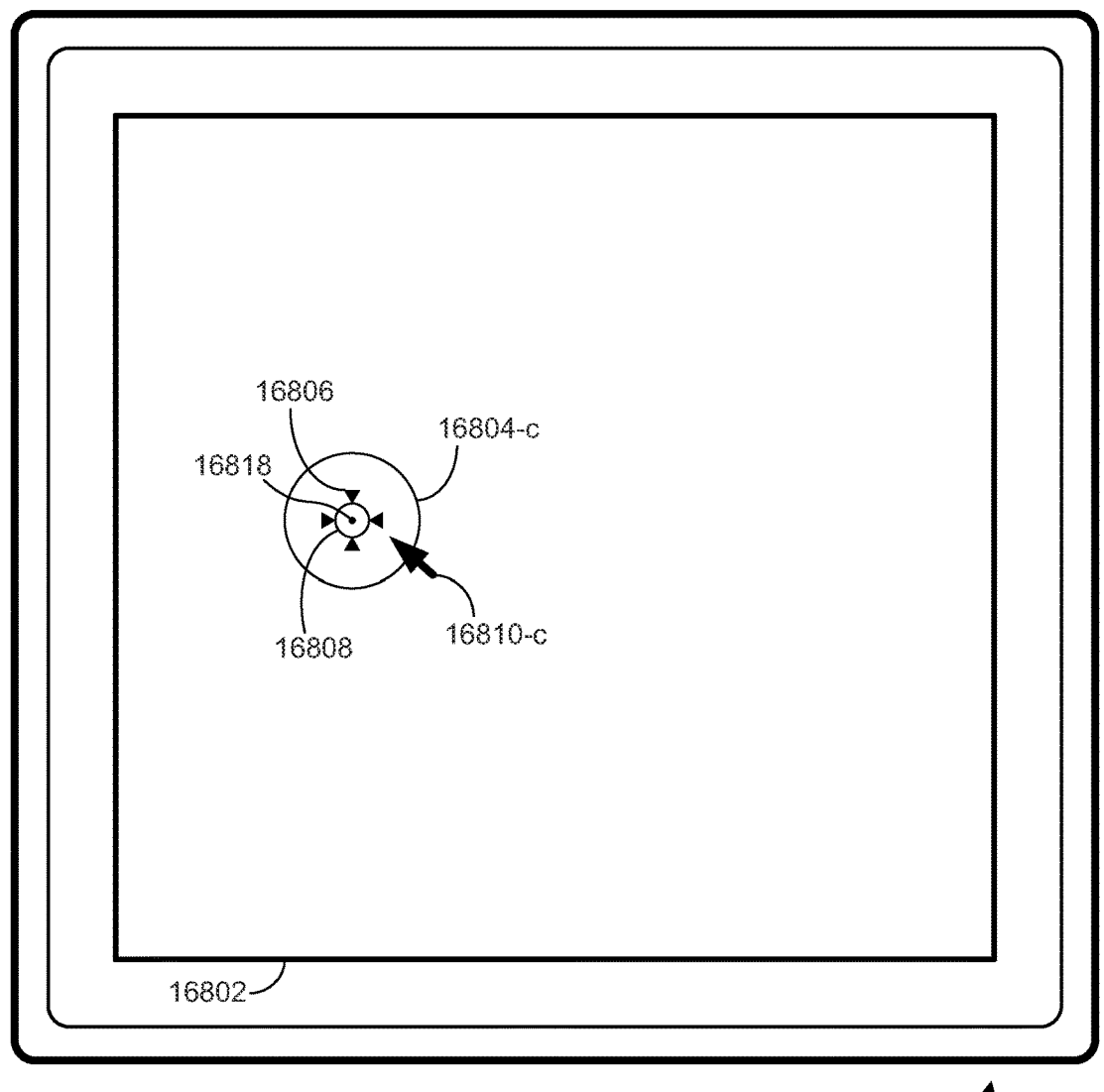
Figure 11C:
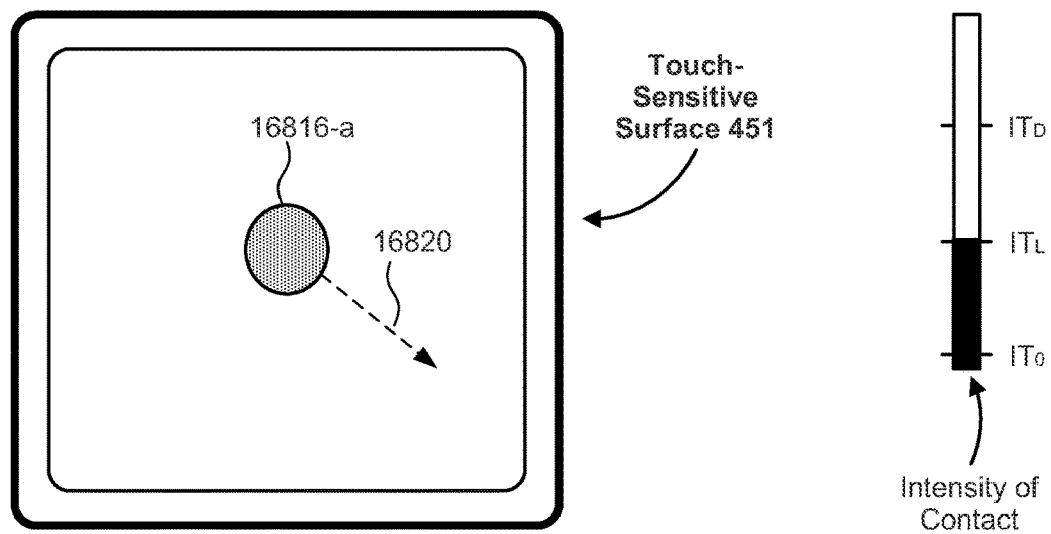

FIG. 11C illustrates brush manipulation object 16804 displayed at location 16804-c. Cursor 16810 is displayed over brush manipulation object 16804, at location 16810-c. Contact 16816 is detected on touch-sensitive surface 451 at location 16816-a. An increase in the intensity of contact 16816 from an intensity below $IT_L$ (e.g., an intensity slightly above $IT_0$) to an intensity above threshold $IT_L$ is detected. In response to the detection of the intensity increase, generation of virtual brush output from brush manipulation object 16804 is enabled, indicated by output status indicators 16806 converging to touch brush status boundary 16808 and output indicator 16818 being displayed in brush manipulation object 16804. In some embodiments, output indicator 16818 gives a visual indication of, not only that generation of virtual brush output is enabled, but also a width or thickness (and optionally also color and/or opacity) of the output (e.g., virtual brush strokes) that is generated as brush manipulation object 16804 moves across virtual canvas 16802. For example, output indicator 16818 has a width, color, and/or opacity that matches the corresponding output width, color, and/or opacity of the virtual brush. In some embodiments, output indicator 16818 is displayed in the center or centroid position of brush manipulation object 16804 and remains in the center/centroid position of brush manipulation object 16804 as brush manipulation object 16804 moves across virtual canvas 16802.

Figure 11D:
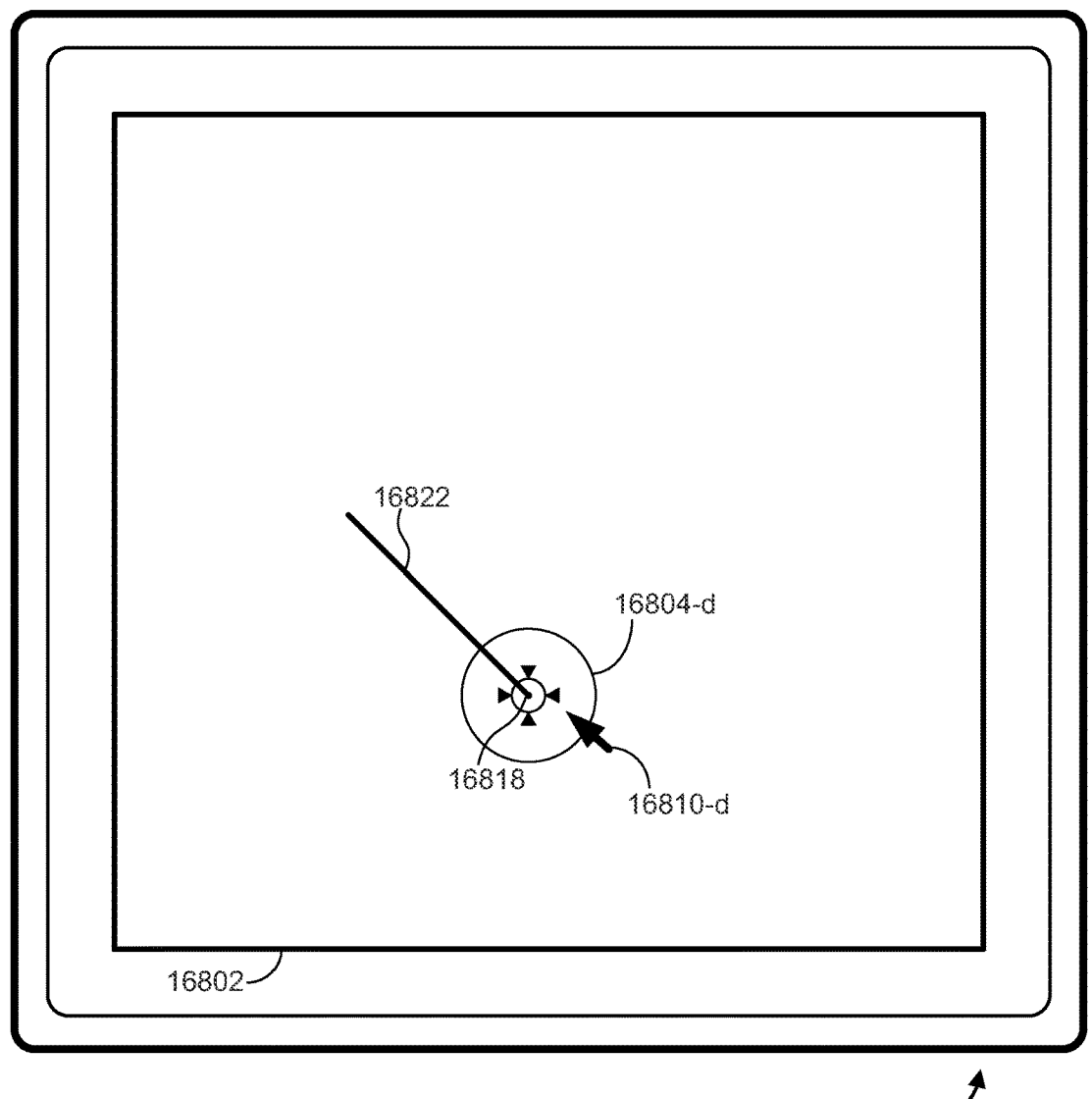
Figure 11D:
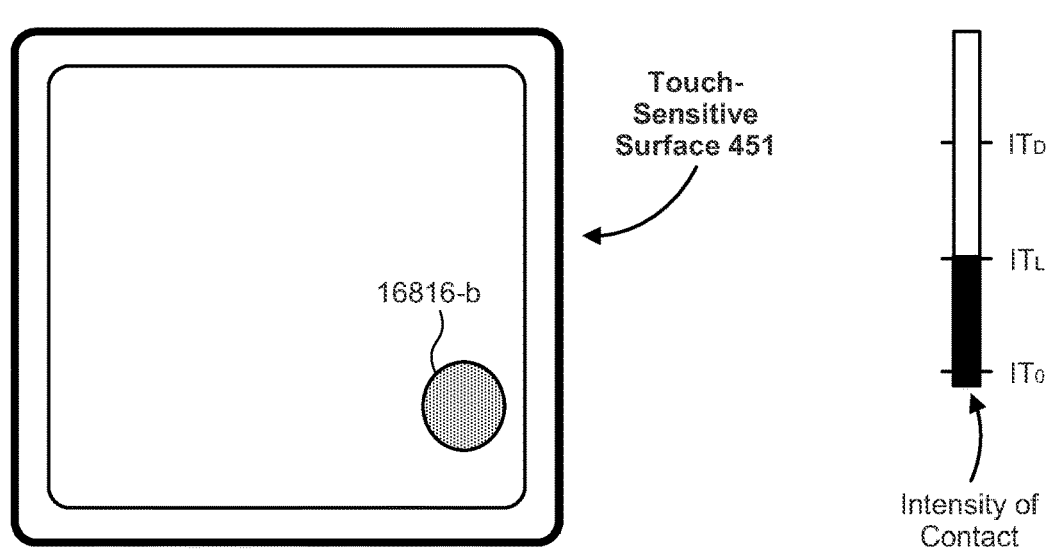

FIGS. 11C-11D illustrates contact 16816 moving 16820, to location 16816-b on touch-sensitive surface 451, while the intensity of contact 16816 is above $IT_L$. In response to detection of the movement of contact 16816, cursor 16810 moves to location 16810-d, brush manipulation object 16804 moves to location 16804-d, and stroke 16822 (e.g., a line) is generated on virtual canvas 16802 in accordance with the movement of brush manipulation object 16804 (e.g., along the path of output indicator 16818), as shown in FIG. 11D. Stroke 16822 has a width that is determined in accordance with the intensity of contact 16816. For example, at an intensity of contact 16816 that is within a predefined range above threshold $IT_L$, stroke 16822 has an initial line width, and the size of output indicator 16818 corresponds to this initial line width. In some embodiments, the line width or thickness changes continuously in accordance with the change in the contact intensity (while the intensity remains above threshold $IT_L$). In some embodiments, the line width or thickness changes discretely in accordance with the change in the contact intensity. For example, an intensity within a first incremental range of intensities above threshold $IT_L$ corresponds to a first line width, and an intensity within the next incremental range of intensities correspond to a second, different line width.

Figure 11E:
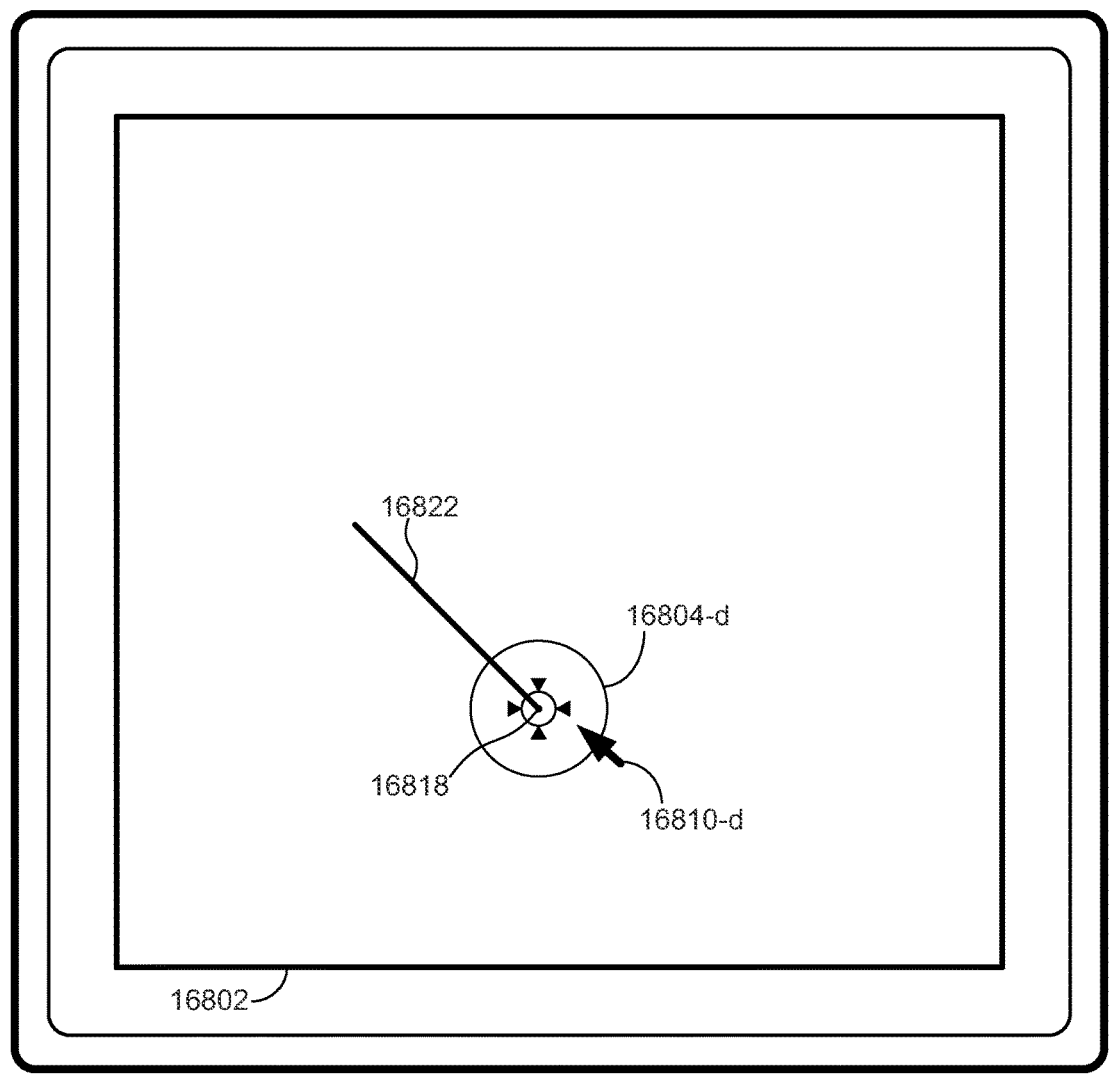
Figure 11E:
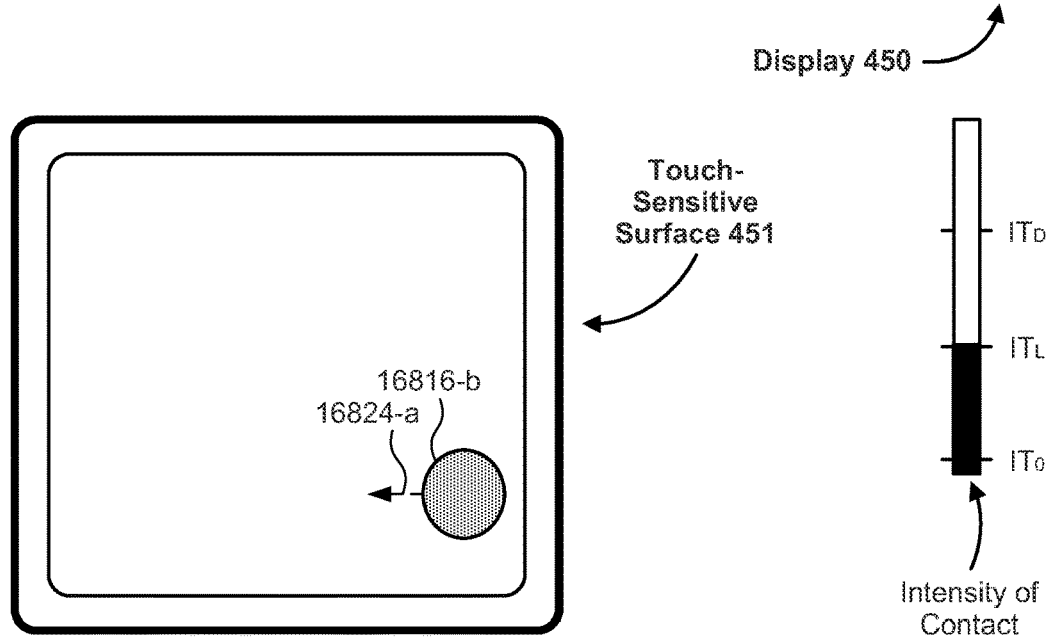
Figure 11F:
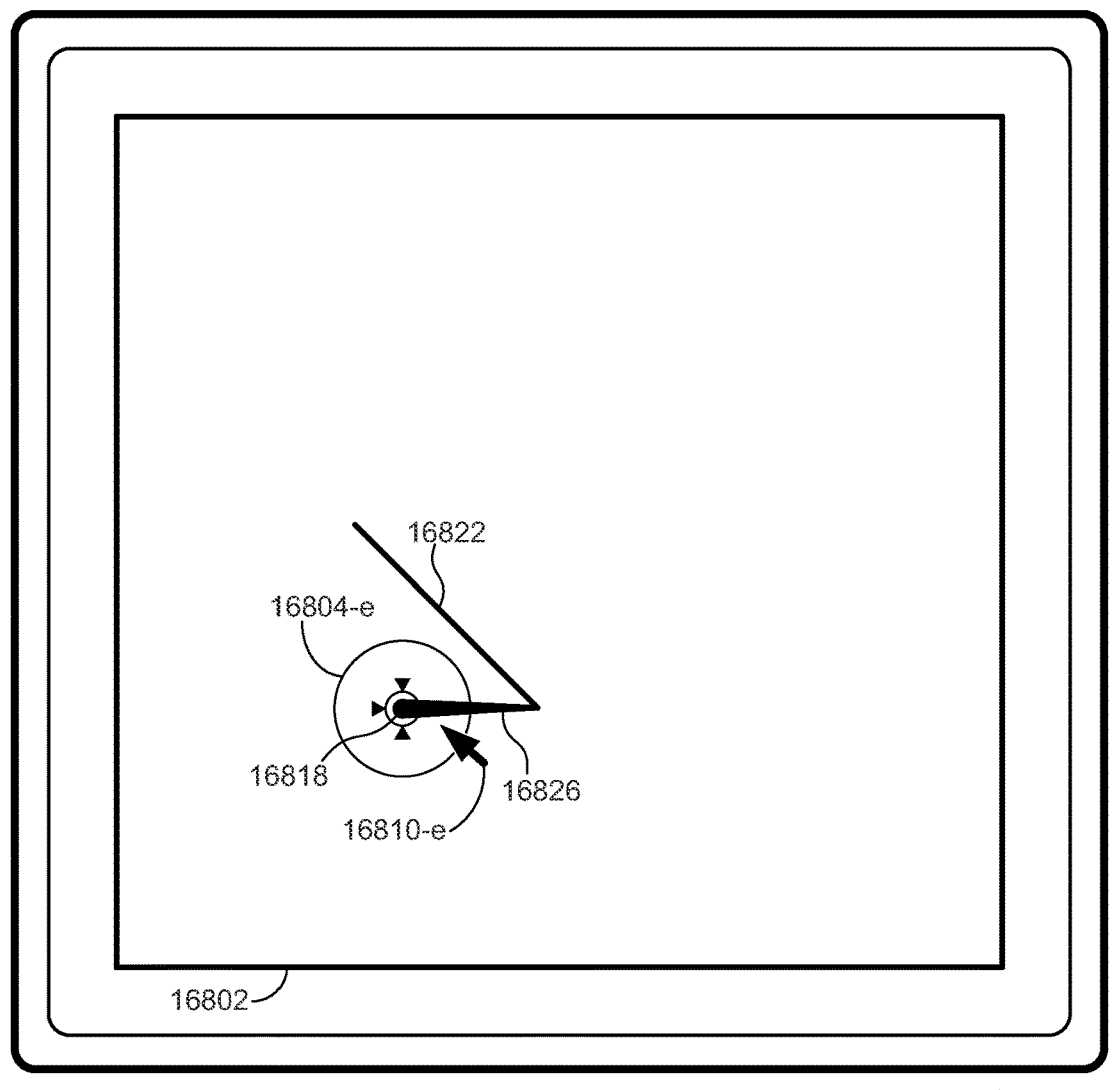
Figure 11F:
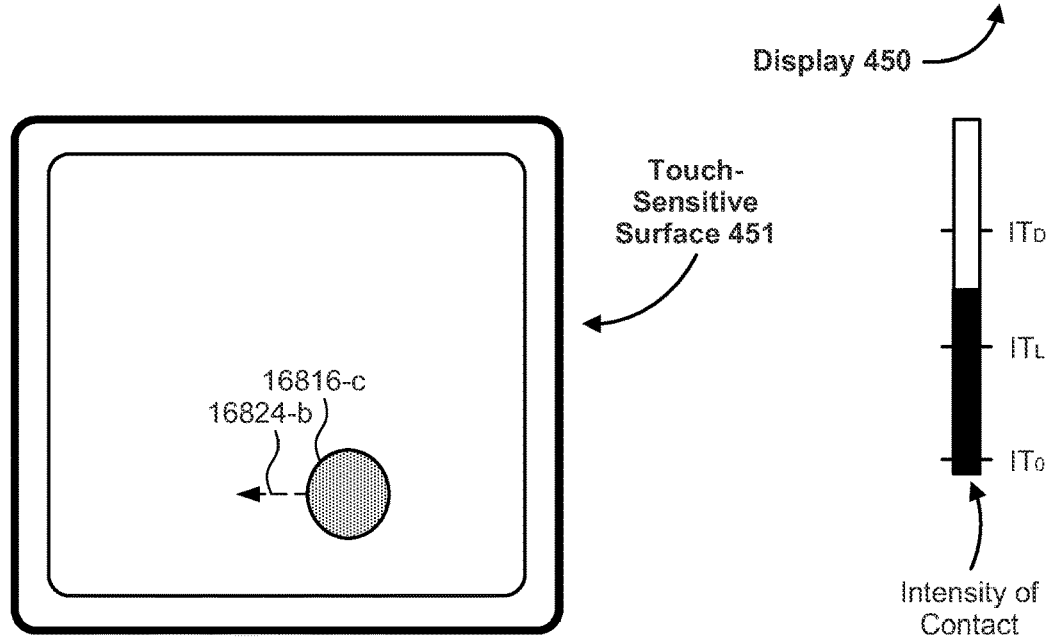
Figure 11G:
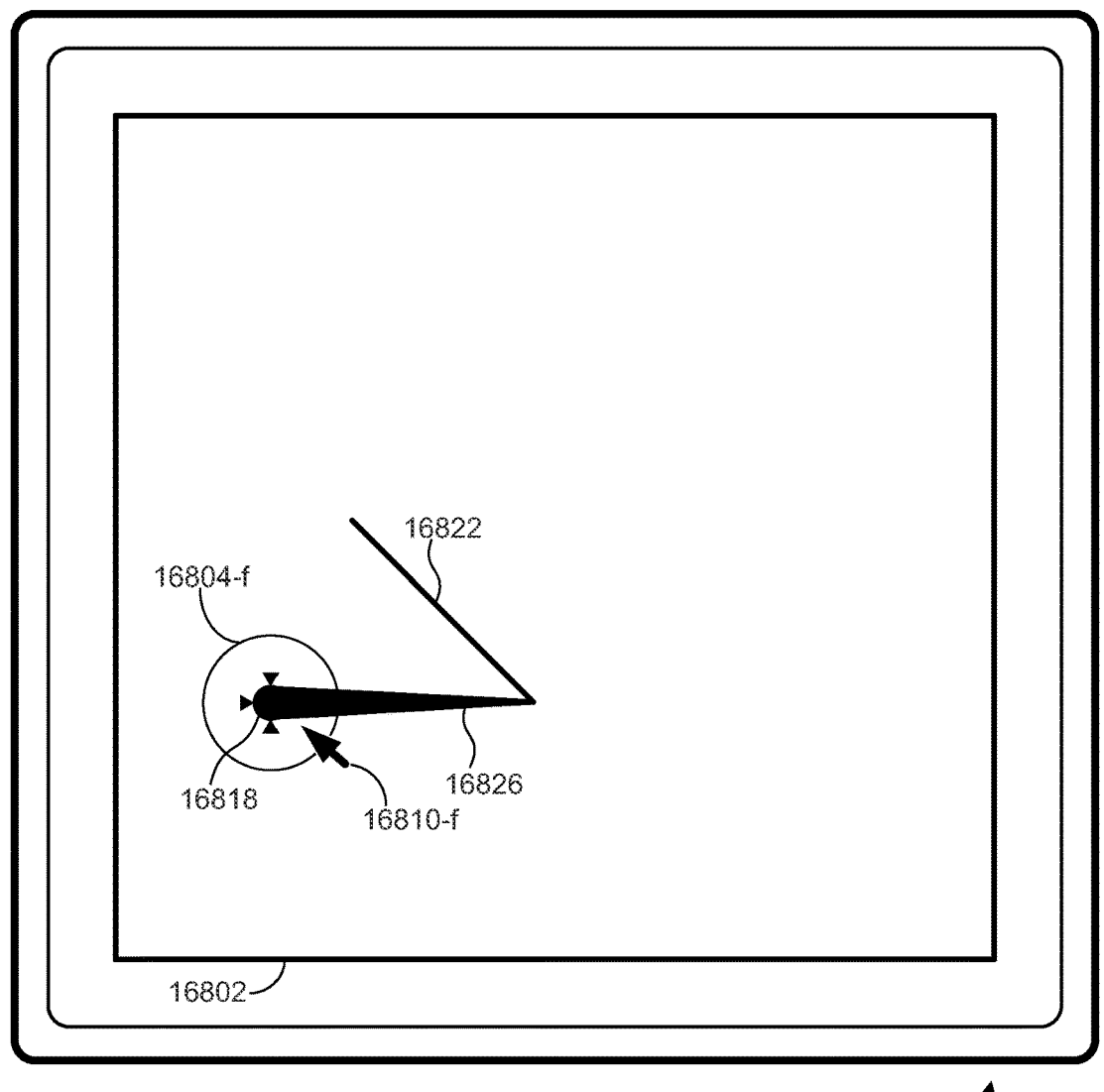
Figure 11G:
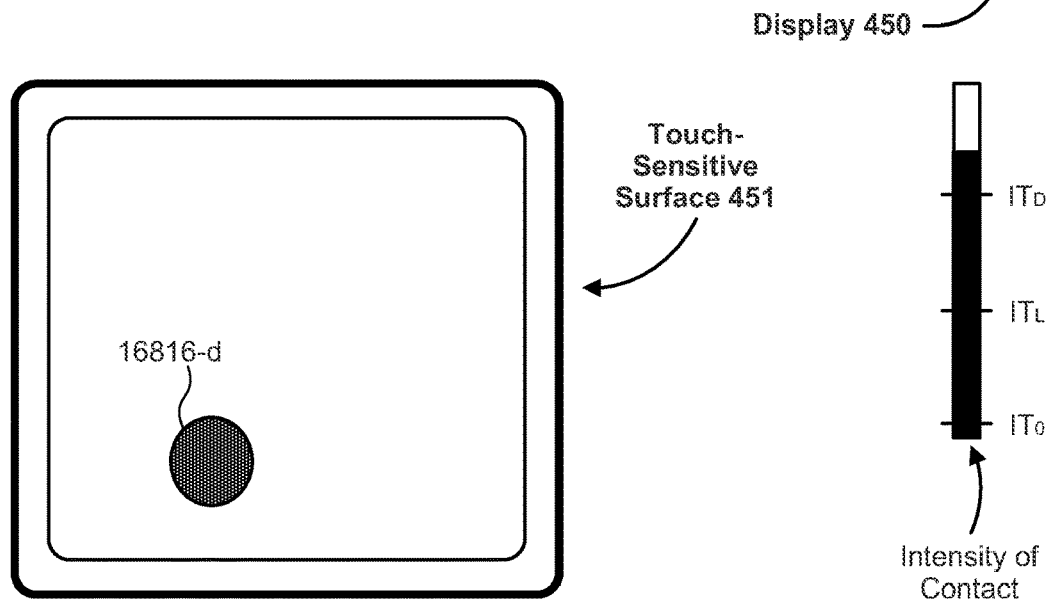

FIGS. 11E-11G illustrate continued movement 16824 of contact 16816, toward location 16816-d. While contact 16816 moves 16824-a from location 16816-b in FIG. 11E to location 16816-c in FIG. 11F and then moves 16824-b to location 16816-d in FIG. 11G, the intensity of contact 16816, already above threshold $IT_L$, is increased further. In response to detection of the movement 16824 of contact 16816 in FIGS. 11E-11G, cursor 16810 moves to location 16810-e in FIG. 11F and location 16810-g in FIG. 11G, brush manipulation object 16804 moves to location 16804-e in FIG. 11F and location 16804-g in FIG. 11G, and stroke 16826 is generated on virtual canvas 16802 in accordance with the movement of brush manipulation object 16804, as shown in FIGS. 11F-11G. The width of stroke 16826 increases, and output indicator 16818 increases in size, in accordance with the increase in the intensity of contact 16816 as brush manipulation object 16804 moves.

Virtual brush output (e.g., stroke 16822 and/or 16826) generated from brush manipulation object 16804 optionally has a maximum width or thickness, which corresponds to a predefined intensity threshold (e.g., $IT_D$). In some embodiments, the size of brush status boundary 16808 corresponds to the maximum width or thickness. For example, as the intensity of contact 16816 increases above $IT_L$, output indicator 16818 increases in size to reflect the increasing width/thickness, in accordance with the increase in the intensity. When the intensity is increased to $IT_D$, the size of output indicator 16818 is the size of brush status boundary 16808. If the intensity of contact 16816 is increased above $IT_D$, the line width or thickness does not increase further, and the size of output indicator 16818 does not increase further.

In FIGS. 11C-11G, increases in the intensity above $IT_L$ the device changes the line width or thickness. In some embodiments, intensity increases above $IT_L$ the device changes other properties of virtual brush output generated from the brush manipulation object, such as the color or opacity (e.g., instead of or in addition to the line width or thickness). For example, increasing the intensity makes the stroke less transparent. As another example, increasing the intensity changes the color of the stroke or, for a particular color of the stroke, the shade of the color (e.g., lighter or darker shade). In some embodiments, the output property that is controlled by the contact intensity is user-changeable (e.g., in an options menu).

In some embodiments, when a property of virtual brush output generated from a brush manipulation object (e.g., brush manipulation object 16804) is changed in accordance with a change in the intensity of a contact controlling the brush manipulation object, the property change affects virtual brush output generated after the change in the property; already-generated virtual brush output is unaffected. For example, when a stroke is being drawn and the width is changed while the drawing is in progress, the width of the already-drawn portion of the stroke is unchanged and the portion of the stroke drawn after the width change has the new width. As another example, when the color is changed between strokes, the color of the stroke drawn prior to the color change is unaffected by the color change.

Figure 11H:
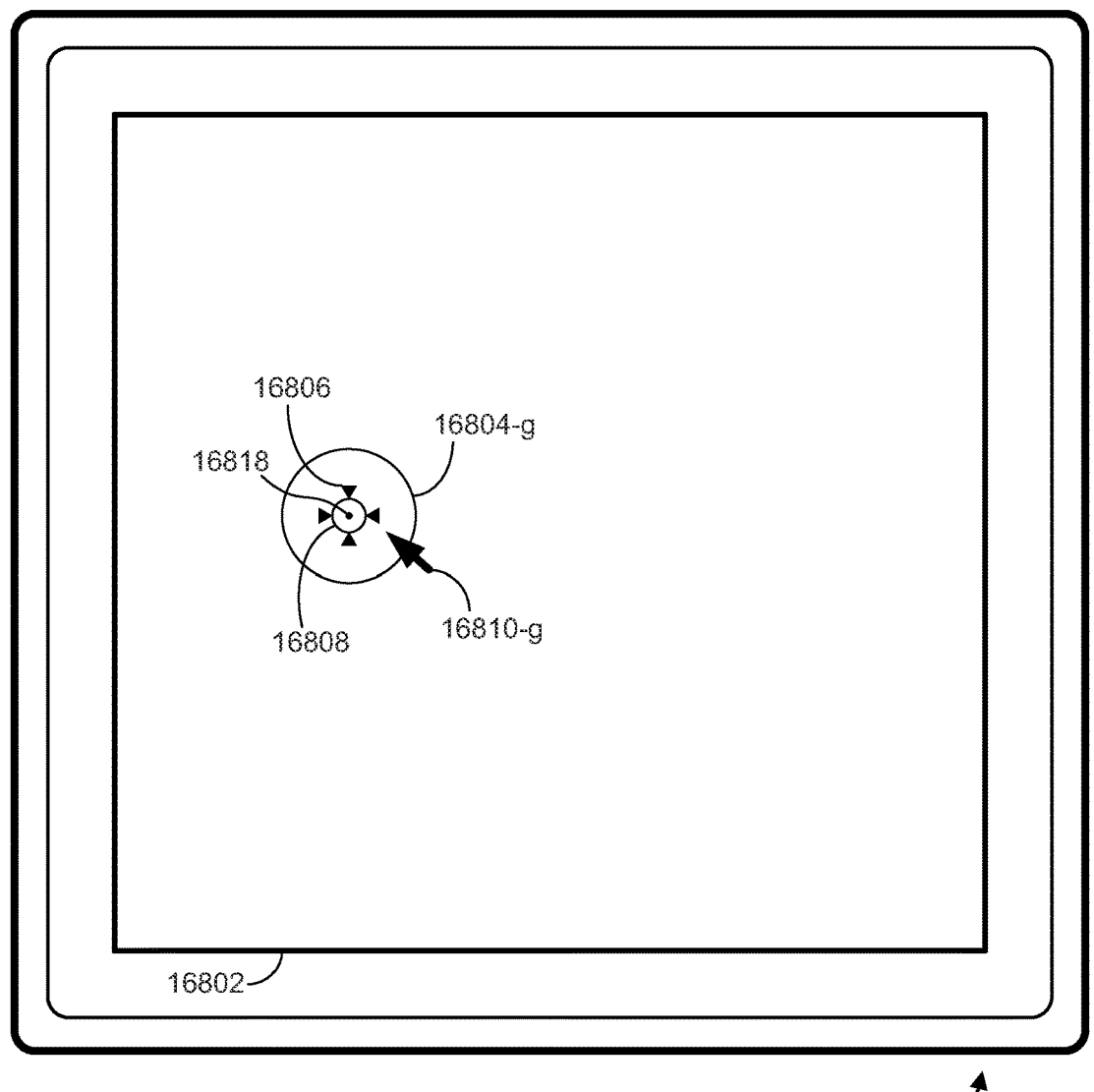
Figure 11H:
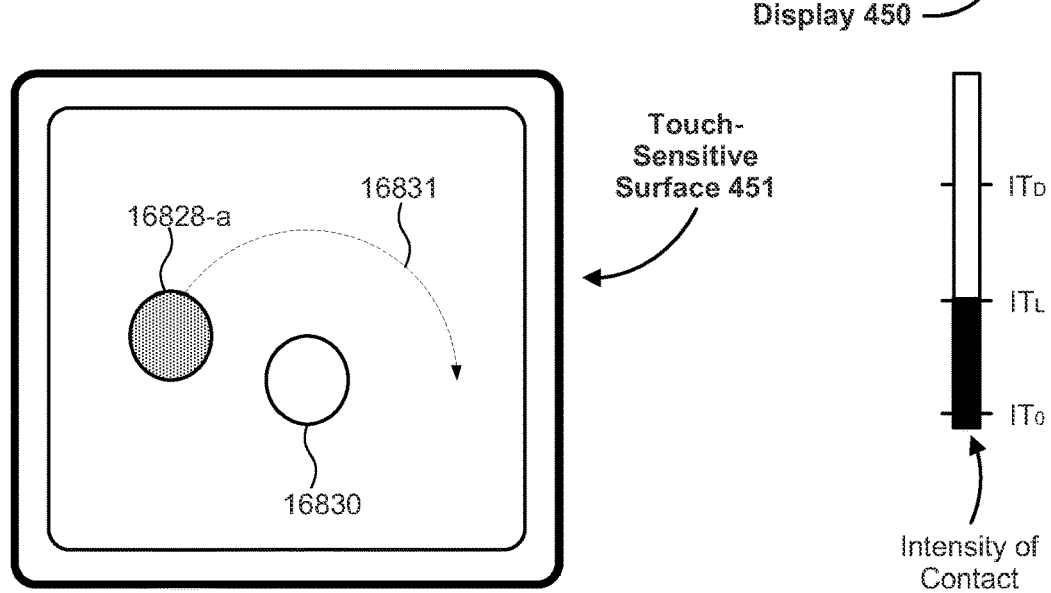

FIG. 11H illustrates brush manipulation object 16804 displayed at location 16804-g. Cursor 16810 is displayed over brush manipulation object 16804, at location 16810-g. Contact 16828 is detected on touch-sensitive surface 451 at location 16828-a. Contact 16828 has an intensity that is above $IT_L$; virtual brush output is enabled and output indicator 16818 is displayed in brush manipulation object 16804. A second contact, contact 16830, is also detected on touch-sensitive surface 451. Movement 16831 of contact 16828 around contact 16830, is detected.

Figure 11I:
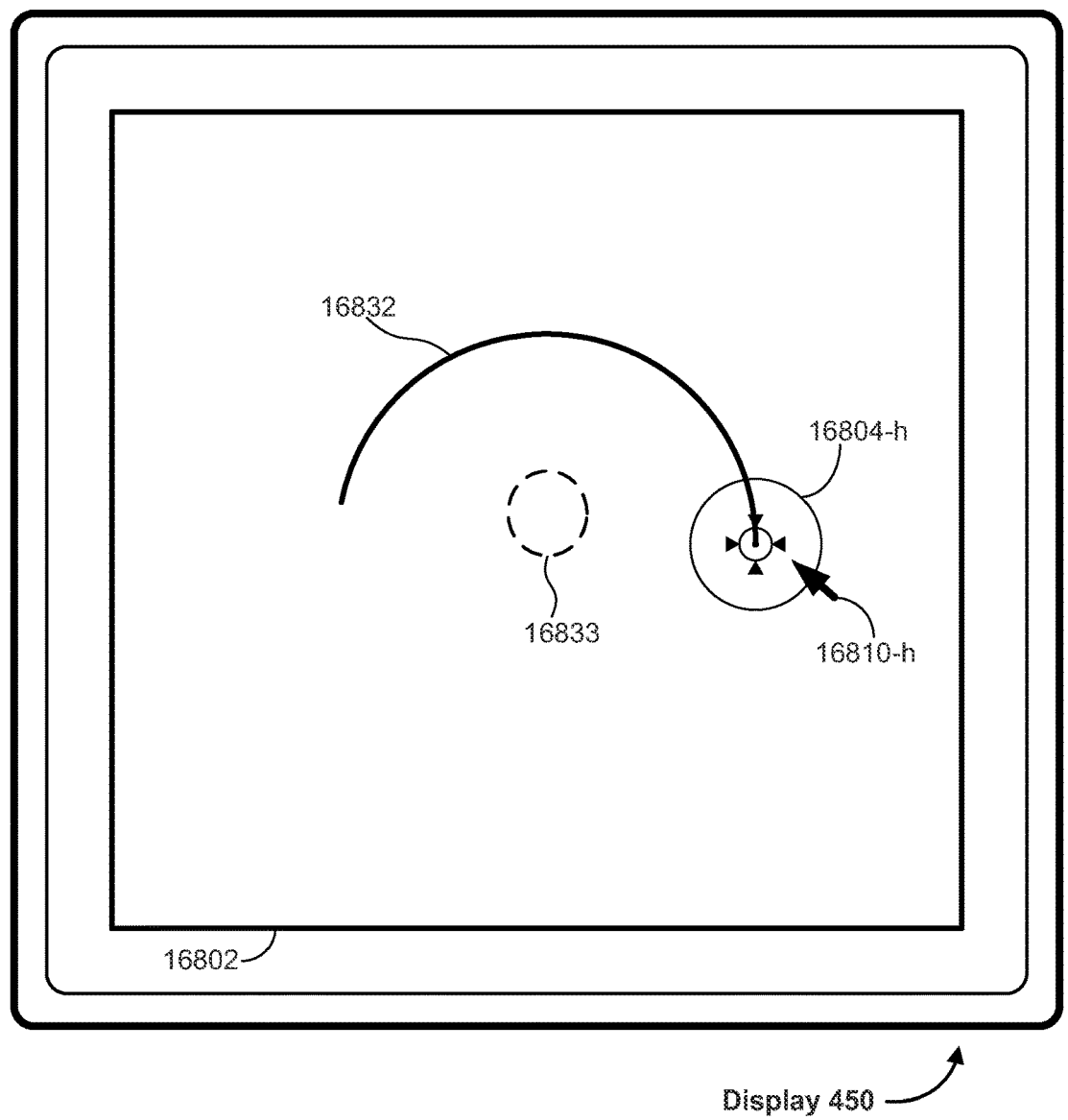
Figure 11I:
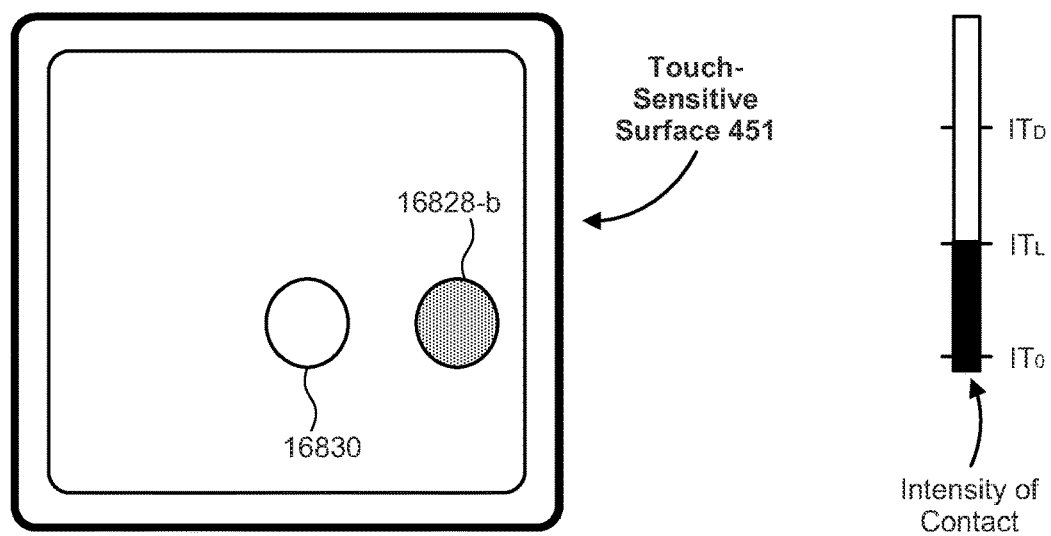

In response to detection of the movement of contact 16828, contact 16828 moves 16831 to location 16828-b, as shown in FIG. 11I. In accordance with the movement 16831 of contact 16828, brush manipulation object 16804 and cursor 16810 move to locations 16804-h and 16810-h, respectively, around location 16833, which corresponds to contact 16830. In FIGS. 11H-11I, a constant distance between location 16833 and brush manipulation object 16804 is maintained by the device. In some embodiments, the constant distance is determined based on the initial distance between contact 16828 and contact 16830 (e.g., a linear multiple of the initial distance between contact 16828 and contact 16830). Brush manipulation object 16804 draws stroke 16832 along its movement path (e.g., because the intensity of contact 16828 is above $IT_L$). Stroke 16832 has a width that is in accordance with the intensity of contact 16828. Stroke 16832 has a path that follows the movement of contact 16828 around location 16833. Thus, contact 16830 is analogous to the fixed or pivot point of a compass, and contact 16828 is analogous to the drawing point of the compass.

Figure 11J:
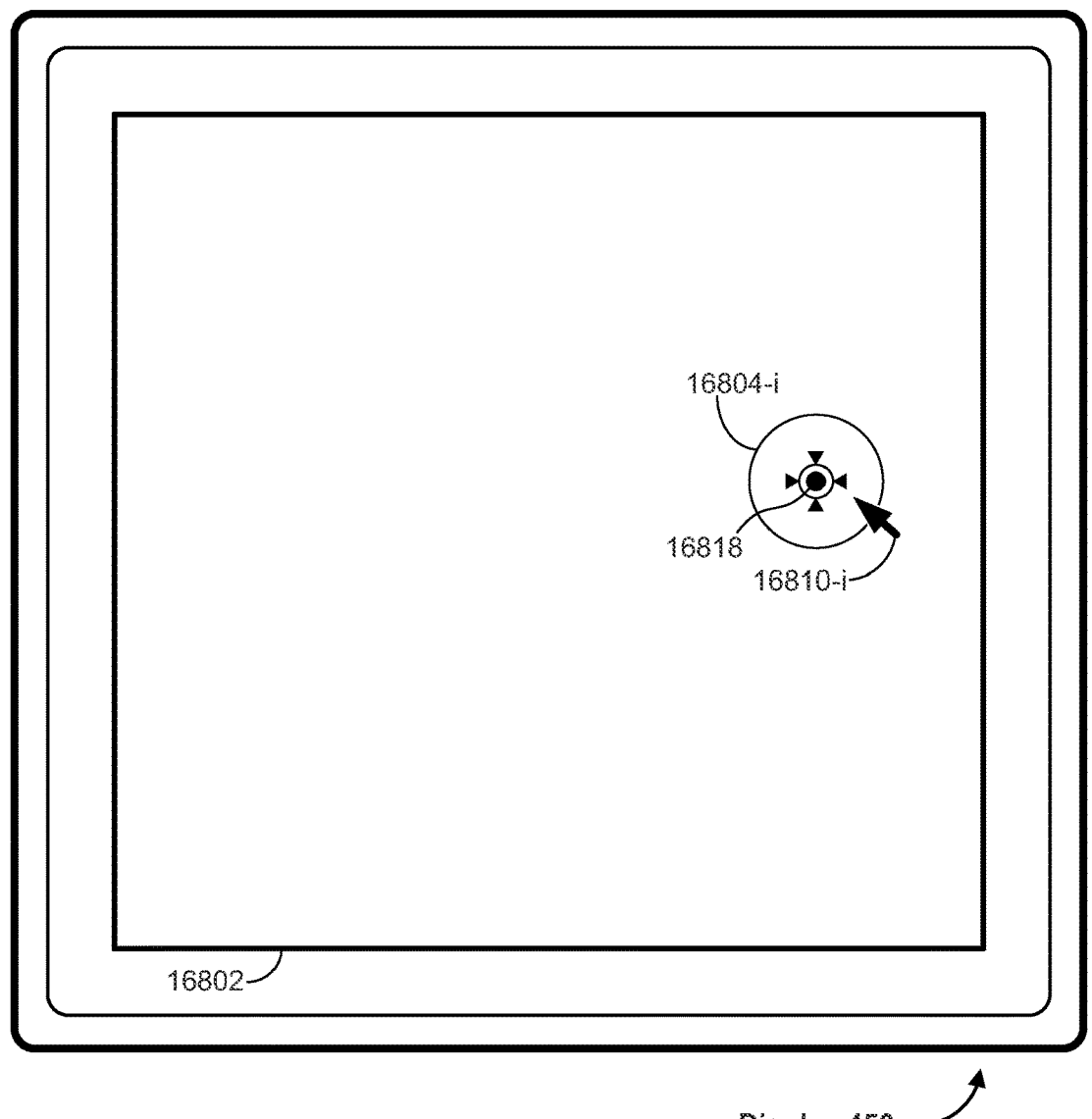
Figure 11J:
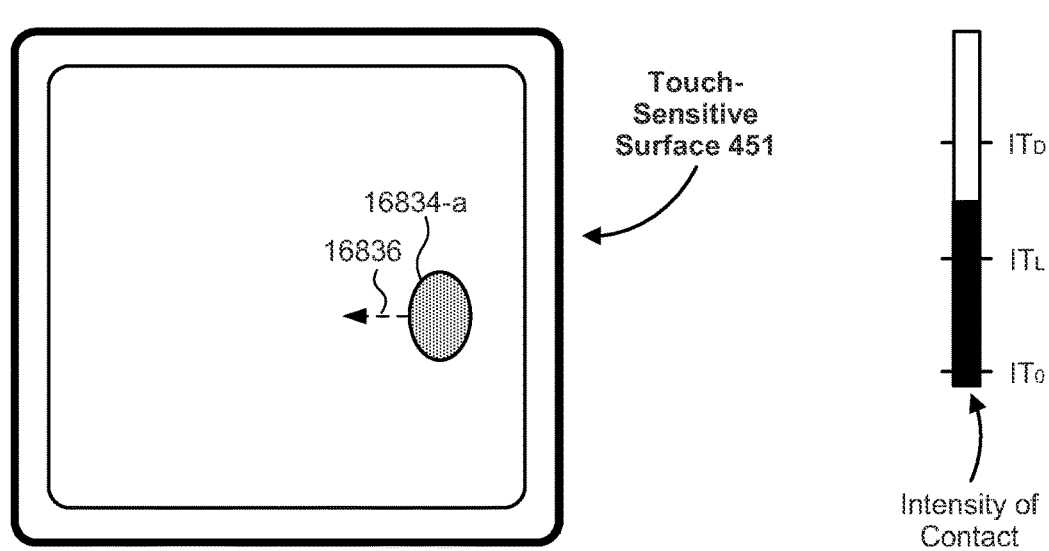
Figure 11K:
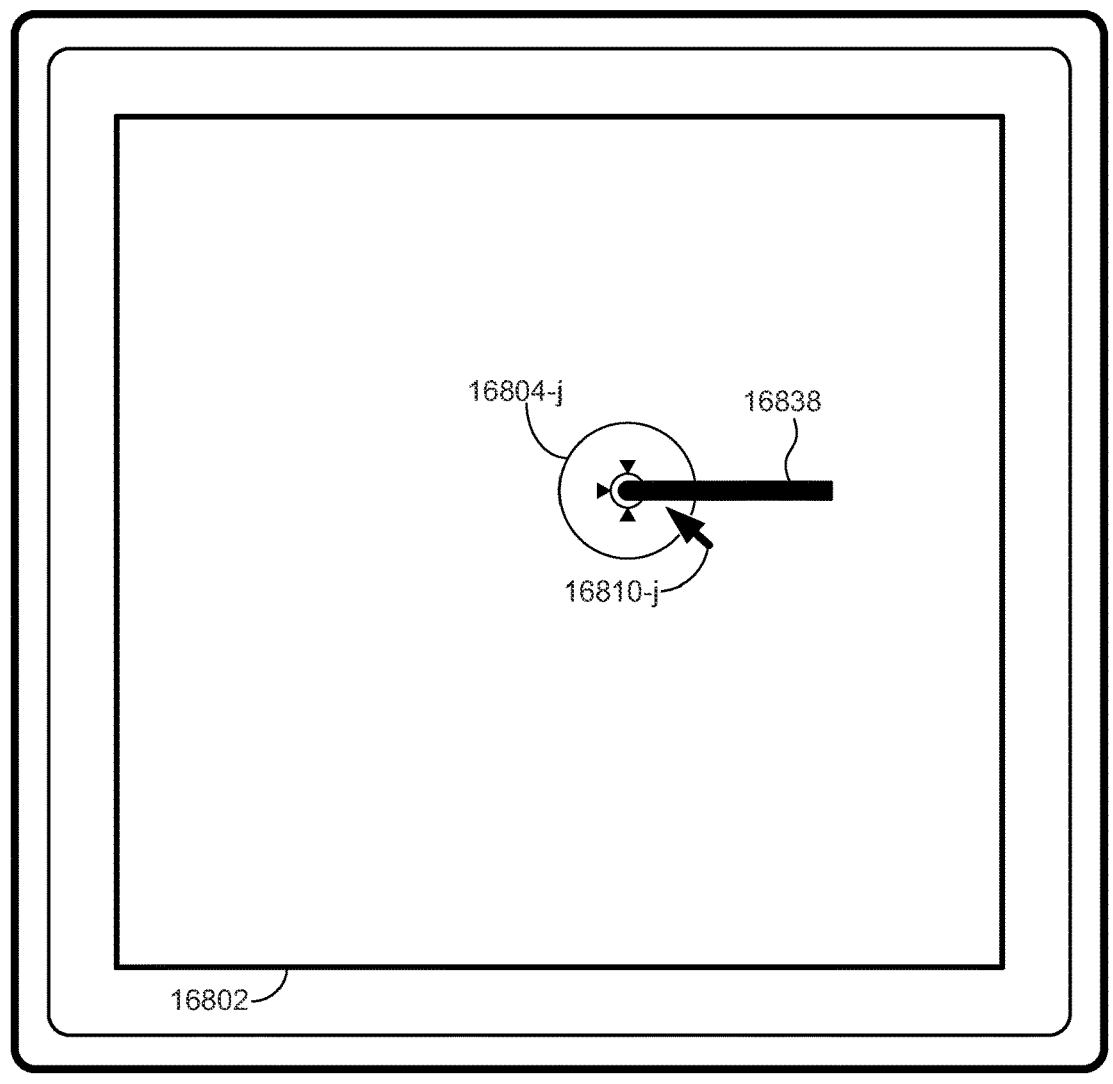
Figure 11K:
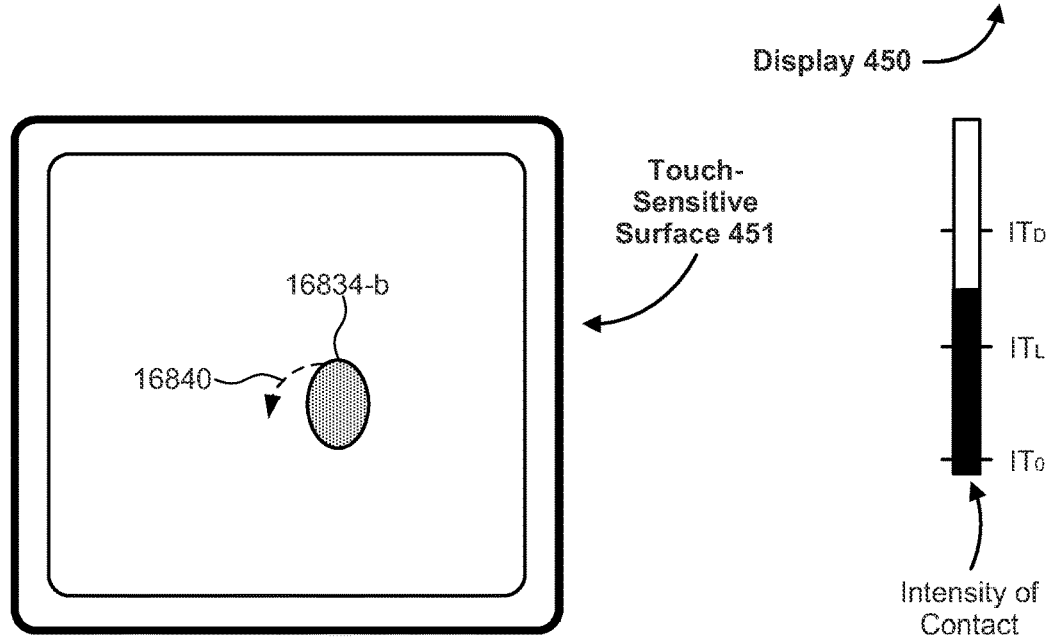

FIG. 11J illustrates brush manipulation object 16804 displayed at location 16804-i. Cursor 16810 is displayed over brush manipulation object 16804, at location 16810-i. Contact 16834 is detected on touch-sensitive surface 451 at location 16834-a. Contact 16834 has an intensity that is above threshold $IT_L$; virtual brush output is enabled and output indicator 16818 is displayed in brush manipulation object 16804. Movement of contact 16834 in direction 16836 is detected. In response to detection of the movement 16836 of contact 16834, contact 16834 moves to location 16834-b, as shown in FIG. 11K. In accordance with the movement 16836 of contact 16834, brush manipulation object 16804 and cursor 16810 move to locations 16804-j and 16810-j, respectively. Brush manipulation object 16804 draws stroke 16838 along its movement path. In FIG. 11K, stroke 16838 has a width that is in accordance with the intensity of contact 16828.

Figure 11L:
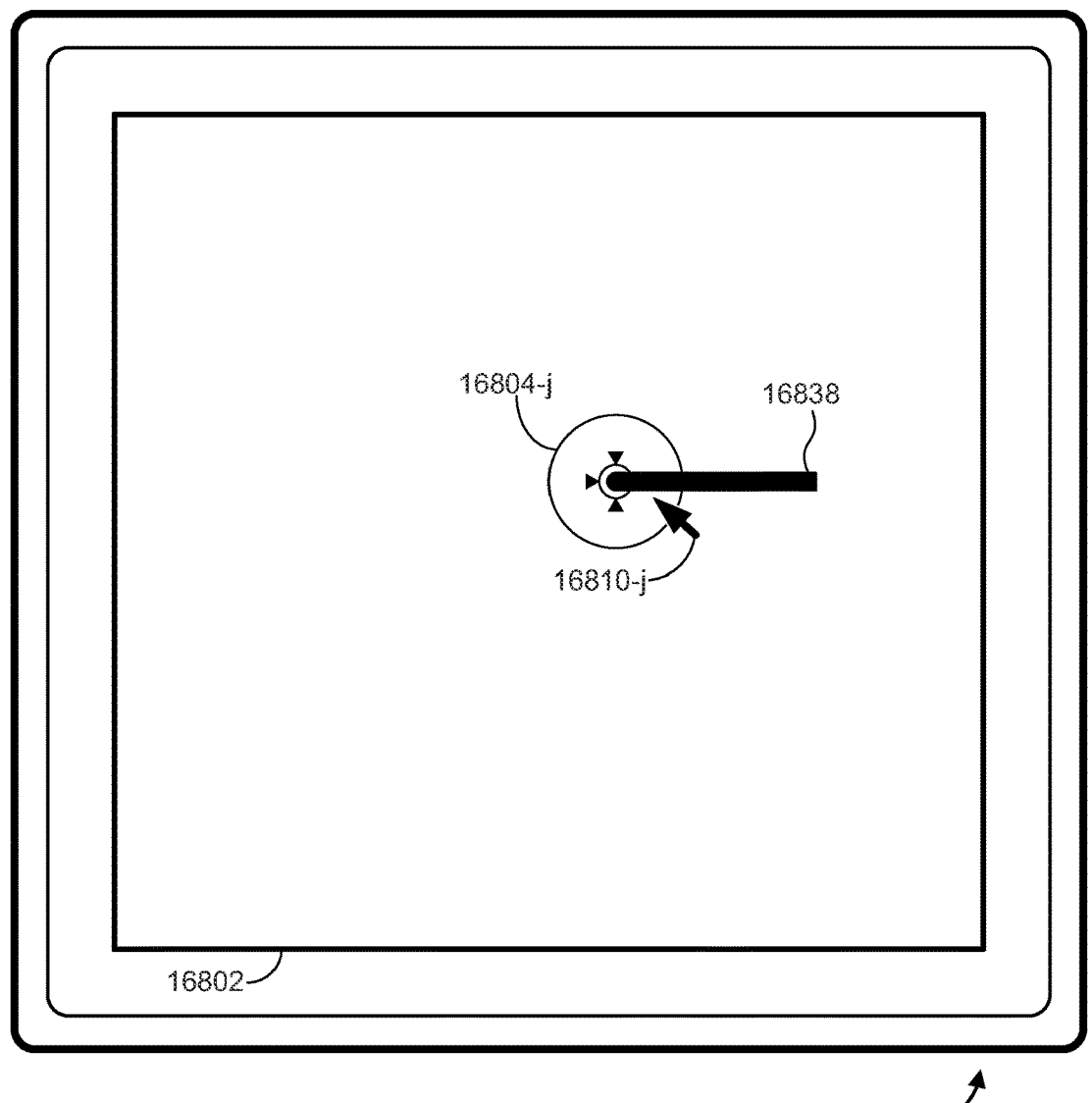
Figure 11L:
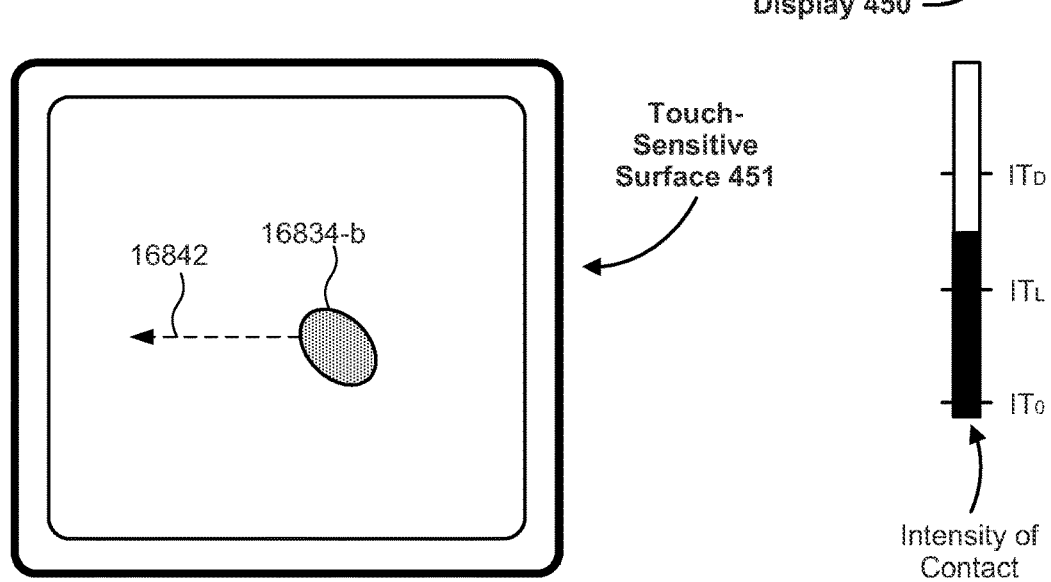

While at location 16834-b, contact 16834 is rotated in direction 16840, around an axis (not shown) perpendicular to display 450 (e.g., as shown in FIGS. 11K-11L). In response to the rotation of contact 16834, a virtual brush output property that is different than width or thickness is changed in accordance with the rotation of contact 16834. In some embodiments, the property that is changed in accordance with the contact rotation is color, opacity, or brush hardness.

Figure 11M:
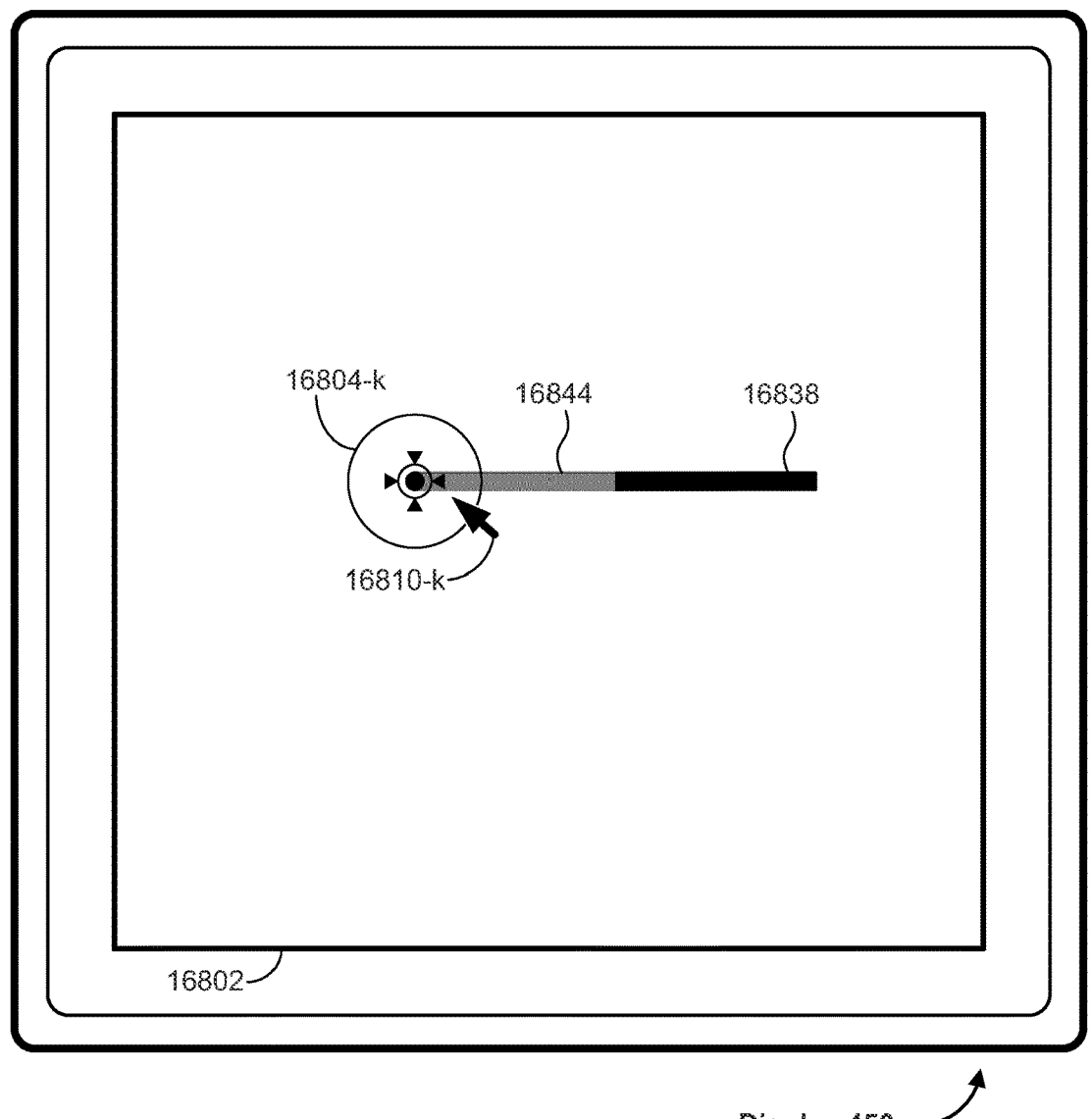
Figure 11M:
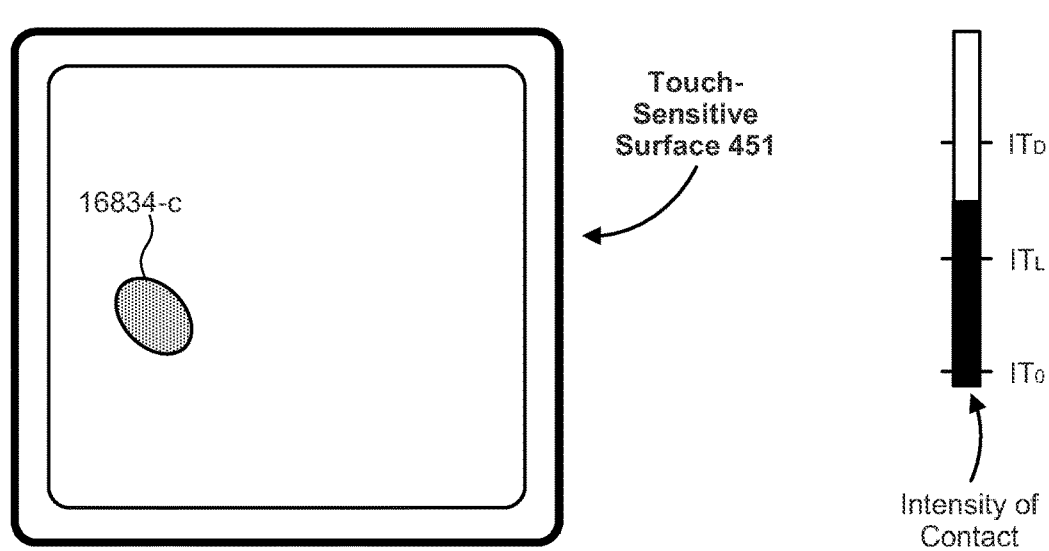

After the rotation of contact 16834, contact 16834 moves 16842, as shown in FIGS. 11L-11M from location 16834-b in FIG. 11L to location 16834-c in FIG. 11M. In response to detection of the movement 16842 of contact 16834, the device moves brush manipulation object 16804 and cursor 16810 from locations 16804-j and 16810-j in FIG. 11L to locations 16804-k and 16810-k in FIG. 11M, respectively. Brush manipulation object 16804 draws stroke 16844 along its movement path in FIGS. 11L-11M. In FIG. 11M, stroke 16844 has a width that is in accordance with the intensity of contact 16828. In accordance with the rotation of contact 16834, stroke 16844 has an opacity and/or color that is different from the opacity and/or color of stroke 16838.

Figure 11N:
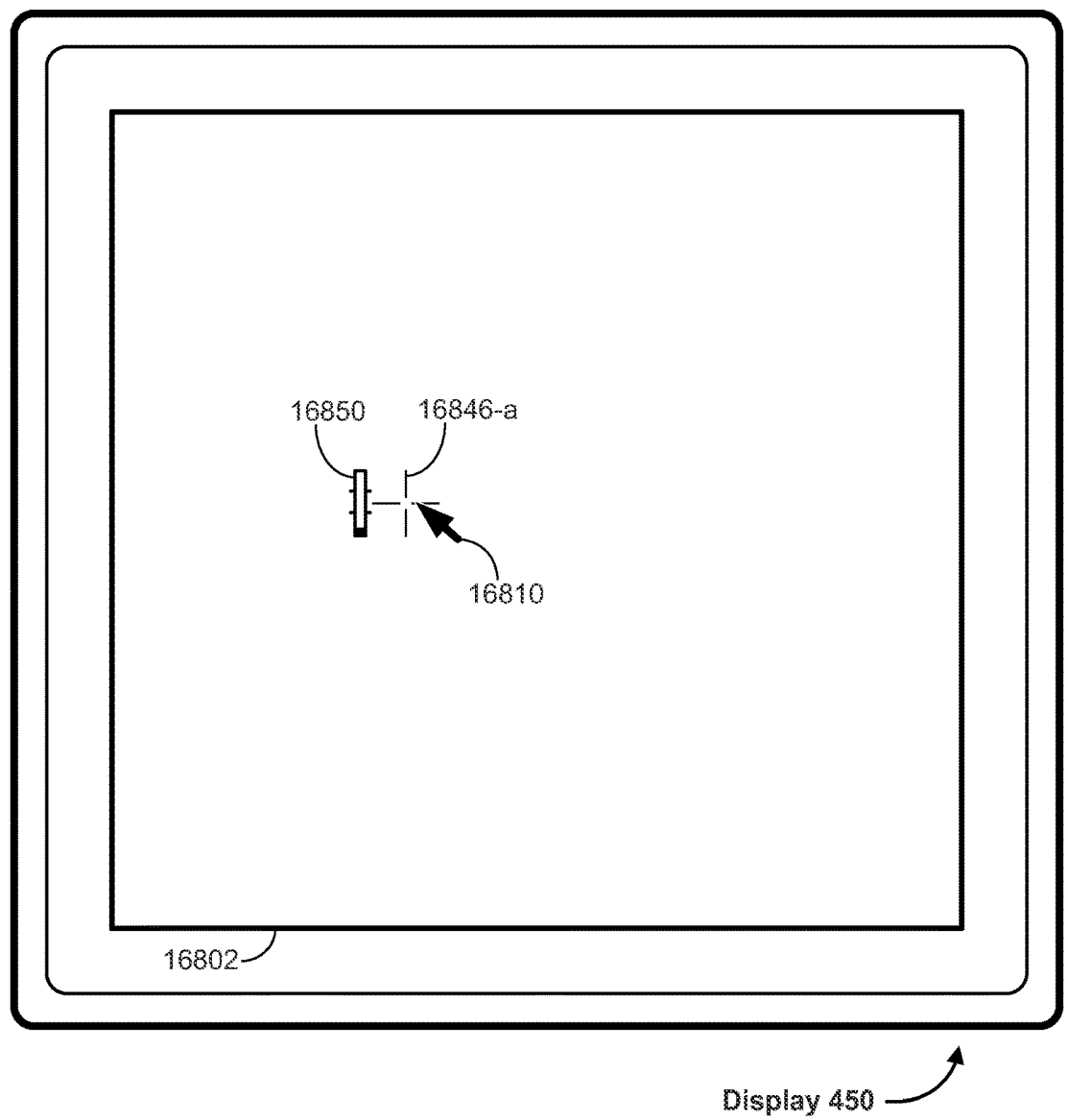
Figure 11N:
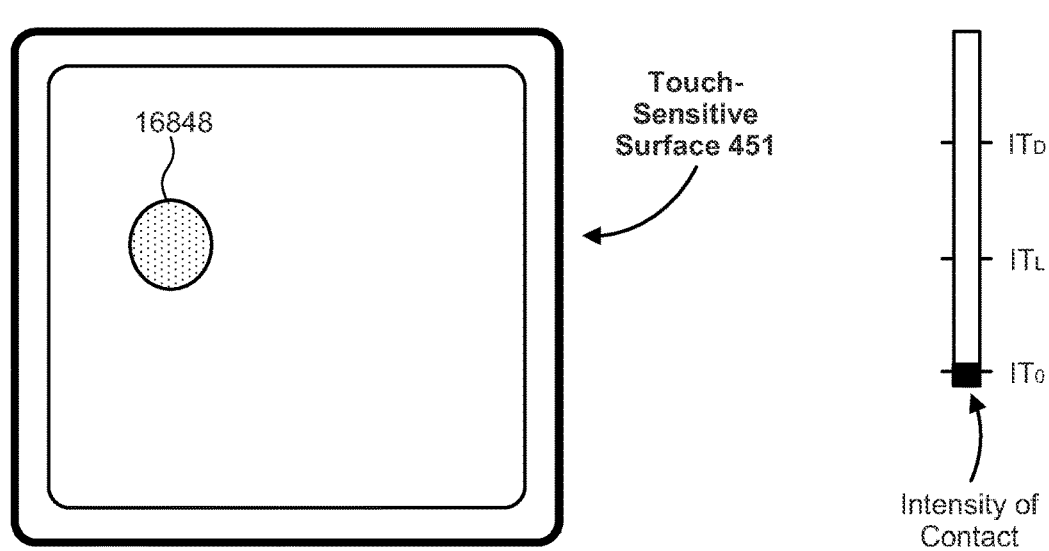
Figure 11O:
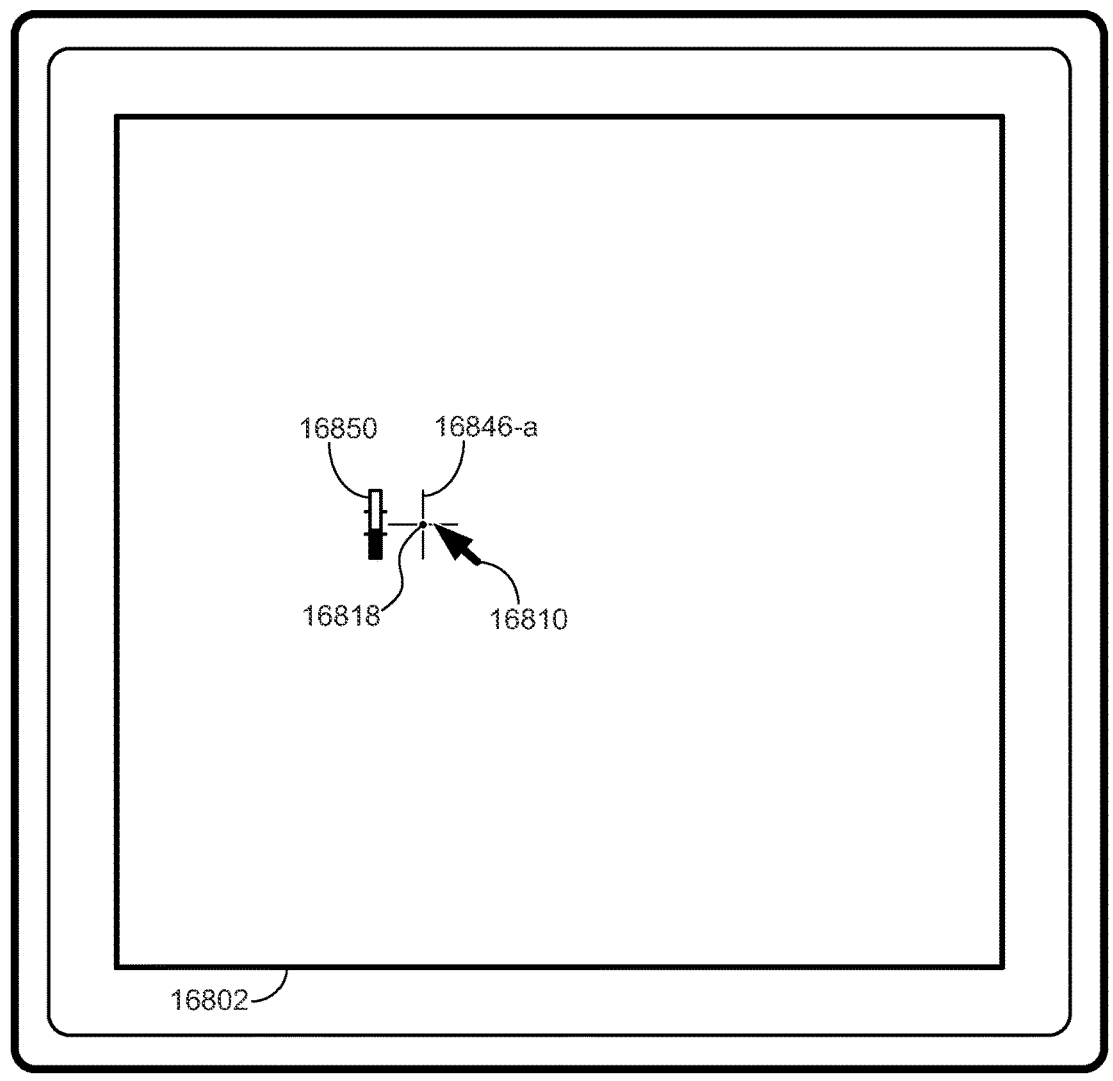
Figure 11O:
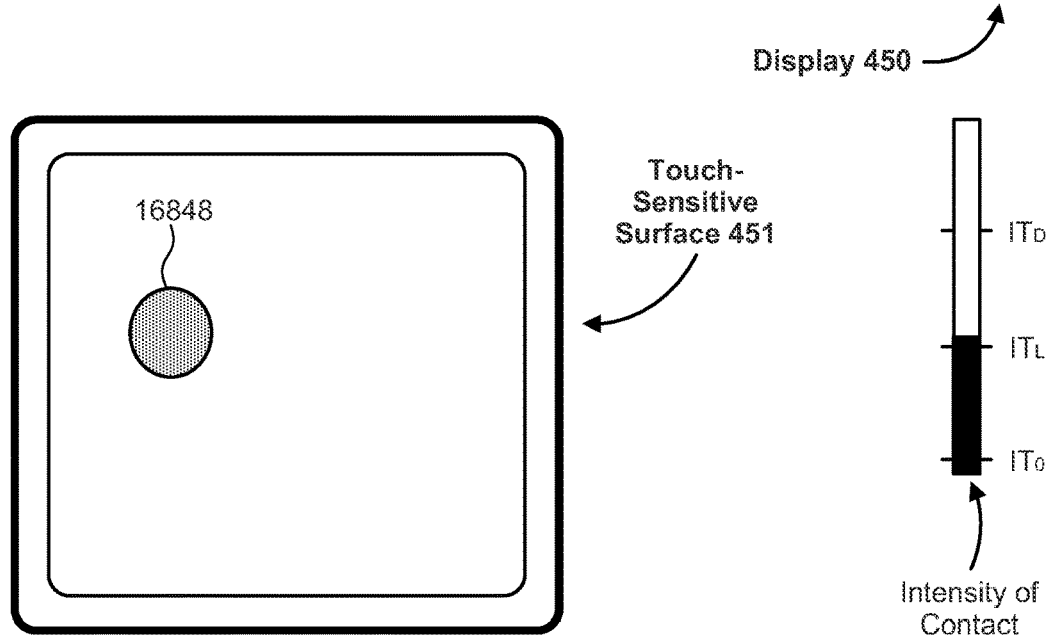

FIGS. 11A-11N illustrate one example of a brush manipulation object, namely brush manipulation object 16804 that is circular and includes output status indicators 16806 and brush status boundary 16808. FIGS. 11N-11P illustrate another example of a brush manipulation object. FIG. 11N illustrates brush manipulation object 16846 displayed on display 450, in virtual canvas 16802. Brush manipulation object 16846 is shaped like crosshairs and does not include output status indicators 16806 and brush status boundary 16808.

FIG. 11N also shows cursor 16810 displayed over brush manipulation object 16846 and contact 16848 detected on touch-sensitive surface 451 (e.g., with an intensity slightly above $IT_0$) while cursor 16810 is located over brush manipulation object 16846. An increase in the intensity of contact 16848 is detected, as shown in FIGS. 11N-11P (e.g., from an intensity below $IT_L$ in FIG. 11N to an intensity above $IT_L$ in FIG. 11O).

In response to detection of the increase in the intensity of contact 16848, bar 16850 is displayed adjacent to brush manipulation object 16846. In some embodiments, bar 16850 is displayed in response to detection of a change (increase or decrease) in the intensity of contact 16848. In some embodiments, bar 16850 is also displayed adjacent to brush manipulation object 16804 in response to detection of a change (increase or decrease) in the intensity of the contact controlling brush manipulation object 5404. Bar 16850 fills up as the intensity of a contact controlling brush manipulation object 16846 increases, and empties as the intensity decreases. In response to detection of an increase in the intensity of contact 16848 beyond a minimum threshold (e.g., $IT_L$), output indicator 16818 is displayed, as shown in FIGS. 11O-11P. The size of output indicator 16818 increases as the intensity of contact 16848 increases, indicating an increase in the width or thickness of virtual brush output generated from brush manipulation object 16846 when brush manipulation object 16846 is moved. Output indicator 16818 increases to a maximum size that is indicative of a maximum output width or thickness, as shown in FIG. 11P. The maximum size of output indicator 16818 corresponds to a predefined intensity threshold (e.g., $IT_D$) above which the width/thickness does not change any further in response to an increase in intensity of an associated contact. Brush manipulation object 16846 is configured to move across virtual canvas 16802 in accordance with movement of contact 16848 that is detected on touch-sensitive surface 451. Thus, in some embodiments, virtual brush output is drawn on virtual canvas 16802 along a path of movement of brush manipulation object 16846 whenever the intensity of contact 16848 is above threshold $IT_L$ during the movement of contact 16848.

FIGS. 12A-12C are flow diagrams illustrating a method 16900 of adjusting properties of a virtual brush in accordance with some embodiments. The method 16900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 16900 are, optionally combined and/or the order of some operations is, optionally changed.

As described below, the method 16900 provides an intuitive way to adjust properties of a virtual brush. The method reduces the cognitive burden on a user when adjusting properties of a virtual brush, thereby creating a more efficient human-machine interface. For battery-operated electronic devices, enabling a user to adjust properties of a virtual brush faster and more efficiently conserves power and increases the time between battery charges.

The device displays (16902) a brush manipulation object on the display, where the output of a virtual brush on a virtual canvas is controlled in accordance with one or more output properties of the virtual brush and movement of the brush manipulation object on the display. For example, FIG. 11A illustrates brush manipulation object 16804 displayed on display 450, in virtual canvas 16802. Virtual brush output generated from brush manipulation object 16804 is controlled in accordance with one or more properties of the virtual brush and movement of brush manipulation object 16804 on display 450.

While a focus selector is over or adjacent to the brush manipulation object, the device detects (16904) an increase in intensity of a first contact on the touch-sensitive surface. FIGS. 11A-11B and illustrate the increase in intensity of contact 16812 controlling brush manipulation object 16804 while cursor 16810 is located over brush manipulation object 16804. FIGS. 11C-11G and illustrate the increase in intensity of contact 16816 controlling brush manipulation object 16804 while cursor 16810 is located over brush manipulation object 16804. FIGS. 11N-11P and illustrate the increase in intensity of contact 16848 controlling brush manipulation object 16804 while cursor 16810 is located over brush manipulation object 16846.

In response (16906) to detecting the increase in intensity of the first contact, the device adjusts (16908) a first output property of the virtual brush in accordance with the increase in intensity of the first contact. In FIGS. 11C-11G, for example, virtual brush output and a width of the output is changed in accordance with the increase in the intensity of contact 16816. In some embodiments, the first output property is (16910) a property selected from the set consisting of: line width, line color, and line opacity. In FIGS. 11C-11G, for example, the output property that is changed in accordance with the increase in the intensity of contact 16816 is the line width of the output.

Also, in response (16906) to detecting the increase in intensity of the first contact, the device adjusts (16916) an appearance of the brush manipulation object in accordance with the change in the first output property of the virtual brush. In FIGS. 11A-11G, for example, the appearance of brush manipulation object 16804 is changed in accordance with the increase in the intensity of contact 16812 (e.g., output status indicators 16806 have moved toward brush status boundary 16808). In FIGS. 11C-11G, for example, the appearance of brush manipulation object 16804 is changed in accordance with the increase in the intensity of contact 16816 (e.g., output indicator 16818 is displayed and increases in size as the intensity of contact 16816 increases). In some embodiments, the brush includes a single drawing point. In some embodiments, the virtual brush includes multiple drawing points. In some embodiments, adjusting the appearance of the brush manipulation object includes (16918) displaying a bar that fills up as the intensity of the first contact increases. FIGS. 11N-11O, for example, illustrates bar 16850 displayed adjacent to brush manipulation object 16846 as the intensity of contact 16848 increases.

In some embodiments, adjusting the appearance of the brush manipulation object includes (16920) displaying a brush output status indicator that moves towards a brush status boundary in accordance with an intensity of the first contact, and adjusting the first output property of the virtual brush includes a binary change in the output of the virtual brush when the status indicator reaches the brush status boundary (e.g., start/stop drawing, change color). In FIGS. 11A-11G, for example, in accordance with the intensity of a contact (e.g., contact 16812 or 16816), output status indicators 16806 move toward brush status boundary 16808. When the intensity does not increase above a respective intensity threshold (e.g., $IT_L$), as is the case of contact 16812 in FIG. 11B, output status indicators 16806 move toward but do not reach brush status boundary 16808, and virtual brush output is not enabled. When the intensity increases above the respective intensity threshold (e.g., $IT_L$), as is the case of contact 16816 in FIG. 11C, output status indicators 16806 move toward and reach brush status boundary 16808, and virtual brush output is enabled.

In some embodiments, adjusting the first output property of the virtual brush includes (16921) a continuous change in the output of the virtual brush that corresponds to an increase in intensity of the first contact after the status indicator reaches the brush status boundary. In contrast, as described above, in some embodiments, before the status indicator reaches the brush status boundary, there is no output of the virtual brush, when the status indicator reaches the brush status boundary, the virtual brush has an initial output corresponding to an initial line width, and when the intensity of the first contact continues to increase beyond the intensity at which the status indicator reaches the brush status boundary, the line width of the virtual brush increases gradually to a maximum line width in accordance with the increase in intensity of the contact. For example, in FIGS. 11E-11G, the width of stroke 16826 increases continuously in accordance with the increase in the intensity of contact 16816 above threshold $IT_L$ (e.g., output status indicators 16806 has reached brush status boundary 16808). In some embodiments, the brush status boundary corresponds (16922) to a maximum size of the virtual brush (e.g., the brush status boundary is a circle and a marker moves toward the brush status boundary from the outside of the circle and the circle delineates a maximum brush width of the brush). For example, in FIG. 11G, output indicator 16818 increases up to the size of brush status boundary 16808 in accordance with the increase in the intensity of contact 16816. The maximum size of output indicator 16818 corresponds to the maximum width of stroke 16826.

In some embodiments, the device detects (16924) movement of the first contact on the touch-sensitive surface (e.g., prior to, during or after detecting the increase in intensity of the first contact on the touch-sensitive surface), and moves (16926) the brush manipulation object on the display in accordance with the movement of the first contact on the touch-sensitive surface. For example, brush manipulation object 16804 moves in accordance with the movement 16814 of contact 16812, as shown in FIGS. 11A-11B or in accordance with the movement 16820 and 16824 of contact 16816, as shown in FIGS. 11C-11G.

In some embodiments, while detecting the first contact, the device detects (16928) a second contact on the touch-sensitive surface and detects movement (16930) of the first contact on the touch-sensitive surface. In response to detecting the movement of the first contact on the touch-sensitive surface, the device moves (16932) the brush manipulation object around a location on the display corresponding to the second contact in accordance with a predefined constraint (e.g., the brush acts as a virtual compass with a second contact acting as a fixed point of the compass). As FIGS. 11H-11I show, for example, contact 16828 moves around concurrently detected contact 16830. In response to detection of the movement of contact 16828 around contact 16830, brush manipulation object 16804 moves around location 16833, which corresponds to contact 16830, with a constant distance maintained between brush manipulation object 16804 and location 16833.

In some embodiments, the device moves (16934) the brush manipulation object while the one or more output properties of the virtual brush meet predefined output generation criteria, and while moving the brush manipulation object, (e.g., in response to movement of the first contact on the touch-sensitive surface that corresponds to movement of the brush manipulation object), the device generates (16936) an output of the virtual brush on the virtual canvas in accordance with movement of the brush manipulation object. For example, in FIGS. 11C-11E, brush manipulation object 16804 is moved while virtual brush output is enabled with a non-zero width. In response to the movement of brush manipulation object 16804, stroke 16822 is generated while brush manipulation object 16804 is moving, along the path of movement of brush manipulation object 16804.

In some embodiments, while a focus selector is over the brush manipulation object, the device detects (16938) a change in rotation of the first contact on the touch-sensitive surface. In response to detecting the change in rotation of the first contact, the device adjusts (16940) a second output property of the virtual brush in accordance with the change in rotation of the first contact, where the second output property is different from the first output property. For example, FIGS. 11J-11M show the width of virtual brush output being determined based on the intensity of contact 16834 and the opacity and/or color of virtual brush output being determined based on the rotation of contact 16834. In some embodiments, the first output property includes (16942) a thickness of a line corresponding to the virtual brush, and the second output property is an output property selected from the set consisting of: a color of the line, an opacity of the line, and a hardness of the virtual brush. For example, FIGS. 11J-11M show the width of virtual brush output being determined based on the intensity of contact 16834 and the opacity and/or color of virtual brush output being determined based on the rotation of contact 16834.

It should be understood that the particular order in which the operations in FIGS. 12A-12C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 16900 described above with respect to FIGS. 12A-12C. For example, the contacts, intensity thresholds, and focus selectors described above with reference to method 16900 optionally have one or more of the characteristics of the contacts, intensity thresholds, and focus selectors described herein with reference to other methods described herein (e.g., those listed in the fifth paragraph of the Description of Embodiments). For brevity, these details are not repeated here.

Figure 13:
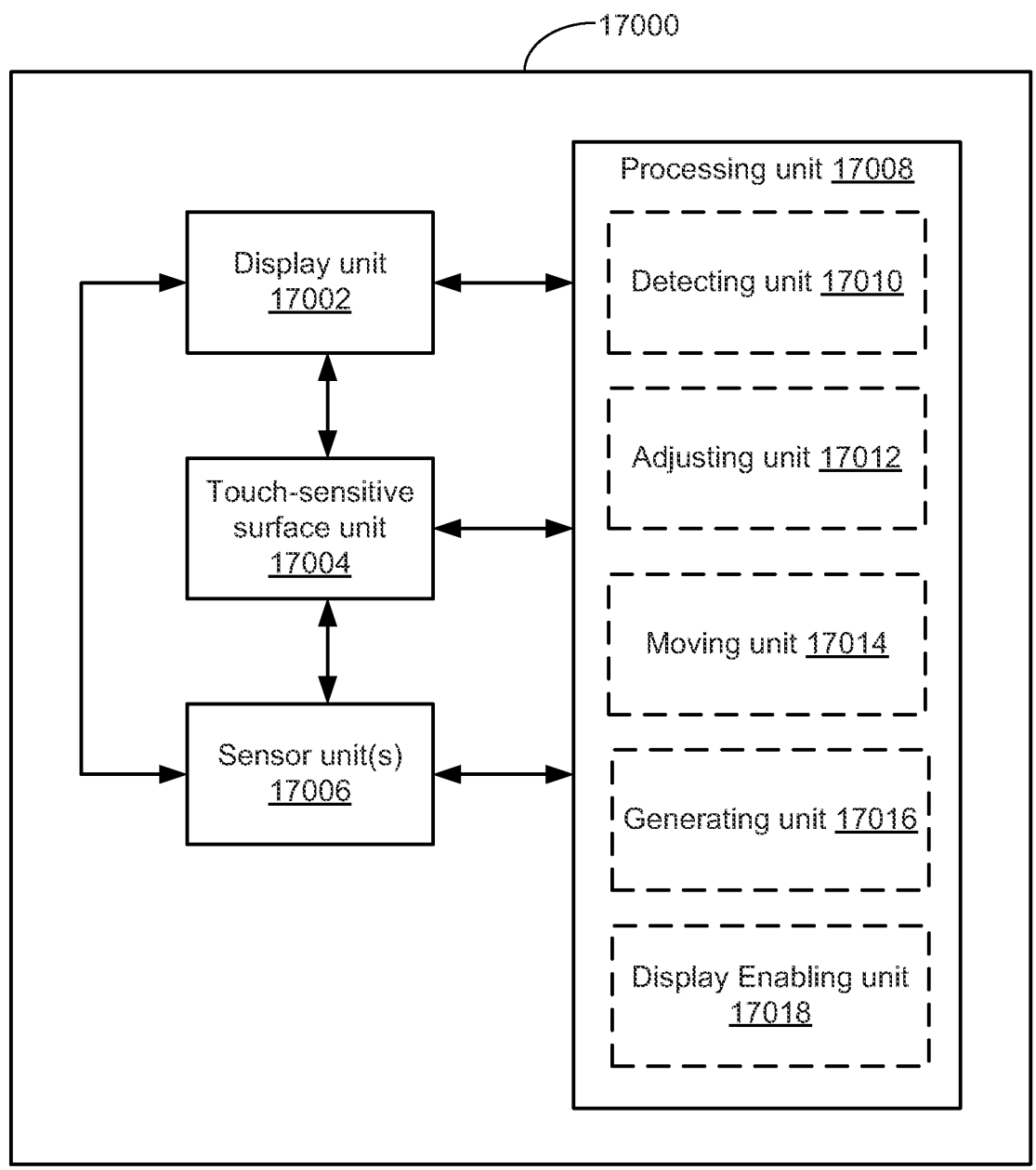
FIG. 13 is a functional block diagram of an electronic device in accordance with some embodiments.

In accordance with some embodiments, FIG. 13 shows a functional block diagram of an electronic device 17000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 17000 includes a display unit 17002 configured to display a brush manipulation object on the display unit 17002, wherein the output of a virtual brush on a virtual canvas is controlled in accordance with one or more output properties of the virtual brush and movement of the brush manipulation object on the display unit 17002; a touch-sensitive surface unit 17004 configured to receive contacts; one or more sensors 17006 configured to detect intensity of contacts with the touch-sensitive surface unit 17004; and a processing unit 17008 coupled to the display unit 17002, the touch-sensitive surface unit 17004 and the one or more sensors 17006. In some embodiments, the processing unit 17008 includes a detecting unit 17010, an adjusting unit 17012, a moving unit 17014, a generating unit 17016, and a display enabling unit 17018.

The processing unit 17008 is configured to: while a focus selector is over or adjacent to the brush manipulation object, detect an increase in intensity of a first contact on the touch-sensitive surface unit 17004 (e.g., with the detecting unit 17010); and in response to detecting the increase in intensity of the first contact: adjust a first output property of the virtual brush in accordance with the increase in intensity of the first contact (e.g., with the adjusting unit 17012), and adjust an appearance of the brush manipulation object in accordance with the change in the first output property of the virtual brush (e.g., with the adjusting unit 17012).

In some embodiments, the processing unit 17008 is configured to: detect movement of the first contact on the touch-sensitive surface unit 17004 (e.g., with the detecting unit 17010), and move the brush manipulation object on the display unit 17002 in accordance with the movement of the first contact on the touch-sensitive surface unit 17004 (e.g., with the moving unit 17014).

In some embodiments, the processing unit 17008 is configured to: while detecting the first contact, detect a second contact on the touch-sensitive surface unit 17004 (e.g., with the detecting unit 17010), detect movement of the first contact on the touch-sensitive surface unit 17004 (e.g., with the detecting unit 17010), and in response to detecting the movement of the first contact on the touch-sensitive surface unit 17004, move the brush manipulation object around a location on the display unit 17002 corresponding to the second contact in accordance with a predefined constraint (e.g., with the moving unit 17014).

In some embodiments, the processing unit 17008 is configured to: move the brush manipulation object while the one or more output properties of the virtual brush meet predefined output generation criteria (e.g., with the moving unit 17014), and while moving the brush manipulation object, generate an output of the virtual brush on the virtual canvas in accordance with movement of the brush manipulation object (e.g., with the generating unit 17016).

In some embodiments, the first output property is a property selected from the set consisting of: line width, line color, and line opacity.

In some embodiments, adjusting the appearance of the brush manipulation object includes enabling display of a bar that fills up as the intensity of the first contact increases.

In some embodiments, adjusting the appearance of the brush manipulation object includes enabling display of a brush output status indicator that moves towards a brush status boundary in accordance with an intensity of the first contact (e.g., with the display enabling unit 17018), and adjusting the first output property of the virtual brush includes a binary change in the output of the virtual brush when the status indicator reaches the brush status boundary (e.g., with the adjusting unit 17012).

In some embodiments, adjusting the first output property of the virtual brush includes a continuous change in the output of the virtual brush that corresponds to an increase in intensity of the first contact after the status indicator reaches the brush status boundary.

In some embodiments, the brush status boundary corresponds to a maximum size of the virtual brush.

In some embodiments, the processing unit 17008 is configured to: while a focus selector is over the brush manipulation object, detect a change in rotation of the first contact on the touch-sensitive surface unit 17004 (e.g., with the detecting unit 17010), and in response to detecting the change in rotation of the first contact, adjust a second output property of the virtual brush in accordance with the change in rotation of the first contact, wherein the second output property is different from the first output property (e.g., with the adjusting unit 17012).

In some embodiments, the first output property includes a thickness of a line corresponding to the virtual brush, and the second output property is an output property selected from the set consisting of: a color of the line, an opacity of the line, and a hardness of the virtual brush.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12C are, optionally implemented by components depicted in FIGS. 1A-1B or FIG. 13. For example, detection operation 16904 and adjusting operations 16908 and 16916 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions, which, when executed by an electronic device with a display, a touch-sensitive surface and one or more sensors to detect intensities of contacts with the touch-sensitive surface, cause the electronic device to:
   display a respective control icon with simulated three-dimensional characteristics;
   display a cursor over the respective control icon;
   detect, on the touch-sensitive surface, a stationary press input that includes an increase in intensity of a contact that corresponds to the cursor; and
   in response to detecting the stationary press input:
      change an appearance of the simulated three-dimensional characteristics of the respective control icon; and
      move the cursor laterally on the display in accordance with the change in appearance of the simulated three-dimensional characteristics of the respective control icon wherein the amount of lateral movement of the cursor on the display is determined based on an amount of change in appearance of the simulated three-dimensional characteristics of the respective control icon on the display.

2. The non-transitory computer readable storage medium of claim 1, wherein the respective control icon moves laterally on the display to simulate downward motion of a button when viewed at an angle.

3. The non-transitory computer readable storage medium of claim 1, wherein:
the cursor is stationary relative to the respective control icon; and
the cursor moves laterally relative to a background.

4. The non-transitory computer readable storage medium of claim 1, including instructions which cause the electronic device to, in response to detecting the stationary press input, reduce a size of the cursor in accordance with the increase in intensity of the contact.

5. The non-transitory computer readable storage medium of claim 1, including instructions which cause the electronic device to, after detecting the increase in intensity of the contact that corresponds to the cursor:
detect, on the touch-sensitive surface, a decrease in intensity of the contact that corresponds to the cursor; and
in response to detecting the decrease in intensity of the contact, increase a size of the cursor in accordance with the decrease in intensity of the contact.

6. The non-transitory computer readable storage medium of claim 1, including instructions which cause the electronic device to, after detecting the increase in intensity of the contact that corresponds to the cursor:
detect, on the touch-sensitive surface, a decrease in intensity of the contact that corresponds to the cursor;
in response to detecting the decrease in intensity of the contact:
change the appearance of the simulated three-dimensional characteristics of the respective control icon; and
move the cursor laterally on the display in accordance with the change in appearance of the simulated three-dimensional characteristics of the respective control icon in a direction that is substantially opposite to a direction in which the cursor was moved in response to detecting the increase in intensity of the contact that corresponds to the cursor.

7. The non-transitory computer readable storage medium of claim 1, including instructions which cause the electronic device to, prior to detecting the stationary press input:
detect movement of the contact on the touch-sensitive surface; and
in response to detecting movement of the contact on the touch-sensitive surface, move the cursor in accordance with the movement of the contact.

8. The non-transitory computer readable storage medium of claim 1, including instructions which cause the electronic device to:
display a plurality of control icons with different simulated three-dimensional characteristics;
in accordance with a determination that the respective control icon is a first control icon with a first simulated three-dimensional characteristic, perform a first movement of the cursor in response to detecting the stationary press input; and
in accordance with a determination that the respective control icon is a second control icon with a second simulated three-dimensional characteristic, different from the first simulated three-dimensional characteristic, perform a second movement of the cursor, different from the first movement of the cursor, in response to detecting the stationary press input.

9. The non-transitory computer readable storage medium of claim 1, wherein the amount of change in appearance of the simulated three-dimensional characteristics of the respective control icon is determined based on the intensity of the contact on the touch-sensitive surface.

10. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying a respective control icon with simulated three-dimensional characteristics;
displaying a cursor over the respective control icon;
detecting, on the touch-sensitive surface, a stationary press input that includes an increase in intensity of a contact that corresponds to the cursor; and
in response to detecting the stationary press input:
changing an appearance of the simulated three-dimensional characteristics of the respective control icon; and
moving the cursor laterally on the display in accordance with the change in appearance of the simulated three-dimensional characteristics of the respective control icon wherein the amount of lateral movement of the cursor on the display is determined based on an amount of change in appearance of the simulated three-dimensional characteristics of the respective control icon on the display.

11. The electronic device of claim 10, wherein the respective control icon moves laterally on the display to simulate downward motion of a button when viewed at an angle.

12. The electronic device of claim 10, wherein:
the cursor is stationary relative to the respective control icon; and
the cursor moves laterally relative to a background.

13. The electronic device of claim 10, including instructions for, in response to detecting the stationary press input, reduce a size of the cursor in accordance with the increase in intensity of the contact.

14. The electronic device of claim 10, including instructions for, after detecting the increase in intensity of the contact that corresponds to the cursor:
detecting, on the touch-sensitive surface, a decrease in intensity of the contact that corresponds to the cursor; and
in response to detecting the decrease in intensity of the contact, increasing a size of the cursor in accordance with the decrease in intensity of the contact.

15. The electronic device of claim 10, including instructions for, after detecting the increase in intensity of the contact that corresponds to the cursor:
detecting, on the touch-sensitive surface, a decrease in intensity of the contact that corresponds to the cursor;
in response to detecting the decrease in intensity of the contact:
changing the appearance of the simulated three-dimensional characteristics of the respective control icon; and
moving the cursor laterally on the display in accordance with the change in appearance of the simulated three-dimensional characteristics of the respective control icon in a direction that is substantially opposite to a direction in which the cursor was moved in response to detecting the increase in intensity of the contact that corresponds to the cursor.

16. The electronic device of claim 10, including instructions for, prior to detecting the stationary press input:
   detecting movement of the contact on the touch-sensitive surface; and
   in response to detecting movement of the contact on the touch-sensitive surface, moving the cursor in accordance with the movement of the contact.

17. The electronic device of claim 10, including instructions for:
   displaying a plurality of control icons with different simulated three-dimensional characteristics;
   in accordance with a determination that the respective control icon is a first control icon with a first simulated three-dimensional characteristic, performing a first movement of the cursor in response to detecting the stationary press input; and
   in accordance with a determination that the respective control icon is a second control icon with a second simulated three-dimensional characteristic, different from the first simulated three-dimensional characteristic, performing a second movement of the cursor, different from the first movement of the cursor, in response to detecting the stationary press input.

18. The electronic device of claim 10, wherein the amount of change in appearance of the simulated three-dimensional characteristics of the respective control icon is determined based on the intensity of the contact on the touch-sensitive surface.

19. A method, comprising:
   at an electronic device with a display and a touch-sensitive surface, wherein the electronic device includes one or more sensors to detect intensities of contacts with the touch-sensitive surface:
   displaying a respective control icon with simulated three-dimensional characteristics;
   displaying a cursor over the respective control icon;
   detecting, on the touch-sensitive surface, a stationary press input that includes an increase in intensity of a contact that corresponds to the cursor; and
   in response to detecting the stationary press input:
      changing an appearance of the simulated three-dimensional characteristics of the respective control icon; and
      moving the cursor laterally on the display in accordance with the change in appearance of the simulated three-dimensional characteristics of the respective control icon wherein the amount of lateral movement of the cursor on the display is determined based on an amount of change in appearance of the simulated three-dimensional characteristics of the respective control icon on the display.

20. The method of claim 19, wherein the respective control icon moves laterally on the display to simulate downward motion of a button when viewed at an angle.

21. The method of claim 19, wherein:
   the cursor is stationary relative to the respective control icon; and
   the cursor moves laterally relative to a background.

22. The method of claim 19, including, in response to detecting the stationary press input, reduce a size of the cursor in accordance with the increase in intensity of the contact.

23. The method of claim 19, including, after detecting the increase in intensity of the contact that corresponds to the cursor:
   detecting, on the touch-sensitive surface, a decrease in intensity of the contact that corresponds to the cursor; and
   in response to detecting the decrease in intensity of the contact, increasing a size of the cursor in accordance with the decrease in intensity of the contact.

24. The method of claim 19, including, after detecting the increase in intensity of the contact that corresponds to the cursor:
   detecting, on the touch-sensitive surface, a decrease in intensity of the contact that corresponds to the cursor;
   in response to detecting the decrease in intensity of the contact:
      changing the appearance of the simulated three-dimensional characteristics of the respective control icon; and
      moving the cursor laterally on the display in accordance with the change in appearance of the simulated three-dimensional characteristics of the respective control icon in a direction that is substantially opposite to a direction in which the cursor was moved in response to detecting the increase in intensity of the contact that corresponds to the cursor.

25. The method of claim 19, including, prior to detecting the stationary press input:
   detecting movement of the contact on the touch-sensitive surface; and
   in response to detecting movement of the contact on the touch-sensitive surface, moving the cursor in accordance with the movement of the contact.

26. The method of claim 19, including:
   displaying a plurality of control icons with different simulated three-dimensional characteristics;
   in accordance with a determination that the respective control icon is a first control icon with a first simulated three-dimensional characteristic, performing a first movement of the cursor in response to detecting the stationary press input; and
   in accordance with a determination that the respective control icon is a second control icon with a second simulated three-dimensional characteristic, different from the first simulated three-dimensional characteristic, performing a second movement of the cursor, different from the first movement of the cursor, in response to detecting the stationary press input.

27. The method of claim 19, wherein the amount of change in appearance of the simulated three-dimensional characteristics of the respective control icon is determined based on the intensity of the contact on the touch-sensitive surface.

* * * * *